United States Patent
Takenaka et al.

(10) Patent No.: US 6,969,965 B2
(45) Date of Patent: Nov. 29, 2005

(54) CONTROLLER OF LEGGED MOBILE ROBOT

(75) Inventors: Toru Takenaka, Wako (JP); Takashi Matsumoto, Wako (JP); Takahide Yoshiike, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/501,562

(22) PCT Filed: Jan. 20, 2003

(86) PCT No.: PCT/JP03/00435

§ 371 (c)(1),
(2), (4) Date: Jul. 14, 2004

(87) PCT Pub. No.: WO03/061917

PCT Pub. Date: Jul. 31, 2003

(65) Prior Publication Data

US 2005/0110448 A1   May 26, 2005

(30) Foreign Application Priority Data

Jan. 18, 2002   (JP) ........................ 2002-009891

(51) Int. Cl.[7] .................................................. B25J 9/18
(52) U.S. Cl. ............................ 318/568.12; 318/568.11; 318/568.1
(58) Field of Search ....................... 318/568.12, 568.11, 318/568.1, 560; 901/1, 3, 5, 7, 12, 13

(56) References Cited

U.S. PATENT DOCUMENTS 5,349,277 A * 9/1994 Takahashi et al. ..... 318/568.12

FOREIGN PATENT DOCUMENTS

| EP | 1 120 203 A1 | 8/2001 |
|----|---|---|
| JP | 62-097005 | 5/1987 |
| JP | 63-150176 | 6/1988 |
| JP | 03-184782 | 8/1991 |
| JP | 04-201187 | 7/1992 |
| JP | 05-305579 | 11/1993 |
| JP | 05-324115 | 12/1993 |
| JP | 05-337849 | 12/1993 |
| JP | 10-086080 | 4/1998 |
| JP | 10-086081 | 4/1998 |
| JP | 10-277969 | 10/1998 |
| JP | 2002-326173 | 11/2002 |

OTHER PUBLICATIONS

WO 01/87548 A1, Floor Shape Deducing Device for Legged Mobile Robot, Publication Date: Nov. 22, 2001.

* cited by examiner

Primary Examiner—Karen Masih
(74) Attorney, Agent, or Firm—Rankin, Hill, Porter & Clark LLP

(57) ABSTRACT

A control device for a legged mobile robot, in which a correction manipulated variable of a desired floor reaction force (desired floor reaction force's moment) is subsequently determined based on an error between an actual state quantity, such as a body posture angle, of the robot 1 and a desired state quantity of the same, and at the same time, a desired movement of the robot 1 is subsequently determined by the use of the correction manipulated variable and a dynamic model. At this time, a friction force component, which defines a frictional force between the robot 1 and a floor such as a translation floor reaction force's horizontal component, is set as a variable to be limited, and an allowable range of the variable to be limited is set. The desired movement is determined so that the variable to be limited remains within the allowable range and a resultant force of an inertial force and gravity, generated by the movement of the robot 1 on the dynamic model, balances with a floor reaction force obtained by correcting the desired floor reaction force by the correction manipulated variable. The desired movement is determined by adjusting a plurality of movement modes having mutually different generation ratios of a floor reaction force's moment and a translation floor reaction force.

25 Claims, 51 Drawing Sheets

(RUNNING GAIT)

(DESIRED FLOOR REACTION FORCE'S VERTICAL COMPONENT)

(DESIRED ZMP)

(BODY TRANSLATION MODE)

(BODY ROTATION MODE)

(SIMPLIFIED MODEL WITH FLYWHEEL)

(FULL MODEL)

FIG.12 (FLOWCHART OF GAIT GENERATION PROCESS)

( DIVERGENCE STATE OF BODY POSITION )

(PROCESS OF DETERMINING NORMAL GAIT PARAMETER)

(RELATIONSHIP AMONG FOOT LANDING POSITIONS/POSTURES FOR NORMAL GAIT)

(DESIRED FLOOR REACTION FORCE'S VERTICAL COMPONENT)

(FLOOR REACTION FORCE'S HORIZONTAL COMPONENT ALLOWABLE RANGE)

(PROVISIONAL GAIT GENERATION PROCESS FOR NORMAL GAIT)

(PROCESS OF DETERMINING NORMAL GAIT INSTANTANEOUS VALUE)

(PROCESS OF DETERMINING BODY HORIZONTAL ACCELERATION AND BODY POSTURE ANGULAR ACCELERATION FOR NORMAL GAIT)

FLOOR REACTION FORCE'S HORIZONTAL COMPONENT
DETERMINED WITHOUT TAKING ALLOWABLE RANGE INTO CONSIDERATION Fxtmp FLOOR REACTION FORCE'S HORIZONTAL COMPONENT
DETERMINED TAKING FLOOR REACTION FORCE'S HORIZONTAL
COMPONENT ALLOWABLE LIMIT INTO CONSIDERATION Fx BODY INCLINATION ANGULAR ACCELERATION $\beta$ BODY INCLINATION RESTORING MOMENT ZMP-CONVERTED VALUE (ZMPrec)

BODY INCLINATION ANGULAR ACCELERATION $\beta$
(FOR RETURNING BODY INCLINATION VELOCITY TO INITIAL VALUE)

FLOOR REACTION FORCE'S HORIZONTAL COMPONENT Fx
DETERMINED TAKING FLOOR REACTION FORCE'S HORIZONTAL
COMPONENT ALLOWABLE RANGE INTO CONSIDERATION

FLOOR REACTION FORCE'S HORIZONTAL COMPONENT Fx

BODY INCLINATION ANGULAR ACCELERATION β

(RELATIONSHIP AMONG BODY POSITIONS
AT THE TIME OF LANDING FOR NORMAL GAIT PARAMETER)

(PROCESS OF PROVISIONALLY DETERMINING CURRENT TIME GAIT PARAMETER)

(FLOOR REACTION FORCE'S HORIZONTAL COMPONENT ALLOWABLE RANGE)

(PROCESS OF CORRECTING CURRENT TIME GAIT PARAMETER IN SEARCHING MANNER)

(PROCESS OF GENERATING PROVISIONAL CURRENT TIME GAIT)

(PROCESS OF DETERMINING CURRENT TIME PROVISIONAL GAIT INSTANTANEOUS VALUE)

FIG.37 (PROCESS OF DETERMINING BODY HORIZONTAL ACCELERATION AND BODY POSTURE ANGULAR ACCELERATION FOR PROVISIONAL CURRENT TIME GAIT)

(CORRECTION OF DESIRED ZMP)

(SUPPORT POLYGON AND ZMP ALLOWABLE RANGE)

(PROCESS OF DETERMINING CURRENT TIME GAIT INSTANTANEOUS VALUE)

( PROCESS OF DETERMINING BODY HORIZONTAL ACCELERATION/BODY POSTURE ANGULAR ACCELERATION OF CURRENT TIME GAIT )

(DESIRED FLOOR REACTION FORCE'S VERTICAL COMPONENT WHEN WALKING)

( PROCESS OF DETERMINING CURRENT TIME GAIT INSTANTANEOUS VALUE )

(PROCESS OF DETERMINING BODY HORIZONTAL ACCELERATION/BODY POSTURE ANGULAR ACCELERATION)

(FUNCTIONAL BLOCK DIAGRAM OF GAIT GENERATING DEVICE WITH FULL-MODEL CORRECTION)

(PERTURBATION MODEL FOR CORRECTING HORIZONTAL BODY POSITION)

(PERTURBATION MODEL FOR CORRECTING BODY POSTURE ANGLES)

(GAIT CORRECTION USING DIRECT FULL MODEL)

CONTROLLER OF LEGGED MOBILE ROBOT

TECHNICAL FIELD

The present invention relates to a control device for a legged mobile robot and more specifically to a control device for a legged mobile robot, provided with an internal model generating a desired gait of the robot, causing behavior of the robot (actual robot) to follow behavior of the internal model.

BACKGROUND ART

Known as a legged mobile robot, particularly as a legged mobile robot with two legs, is a robot described in, for example, Japanese Patent Laid-Open Publication No. Showa 62-97005 and Japanese Patent Laid-Open Publication No. Showa 63-150176. Control of robots including the legged mobile robot is detailed in, for example, Robotics Handbook, Robotic Society of Japan, Oct. 20, 1990.

The stability of the legged mobile robot, particularly the legged mobile robot with two legs, is intrinsically low. Therefore, when disturbance or the like is applied to the robot, the posture of the robot becomes unstable. Thus, it is preferred that an inclination angle (posture angle) of the body of the robot and the rate of change of the angle are detected and the posture of the robot is then controlled in accordance with the detected values. To do so, control was earlier proposed by the applicant in Japanese Patent Laid-Open Publication No. Heisei 4-201187 and the like. In this control, a plurality of candidate landing positions are prepared in advance, and any one of those candidate landing positions is selected in a control cycle of each step and then a desired gait is switched.

However, in this control, even when posture is disrupted, there occurs no effect of recovering the posture until the next landing. Therefore, the posture may be largely disrupted before the next landing and the robot may fall over. In addition, this control has the following disadvantage. Even though floor contactability is diminished, as a result of disruption of the posture which causes the ZMP (the center of gravity where vertical floor reaction force acts and a horizontal component of a floor reaction force's moment becomes zero; zero moment point) to shift close to the vicinity of the boundary of a range where the ZMP can exist, the ZMP remains shifted to the vicinity of the boundary until the posture is recovered by correcting the gait in the next step. Thus, contact with the ground cannot be recovered until then.

Thus, the applicant has proposed the following technology in, for example, Japanese Patent Laid-Open Publication No. Heisei 5-305579. In this technology, a desired gait is generated, in which a floor reaction force is set to ensure a state of dynamic equilibrium, based on a dynamic model of a robot. When errors occur between the desired and actual values of the inclination angles and inclination angular velocities due to a modeling error or disturbance, displacement or a moment of the floor contacting portion of the actual robot is deliberately shifted from that of a reference gait. Accordingly, the floor reaction force of the actual robot (actual floor reaction force) is deliberately shifted from the floor reaction force of the desired gait which is calculated by the model, thus obtaining a recovering force which brings inclination of the actual robot near inclination of the model. Note that, the "floor reaction force" herein means a resultant force and resultant moment acting at a certain point of action, obtained as the sum of all floor reaction forces acting on respective legs.

However, when this technology is used, during a one-leg supporting period of a biped mobile robot, for example, it is sometimes infeasible to generate the total floor reaction force with the ZMP outside of the contact surface, even though the ankle joint angle is largely shifted to deliberately and greatly shift the floor reaction force of actual robot. Therefore, a part of the foot rises off the floor. Hence, when the actual robot greatly inclines relative to the model, it is sometimes impossible to obtain the sufficient recovering force for bringing inclination of actual robot back to normal. In this case, the actual robot falls over. In other words, with the technology proposed in Japanese Patent Laid-Open Publication No. Heisei 5-305579, the recovering effect reducing the errors between the desired values and actual values is limited within the range where the ZMP can exist.

The above technologies are explained with reference to the drawings. As for the control which causes joint displacement of the actual robot to strictly follow the model, the ZMP of the actual robot shown by a solid line in FIG. 61 coincides with the desired ZMP determined by the model, if the inclination angle and inclination angular velocity of the actual robot coincide with those of the model. Thus, the robot walks with a desired posture. In reality, however, the errors in the inclination angles and inclination angular velocities occur as shown by a dotted line, due to a modeling error or disturbance as mentioned earlier. In addition, the gravitational effect causes these shifts to have a tendency toward divergence in which the shifts increase more as the errors increase in magnitude. Once the actual ZMP shifts from the desired ZMP, a moment M obtained by multiplying a distance x between the actual and desired ZMPs by a force F is generated about the desired ZMP, as shown in FIG. 62. In other words, a desired moment can be generated by controlling joint displacement to deliberately shift the actual ZMP from the desired ZMP. Based on this idea, the earlier proposed technology generates a moment in a direction for posture recovery by deliberately shifting the actual ZMP as shown in FIG. 62 when the errors in inclination (angle and angular velocity) occur. When this technology is used, however, the range in which the actual ZMP can be shifted is limited within a foot region Xsole, as shown in the drawing. Therefore, the moment which can be generated in the direction of posture recovery is limited, and thus the posture recovery of the robot may not be pursued appropriately.

Thus, the applicant of the application concerned has also proposed the following technology in Japanese Patent Laid-Open Publication No. Heisei 5-337849 or the like. Specifically, in this technology, when the errors in inclination of the robot occur, the actual ZMP is shifted as described above to generate a moment in the direction of posture recovery about the desired ZMP within allowable range, and at the same time, movement of a desired gait is determined so as to generate a moment about the desired ZMP on the model used for generating the desired gait. By intentionally generating the moment on the model as above, an effect equivalent to that of generating the moment in the direction of posture recovery on the actual robot can be obtained. In this case, it is also possible to arbitrarily generate the moment on the model without considering the range in which the ZMP can exist. Therefore, even if it is difficult to generate the moment in the direction of posture recovery on the actual robot, generation of the moment on the model enables the posture of the actual robot to be appropriately stabilized in the recovery direction.

In this technology, however, the moment is generated on the model by adjusting translational acceleration in a horizontal direction of the robot's body (eventually, by adjusting a translation floor reaction force's horizontal component acting on the robot). Thus, the robot may slip when it moves on a floor with a low frictional force or when the movement of the robot, such as running, includes a period during which the vertical component of the translation floor reaction force becomes very small (a frictional force which can be eventually generated becomes small).

Therefore, it is an object of the present invention to propose a control device for a legged mobile robot, enabling a robot to move with a stable posture without causing slipping.

DISCLOSURE OF THE INVENTION

In order to achieve the above object, a control device for a legged mobile robot of the present invention that moves by moving legs extending from a body for successively determining an instantaneous value of a desired movement of the legged mobile robot, by the use of a dynamic model representing at least a relation between a movement and a floor reaction force of the robot, and at the same time, performing movement control of the robot to allow the movement of the robot to follow the determined instantaneous value of the desired movement. The control device for a legged mobile robot is characterized by comprising: allowable range setting means for setting a allowable range of a variable to be limited, which is at least a horizontal component of a translation floor reaction force or a floor surface parallel component of a translation floor reaction force, acting on the robot, or a total center-of-gravity acceleration or a floor surface parallel component of the total center-of-gravity acceleration of the robot; and desired instantaneous value determining means for determining a new instantaneous value of the desired movement based on at least an error between a desired state quantity of a posture of the robot, which corresponds to the determined instantaneous value of the desired movement, and an actual state quantity of the posture of the robot such that the variable to be limited which is defined based on the dynamic model in accordance with the new instantaneous value, remains within the allowable range (first aspect of the invention).

Note that, in the present invention (including aspects other than the first aspect of the invention), any one of the horizontal component of the translation floor reaction force or the floor surface parallel component (to be specific, a component parallel to a floor surface) of the translation floor reaction force, or a horizontal component of the total center-of-gravity acceleration or the floor surface parallel component of the total center-of-gravity acceleration of the robot is in proportional or almost proportional to a friction force. Therefore, in description below, these are generally referred to as a friction force component for convenience.

According to the first aspect of this invention, the new instantaneous value of the desired movement is set based on the error between the desired state quantity of the posture of the robot and the actual state quantity of the posture of the robot so that the variable to be limited (friction force component), defined based on the dynamic model in accordance with the new instantaneous value, remains within the allowable range. Thus, it becomes possible to subsequently determine the instantaneous value of the desired movement which enables the variable to be limited, that is, the friction force component, to remain within the allowable range, and enables the error related to the state quantity of the posture of the robot (for example, the state quantity of a posture angle of the body of the robot, the center of gravity of the same and the like) to be close to zero. Therefore, by performing movement control of the robot to allow the movement of the robot to follow the instantaneous value of the desired movement, the robot can be moved with a stable posture without causing the robot to slip, even where the robot is moved on a floor surface with a small frictional force, or in a gait having a period during which a vertical component of the translation floor reaction force becomes small (for example, a running gait).

In the first aspect of this invention, it is preferred that a movement of the dynamic model include at least a plurality of movement modes of the robot, the movement modes having mutually different generation ratios of a floor reaction force's moment to the translation floor reaction force, and that the desired instantaneous value determining means determine the new instantaneous value of the desired movement by adjusting a plurality of the movement modes of the movement of the dynamic model, in accordance with the allowable range (second aspect of the invention).

According to the second aspect of this invention, it becomes possible to determine the desired movement of the robot by adjusting the plurality of movement modes so that the floor reaction force's moment and the translation floor reaction force become arbitral desired values, respectively. Therefore, by adjusting the plurality of movement modes in accordance with at least the allowable range of the variable to be limited while considering the allowable range of the variable to be limited, the friction force component (which depends on the translation floor reaction force), serving as the variable to be limited, remains within the allowable range, and it becomes possible to determine the instantaneous value of the desired movement which can generate a floor reaction force's moment which causes the error to be close to zero. For example, in a situation where the floor reaction force's moment in a direction in which the error becomes close to zero, is generated in one of the movement modes, if the friction force component seems about to exceed the allowable range, the desired floor reaction force's moment can be maintained and the friction force component can be caused to remain within the allowable range, by adjusting the one of the movement mode and the other movement modes.

Further, in the second aspect of this invention, it is preferred that the movement modes include a posture changing movement for changing a posture of a predetermined portion of the robot (for example, the body of the robot) while maintaining center-of-gravity of the robot almost invariable, and a translation movement of the body of the robot (third aspect of the invention).

According to this, the translation floor reaction force can be mainly adjusted by a translation movement of the body, and the floor reaction force's moment can be adjusted by the posture changing movement without changing the translation floor reaction force so much. Thus, it becomes possible to easily perform determination processing of the instantaneous value of the desired movement which can generate the desired floor reaction force's moment and desired translation floor reaction force (thus, desired friction force component).

Moreover, in the first to third aspects of this invention, it is preferred that the control device for a legged mobile robot comprise means for correcting gait parameters for determining a pattern(s) of a desired floor reaction force and/or a desired movement of the robot after current time, in accordance with at least a state quantity of the dynamic model (fourth aspect of the invention).

According to this, the gait parameters (for example, parameters defining a trajectory of a desired ZMP (desired floor reaction force central point) and the like) defining basic patterns (forms) of the desired floor reaction force and desired movement of the robot are corrected in accordance with the state quantity of the dynamic model. Thus, it becomes possible to determine the desired floor reaction force and desired movement while maintaining continuous stability of behavior of the dynamic model.

Moreover, in the first aspect of this invention, it is preferred that the control device for a legged mobile robot comprise means for successively determining a reference instantaneous value of a desired floor reaction force of the robot, and that the desired instantaneous value determining means determine a correction manipulated variable of the desired floor reaction force in accordance with at least the error and the allowable range of the variable to be limited, and also determine the new instantaneous value of the desired movement to permit a resultant force of an inertial force and gravity, generated on the dynamic model by the new instantaneous value of the desired movement, to balance with a floor reaction force obtained by correcting the reference instantaneous value by the correction manipulated variable (fifth aspect of the invention).

According to this, the correction manipulated variable of the desired floor reaction force is used as an element for manipulating the error and variable to be limited. In addition, the desired floor reaction force is a physical quantity which directly and particularly affects the friction force component serving as the variable to be limited. Therefore it becomes possible to relatively easily determine a preferable correction manipulated variable which enables the error to be close to zero, while causing the friction force component serving as the variable to be limited, to remain within the allowable range. As a result, it becomes possible to determine the new instantaneous value of a preferable desired movement for causing the error to be close to zero, while causing the friction force component to remain within the allowable range and reducing a calculation load.

In the fifth aspect of this invention, it is preferred to employ a mode similar to those of the second and third aspects of this invention. In other words, it is preferred that a movement of the dynamic model include at least a plurality of movement modes of the robot, the movement modes having mutually different generation ratios of a floor reaction force's moment to the translation floor reaction force, and that the desired instantaneous value determining means determine the new instantaneous value of the desired movement by adjusting a plurality of the movement modes of the movement of the dynamic model, in accordance with at least the allowable range (sixth aspect of the invention). Furthermore, in the sixth aspect of this invention, it is preferred that the movement modes include a posture changing movement for changing a posture of a predetermined portion of the robot while maintaining center-of-gravity of the robot almost invariable, and a translation movement of the body of the robot (seventh aspect of the invention).

According to the sixth and seventh aspects of this invention, operational advantages similar to those of the second and third aspects of this invention can be achieved, respectively.

In addition, in the seventh aspect of this invention, it is preferred that the desired instantaneous value determining means determine a new desired instantaneous value of the desired movement by preferentially adjusting the translation movement of the body, rather than the posture changing movement, in order to permit the resultant force to balance with the floor reaction force obtained by correcting the reference instantaneous value by the correction manipulated variable of the desired floor reaction force (eighth aspect of the invention).

In other words, a posture changing movement about the center of gravity of the robot, such as the posture changing movement of the body, easily causes a large fluctuation of the posture of the robot, which changes the floor reaction force's moment. On the other hand, changes of the translation floor reaction force and floor reaction force's moment has relatively high sensitivity to the changes of the translation movement of the body. Therefore, by preferentially adjusting the translation movement of the body, frustrations of the posture of the robot can be suppressed to the minimum level.

Further, in the fifth to eights aspects of this invention, it is preferred that the control device for a legged mobile comprise means for determining the correction manipulated variable of the desired floor reaction force in accordance with at least the error, the allowable range of the variable to be limited, and a state quantity of the dynamic model (ninth aspect of the present invention).

According to this, not only the error (that is, the error of the state quantity of the posture of the actual robot), but also the state quantity of the dynamic model are factored in the correction manipulated variable of the desired floor reaction force. Therefore, it becomes possible to ensure not only stability of the posture of the actual robot but also stability of behavior of the dynamic model. Accordingly, it becomes possible to determine an instantaneous value of a desired movement preferable for actual stable movement of the robot.

Note that the state quantity of the dynamic model may include the center of gravity of the robot on the dynamic model, body posture angle of the same, and their rates of change and the like.

Moreover, in the fifth to ninth aspects of this invention, it is preferred that the control device for a legged mobile robot comprise means for correcting gait parameters for determining a pattern(s) of the desired floor reaction force and/or the desired movement of the robot after current time, in accordance with the correction manipulated variable of the desired floor reaction force used for determining an instantaneous value of the desired movement, and/or a change of a state quantity of the dynamic model by the correction manipulated variable (tenth aspect of the invention).

According to this, the gait parameters (for example, parameters defining a trajectory of a desired ZMP (desired floor reaction force central point) and the like) defining basic patterns (forms) of the desired floor reaction force and desired movement of the robot are corrected in accordance with the correction manipulated variable of the desired floor reaction force and changes of the state quantity of the dynamic model by the correction manipulated variable. Thus, it becomes possible to ensure continuous stability of behavior of the dynamic model.

Furthermore, in the fifth to tenth aspects of this invention, it is preferred that the control device for a legged mobile robot comprise first means for determining a first required manipulated variable of a floor reaction force in accordance with the error, so that the error becomes close to zero; second means for determining an actual floor reaction force manipulated variable and the correction manipulated variable of the desired floor reaction force which define a desired value of an actual floor reaction force of the robot, based on at least the first required manipulated variable; and third means for performing movement control of the robot in accordance with the actual floor reaction force manipulated variable and the instantaneous value of the desired movement (eleventh aspect of the invention).

According to this, in addition to manipulation of a floor reaction force on the dynamic model by the correction manipulated variable of the desired floor reaction force, the actual floor reaction force on the actual robot is manipulated by the actual floor reaction force manipulated variable. As a result, manipulation of a floor reaction force for causing the error to be close to zero can be distributed to the actual robot and the dynamic model, thereby keeping changes of behavior of the actual robot and changes of behavior of the dynamic model at minimum. Accordingly, behavior of the actual robot can be even more stabilized.

In the eleventh aspect of this invention, it is preferred that any one of the first required manipulated variable, the actual floor reaction force manipulated variable, and the correction manipulated variable of the desired floor reaction force is a manipulated variable related to a floor reaction force's moment about a point of action of a floor reaction force, a position of the point of action of the floor reaction force, or a ZMP (twelfth aspect of the invention). In other words, the stability of the posture of the robot is greatly affected by the floor reaction force's moment about the point of action of the floor reaction force, the position of the point of action of the floor reaction force, or the position of the ZMP (point about which the horizontal component of the floor reaction force's moment is zero). Thus, by using the manipulated variables related to them as the first required manipulated variable, the actual floor reaction force manipulated variable, and the correction manipulated variable of the desired floor reaction force, stability of the posture of the robot can be surely ensured.

Moreover, in the eleventh or twelfth aspect of this invention, it is preferred that the second means determine the actual floor reaction force manipulated variable and the correction manipulated variable of the desired floor reaction force so that a difference between the actual floor reaction force manipulated variable and the correction manipulated variable of the desired floor reaction force monotonously changes as the first required manipulated variable increases (thirteenth aspect of the present invention).

According to this, it is possible to determine the actual floor reaction force manipulated variable and the manipulated variable of the desired floor reaction force which can cause the error to be close to zero. Note that, in order for the difference between the actual floor reaction force manipulated variable and the correction manipulated variable of the desired floor reaction force to monotonously change as the first required manipulated variable increases, the actual floor reaction force manipulated variable and the correction manipulated variable of the desired floor reaction force are determined so that the difference almost coincides with or is in proportional to the first required manipulated variable.

In the eleventh to thirteenth aspects of this invention, it is preferred that the second means determine the actual floor reaction force manipulated variable so that a value obtained by adding the actual floor reaction force manipulated variable to the reference instantaneous value remains within a predetermined actual floor reaction force allowable range (fourteenth aspect of the invention). According to this, not only the friction force component (variable to be limited), but also the floor reaction force component corresponding to the actual floor reaction force manipulated variable, that is, the floor reaction force's moment about the point of action of the floor reaction force, the position of the point of action of the floor reaction force, and ZMP can remain within desirable allowable ranges. Therefore, stability of behavior of the robot can be even more improved.

To be more specific, in the fourteenth aspect of this invention, when a value obtained by adding the first required manipulated variable to the reference instantaneous value is a value within the predetermined actual floor reaction force allowable range, the second means determines the first required manipulated variable as the actual floor reaction force manipulated variable, and determines the correction manipulated variable of the desired floor reaction force to be almost zero or a value defined in accordance with the state quantity of the dynamic model, and, when the value obtained by adding the first required manipulated variable to the reference instantaneous value deviates from the predetermined actual floor reaction force allowable range, the second means determines a value obtained by subtracting the reference instantaneous value from a limit value of the actual floor reaction force allowable range, as the actual floor reaction force manipulated variable, and determines the correction manipulated variable of the desired floor reaction force in accordance with at least a difference between the actual floor reaction force manipulated variable and the first required manipulated variable (fifteenth aspect of the invention).

According to this, when a value obtained by adding a provisionally determined value of the actual floor reaction force manipulated variable to the reference instantaneous value (a value equivalent to the actual floor reaction force of the robot; hereinafter referred to as an estimated value of actual floor reaction force) is within the actual floor reaction force allowable range, the actual floor reaction force of the actual robot is manipulated by the actual floor reaction force manipulated variable. Thus, the error is controlled to be close to zero. In addition, when the estimated value of actual floor reaction force deviates from the actual floor reaction force allowable range, an actual floor reaction force manipulated variable, which controls the estimated value of the above actual floor reaction force to remain within the actual floor reaction force allowable range, is determined. Therefore, when the actual floor reaction force of the robot is manipulated in accordance with the actual floor reaction force manipulated variable, the actual floor reaction force can remain within the predetermined actual floor reaction force allowable range. Further, when the estimated value of actual floor reaction force deviates from the actual floor reaction force allowable range, the actual floor reaction force manipulated variable is limited. However, the correction manipulated variable of the desired floor reaction force is determined in accordance with the difference between the actual floor reaction force manipulated variable and the first required manipulated variable, that is, a surplus of the first required manipulated variable for causing the error to be close to zero, which cannot be dealt by the actual floor reaction force manipulated variable. Thus, the error can be close to zero by the combination of manipulation of the actual floor reaction force in accordance with the actual floor reaction force manipulated variable, and manipulation of the floor reaction force on the dynamic model in accordance with the correction manipulated variable of the desired floor reaction force (adjustment of the instantaneous value of the desire movement). Note that, when the estimated value of actual floor reaction force is within the actual floor reaction force allowable range, behavior of the dynamic model can be stabilized when determining the correction manipulated variable of the desired floor reaction force in accordance with the state quantity of the dynamic model.

In the fourteenth aspect of this invention, the second means comprises: means for obtaining provisionally determined values of the actual floor reaction force manipulated variable and the correction manipulated variable of the desired floor reaction force so that a difference between the actual floor reaction force manipulated variable and the correction manipulated variable of the desired floor reaction force becomes at least a value corresponding to the first required manipulated variable; means for obtaining an estimated value of the variable to be limited corresponding to the new instantaneous value of the desired movement when the new instantaneous value of the desired movement is assumed to be determined by the use of the obtained provisionally determined value of the correction manipulated variable of the desired floor reaction force; means for comparing a value obtained by adding the provisionally determined value of the actual floor reaction force manipulated variable to the reference instantaneous value and the estimated value of the variable to be limited, to the predetermined actual floor reaction force allowable range and the allowable range of the variable to be limited, respectively, and determining a group of the actual floor reaction force manipulated variable and the variable to be limited which satisfy limits by the actual floor reaction force allowable range and the allowable range of the variable to be limited, respectively, based on a result of the comparison; and means for determining the correction manipulated variable of the desired floor reaction force based on the variable to be limited and a value obtained by subtracting the first required manipulated variable from the determined actual floor reaction force manipulated variable (sixteenth aspect of the invention).

According to the sixteenth aspect of this invention, provisionally determined values of the actual floor reaction force manipulated variable and the correction manipulated variable of the desired floor reaction force are obtained so that the difference between the actual floor reaction force manipulated variable and the correction manipulated variable of the desired floor reaction force becomes a value corresponding to the first required manipulated variable which causes the error to close to zero. On top of this, the estimated value of the variable to be limited is obtained under the assumption that the new instantaneous value of the desired movement is determined by the use of the provisionally determined value of the correction manipulated variable. Thereafter, the value obtained by adding the provisionally determined value of the actual floor reaction force manipulated variable to the reference instantaneous value (hereinafter, referred to as provisional actual floor reaction force) and the estimated value of the variable to be limited are compared with the actual floor reaction force allowable range and allowable range of the variable to be limited, respectively. Thus, a group of the actual floor reaction force manipulated variable and variable to be limited, which satisfy the limitations by the above allowable ranges, is determined. Further, the correction manipulated variable of the desired floor reaction force is determined based on the variable to be limited and the value obtained by subtracting the first required manipulated variable from the actual floor reaction force manipulated variable.

Accordingly, it becomes possible to determine the group of the actual floor reaction force manipulated variable and the correction manipulated variable, which allows the error to be close to zero and allows the actual floor reaction force manipulated variable and variable to be limited to properly remain in the allowable ranges, respectively.

Note that, it is also possible to searchingly determine the group of the actual floor reaction force manipulated variable and the correction manipulated variable of the desired floor reaction force, which satisfy the limitations by the actual floor reaction force allowable range and the allowable range of the variable to be limited, respectively.

In the sixteenth aspect of this invention, it is preferred that a movement of the dynamic model include at least a plurality of movement modes having mutually different generation ratios of a floor reaction force's moment to a translation floor reaction force, and that the correction manipulated variable of the desired floor reaction force be configured by a plurality of manipulated variables, each corresponds to each of the movement modes (seventeenth aspect of the invention).

According to this, by adjusting each manipulated variable corresponding to each movement mode, desired translation floor reaction force and floor reaction force's moment can be generated on the dynamic model. Thus, it becomes possible to determine the correction manipulated variable which is particularly preferable for causing the variable to be limited to remain in the corresponding allowable range. Note that, in this seventeenth aspect of this invention, a plurality of the movement modes are similar to those of the third or seventh aspect of this invention.

In the eleventh aspect of this invention, it is further preferred that the control device for a legged mobile robot comprise fourth means for determining a second required manipulated variable of the floor reaction force to cause a state quantity of the dynamic model to be close to a predetermined state quantity (basically, a state which can stabilize behavior of the dynamic model) in accordance with the state quantity of the dynamic model, and that the second means determine the actual floor reaction force manipulated variable and the correction manipulated variable of the desired floor reaction force based on at least the first required manipulated variable, the second required manipulated variable, and the allowable range (eighteenth aspect of the invention).

According to this, it becomes possible to properly determine the actual floor reaction force manipulated variable and the correction manipulated variable of the desired floor reaction force, which are capable of properly determining the instantaneous value of the desired movement by which the error becomes close to zero, the state of the dynamic model is stabilized, the actual floor reaction force remains within the actual floor reaction force allowable range, and the variable to be limited (friction force component) remains within the corresponding allowable range.

In the eighteenth aspect of this invention, as in the case of the twelfth aspect of the invention, it is preferred that any one of the first and second required manipulated variables, the actual floor reaction force manipulated variable and the correction variable of the desired floor reaction force is a manipulated variable related to a floor reaction force's moment about a point of action of a floor reaction force, a position of the point of action of the floor reaction force, or a ZMP (nineteenth aspect of the invention). According to this, stability of the posture of the robot can be surely ensured, similarly to the twelfth aspect of this invention.

Yet further, in the eighteenth and nineteenth aspects of this invention, as in the case of the thirteenth aspect of this invention, it is preferred that the second means determine the actual floor reaction force manipulated variable and the correction manipulated variable of the desired floor reaction force so that a difference between the actual floor reaction force manipulated variable and the correction manipulated variable of the desired floor reaction force monotonously changes as the first required manipulated variable increases (twentieth aspect of the invention).

According to this, similarly to the thirteenth aspect of this invention, it becomes possible to determine the actual floor reaction force manipulated variable and the correction manipulated variable of the desired floor reaction force, which enable the error to be close to zero.

Moreover, in the eighteenth to twentieth aspects of this invention, as in the case of the fourteenth aspect of this invention, it is preferred that the second means determine the actual floor reaction force manipulated variable so that a value obtained by adding the actual floor reaction force manipulated variable to the reference instantaneous value remains within a predetermined actual floor reaction force allowable range (twenty-first aspect of the invention).

According to this, similarly to the fourteenth aspect of this invention, not only the friction force component (variable to be limited), but also the floor reaction force component corresponding to the actual floor reaction force manipulated variable, that is, the floor reaction force's moment about the point of action of the floor reaction force, the position of the point of action of the floor reaction force, and ZMP can remain within desirable allowable range. Therefore, stability of behavior of the robot can be even more improved.

Furthermore, to be more specific, it is preferred that the twenty-first aspects of the invention has a mode similar to that of the sixteenth aspect of this invention. In other words, it is preferred that the second means comprises: means for obtaining provisionally determined values of the actual floor reaction force manipulated variable and the correction manipulated variable of the desired floor reaction force so that a difference between the actual floor reaction force manipulated variable and the correction manipulated variable of the desired floor reaction force becomes at least a value corresponding to the first required manipulated variable and that the correction manipulated variable of the desired floor reaction force becomes a value corresponding to the second required manipulated variable; means for obtaining an estimated value of the variable to be limited corresponding to the new instantaneous value of the desired movement when the new instantaneous value of the desired movement is assumed to be determined by the use of the obtained provisionally determined value of the correction manipulated variable of the desired floor reaction force; means for comparing a value obtained by adding the obtained provisionally determined value of the actual floor reaction force manipulated variable to the reference instantaneous value and the estimated value of the variable to be limited, to the predetermined actual floor reaction force allowable range and the allowable range of the variable to be limited, respectively, and determining a group of the actual floor reaction force manipulated variable and the variable to be limited which satisfy limits by the actual floor reaction force allowable range and the allowable range of the variable to be limited, respectively, based on a result of the comparison; and means for determining the correction manipulated variable of the desired floor reaction force, based on the variable to be limited and a value obtained by subtracting the first required manipulated variable from the determined actual floor reaction force manipulated variable (twenty-second aspect of the invention).

In the twenty-second aspect of this invention, the second required manipulated variable for causing the state quantity of the dynamic model to be close to a predetermined state quantity, is considered in addition to the first required manipulated variable. Further, the provisional values of the actual floor reaction force manipulated variable and the correction manipulated variable of the desired floor reaction force are determined so that the difference between the actual floor reaction force manipulated variable and the correction manipulated variable of the desired floor reaction force becomes at least a value corresponding to the first required manipulated variable, and that the correction manipulated variable of the desired floor reaction force becomes a value corresponding to the second required manipulated variable. Apart from the above, this aspect is similar to the sixteenth aspect of this invention.

Therefore, according to the twenty-second aspects of this invention, it becomes possible to determine the group of the actual floor reaction force manipulated variable and the correction manipulated variable, which are capable of causing the error to be close to zero, improving stability of behavior of the dynamic model, and properly causing the actual floor reaction force manipulated variable and the variable to be limited to remain within the allowable range, respectively. Thus, stability of behavior of the robot can be improved.

Note that it is also possible to searchingly determine the group of the actual floor reaction force manipulated variable and the correction manipulated variable of the desired floor reaction force, which satisfy the limitations by the actual floor reaction force allowable range and the allowable range of the variable to be limited, respectively.

Moreover, in the twenty-second aspect of this invention, as in the case of the seventeenth aspect of this invention, it is preferred that a movement of the dynamic model include at least a plurality of movement modes having mutually different generation ratios of a floor reaction force's moment to a translation floor reaction force, and that the correction manipulated variable of the desired floor reaction force be configured by a plurality of manipulated variables, each corresponds to each of the movement modes (twenty-third aspect of the invention).

According to this, similarly to the seventeenth aspect of this invention, it becomes possible to determine the correction manipulated variable which is preferable particularly for causing the variable to be limited to remain within the corresponding allowable range. Note that it is also preferable in the twenty-third aspect of this invention that the plurality of movement modes are similar to those of the third or seventh aspect of this invention.

BEST MODE FOR CARRYING OUT THE INVENTION

Figure 1:
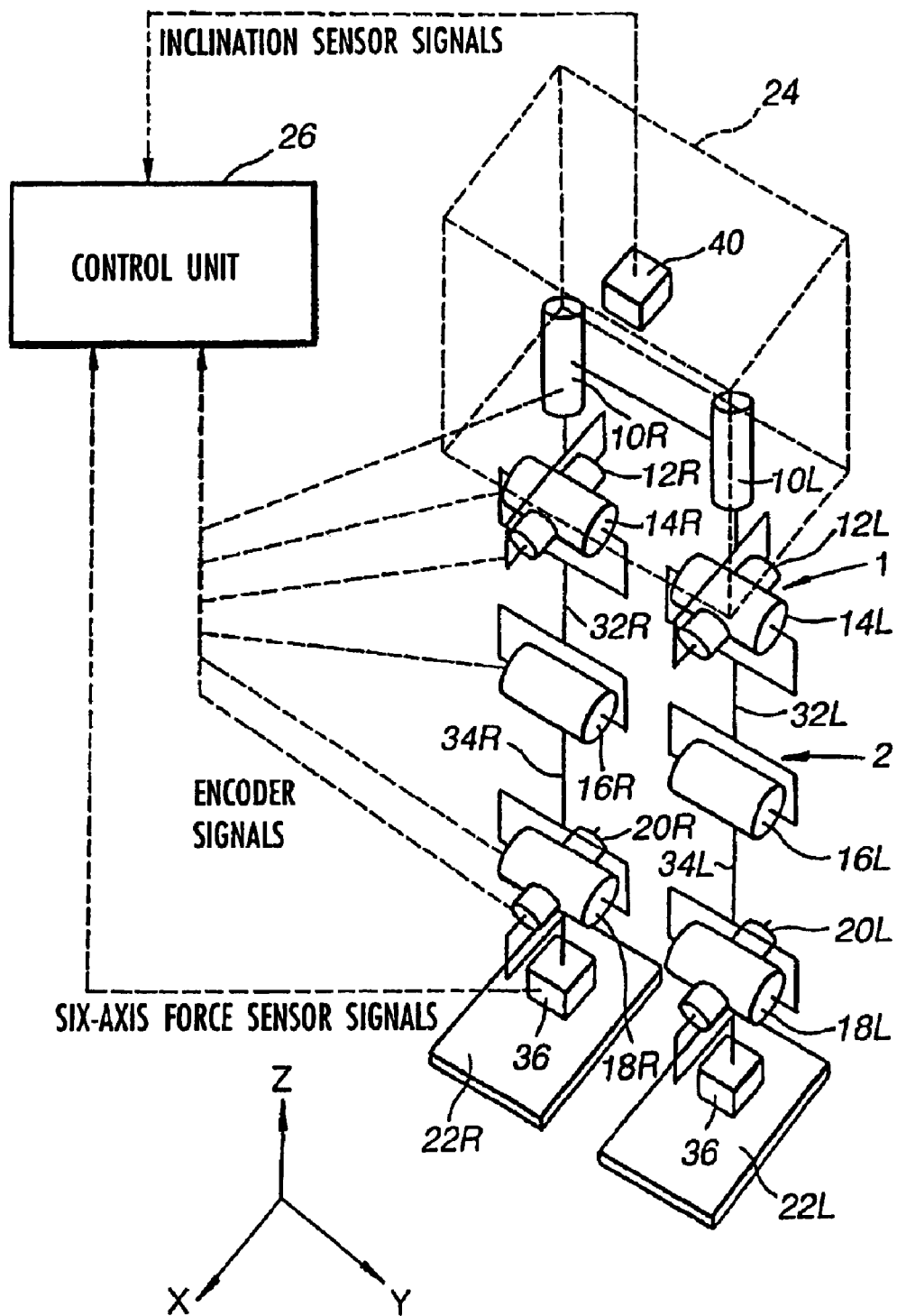
FIG. 1 is a schematic view showing the entire configuration of a biped mobile robot serving as a legged mobile robot in embodiments of the present invention.

Embodiments of the present invention are described hereinbelow, taking a biped mobile robot as an example of a legged mobile robot. FIG. 1 is an explanatory skeleton view showing the entire robot 1. As shown in the drawing, the robot 1 includes a pair of right and left legs (leg links) 2 and 2 extending downward from a body 24. Both legs 2 and 2 have the same structure and each has six joints (for the convenience of understanding, each joint is shown as an electric motor driving each joint). These six joints are configured by joints 10R and 10L (Reference Symbols R and L represent legs which correspond to the right and left legs, respectively, and the same can be said of the below) for turning the waist (hip) (for rotating the waist in the yaw direction relative to the body 24), joints 12R and 12L for rotating the waist (hip) in the roll direction (about the X axis), joints 14R and 14L for rotating the waist (hip) in the pitch direction (about the Y axis), joints 16R and 16L for rotating knee portions in the pitch direction, joints 18R and 18L for rotating ankle portions in the pitch direction, and joints 20R and 20L for rotating ankle portions in the roll direction. These joints are sequentially provided from the body 24.

A foot 22R(L) configuring the end of each leg 2 is attached to the bottom of two joints 18R(L) and 20R(L) in the ankle portion of each leg 2. The aforementioned body (casing) 24 is also provided at the uppermost positions of both legs 2 and 2 through three joints 10R(L), 12R(L) and 14R(L) in the hip of each leg 2. A control unit 26 and the like are housed inside the body 24. In FIG. 1, the control unit 26 is depicted outside of the body 24 for the convenience of illustration.

In each leg 2 having the above configuration, the waist joint (hip joint) is configured by the joints 10R(L), 12R(L) and 14R(L), the knee joint is configured by the joint 16R(L), and the foot joint (ankle joint) is configured by the joints 18R(L) and 20R(L). Further, the waist joint (hip joint) and the knee joint are connected by a thigh link 32R(L), and the knee joint and the foot joint are connected by a crus link 34R(L).

Though not illustrated, a pair of right and left arms are attached to both sides of the upper portion of the body 24, and a head is placed on the top end portion of the body 24. Details of the arms and head are omitted as they are not directly related to the gist of this invention. Each arm is provided with a plurality of joints which enable each arm to perform movement such as swinging forward and backward relative to the body 24.

Each joint mentioned above is made from the electric motor and further provided with a speed reducer and the like which boosts output. Details of each joint are described in Patent Application No. Heisei 1-324218, Japanese Patent Laid-Open Publication No. Heisei 3-184782 and the like earlier proposed by the applicant. Further description of each joint is omitted as the joint itself is not related to the gist of this invention.

Because of the above-described configuration of each leg 2, the foot 22R(L) of each leg 2 is given six degrees of freedom relative to the body 24. The total number of joints of both legs 2 and 2 is 6*2=12. (In this description, "*" represents multiplication in calculating a scalar and represents an outer product in calculating a vector). When the robot 1 is moving, the twelve joints are driven to have appropriate angles. Thus, both feet 22R and 22L can perform desirable movements. Accordingly, the robot 1 can arbitrary move a three-dimensional space.

The position and velocity of the body 24 described later in this description have meanings of a predetermined position of the body 24 and a moving velocity of the position, respectively. Specifically, the predetermined position is a representative point of the body 24 set in advance (for example, a central point between the right and left hip joints, or the like). Similarly, the positions and velocities of the respective feet 22R and 22L have meanings of the positions and moving velocities of previously set representative points of the respective feet 22R and 22L. In this case, the representative points of the respective feet 22R and 22L in this embodiment are set, for example, on the bottom surfaces of the respective feet 22R and 22L (more specifically, an intersection point between the bottom surface of the each feet and a perpendicular line extending from the center of the ankle joint of each leg 2 to the bottom surface of each of the feet 22R and 22L, or the like).

In the robot shown in FIG. 1, a known six-axis force sensor 36 is provided between the ankle joints 18R(L) and 20R(L), and the foot 22R(L) of each leg 2. The six-axis force sensor 36 is for detecting whether the foot 22R(L) of each leg 2 lands, as well as the magnitude and direction of a force acting on a supporting leg from the floor. This sensor outputs detection signals to the control unit 26. Outputted signals are detection signals of the translational components Fx, Fy and Fz of the floor reaction force in X, Y and Z directions, transmitted to each leg 2 through the foot 22R(L) from the floor, and detection signals of moment components Mx, My and Mz about these three directions. Further, capacitance type floor contact switches 38 (not shown in FIG. 1) for detecting whether each foot 22R(L) contacts the floor are provided in the four corners of each foot 22R(L), and the detection signals of the floor contact switches 38 are outputted from the floor contact switches 38 to the control unit 26. In addition, an inclination sensor 40 is mounted on the body 24 for detecting an inclination angle (posture angle) of the body 24 relative to the z axis within the X-Z plane and Y-Z plane, that is, relative to a gravitational direction (vertical direction), as well as an angular velocity of the inclination angle. Detection signals of the inclination sensor 40 are outputted from the inclination sensor 40 to the control unit 26. An encoder (rotary encoder) 47 (see FIG. 2) is provided in each electric motor 46 (see FIG. 2) of each joint for detecting rotation amount of the motor, and the detection signals of the encoders 47 are outputted from the encoders 47 to the control unit 26. Furthermore, though not illustrated in FIG. 1, a zero reference switch 42 for correcting outputs from the inclination sensor 40 and a limit switch 44 for fail safe are provided in appropriate positions in the robot 1, and outputs from them are transmitted to the control unit 26.

Moreover, though not illustrated, a joystick (manipulator) for controlling the robot 1 is provided outside the robot 1. The joystick is configured to input requests regarding a gait of the robot 1 to the control unit 26 as necessary, by operating the joystick, so that, for example, the robot 1 in a translation movement is turned. In this case, requests which can be inputted are, for example, a gait form (walking, running or the like) while the robot 1 is moving, landing position/posture and landing time of a free leg, or command data defining the landing position/posture and landing time of the free leg (for example, a moving direction, a moving velocity or the like of the robot 1).

Figure 2:
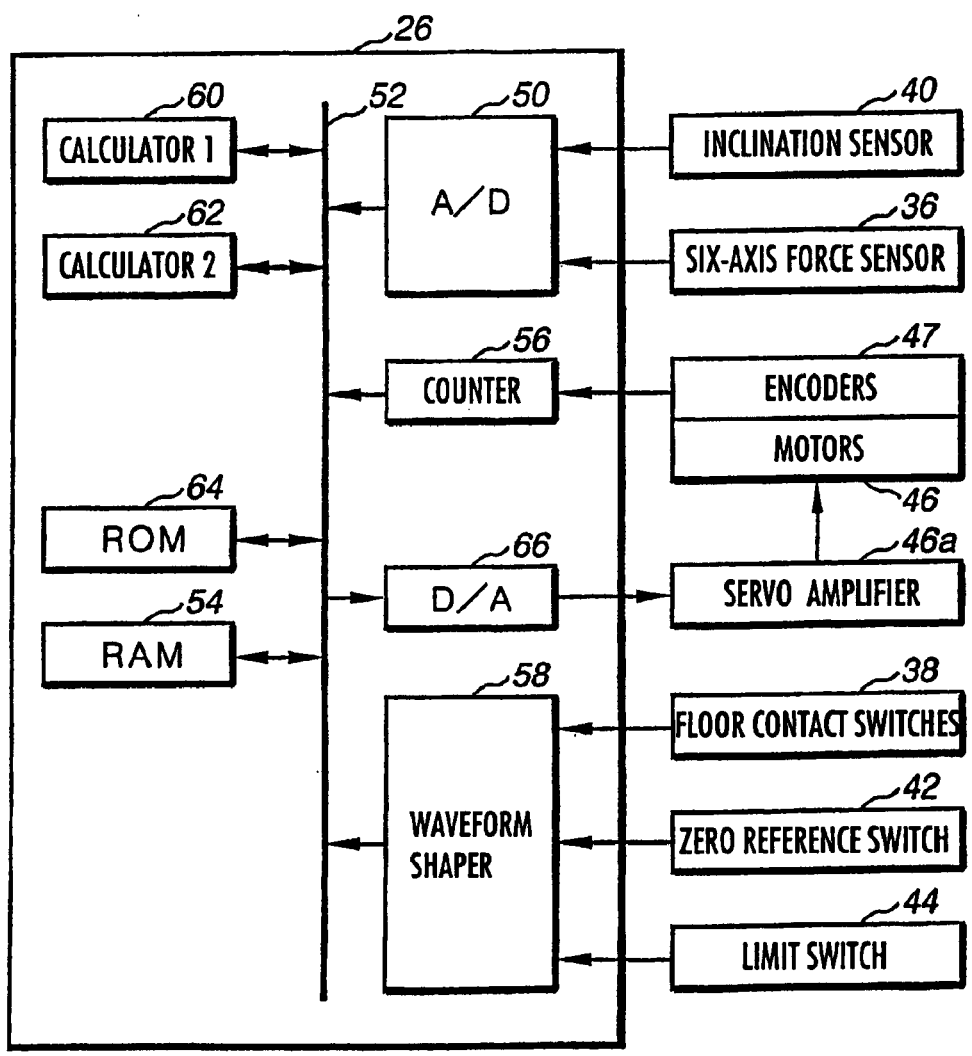
FIG. 2 is a block diagram showing a configuration of a control unit provided in the robot in FIG. 1.

FIG. 2 is a block diagram showing the configuration of the control unit 26. The control unit 26 is configured by microcomputers and includes a first calculator 60 and a second calculator 62, each made of a CPU, an A/D converter 50, a counter 56, a D/A converter 66, a waveform shaper 58, a RAM 54, a ROM 64, and a bus line 52 transmitting and receiving data between the above. In the control unit 26, the output signals from the six-axis sensor 36 of each leg 2, the inclination sensor 40 and the like are converted into digital values in the A/D converter 50, and thereafter inputted to the RAM 54 thorough the bus line 52. The output from the encoder (rotary encoder) 47 of each joint of the robot 1 is inputted to the RAM 54 through the counter 56. Further, the outputs from the floor contact switches 38, the zero reference switch 42, the limit switch 44 and the like are inputted to the RAM 54 through the waveform shaper 58.

As described later, the first calculator 60 mentioned above generates a desired gait and also calculates a joint angle displacement command (a desired value of each joint's displacement angle or a rotational angle of each electric motor 32), and then transmits the desired gait and the command to the RAM 54. The second calculator 62 reads out the joint angle displacement command and an actual measurement value of the joint angle detected based on the output signal from the foregoing encoders 47, from the RAM 54. Thereafter, the second calculator 62 calculates manipulated variables required for driving the respective joints, and outputs the manipulated variables to the electric motors 46 driving the respective joints, through the D/A converter 66 and servo amplifiers 46a.

The configuration described so far is commonly used in any of the embodiments described below.

Figure 3:
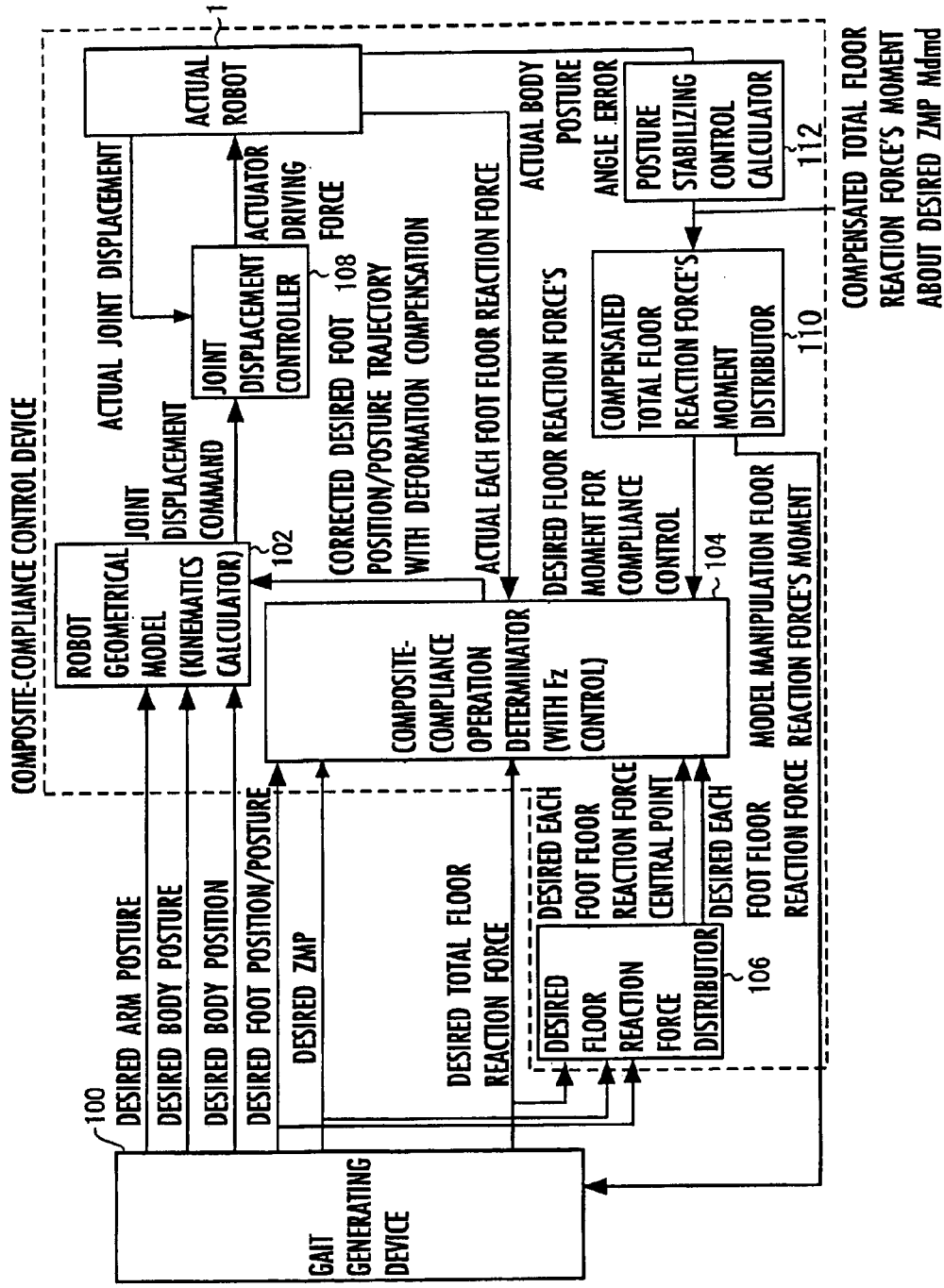
FIG. 3 is a block diagram showing a functional configuration of the control unit in the first embodiment.

FIG. 3 is a block diagram showing the entire functional configuration of the control device of the robot 1 in the first embodiment of this invention. Portions other than the "actual robot" in FIG. 3 are configured by processing functions (mainly functions of the first calculator 60 and the second calculator 62) executed by the control unit 26. In the description below, Reference Symbols R and L are omitted when it is not necessary to identify the right and left legs 2.

The actuation of the control device of this embodiment is outlined with reference to FIG. 3. The control unit 26 generates a desired gait by the use of a gait generating device 100 as described later. The desired gait generated and outputted by the gait generating device 100 includes desired body position/posture trajectories (trajectories of desired position and posture of the body 24), desired foot position/posture trajectories (trajectories of desired position and posture of each foot 22), desired arm posture trajectories (trajectories of the desired postures of respective arms), a desired ZMP (a desired total floor reaction force central point) trajectory, and a desired total floor reaction force trajectory. In a case where the body 24, other than the legs 2 and the arms, is provided with a movable portion, the desired position/posture trajectories of the movable portion are added to the desired gait.

Here, the "trajectory" of the above-mentioned gait means a pattern of temporal changes (time series pattern) and includes time series of instantaneous values, each calculated for every control cycle (calculation process cycle) of the gait generation device 100. "Pattern" will be sometimes used instead of "trajectory" in description below. The "posture" means a spatial direction. To be specific, the body posture is expressed by an inclination angle (posture angle) of the body 24 in the roll direction (about the X axis) and an inclination angle (posture angle) of the body 24 in the pitch direction (about Y-axis direction), relative to the Z axis (vertical axis). A foot posture is expressed by spatial azimuths of two axes fixedly set in each foot 22. In this description, the body posture may also be referred to as a body posture angle. In a broad sense, the body posture may include rotation of the body 24 in the yaw direction (about the Z axis).

In the description below, the term "desired" will be omitted unless the omission causes misunderstanding. Further, among the constituents of the gait, those other than constituents related to the floor reaction force (desired ZMP and desired total floor reaction force), specifically, those related to movement of each portion of the robot 1, such as the foot position/posture, the body position/posture and the like, are generically called "movement." Further, a floor reaction force (floor reaction force made up by a translational force and a moment) acting on each foot 22 is called "each-foot floor reaction force." A resultant force of the "each-foot floor reaction forces" of all (two) feet 22R and 22L of the robot 1 is called a "total floor reaction force." In the description below, however, the each-foot floor reaction force is hardly referred to. Thus, the "floor reaction force" is used as a term having the same meaning as "total floor reaction force", unless otherwise specified.

The desired floor reaction force is generally expressed by a point of action as well as a translational force and a moment acting on the point. Since the point of action can be anywhere, there are countless ways to express one desired floor reaction force. In the embodiments of this description, the desired ZMP (desired floor reaction force central point) is set as the point of action of the desired floor reaction force. In this case, the moment components of the desired floor reaction force, except for a vertical component (a moment about the vertical axis (Z axis)), are zero. In other words, the horizontal moment components of the desired floor reaction force (moments about horizontal axes (X and Y axes)) about the desired floor reaction force central point are zero.

In the desired gait generated by the gait generating device 100, the desired body position/posture (trajectories) and the desired arm posture (trajectories) are directly transmitted to a robot geometric model (kinematics calculator) 102.

Moreover, the desired foot position/posture trajectories, the desired ZMP trajectory (desired total floor reaction force central point trajectory), and the desired total floor reaction force trajectory (specifically, a desired translation floor reaction force's vertical component trajectory, a desired translation floor reaction force's horizontal component trajectory, and a trajectory of a desired floor reaction force's moment about the desired ZMP) are directly transmitted to a composite-compliance operation determinator 104 and also to a desired floor reaction force distributor 106. Thereafter, the desired floor reaction force is distributed to the respective feet 22R and 22L in the desired floor reaction force distributor 106, and the desired each-foot floor reaction force central point and the desired each-foot floor reaction force are thus determined. The determined desired each-foot floor reaction force central point and the desired each-foot floor reaction force are transmitted to the composite-compliance operation determinator 104.

In the composite-compliance operation determinator 104, corrected desired foot position/posture (trajectories) with deformation compensation made up by correcting the desired foot position/posture (trajectories) are obtained, and this corrected desired foot position/posture (trajectories) are transmitted to the robot geometric model 102. Once the desired body position/posture (trajectories) and the corrected desired foot position/posture (trajectories) with deformation compensation are inputted, the robot geometric model 102 calculates joint displacement commands (values) for twelve joints (including 10R(L)) of both legs 2 and 2 to satisfy the above desired positions/postures, by inverse kinematics calculation based on a kinematics model (rigid body link model) of the robot 1. The robot geometric model 102 then transmits the calculated joint displacement commands to a displacement controller 108. The displacement controller 108 sets the joint displacement commands (values) calculated by the robot geometric model 102 as desired values and subjects displacement of the twelve joints of both legs 2 and 2 of the robot 1 to follow-up control. The robot geometric model 102 also calculates joint displacement commands (values) for the arm joints to satisfy the desired arm position and sends the commands to the displacement controller 108. The displacement controller 108 sets the displacement commands (values) calculated by the robot geometric model 102 as desired values and subjects displacement of ten (or eight) joints of the arms of the robot 1 to the follow-up control.

The foregoing six-axis force sensor 36 detects a floor reaction force (actual each-foot floor reaction force) generated in the robot 1 by actual movement of the robot 1 owing to the follow-up control mentioned above. The detected value is transmitted to the aforementioned composite-compliance operation determinator 104.

Further, an actual body posture angle error (error of actual body posture angle from the desired body posture angle) which occurred in the robot 1 is detected by the foregoing inclination sensor 36, and the detected value is transmitted to a posture stability control calculator 112. Based on the actual body posture angle error, the posture stability control calculator 112 calculates a compensated total floor reaction force's moment about the desired ZMP Mdmd for recovering the actual body posture angle of the robot 1 to the desired body posture angle (causing the actual body posture angle error to be close to zero), by using an appropriate feedback control law.

To be more specific, in this' embodiment, the compensated total floor reaction force's moment Mdmd is determined by the following equation using, for example, a PD control law.

Compensated total floor reaction force's moment $Mdmd = K\theta b^*$actual body posture angle error$+ K\omega b^*$actual body posture angular velocity error     d25

Here, the actual body posture angular velocity error is a time differential of the actual body posture angle error, and means an error of an actual body posture angular velocity from a desired body posture angular velocity. The actual body posture angle error is specifically a vector made up by posture angle errors in the roll direction (about X axis) and the pitch direction (about Y axis) of the body 24 of the robot 1. The same can be said of compensated total floor reaction force's moment Mdmd.

The compensated total floor reaction force's moment Mdmd determined as above is distributed into a desired floor reaction force's moment for compliance control and a model manipulation floor reaction force's moment, by a compensated total floor reaction force's moment distributor 110. In other words, based on the actual body posture angle error, the desired floor reaction force's moment for compliance control and the model manipulation floor reaction force's moment are determined by the posture stability control calculator 112 and the compensated total floor reaction force's moment distributor 110.

The desired floor reaction force's moment for compliance control is a floor reaction force's moment about the desired ZMP, generated in the actual robot 1 in order to converge the posture of the actual robot 1 to a desired gait (precisely speaking, a corrected gait) and to stabilize (recover) the posture. The model manipulation floor reaction force's moment is a floor reaction force's moment about the desired ZMP, generated in a later-described robot dynamic model for gait generation for the same purpose as that for the desired floor reaction force's moment for compliance control. In other words, the model manipulation floor reaction force's moment is a floor reaction force's moment generated about the desired ZMP by movement of the ultimately determined desired gait (corrected gait).

These floor reaction force's moments are determined in the following manner. First of all, the model manipulation floor reaction force's moment is determined by the following expression. Floor reaction force's moment allowable range is determined by the gait generating device 100 as described later.

> If $Mdmd$>upper limit of floor reaction force's moment allowable range is established, "Model manipulation floor reaction force's moment=$-Mdmd$+upper limit of floor reaction force's allowable range" is established.
>
> If $Mdmd$<lower limit of floor reaction force's moment allowable range is established, "Model manipulation floor reaction force's moment=$-Mdmd$+lower limit of floor reaction force's allowable range" is established.
>
> If lower limit of floor reaction force's moment allowable range$\leq Mdmd$, and $Mdmd\leq$upper limit of floor reaction force's moment allowable range are established, "model manipulation floor reaction force's moment=0" is established.    d26

In above Equations d26, the compensated total floor reaction force's moment Mdmd itself is compared with the floor reaction force's moment allowable range. However, what is to be originally compared with the floor reaction force's moment allowable range is a product obtained by adding Mdmd to a reference instantaneous value of the floor reaction force's moment about the desired ZMP. In this case, the instantaneous value (the horizontal component of the desired total floor reaction force's moment outputted by the gait generating device 100) of the moment (specifically, the horizontal component) about the desired ZMP is always "0" in this embodiment. Therefore, the product obtained by adding Mdmd to this value is equal to Mdmd. Thus, Mdmd is directly compared with the floor reaction force's moment allowable range as stated above.

Next, the desired floor reaction force's moment for compliance control is determined by the following equation.

Desired floor reaction force's moment for compliance control= $Mdmd$+model manipulation floor reaction force's moment    d27

Therefore, the desired floor reaction force's moment for compliance control and the model manipulation floor reaction force's moment are determined so that a difference between them is equal to Mdmd.

Figure 4:
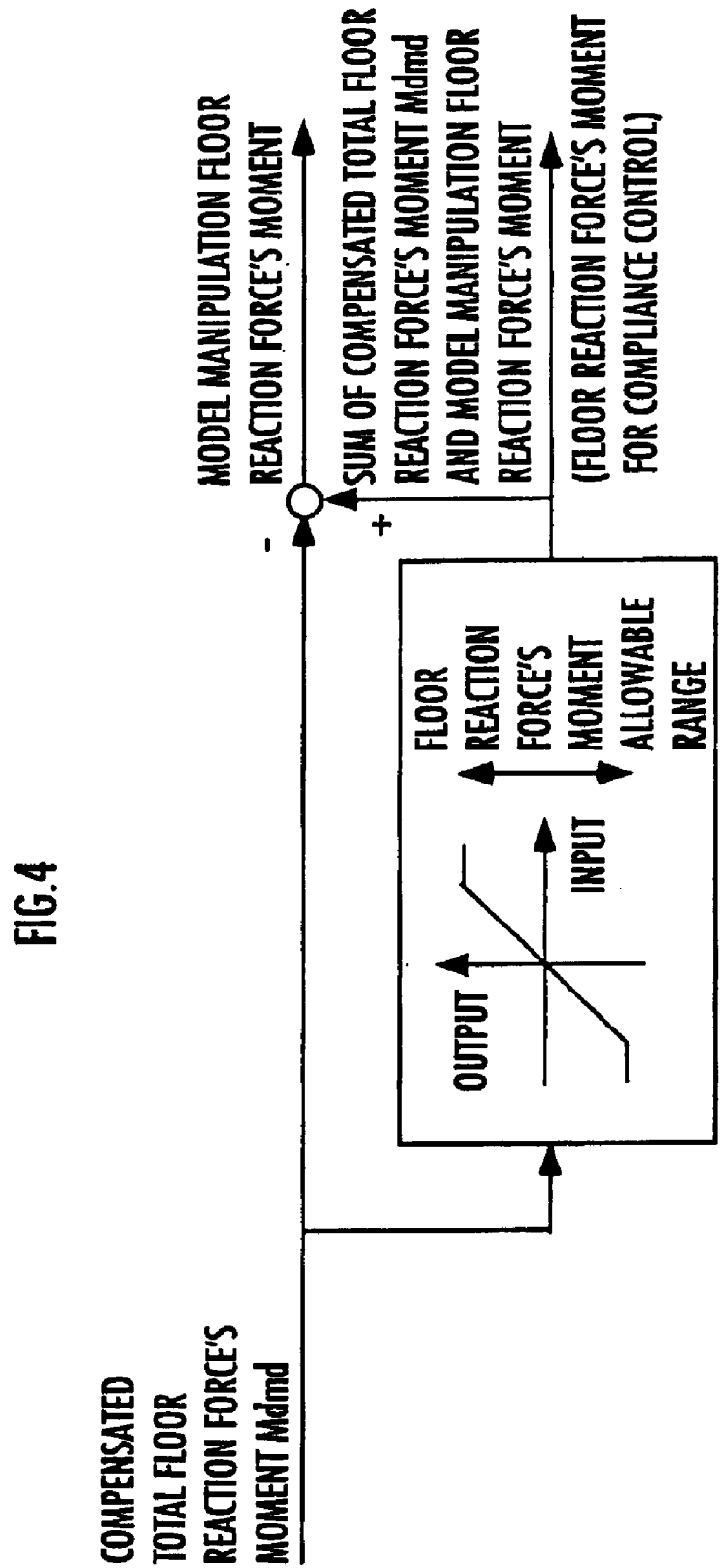
FIG. 4 is a block diagram showing functions of a compensated total floor reaction force's moment distributor 110 in FIG. 3.

The compensated total floor reaction forcers moment distributor 110, which operates such operations described above, illustrated in a form of block diagram is as shown in FIG. 4.

Referring back to FIG. 3, the model manipulation floor reaction force's moment determined above is inputted to the gait generating device 100. Thereafter, the gait generating device 100 generates movements (especially a body position/posture trajectories) of the desired gait using the dynamic model so that a floor reaction force's moment about the desired ZMP determined by the gait generating device 100 becomes the model manipulation floor reaction force's moment. The details of this will be described later.

Further, the desired floor reaction force's moment for compliance control determined above is inputted to the composite-compliance operation determinator 104. The composite-compliance operation determinator 104 determines the corrected desired foot position/posture (trajectories) with deformation compensation by correcting the desired foot position/posture so that an actual floor reaction force's moment about the desired ZMP becomes closer to the desired floor reaction force's moment for compliance control, while causing the movement of the robot 1 to follow the movement of the desired gait generated by the gait generating device 100. In this case, it is practically impossible to permit all states of the foot position/posture and floor reaction force of the robot 1 to coincide with the desired states. Thus, a trade-off relation exists between these states so as to realize a highest possible coincidence. Specifically, control errors from individual desired states are weighted, and the corrected desired foot position/posture (trajectories) with deformation compensation are determined to minimize the weighted average of control errors (or the square of control errors). In other words, the corrected desired foot position/posture (trajectories) with deformation compensation is determined so that the actual floor reaction force's moment about the desired ZMP and the actual foot position/posture of the robot 1 become closest to the desired floor reaction force's moment for compliance control and the desired foot position/posture, respectively. The composite-compliance operation determinator 104 outputs the corrected desired foot position/posture to the robot geometric model 102 as a final desired value of the foot position/posture, thus controlling the operation of the robot 1.

The gist of this invention is mainly about a method of gait generation by the gait generating device 100. The foregoing configuration and operation of the composite-compliance operation determinator 104 and the like are detailed in Japanese Patent Laid-Open Publication No. Heisei 10-277969 or the like, earlier applied by the applicant. Thus, the description thereof is ended.

Figure 5:
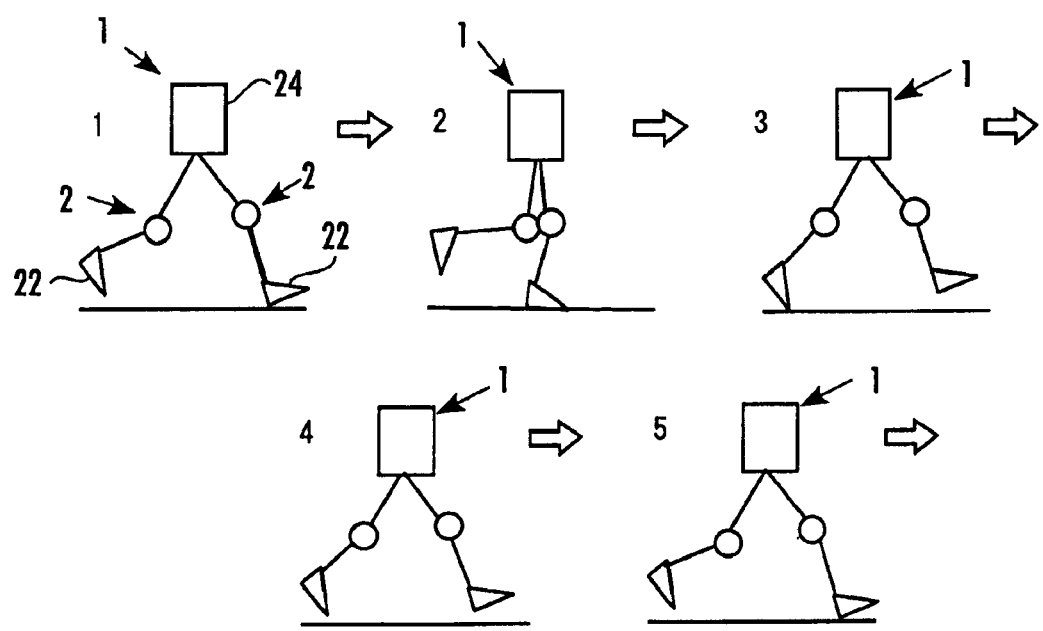
FIG. 5 is an explanatory view exemplifying a running gait of the robot.

Next, the desired gait generated by the gait generating device 100 is outlined, taking a running gait shown in FIG. 5 as an example. In the description below, the term "floor reaction force's vertical component" means a "translation floor reaction force's vertical component." The term "moment" is used for the vertical component (component about the vertical axis) of a moment of a floor reaction force so as to be distinguished from the "floor reaction force's vertical component." Similarly, the term "floor reaction force's horizontal component" means a "translation floor reaction force's horizontal component." Needless to say, the two-leg supporting period in a gait is a period during which the robot 1 supports the self weight by both legs 2 and 2, and the one-leg supporting period is a period during which the robot 1 supports the self weight only by any one of the legs 2. The floating period is a period during which both legs 2 and 2 are separated from the floor (raised in the air). The leg 2 which does not support the self weight of the robot 1 during the one-leg supporting period is called a "free leg." In the running gait mainly described in this embodiment, however, the two-leg supporting period does not exist and the one-leg supporting period (landing period) and the floating period are alternately repeated. In this case, although both legs 2 and 2 do not support the self weight of the robot 1 during the floating period, the leg 2 which was the free leg during the one-leg supporting period immediately before the floating period, and the leg 2 which was the supporting leg during the same, are also called free leg and supporting leg, respectively, during the floating period.

First of all, the running gait shown in FIG. 5 is described. This gait is a gait similar to a human's steady running gait. In this running gait, the one-leg supporting period during which the foot 22 of any one of the right and left legs 2 (supporting leg) of the robot 1 lands (contacts the floor), and the floating period during which both legs 2 and 2 are raised in the air, are alternately repeated. The first state in FIG. 5 shows a (initial) state where the one-leg supporting period starts, the second state shows an intermediate state of the one-leg supporting period, the third state shows a state where the floating period starts following the one-leg supporting period (end of the one-leg supporting period), the fourth state shows an intermediate state of the floating period, and the fifth state shows a state where the floating period ends (start of the next one-leg supporting period).

As shown in the first state in FIG. 5, the robot 1 in this running gait lands with the heel of the foot 22 on the supporting leg side (front leg 2 in the traveling direction of the robot 1) at the initial time of the one-leg supporting period. Subsequently, as shown in the second state in FIG. 5, the robot 1 allows almost entire bottom surface of the landed foot 22 (the foot 22 on the supporting leg side) to contact the floor. Thereafter, as shown in the third state in FIG. 5, the robot 1 kicks the floor with the toe of the foot 22 on the supporting leg side (the foot 22 of the leg 2 at the back in the traveling direction of the robot 1 in the third state in FIG. 5) to jump in the air. The one-leg supporting period is thus finished and the floating period starts simultaneously. As shown in the first state in FIG. 5, the free leg in the one-leg supporting period is at the back of the supporting leg at the initial time of the one-leg supporting period, and then swung to the front of the supporting leg toward the next expected landing position, as shown in the second and third states in FIG. 5. Next, after the floating period shown in the fourth state in FIG. 5, the robot 1 lands with the heel of the foot 22 of the free leg (the leg 2 which was the free leg during the one-leg supporting period immediately before the floating period), and the next one-leg supporting period starts.

A basic outline of the desired gait generated by the foregoing gait generating device 100 is described in consideration of the running gait in FIG. 5. Note that the details regarding a gait are also described in Japanese Patent Laid-Open Publication No. Heisei 10-86081 proposed by the applicant of the application concerned. Therefore, the description is mainly given regarding the content which is not described in Japanese Patent Laid-Open Publication No. Heisei 10-86081.

Though details are described later, when the gait generating device 100 generates a desired gait, basic required values (required parameters) for generating the desired gait, such as landing position/posture (planned landing position/posture) and landing time (expected landing time) of the foot 22 on the free leg side, are given to the gait generating device 100 in accordance with desired manipulation or the like of a joystick (manipulator of the robot 1) or the like. The gait generating device 100 then generates the desired gait by using the required parameters. To be more specific, the gait generating device 100 determines parameters (referred to as gait parameters) defining a part of constituents of the desired gait, such as the desired foot position/posture trajectories and desired floor reaction force's vertical component trajectory of the desired gait, in accordance with the aforementioned required parameters. The gait generating device 100 then sequentially determines instantaneous values of the desired gait by the use of the gait parameters and generates a time series pattern of the desired gait.

In this case, the desired foot position/posture trajectories (to be more specific, desired trajectories of respective spatial components (such as X-axis component) of the position and posture of the foot) are generated for each foot 22 by the use of, for example, a finite duration settling filter proposed in U.S. Pat. No. 3,233,450 by the applicant. This finite duration settling filter is obtained by serially connecting a plurality of stages (three stages or more in this embodiment) of first-order delay filters with variable time constants, that is, filters in which transfer functions are expressed by $1/(1+\tau s)$. ($\tau$ represents a variable time constant, and these filters are hereinafter called unit filters.) The filter with infinite settling time is enabled to generate and output a trajectory which reaches a designated value at desired designated time. In this case, after the finite duration settling filter starts generating outputs, every time constant $\tau$ of the unit filter of each stage is sequentially and variably set in accordance with remaining period to the above-mentioned designated time. To be more specific, the value of $\tau$ is set to be reduced from a predetermined initial value (>0) as the remaining period becomes shorter, until the value $\tau$ ultimately becomes 0 at the designated time at which the remaining duration becomes 0. Thereafter, a step input is given to the finite duration settling filter. The step input has a height which corresponds to the aforementioned designated value (to be more specific, an amount of change from the initial value of the output of the finite duration settling filter to the designated value). This kind of finite duration settling filter not only generates an output which reaches a designated value at designated time but also allows a rate of change of the output of the finite duration settling filter at the designated time to be zero or nearly zero. In particular, when three stages or more (three stages are sufficient) of unit filters are connected, an acceleration of change (differential of the change rate) of output from the finite duration settling filter can be zero or nearly zero.

The foot position/posture trajectories (position/posture trajectories from landing of the foot 22 until the next landing thereof) by the use of the finite duration settling filter of this kind are generated, for example, in the following manner. For example, the desired foot position trajectory in the X-axis direction (front-and-back direction) is generated as follows. The height of step input to the finite duration settling filter is determined in accordance with the next expected landing position of each foot 22 in X-axis direction (to be more specific, an amount of change (amount of movement) of the next planned landing position in the X-axis direction relative to the previous landing position, which is equivalent to the foregoing designated value), determined by the foregoing required parameter. At the same time, the foregoing time constant τ is initialized to be the predetermined initial value. Thereafter, the determined step input is given to the finite duration settling filter, and generation of the trajectory of the position of the foot 22 in the X-axis direction starts. While the trajectory is generated, the foregoing time constant τ is sequentially and variably set to be reduced from the initial value to 0 by the expected landing time (equivalent to the foregoing designated time) of the foot 22. Thus, the trajectory of the position of the foot 22 in the X-axis direction is generated, in which the foot 22 reaches the expected landing position at the planned landing time.

Further, the desired foot position trajectory in the Z-axis direction (vertical direction) is generated in the following manner, for example. First of all, in accordance with the next expected landing position and expected landing time of the foot 22, the following are determined: the position of the foot 22 in the Z-axis direction when the height (vertical position) of the foot 22 is the greatest (hereinafter, referred to as a peak position); and time at which the foot 22 reaches the peak position. The height of step input to the finite duration settling filter is determined in accordance with the peak position (equivalent to the foregoing designated value), and at the same time, the time constant τ is initialized. Thereafter, the determined step input is given to the finite duration settling filter, and the foot position trajectory in the Z-axis direction to the aforementioned peak position is thus generated sequentially. In this event, the time constant τ is sequentially and variably set to be reduced from the initial value to 0 by the time at which the foot 22 reaches the peak position (equivalent to the foregoing designated time). Further, once generation of the trajectory of the position in the Z-axis direction to the peak position is completed, the time constant τ is initialized. At the same time, a step input of opposite polarity to that of the step input so far (to be more specific, a step input of opposite polarity having a height corresponding to an amount of change (equivalent to the foregoing designated value) in the Z-axis direction, from the peak position to the next expected landing position) is inputted to the finite duration settling filter. Thus, the trajectory of foot position in the Z-axis direction from the peak position to the expected landing position is sequentially generated. In this event, the time constant τ is sequentially and variably set to be reduced from the initial value to 0 by the expected landing time of the foot 22.

The foot position trajectory in the Z-axis direction may also be generated by variably setting the time constant τ to be continuously reduced from the initial value to 0 from the initial time of trajectory generation until the expected landing time of the foot 22, while switching the polarity of the step input at or around the time at which the foot 22 reaches the peak position. In this case, the foot 22 cannot reach the desired peak position with high accuracy. However, the foot 22 can reach the expected landing position at the expected landing time without any problems.

The foot posture trajectory can also be generated by using the finite duration settling filter, as in the case of the above-mentioned foot position trajectory. In this case, the foot posture trajectory can be generated as in the case of generation of the aforementioned foot position trajectory in the X-axis direction, with regard to a component of foot posture, having a monotonous change (monotonous increase or decrease) in the angle of the posture, among respective spatial components of the foot posture. The foot posture can be generated as in the case of generation of the foregoing foot position trajectory in the Z-axis direction, with regard to a component of foot posture, having a maximum or minimum value of posture angle change.

The desired foot position/posture trajectories generated by the finite duration settling filter as above are desired position/posture trajectories of each foot 22 of a later-described supporting leg coordinate system fixed on the floor surface.

The desired foot position/posture trajectories generated as above are generated so that the position of each foot 22 starts moving from its initial floor contacting state (state of the desired gait at initial time), while gradually accelerating toward the expected landing position. The desired foot position/posture trajectories are generated so that a rate of change of the position of the foot 22 is gradually reduced to ultimately become zero or nearly zero by the expected landing time, and that the foot 22 stops when it reaches the expected landing position at the expected landing time. Thus, a ground speed (rate of change of the position of each foot 22 at the supporting leg coordinate system fixed on the floor) at the landing moment of each foot 22 becomes zero or nearly zero. Therefore, a landing impact becomes small even if the foot 22 lands from the state where both legs 2 and 2 are in the air at the same time (state of the floating period) in the running gait.

In the running gait, a vertical velocity of the body 24 is downward from the latter half of the floating period due to the gravity acting on the robot 1. The vertical velocity is still downward at landing time. Therefore, the desired foot position/posture trajectories are generated such that the ground speed of each foot 22 at the landing moment becomes zero or nearly zero, as described above. At the same time, when generating the desired position/posture trajectories of the body 24 to satisfy dynamic equilibrium conditions as described later, the velocity of the foot 22 on the free leg side relative to the body 24 becomes upward immediately before landing. Specifically, the desired gait of the robot 1 is generated as a gait in which the leg 2 on the free leg side lands while pulling the leg toward the body 24 at the landing moment in the running gait. In other words, in the desired gait of this embodiment, the robot 1 lands while lifting the foot 22 on the free leg side toward the body 24 so that the ground speed of the foot 22 on the free leg side at the landing moment becomes zero or nearly zero. Thus, the landing impact becomes small, preventing the landing impact from being too large.

In this embodiment, the finite duration settling filter includes three or more stages (for example, three stages) of unit filters serially connected. Therefore, the velocity of each foot 22 (rate of change of the foot position) becomes zero or nearly zero by the expected landing time. In addition, the acceleration of each foot 22 becomes zero or nearly zero at the expected landing time, and the foot 22 stops. In other words, the ground acceleration at the landing moment becomes zero or nearly zero. Hence, the landing impact is further reduced. In particular, even if landing time of the actual robot 1 deviates from the desired landing time, the impact does not increase so much. A supplement description is provided. The number of stages of unit filters of the finite duration settling filter may be two for realizing zero or nearly zero ground speed of each foot 22 at the expected landing time. However, the acceleration of each foot 22 at the expected landing time does not generally become zero in this case.

After each foot 22 lands with the heel at the expected landing time, the foot posture keeps moving until almost entire bottom surface of the foot 22 contacts the floor. Thus, time at which almost entire bottom surface of the foot 22 contacts the floor is set as the foregoing designated time, and the foot posture trajectory is generated by the foregoing finite duration settling filter.

In this embodiment, the foot position trajectory is generated by the use of the finite duration settling filter. The foot position trajectory may also be generated by the use of a function such as a polynomial which is set so that the rate of change of the foot position at the expected landing time becomes zero or nearly zero (time differential of the foot position becomes zero), and further, that the acceleration of change (time differential of the rate of change) of the foot position at the planed landing time becomes zero or nearly zero. The same can be said of generation of the desired foot posture trajectory. Note that, as for generation of the desired foot posture trajectory, a function such as a polynomial is set so that, as mentioned earlier, the rate of change as well as the acceleration of change of each foot 22 becomes zero or nearly zero at time at which almost entire surface of each foot 22 contacts the floor.

Figure 6:
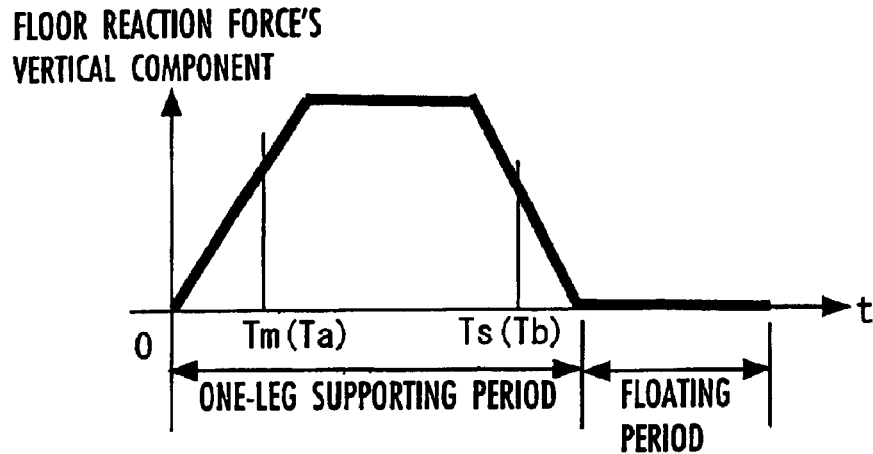
FIG. 6 is a diagram showing an example of setting a desired floor reaction force's vertical component.

The gait generating device 100 explicitly sets a desired floor reaction force's vertical component. The desired floor reaction force's vertical component trajectory is set, for example, as shown in FIG. 6. In this embodiment, a shape of the desired floor reaction force's vertical component trajectory in the running gait (specifically, a shape in the one-leg supporting period) is specified to be trapezoid (projecting shape to the increasing side of floor reaction force's vertical component). The height of the trapezoid and times of break points thereof are determined as gait parameters (floor reaction force's vertical component trajectory parameters) which define the desired floor reaction force's vertical component trajectory. During the floating period in the running gait, the desired floor reaction force's vertical component is normally set to zero. It is preferred to set the desired floor reaction force's vertical component trajectory to be substantially continuous (to prevent values from being discontinuous) like this example. This is for realizing smooth operations of the joints of the robot 1 when a floor reaction force is controlled. Here, the expression "substantially continuous" means the following. When a trajectory which is continuous in an analog manner (continuous trajectory in a true sense) is represented in a digital manner by a discrete time system, discontinuous values are consequently generated. However, the discontinuous values do not cause a loss of continuation of the trajectory.

Figure 7:
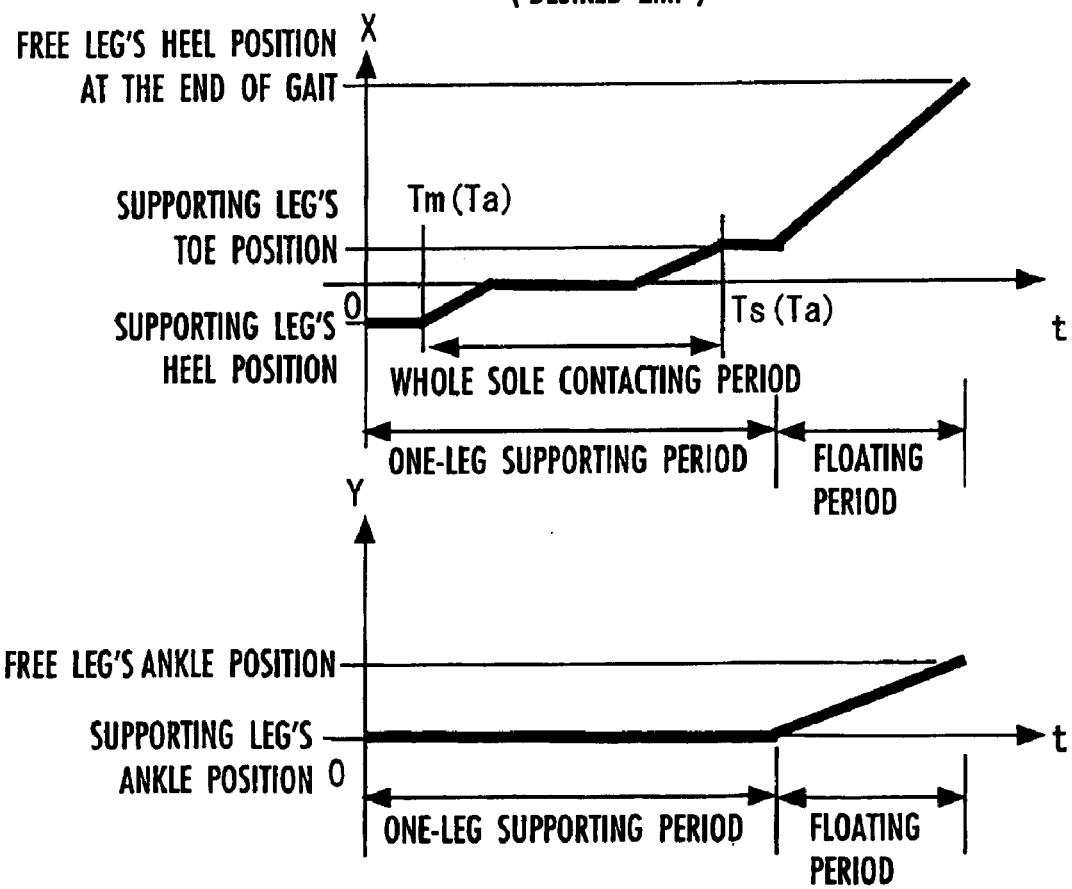
FIG. 7 is a diagram showing an example of setting a desired ZMP.

A desired ZMP trajectory is set as follows. In the running gait in FIG. 5, as mentioned earlier, the robot 1 lands with the heel of the foot 22 on the supporting leg side, then kicks the floor with the toe of the foot 22 to jump in the air, and finally lands with the heel of the foot 22 on the free leg side. Therefore, as shown in the upper diagram in FIG. 7, the desired ZMP trajectory is set as follows. The heel of the foot 22 on the supporting leg side is set as an initial position, and the desired ZMP moves to the center in the front-and-back direction of the foot 22 during a period when almost entire bottom surface of the foot 22 on the supporting leg side contacts the floor. Thereafter the desired ZMP moves to the toe of the foot 22 on the supporting leg side by lifting time. The upper diagram in FIG. 7 shows the desired ZMP trajectory in the X-axis direction (front-and-back direction), and the lower diagram in FIG. 7 shows the desired ZMP trajectory in the Y-axis direction (right-and-left direction). As shown in the lower diagram in FIG. 7, the desired ZMP trajectory in the Y-axis direction in the one-leg supporting period is set at the same position as the central position of the ankle joint of the leg 2 on the supporting leg side in the Y-axis direction.

As shown in the upper diagram in FIG. 7, the position in the X-axis direction in the desired ZMP trajectory during the floating period is set to continuously move from the toe of the foot 22 on the supporting leg side to the landing position of the heel of the foot 22 on the free leg side, by the next leg 2 on the free leg side lands. In addition, as shown in the lower diagram in FIG. 7, the position in the Y-axis direction in the desired ZMP trajectory during the floating period is set to continuously move from the central position in the Y-axis direction of the ankle joint of the leg 2 on the supporting leg side to the central position in the Y-axis direction of the ankle joint of the leg 2 on the free leg side, by the next leg 2 on the free leg side lands. In other words, the desired ZMP trajectory is set to be continuous (substantially continuous) over the entire gait period. The earlier-stated expression "substantially continuous" used for ZMP trajectory has the similar meaning to that for the foregoing floor reaction force's vertical component trajectory.

Considering approximation accuracy or the like of the dynamic model used for generation of the desired gait, it is preferred that the desired ZMP trajectory be substantially continuous even during the floating period as mentioned above, in order to cause a desired movement of the desired gait to be as continuous as possible. However, in the later-described dynamic model used in this embodiment, the desired ZMP is not necessarily continuous. Further, in this embodiment, the positions and times of breakpoints of the desired ZMP trajectory shown in FIG. 7 are set as ZMP trajectory parameters (parameters defining the desired ZMP trajectory).

The ZMP trajectory parameters are determined so that the ZMP trajectory has high stability margin and does not change suddenly. Here, the expression "high stability margin" is referred to as a state where the desired ZMP exists near the center of a smallest projecting polygon (so-called supporting polygon) including the contact surface of the robot 1 (see Japanese Patent Laid-Open Publication No. Heisei 10-86081). The desired ZMP trajectory in FIG. 7 is set to satisfy this condition.

The desired arm postures are expressed by postures relative to the body 24.

The desired body position/posture, the desired foot posture/position and later-described reference body posture are described by global coordinate systems. The global coordinate systems are coordinate systems fixed on the floor. More specifically, later-described supporting leg coordinate systems are used.

In this embodiment, the gait generating device 100 generates not only the desired body posture but also reference body posture. The reference body posture is a body posture generated by faithfully following requests to the gait (requests from a device such as a behavior planner or outside (such as the foregoing joystick) to the gait generating device 100).

The desired body posture (hereinafter, body posture without "reference" means the desired body posture) is generated to follow or coincide with the reference body posture in a long term basis.

In the walking gait, the desired body posture can always coincide with the reference body posture, like an embodiment described in the description of Patent Application No. 2000-352011 by the applicant of the application concerned. In Patent Application No. 2000-352011, the concept of reference body posture is not described, but a desired body posture pattern is explicitly and preferentially given. This means the same as that the desired body posture always coincides with the reference body posture.

However, in a gait, such as running having the floating period and a gait on a floor with low friction, merely adjusting a body horizontal acceleration does not satisfy the dynamic equilibrium conditions while maintaining a floor reaction force's horizontal component of the desired gait within a allowable range (or within a friction limit).

Therefore, in this embodiment, the desired body posture is deliberately shifted from the reference body posture as necessary. To be more specific, by compositionally generating two movement modes described below, the floor reaction force's horizontal component of the desired gait is maintained within the allowable range (or within the friction limit).

Figure 8:
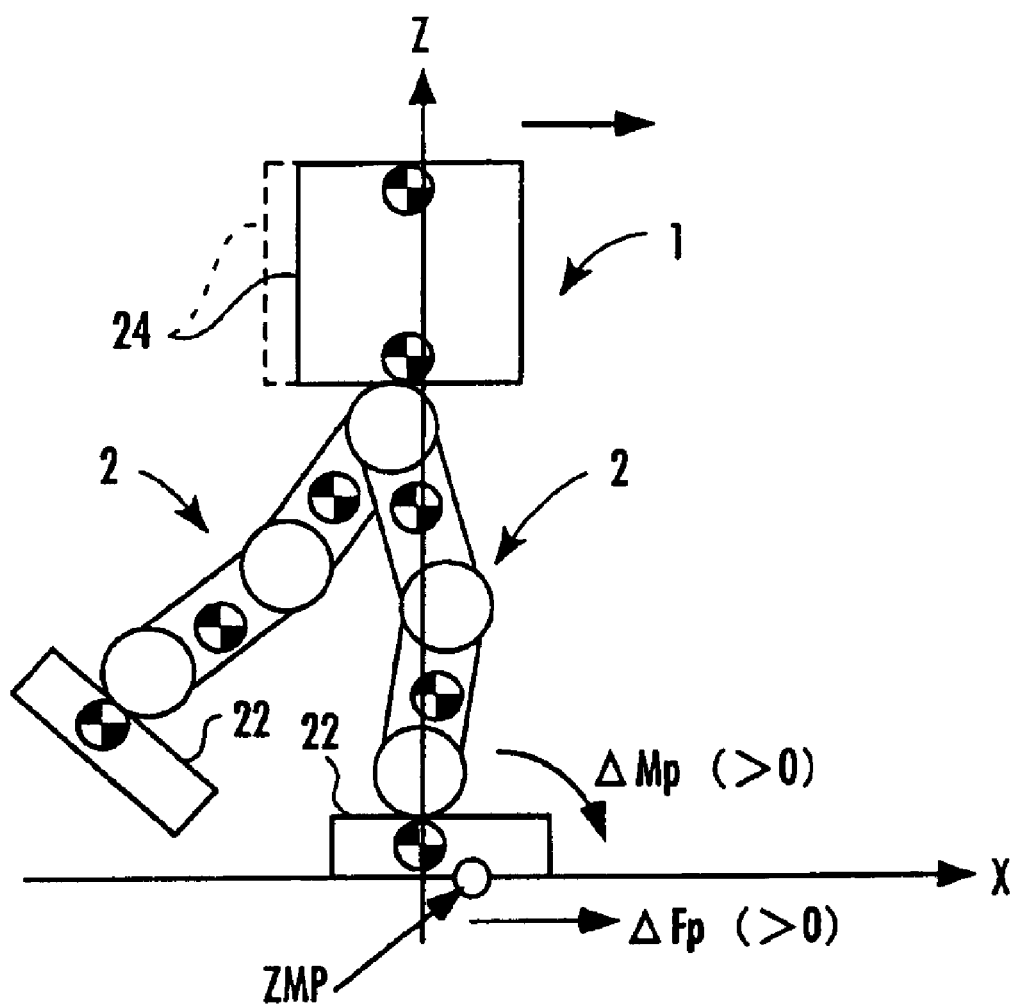
FIGS. 8 and 9 are explanatory views of movement modes (a body translation mode and a body rotation mode) of the robot.

As shown in FIG. 8, when only the body horizontal acceleration is perturbated (slightly changed) from a certain movement state of the robot 1, total center-of-gravity horizontal acceleration and angular momentum about the total center of gravity of the robot 1 are perturbated. Specifically, a perturbation of the body horizontal acceleration causes perturbations of the component of the floor reaction force's moment about the desired ZMP (excluding the component about the vertical axis) and the floor reaction force's horizontal component, without causing a perturbation of the floor reaction force's vertical component which dynamically balances with the resultant force of the inertial force and gravity of the robot 1 generated by the perturbation of the body horizontal acceleration (without causing a perturbation of the total center of gravity's vertical acceleration of the robot 1). The movement mode causing a perturbation of the body horizontal acceleration of the robot 1 is referred to as a body translation mode.

In other words, the body translation mode is referred to as movement which changes the component of the floor reaction force's moment (excluding the component about the vertical axis) about the desired ZMP and the floor reaction force's horizontal component, without changing the floor reaction force's vertical component.

A change of the component of the floor reaction force's moment per unit acceleration at this time is denoted by ΔMp, and a change of the floor reaction force's horizontal component per unit acceleration is denoted by ΔFp. When the body 24 is accelerated horizontally toward the front in the situation shown in FIG. 8, ΔMp and ΔFp act in directions of arrows shown in FIG. 8.

For better sensory understanding, the floor reaction force balancing out the resultant force of the inertial force and gravity generated by movement is used to express the floor reaction force's vertical component. However, it is more theoretically appropriate to use the resultant force of the inertial force and gravity to express the floor reaction force's vertical component. This resultant force and the floor reaction force have the same magnitude in the opposite directions to each other.

Figure 9:
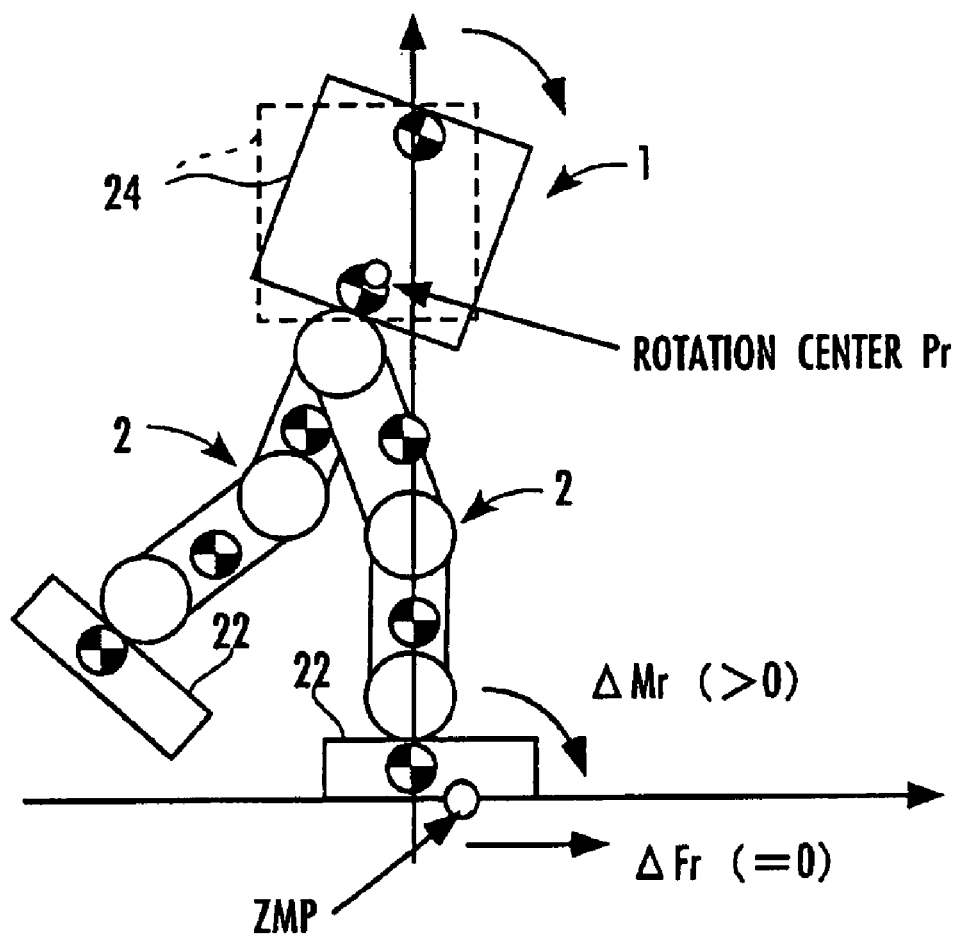

On the other hand, when a body posture angular acceleration (angular acceleration of the posture angle of the body 24) is perturbated about a certain point Pr from a certain movement state of the robot 1 as shown in FIG. 9, the total center of gravity of the robot 1 is not perturbated but the angular momentum about the total center of gravity is perturbated. In other words, the perturbation of the body posture angular acceleration about the point Pr does not cause perturbations of the floor reaction force's vertical component and the floor reaction force's horizontal component, but causes a perturbation of the component of the floor reaction force's moment about the desired ZMP (excluding the component about the vertical axis). The movement mode causing a perturbation of the body posture angular acceleration of the robot 1 is referred to as a body rotation mode.

In other words, the body rotation mode is referred to as a movement changing the component of the floor reaction force's moment about the desired ZMP (excluding the component about the vertical axis), without changing the floor reaction force's vertical component and the floor reaction force's horizontal component.

A change of the component of the floor reaction force's moment per unit angular acceleration at this time is denoted by ΔMr, and a change of the floor reaction force's horizontal component per unit angular acceleration is denoted by ΔFr. ΔFr is zero. When angular acceleration of the body posture angle is generated so that the body 24 inclines to the front in the state shown in FIG. 9, ΔMr acts in the direction of the arrow shown in FIG. 9.

Next, description is given regarding a robot dynamic model used for gait generation in this embodiment. In this embodiment, a below-described simplified (approximated) dynamic model is used. However, a kinematics model (a model expressing structures and dimensions of joints and links, in other words, a model expressing a relation between joint displacement and link position/posture) is also required as far as this dynamic model described below is concerned.

Figure 10:
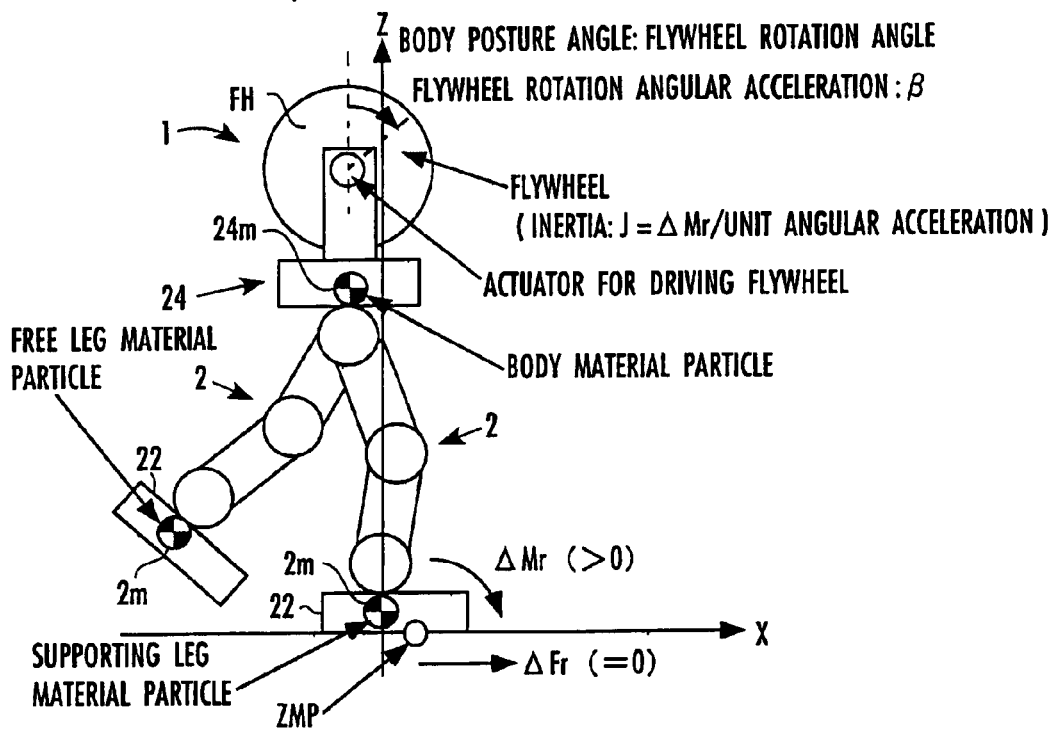
FIGS. 10 and 11 are explanatory views of dynamic models of the robot.

FIG. 10 shows the robot dynamic model used in this embodiment. As shown in the drawing, this dynamic model is configured by three material particles in total, including two material particles 2m and 2m corresponding to the legs 2 and 2 of the robot 1, respectively, and a material particle 24m corresponding to the body 24, as well as a flywheel FH having inertia but no mass. In this dynamic model, dynamics of the legs 2 and 2 (dynamics of the respective material particles 2m and 2m) and dynamics of the body 24 (dynamics of the material particle 24m and flywheel FH) are configured to be decoupled, that is, not to interfere with each other. At the same time, dynamics of the entire robot 1 is expressed by linear combination of dynamics of the above material particles. In addition, a relation between a movement of the body 24 and the floor reaction force is separated into a relation between the translation movement (body translation mode) of the body 24 and the floor reaction force, and a relation between the rotation movement (body rotation mode) of the body 24 and the floor reaction force. To be specific, a floor reaction force generated by a horizontal movement of the body material particle 24m corresponds to a floor reaction force generated by a translation movement (body translation mode) of the body 24 in the horizontal direction. A floor reaction force generated by a rotation movement of the flywheel corresponds to the floor reaction force generated by rotation movement (body rotation mode) of the posture angle of the body 24.

Note that masses of arms of the robot 1 are included in the body 24, and the body material particle 24m has a mass including the masses of arms. In this embodiment, as described later, movements of arms (arm swinging movements) in the desired gait are performed so that the total center of gravity of both arms relative to the body 24 does not move, while canceling an inertial force's moment about the vertical axis generated in the robot 1 by a movement of the robot 1 other than arm swinging movements. Thus, influences of arm swinging movements on the floor reaction force's moment (excluding a moment about the vertical axis) and on the floor reaction force's horizontal component are ignored.

The above-mentioned simplified model is formulated hereinbelow. However, in order to simplify description, only equations of movement on a sagittal plane (a plane including a front-and-back axis (X axis) and a vertical axis (Z axis)) are described. Equation of movement on a lateral plane (a plane including a right-and-left axis (Y axis) and the vertical axis (Z axis)) are omitted.

For the convenience of description, functions and parameters related to the dynamic model are defined as below. The respective material particles 2m, 2m and 24m correspond to either representative points of corresponding portions, or points geometrically and uniquely determined from the positions/postures of the corresponding portions. For example, the position of the material particle 2m of the leg 2 on the supporting leg side is set to be a point above the aforementioned representative point of the bottom surface of the foot 22 of the leg 2 by a predetermined distance.

Zsup: supporting leg material particle's vertical position
Zswg: free leg material particle's vertical position
Zb: body material particle's vertical position (generally different from a body vertical position)
ZGtotal: total center-of-gravity vertical position
Xsup: supporting leg material particle's horizontal position
Xswg: free leg material particle's horizontal position
Xb: body material particle's horizontal position (This is a point offsetting forward or backward from the aforementioned point Pr by a predetermined distance. Offset is determined so that a center of gravity of a precise model coincides with the center of gravity of the dynamic model as much as possible when, for example, the robot 1 is standing upright. This point is generally different from the body horizontal position.)
XGtotal: total center-of-gravity horizontal position
θby: body posture angle (inclination angle) about Y axis relative to vertical direction
mb: body material particle's mass
msup: supporting leg material particle's mass
mswg: free leg material particle's mass
mtotal: total robot mass (=mtotal+msup+mswg)
J: body's moment of inertia (This is an equivalent moment of inertia in the body rotation mode and does not generally coincide with a inertia moment of the body 24 of the actual robot 1.)
Fx: floor reaction force's horizontal component (Specifically, this is a (X axis) component in the front-and-back direction of a translation floor reaction force.)
Fz: floor reaction force's vertical component (Specifically, this is a (Z axis) component in the vertical direction of a translation floor reaction force, and is equivalent to a desired translation floor reaction force's vertical component in this embodiment.)
My: floor reaction force's moment about desired ZMP (Specifically, this is a component of the floor reaction force's moment about the right-and-left axis (Y axis))

Note that, in this embodiment, a relation between the position of the material particle 2m of each leg 2 and the position of the foot 22 of the leg 2 (position of the representative point of the foot 22 determined in advance) is set in advance. Thus, once one of the positions is determined, the other position is uniquely set. Further, a relation between the position of the body material particle 24m and the position of the body 24 (position of the representative point of the body 24 set in advance) is set in advance in accordance with the posture angle of the body 24. Thus, the posture angle and the position of one side are determined, the position of the other side is uniquely set.

For an arbitrary variable X, dX/dt represents a first-order differential of X, and d2X/dt2 represents a second-order differential of X. Therefore, if the variable X represents displacement, dX/dt means a velocity, and d2X/dt2 means acceleration. g represents a gravity acceleration constant. Here, g is set to be a positive value.

Equations of movement (equations expressing dynamic equilibrium conditions) of the foregoing dynamic model are expressed by Equations 01, 02 and 03.

$$Fz=mb*(g+d2Zb/dt2)+msup*$$
$$(g+d2Zsup/dt2)+mswg*$$
$$(g+d2Zswg/dt2) \qquad \text{Equation 01}$$

$$Fx=mb*d2Xb/dt2+msup*d2Xsup/dt2+mswg*d2Xswg/dt2 \qquad \text{Equation 02}$$

$$My=-mb*(Xb-Xzmp)*(g+d2Zb/dt2)+mb*(Zb-Zzmp)*(d2Xb/dt2)-msup*(Xsup-Xzmp)*(g+d2Zsup/dt2)+msup*(Zsup-Zzmp)*(d2Xsup/dt2)-$$

$$mswg*(Xswg-Xzmp)*(g+d2Zswg/dt2)+mswg*(Zswg-Zzmp)*(d2Xswg/dt2)+J*d2\theta by/dt2 \qquad \text{Equation 03}$$

Further, the following relational expressions are applied to the total center of gravity of the robot.

$$ZGtotal=(mb*Zb+msup*Zsup+mswg*Zswg)/mtotal \qquad \text{Equation 04}$$

$$XGtotal=(mb*Xb+msup*Xsup+mswg*Xswg)/mtotal \qquad \text{Equation 05}$$

Relations between the foregoing dynamic model and aforementioned ΔFp, ΔMp, ΔFr and ΔMr are described below.

In Equation 02, ΔFp is a perturbation amount of Fx when d2Xb/dt2 is perturbated by a unit amount, and thus obtained by the following equation.

$$\Delta Fp=mb \qquad \text{Equation 06}$$

In other words, a change ΔFp of the horizontal component of the floor reaction force per unit acceleration in the body translation mode is equivalent to the mass of the body material particle 24m of the foregoing dynamic model.

In Equation 03, ΔMp is a perturbation amount of My when d2X/dt2 is perturbated by unit amount, and thus obtained by the following equation.

$$\Delta Mp=mb*(Zb-Zzmp) \qquad \text{Equation 07}$$

In other words, a change ΔMp of the component of the floor reaction force's moment per unit acceleration in the body translation mode is obtained by multiplying the mass of the body material particle of the foregoing dynamic model by a height (vertical position) of the body material particle 24m from the desired ZMP. The relation between the positions of the body material particle 24m and the desired ZMP and a movement of the body material particle 24m at this time is equivalent to behavior of an inverted pendulum when the body material particle 24m corresponds to an inverted pendulum material particle and the desired ZMP corresponds to an inverted pendulum fulcrum, respectively.

In Equation 02, ΔFr is a perturbation amount of Fx when d2θby/dt2 is perturbated by unit amount, and thus obtained by the following equation.

$$\Delta Fr=0 \qquad \text{Equation 08}$$

In other words, a change ΔFr of the translation floor reaction force's horizontal component per unit acceleration in the body rotation mode is zero.

In Equation 03, ΔMr is a perturbation amount of My when d2θby/dt2 is perturbated by unit amount, and thus obtained by the following equation.

$$\Delta Mr = J \quad \text{Equation 09}$$

In other words, a change ΔMr of the component of the floor reaction force's moment per unit acceleration in the body rotation mode is equivalent to the inertia moment of the flywheel.

In the gait generating device 100 in this embodiment, a desired gait for one step from landing of one leg 2 of the robot 1 to landing of the other leg 2 is set as a unit, and the desired gait for one step is sequentially generated. Therefore, as for the running gait in FIG. 5 generated in this embodiment, the desired gait from initial time of the one-leg supporting period to end time of the following floating period (initial time of the next one-leg supporting period) is sequentially generated. In this description, "one step" of the desired gait is used to mean the duration from the landing of one leg 2 of the robot 1 until the landing of the other leg 2. Further, the desired gait which to be newly generated is called a "current time gait", the following desired gait is called a "next time gait", and the next following desired gait is called a "next but one time's gait." In addition, the last desired gait generated before the "current time gait" is called a "last time gait."

Moreover, when the gait generating device 100 newly generates a current time gait, required values (requests) of a expected landing position/posture and expected landing time of the foot 22 on the free leg side of the robot 1 for the next two steps are inputted to the gait generating device 100 as required parameters for the gait (alternatively, the gait generating device 100 reads the required parameters from a storage device). By the use of these required parameters, the gait generating device 100 then generates desired body position/posture trajectories, desired foot position/posture trajectories, a desired ZMP trajectory, a desired floor reaction force's vertical component trajectory, a desired arm posture trajectory and the like. At this time, a part of the gait parameters defining these trajectories is corrected as appropriate to ensure continuity of the gait.

Figure 12:
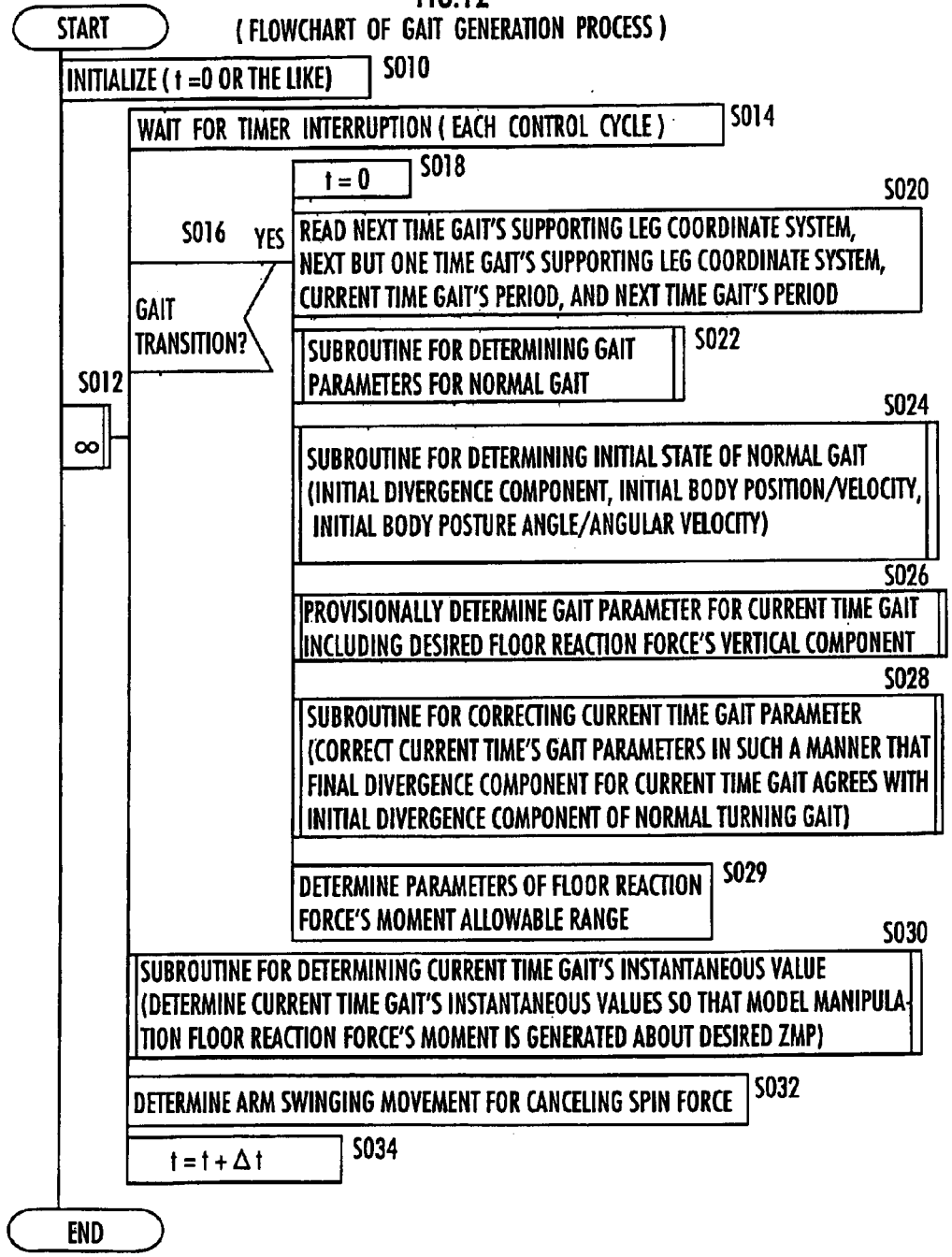
FIG. 12 is a flowchart showing main routine processing of a gait generating device in the first embodiment.

Details of gait generation processing by the gait generating device 100 are described hereinbelow with reference to FIGS. 12 to 41, taking generation of the running gait in FIG. 5 as a main example. FIG. 12 is a flowchart (structured flowchart) showing gait generating processing executed by the gait generation device 100.

First of all, in S010, various initialization operations are performed such as initialization of time t to zero. This processing is performed when the gait generating device 100 starts, for example. Next, processing proceeds to S014 via S012 and the gait generating device 100 waits for the timer interruption for each control cycle (calculation process cycle of the flowchart in FIG. 12). The control cycle is represented by Δt.

Next, processing proceeds to S016, it is determined whether a gait transition is detected or not. If the gait transition is detected, processing proceeds to S018, otherwise the process proceeds to S030. This "gait transition" herein means a timing at which generation of the last time gait is completed and generation of the current time gait starts. The gait transition is, for example, a control cycle following a control cycle in which generation of the last time gait is completed.

When processing proceeds to S018, time t is initialized to zero, and then processing proceeds to S020 where the next time gait's supporting leg coordinate system, the next but one time gait's supporting leg coordinate system, the current time gait's period and the next time gait's period are read. These supporting leg coordinate systems and gait periods are defined by the foregoing required parameters. In other words, in this embodiment, the required parameters that the gait generating device 100 is given by the joystick or the like include the required values of the expected landing position/posture (foot position/posture in a state where the foot 22 is rotated without slipping so that almost entire bottom surface contacts a floor surface after the foot 22 lands) and the expected landing time of the foot 22 on the free leg side, for next two steps. The required values for the first step and the second step, corresponding to the current time gait and the next time gait, respectively, are given to the gait generating device 100 before initial time of generation of the current time gait (before a gait transition earlier described in S016). The required values can be changed while generating the current time gait.

Thereafter, the next time gait's supporting leg coordinate system is determined in accordance with the required values of the expected landing position/posture of the foot 22 on the free leg side of the first step (foot 22 on the free leg side in the current time gait) by the foregoing required parameters.

Figure 15:
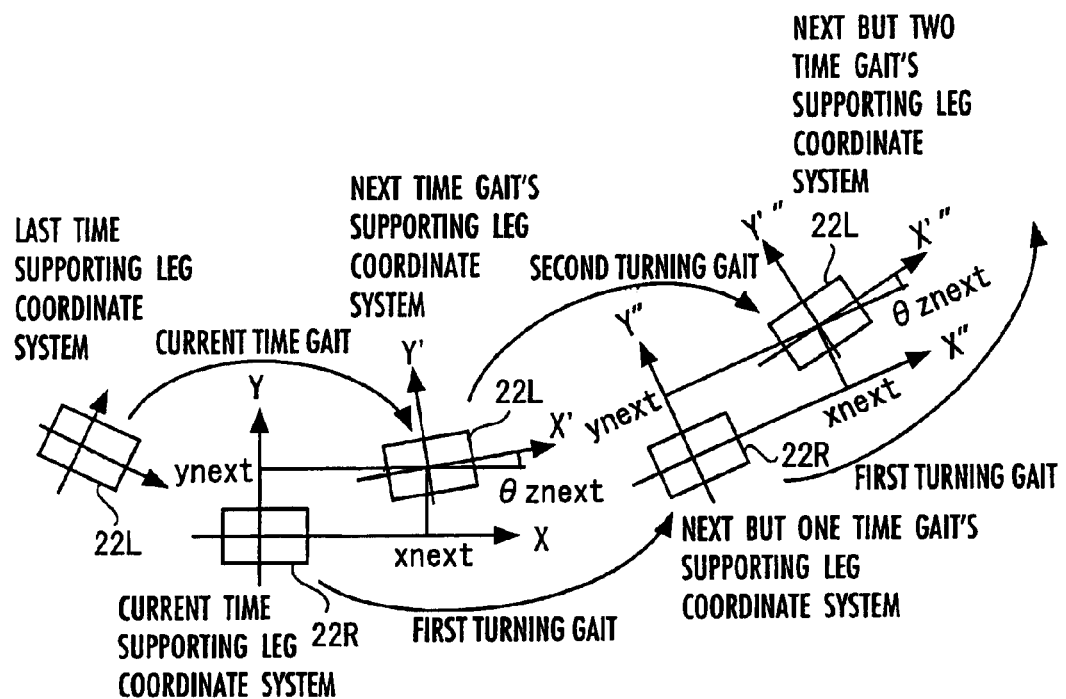
FIG. 15 is an explanatory view showing a relation between normal gait's foot landing position/posture and coordinate systems.

Referring to FIG. 15, for example, it is assumed that the required values of the expected landing position/posture of the foot 22 on the free leg side (22L in the drawing) related to the current time gait (first step) are set as position/posture obtained as follows. The position/posture is moved from the landing position/posture of the foot 22 on the supporting leg side (22R in the drawing) of the current time gait, by xnext and ynext in the X-axis direction (front-and-back direction of the foot 22R on the supporting leg side of the current time gait) and the Y-axis direction (right-and-left direction of the foot 22R on the supporting leg side of the current time gait) of the current time gait's supporting leg coordinate system, respectively, and is rotated about the Z axis (about the vertical axis) by θznext. Here, the supporting leg coordinate system is a coordinate system fixed on a floor. The origin of the supporting leg coordinate system is set to a point where a perpendicular extending from the center of the ankle of the leg 2 on the supporting leg side intersects with a floor surface in a state where the foot 22 on the supporting leg side is horizontally postured (more generally, postured in parallel with a floor surface), causing almost entire bottom surface of the foot 22 on the supporting leg side to (closely) contact the floor surface. (The above point coincides with the representative point of the foot 22 on the supporting leg side in the state where almost entire bottom surface of the foot 22 contacts the floor surface in an example of this embodiment.) In the supporting leg coordinate system, a horizontal plane passing through the origin is set to be an XY plane. In this case, the X-axis direction and Y-axis direction are the front-and-back direction and the right-and-left direction of each foot 22 on the supporting leg side, respectively. The origin of the supporting leg coordinate system does not have to coincide with the representative point of the foot 22 (point representing the position of the foot 22) in the state where almost entire bottom surface of the foot 22 on the supporting leg side contacts the floor surface. The origin may be set as a point on the floor surface, which differs from the representative point.

In this case, the next time gait's supporting leg coordinate system is a coordinate system whose origin is the representative point of the foot 22L (more specifically, a point on the floor, which coincides with the representative point) in a case where the foot 22 is landed in accordance with the required values of the expected landing position/posture of the foot 22L on the free leg side of the current time gait as shown in the drawing (in a case where the representative point of the foot 22 is caused to coincide with the required value of the expected landing position, and the posture (orientation) of the foot 22 is caused to coincide with the required value of the expected landing posture). In the next time gait's supporting leg coordinate system, the front-and-back direction and right-and-left direction of the foot 22 within the horizontal plane passing through the origin are set as an X'-axis direction and a Y'-axis direction, respectively.

As in the case of the above, the next but one time gait's supporting leg coordinate system (see X" and Y" coordinates in FIG. 15) is defined in accordance with the required values of the expected landing position/posture of the foot 22 on the free leg side of the second step. Further, the current time gait's period is defined as a duration from the (required value of) expected landing time of the foot 22 on the supporting leg side of the current time gait until (the required value of) the expected landing time of the foot 22 on the free leg side of the first step (current time gait). The next time gait's period is defined as a duration from (the required value of) the expected landing time of the foot 22 on the free leg side of the first step until (the required value of) the expected landing time of the foot 22 on the free leg side of the second step.

In this embodiment, the foregoing required parameters are inputted to the gait generating device 100 by required manipulation of the joystick. However, the required parameters or corresponding positions/postures of the aforementioned supporting leg coordinate systems and gait periods may be stored in advance as a movement schedule of the robot 1. Alternatively, the next time gait's supporting leg coordinate system and next but one time gait's supporting leg coordinate system as well as the present and next time gait's periods may be determined based on commands (requests) from a manipulator such as a joystick, and a history of movements of the robot 1 before the commands are given.

Next, processing proceeds to S022, where the gait generating device 100 determines gait parameters of a normal turning gait serving as a virtual cyclic gait which follows the current time gait. The gait parameters include foot trajectory parameters defining desired foot position/posture trajectories in the normal turning gait, reference body posture trajectory parameters defining the body posture trajectory as a reference, arm trajectory parameters defining the desired arm posture trajectories, ZMP trajectory parameters defining a desired ZMP trajectory, and floor reaction force's vertical component trajectory parameters defining a desired floor reaction force's vertical component trajectory. Additionally, parameters defining a desired floor reaction force's horizontal component allowable limit are included in the gait parameters.

In this description, the "normal turning gait" is used to mean a cyclic gait in which states of movement of the robot 1 (states of foot position/posture and body position/posture) will not be discontinuous at a boundary of gait (in this embodiment, a boundary of gait for each step) when the normal turning gait is repeated. Hereinbelow, the "normal turning gait" may be abbreviated as a "normal gait."

In this embodiment, in the normal turning gait, which is a cyclic gait, is configured by repeating a gait for one cycle. The gait for one cycle of the normal turning gait is a gait of two steps of the robot 1, that is, a gait including the first turning gait following the current time gait and the second turning gait following the first turning gait. The reason why the term "turning" is used is because zero turning rate means straight travel and therefore straight travel can be included in turning in a broad sense. Further, when the desired gait to be generated is the foregoing running gait in FIG. 5, the current time gait of the desired gait is the running gait having the one-leg supporting period and the floating period. Thus, any of the first turning gait and the second turning gait of the normal turning gait is the gait having the one-leg supporting period and the floating period, as in the case of the current time gait. In short, the basic gait forms of the first turning gait and the second turning gait are the same as that of the current time gait.

A supplementary description is given with regard to the normal turning gait. In a biped mobile robot, the normal turning gait for one cycle requires a gait with at least two steps in a narrow sense described above. It is also possible to set a complicated normal turning gait in which a gait with three or more steps is set as the gait for one cycle. However, the normal turning gait is used only for determining a divergence component (to be detailed later) at the end (end time) of the current time gait, as stated later. Therefore, a use of the normal turning gait, in which a gait of three or more steps is set as the gait for one cycle, does not produce effects so much, although it results in complex processing of gait generation. Thus, the gait for one cycle of the normal turning gait in this embodiment is configured by the gait of two steps (the first and second turning gaits). As for a legged mobile robot with three or more legs, the number of gaits sufficient to define a normal turning gait increases in accordance with the number of legs. For the convenience of explanation, the normal turning gait made of a plurality of gaits in a narrow sense (gaits, each including two steps in this embodiment) is regarded as a one step of gait hereinbelow.

The normal turning gait is temporarily produced in the gait generating device 100 for determining a state of movement of the robot 1 such as a divergence component, a body vertical position velocity, a body posture angle and its angular velocity and the like at the end of the current time gait. The normal turning gait is not outputted as it is from the gait generating device 100.

Figure 13:
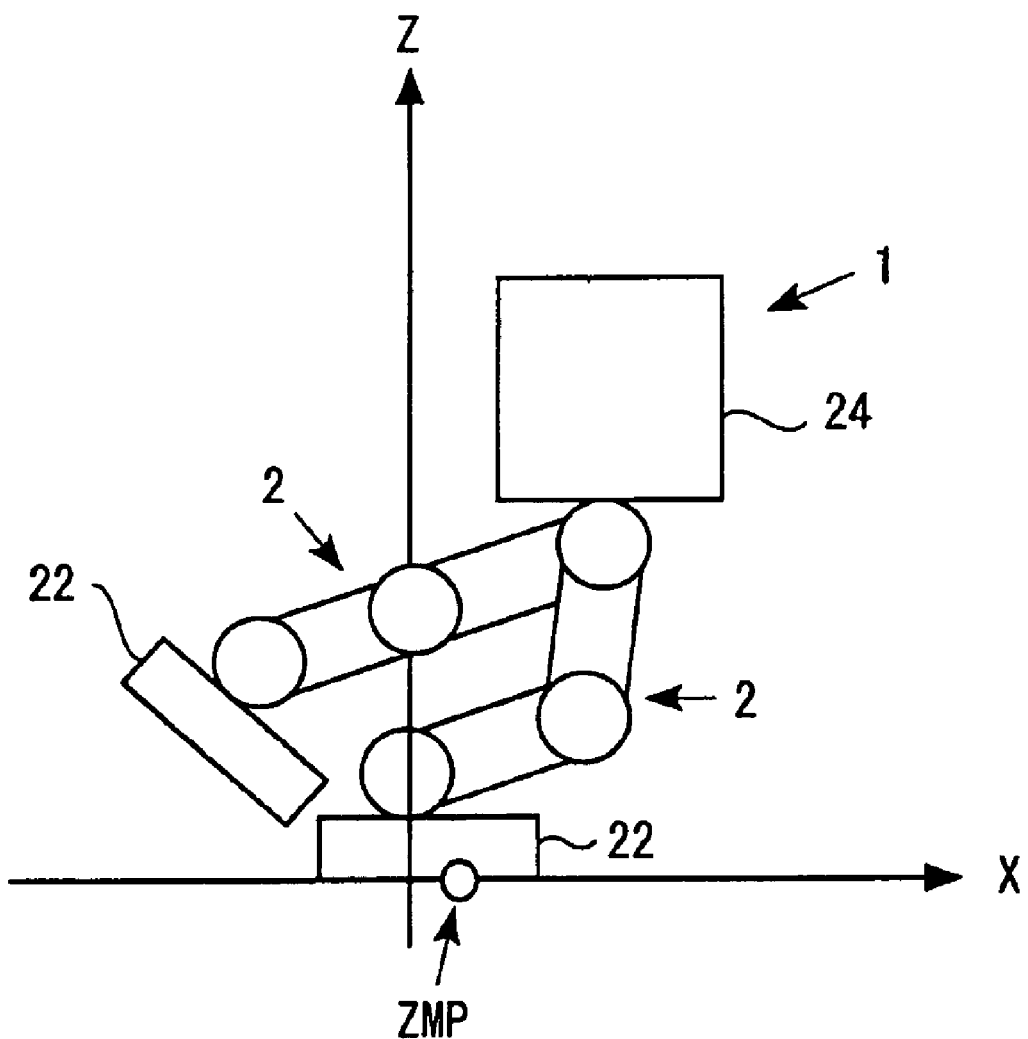
FIG. 13 is an explanatory view showing a state of divergence of the robot's body position.

Note that the "divergence" means that the position of the body 24 of the biped mobile robot 1 is shifted to a position significantly away from the positions of both feet 22 and 22, as shown in FIG. 13. The value of the divergence component is a numerical value expressing a situation where the body 24 of the biped mobile robot 1 shifts away from the positions of both feet 22 and 22 (more specifically, from the origin of a global coordinate system (supporting leg coordinate system) set on the contact surface of the foot 22 on the supporting leg side).

In this embodiment, a gait is produced with reference to the divergence component so that a desired gait is continuously generated without causing divergence described above. However, the normal gait, a typical example of a continuous gait (a cyclic gait with the same pattern which can be repeated without causing a discontinuity of gait trajectory; gait having no divergence in principle even if the gait is repeated infinite times) has an initial divergence component (divergence component at initial time of the normal turning gait), and even this initial divergence component is not simply zero. When parameters of the normal gait change, the initial divergence component of the normal gait also changes. In short, an appropriate divergence component changes depending on the gait form such as a way of walking or running and the like. Therefore, in this embodiment, the normal gait following the current time gait to be generated from now is set in accordance with the required parameters related to the current time gait. After an initial divergence component of the normal gait is obtained, the current time gait is generated so that an final divergence component of the current time gait coincides with the initial divergence component of the normal gait (more generally, the current time gait is continued to or brought close to the normal gait). This basic guideline for such gait generation is similar to that in Patent Application No. 2000-352011 earlier proposed by the applicant.

In the embodiments of this invention, a linear dynamic model with three material particles like the one used in the first embodiment of Patent Application No. 2000-352011 is not used. However, concepts of a divergence component and a convergence component defined in the following equation can be applied to a perturbation of behavior of the nonlinear dynamic model like the model shown in FIG. 10, with approximately sufficient accuracy.

Divergence component=body material particle's horizontal position+body material particle's horizontal velocity/$\omega 0$ Equation 10

Convergence component=body material particle's horizontal position−body material particle's horizontal velocity/$\omega 0$ Equation 11

Here, the body material particle's horizontal position represents the body material particle's horizontal position Xb in the foregoing dynamic model shown in FIG. 10.

Further, $\omega 0$ is a predetermined value, and, for running, this value needs to be slightly changed from the value obtained when generating a walking gait in Patent Application No. 2000-352011.

Other details regarding the divergence component and convergence component are described in Patent Application No. 2000-352011. Therefore, no further details are provided.

In this embodiment, in addition to the method shown in Patent Application No. 2000-352011, gait parameters defining the desired floor reaction force's vertical component trajectory are set and the total center-of-gravity vertical position of the robot 1 is determined to dynamically satisfy the desired floor reaction force's vertical component as described later. In this case, the second-order integral of the floor reaction force's vertical component defines the total center-of-gravity vertical position of the robot 1. Therefore, if the desired floor reaction force's vertical component is badly set, the total center-of-gravity vertical position or the body vertical position of the robot 1 becomes too high or too low. Thus, a method of setting the desired floor reaction force's vertical component is also an important issue. However, the relation between the floor reaction force's vertical component and the body vertical position is similar to the relation between the ZMP and the body horizontal position. Therefore, a part of a determining method of desired ZMP for realizing appropriate body horizontal position velocity is only slightly changed as shown in the following of this embodiment, and the changed determining method can be applied to a determining method of the desired floor reaction force's vertical component for realizing appropriate body vertical position/velocity.

Figure 14:
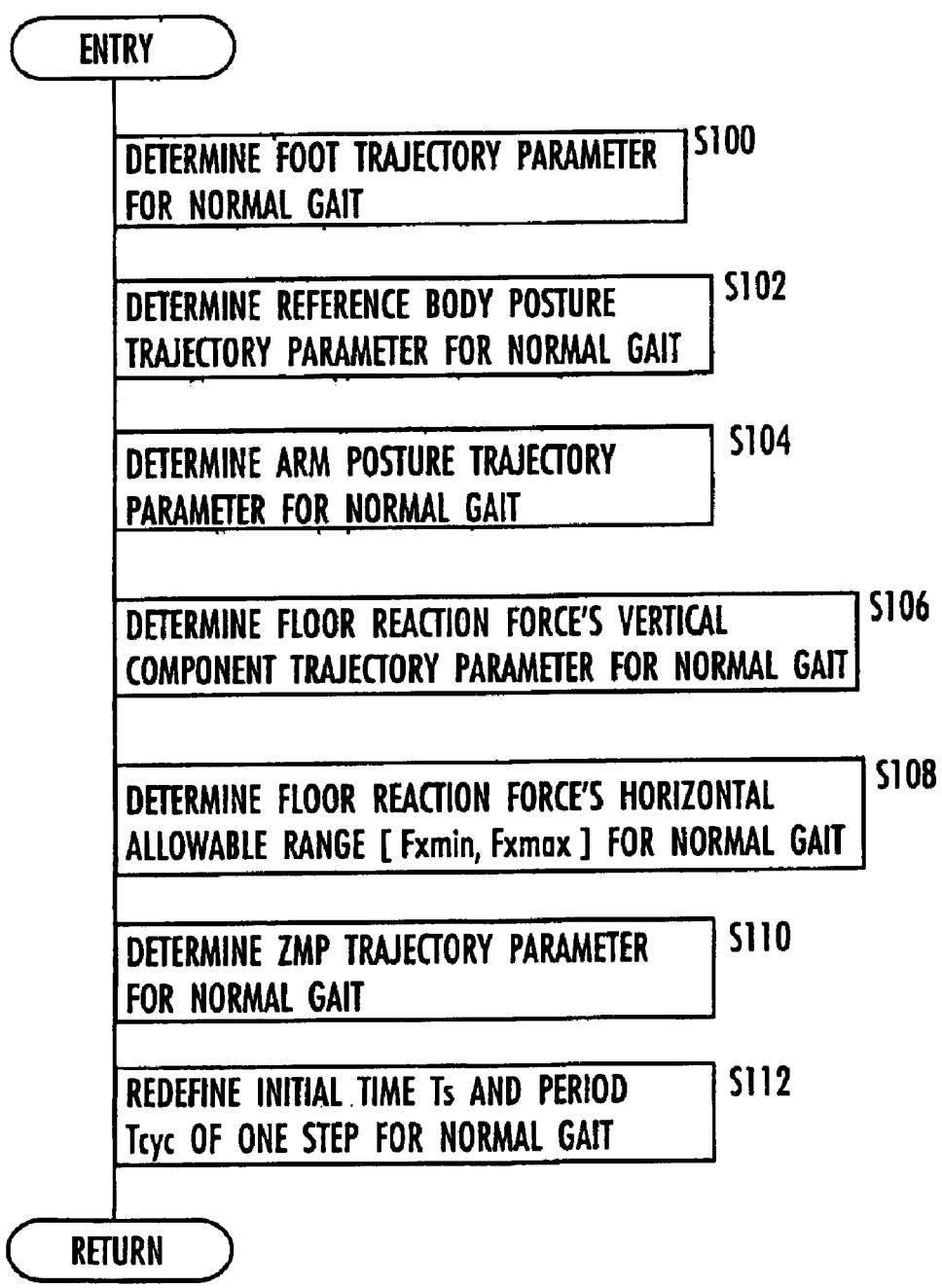
FIG. 14 is a flowchart showing subroutine processing of the flowchart in FIG. 12.

Turning back to the main subject, in S022, the following processing is performed following the flowchart shown in FIG. 14.

First of all, in S100, among the gait parameters for the normal gait, the foot trajectory parameters are determined so that the foot position/posture trajectories are continuous sequentially through the current time gait, the first turning gait, and the second turning gait. A specific setting method thereof is described below with reference to FIG. 15. Note that, in the description below, the foot 22 of the leg 2 on the supporting leg side is called a supporting leg foot, and the foot 22 of the leg 2 on the free leg side is called a free leg foot. Further, "beginning" and "end" of a gait means initial time and end time of the gait or instantaneous gaits at initial time and end time, respectively.

The foot trajectory parameters are configured by positions/postures of the supporting leg foot 22 and the free leg foot 22, respectively, at the beginnings and ends of the first turning gait and the second turning gait, and gait period of each turning gait and the like. Among the foot trajectory parameters, a free leg foot position/posture at first turning gait's beginning is set to be a supporting leg foot position/posture at current time gait's end, viewed from the next time gait's supporting leg coordinate system. In this case, in the running gait, the supporting leg foot 22 at the end of the current time gait is moved in the air. The supporting leg foot position/posture at current time gait's end are obtained by generating foot position/posture trajectories from the supporting leg foot position/posture at current time gait's beginning (=free leg foot position/posture at last time gait's end) to free leg foot position/posture at next time gait's end (specifically, trajectories viewed from the next time gait's supporting leg coordinate system), by the use of the foregoing finite duration settling filter until the end of the current time gait. The free leg foot position/posture at next time gait's end is determined in accordance with either required values of the expected landing position/posture of the free leg foot 22 of the second step in the foregoing required parameters (required values of the expected landing position/posture of the current time gait's supporting leg foot 22, in the next time gait), or the next but one time gait's supporting leg coordinate system, corresponding to the required values.

The free leg foot position/posture at next time gait's end are determined so that the position/posture of the foot 22 coincide with the position/posture of the next but one time gait's supporting leg coordinate system, when the foot 22 is rotated from the position/posture at next time gait's end by a predetermined angle in the pitch direction, so that the toe is lowered while contacting a floor, until the foot is horizontally postured. In other words, the free leg foot position/posture at next time gait's end are position/posture of the foot 22 in the following state. The foot 22 is rotated by a predetermined angle in the pitch direction from the required values of the landing position/posture of the free leg foot 22 of the second step in the foregoing required parameters, so that the toe is lifted while the foot 22 contacts the floor without causing slip (a state where the toe is lifted and the heel lands).

Further, supporting leg foot position/posture at the first turning gait's beginning are set to be free leg foot position/posture of current time gait's end viewed from the next time gait's supporting leg coordinate system. In this case, as in the case of the free leg foot position/posture at next time gait's end, the free leg foot position/posture at current time gait's end is defined in accordance with the next time gait's supporting leg coordinate system or the required values of the free leg expected landing position/posture of the first step (current time gait) of the foregoing required parameters, corresponding to the next time gait's supporting leg coordinate system. In other words, the free leg foot position/posture at current time gait's end are determined so that the representative point of the foot coincides with the origin of the next time gait's supporting leg coordinate system, when the foot 22 is rotated to lower the toe while contacting the floor so that almost entire bottom surface of the foot 22 contacts the floor.

Free leg foot position/posture at the first turning gait's end are determined based on the position/posture of the next but one time gait's supporting leg coordinate system, viewed from the next time gait's supporting leg coordinate system, as in the case of the determining methods for the free leg foot position/posture at current time gait's end and the free leg foot position/posture at next time gait's end. More specifically, the free leg foot position/posture at the first turning gait's end are set so that the foot position/posture coincide with the position/posture of the next but one time gait's supporting leg coordinate system, viewed from the next time gait's supporting leg coordinate system, when the foot 22 is rotated while contacting the floor without slipping, by a predetermined angle from the position/posture at the first turning gait's end until the foot 22 is horizontally postured.

At the end of the first turning gait, the supporting leg foot 22 is lifted in the air. In order to determine trajectories after the supporting leg foot 22 is lifted, expected landing position/posture of the first turning gait supporting leg foot are set. The expected landing position/posture of the first turning gait supporting leg foot are set based on position/posture of the next but two time gait's supporting leg coordinate system, viewed from the next time gait's supporting leg coordinate system. More specifically, the expected landing position/posture of the first turning gait supporting leg foot are the position/posture of the next but two time gait's supporting leg coordinate system, viewed from the next time gait's supporting leg coordinate system. Note that, the next but two time gait's supporting leg coordinate system is set such that a relative position/posture relation between next but one time gait's supporting leg coordinate system and the next but two time gait's supporting leg coordinate system coincides with a relative position/posture relation between the current time gait's supporting leg coordinate system and the next time gait's supporting leg coordinate system.

As in the case of obtaining the supporting leg foot position/posture at the first turning gait's beginning, free leg foot position/posture at the first turning gait's end are obtained by generating foot position/posture trajectories (more specifically, trajectories viewed from the next time gait's supporting leg coordinate system) from the supporting leg foot position/posture at the first turning gait's beginning to the expected landing position/posture of the first turning gait supporting leg foot, by the use of the finite duration settling filter until the end of the first turning gait.

Free leg foot position/posture at the second turning gait's beginning are set to be the supporting leg foot position/posture at the first turning gait's end viewed from the next but one time gait's supporting leg coordinate system. The supporting leg foot position/posture at the second turning gait's beginning are set to be the free leg foot position/posture at the first turning gait's end viewed from the supporting leg coordinate system of the next but one time's gait.

Free leg foot position/posture at the second turning gait's end are set to be the free leg foot position/posture at the current time gait's end viewed from the current time gait's supporting leg coordinate system. Supporting leg foot position/posture at the second turning gait's end are set to be the supporting leg foot position/posture at current time gait's end viewed from the current time gait's supporting leg coordinate system.

The gait periods of the first and second turning gaits are set to be the same as the next time gait's periods. The gait periods of the first and second gaits do not always have to be the same. It is preferred, however, that any cycle is determined at least in accordance with the next time gait's period. Note that movement parameters (including time parameters such as the two-leg supporting period) other than those described earlier, for the current time gait, the first turning gait and the second turning gait are determined, as appropriate, to satisfy gait conditions (for example, whether velocities of actuators are within its allowable range, whether a movable angle is exceeded, and whether any interference with the floor or the like exists).

Next, processing proceeds to S102. In S102, determined are reference body posture trajectory parameters defining a reference body posture trajectory that the desired body posture should follow. The reference body posture does not have to be a uniform posture as long as the reference body posture is set to be continuous at the beginning of the normal gait (beginning of the first turning gait) and the end of the same (end of the second turning gait) (so that posture angles of the reference body posture and angular velocities of these angles are the same at the beginning and end of the normal gait). In this embodiment, however, the reference body posture is set to be an upright posture (vertical posture) for easier understanding. In other words, in this embodiment, the reference body posture is set to be the upright posture over the entire period of the normal gait. Therefore, in this embodiment, the angular velocity and angular acceleration of the posture angle of the reference body posture are zero.

Next, processing proceeds to S104, where arm posture trajectory parameters are determined. More specifically, determined are the arm posture trajectory parameters apart from those related to changes of angular momentum of both arms about the vertical axis (or body trunk axis). For example, determined are arm posture trajectory parameters for heights of the tips of hands of the arms, center of gravity of the entire arms relative to the body 24, and the like. In this embodiment, the center of gravity of the entire arms is set to be maintained at constant position relative to the body.

Next, processing proceeds to S106, where floor reaction force's vertical component trajectory parameters are set. In this case, the floor reaction force's vertical component trajectory parameters are set so that the floor reaction force's vertical component trajectory defined by the parameters is substantially continuous as shown in FIG. 6 in any one of the first and second turning gaits. In other words, a desired floor reaction force's vertical component trajectory of the normal turning gait is set with a pattern shown in FIG. 16. In this pattern, in any one of the first and second turning gaits, the floor reaction force's vertical component is changed into a trapezoid shape during the one-leg supporting period, and the floor reaction force's vertical component is maintained at zero during the floating period. Times of breakpoints and the height (peak value) of the trapezoid portion of the pattern are set as the floor reaction force's vertical component trajectory parameters.

When setting the floor reaction force's vertical component trajectory parameters, an average value of the floor reaction force's vertical components over the entire gait duration (period of both first and second turning gaits combined together; period of one cycle of the normal gait) is caused to coincide with the self weight of the robot 1. In other words, the average value of the floor reaction force's vertical components is allowed to have the same magnitude as that of the gravity acting on the robot 1 in the opposite direction.

It is necessary to set the floor reaction force's vertical component trajectory in the above-described manner in order to satisfy a condition of the normal gait. The condition of the normal gait is that an initial state (initial state of the first turning gait) of any state variable (position, posture, velocity and the like of each portion of the robot 1) of the gait viewed from the supporting leg coordinate system (coordinate system set on the floor surface that the foot 22 on the supporting leg side contacts) is the same as the end state (end state of the second turning gait) of the gait viewed from the next supporting leg coordinate system (supporting leg coordinate system of the next first turning gait). (Hereinafter, this condition may be referred to as a boundary requirement of the normal gait). Therefore, a difference between the total center of gravity's vertical velocity of the robot 1 at the end of the normal gait and the total center of gravity's vertical velocity at the beginning of the normal gait (specifically, a difference between the total center of gravity's vertical velocity at the end of the second turning gait and the total center of gravity's vertical velocity at the beginning of the first turning gait) also has to be zero. The difference stated above is an integral (first-order integral) of a difference between the floor reaction force's vertical component and the gravity. Hence, in order to reduce the abovementioned difference into zero, it is required to set the floor reaction force's vertical component trajectory in the aforementioned manner.

In this embodiment, average values of the floor reaction force's vertical components in individual periods of the first turning gait and the second turning gait are caused to coincide with the self weight of the robot 1, respectively. To be more specific, for example, in each turning gait, times of break points of the trapezoid portion of the floor reaction force's vertical component trajectory is set, in accordance with the gait periods of the first and second turning gaits. Thereafter, the heights of the trapezoid portions are determined so that the average values of the floor reaction force's vertical components in individual periods of the first and second turning gaits coincide with the self weight of the robot 1, respectively. (Each height of the trapezoid is obtained by solving an expression expressing a condition to cause the above-mentioned average value to coincide with the self weight, where the height of the trapezoid is set to be unknown.)

Accordingly, a difference between the total center of gravity's vertical velocity at the end of the first turning gait and the total center of gravity's vertical velocity at the beginning of the first turning gait becomes zero. A difference between the total center of gravity's vertical velocity at the end of the second turning gait and the total center of gravity's vertical velocity at the beginning of the second turning gait becomes also zero. However, this is not always required. For example, when the body vertical position seems about to become too high or too low around the boundary between the first and second turning gaits, thus resulting in an improper posture, the height or the like of the trapezoid of the floor reaction force's vertical component of each turning gait may be corrected from the state where the aforementioned average value and the self weight are caused to coincide with each other in each turning gait.

Figure 16:
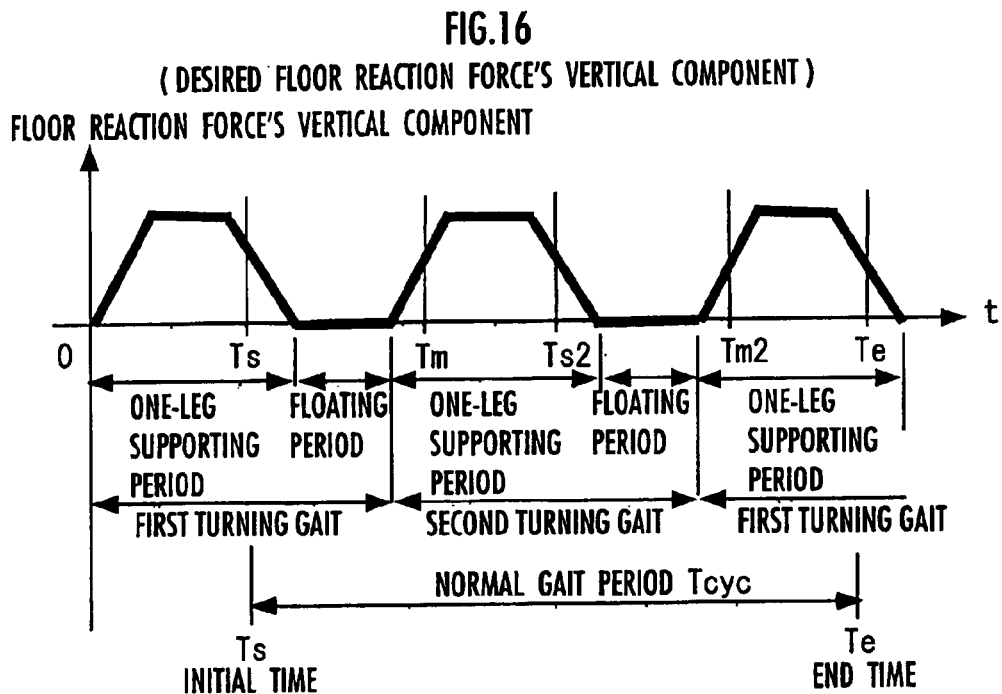
FIG. 16 is a diagram showing an example of setting a desired floor reaction force's vertical component of the normal gait.
Figure 17:
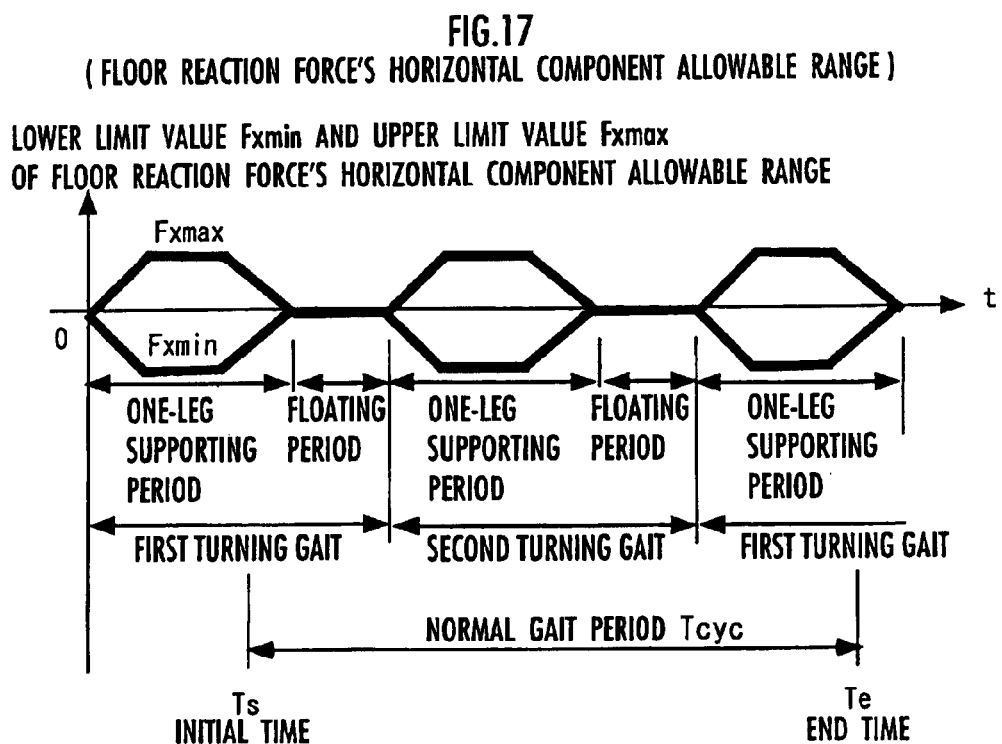
FIG. 17 is a diagram showing an example of setting a floor reaction force's horizontal component allowable limit of the normal gait.

Next, processing proceeds to S108, where a allowable range of floor reaction force's horizontal component [Fxmin, Fxmax] (to be more specific, parameters defining allowable range) is set as shown in FIG. 17, in accordance with the floor reaction force's vertical component trajectory set as shown in FIG. 16 in the aforementioned manner. A broken line on the negative side in FIG. 17 represents a floor reaction force's horizontal component allowable lower limit Fxmin, and a broken line on the positive side represents a floor reaction force's horizontal component allowable upper limit Fxmax. A supplementary description is provided below regarding a method of setting these limitations. In description given below is about a case where a floor surface is horizontal.

The floor reaction force's horizontal component is generated by friction between a floor and the foot 22. However, friction is not generated without limitation. There is a limitation of friction. Therefore, the floor reaction force's horizontal component of a desired gait always has to be within the friction limit, in order to prevent the actual robot 1 from slipping when the actual robot 1 moves in accordance with the generated desired gait. In order to satisfy this condition, the floor reaction force's horizontal component allowable limit is set, and the desired gait is generated so that the floor reaction force's horizontal component of the desired gait remains within the allowable range as described later.

Let a coefficient of friction between the floor and the foot 22 be $\mu$. Fxmin then has to be always set equal to or greater than $-\mu$*floor reaction force's vertical component, and Fxmax has to be set equal to or smaller than $\mu$*floor reaction force's vertical component. The simplest setting method is setting by the following equations, where ka represents a positive constant smaller than 1.

$$Fxmin = -ka*\mu*\text{floor reaction force's vertical component}$$

$$Fxmax = ka*\mu*\text{floor reaction force's vertical component}$$

Equations 12

The floor reaction force's horizontal component allowable limit in FIG. 17 is an example of the allowable range set in accordance with Equations 12. Values and time at break points of a trapezoid waveform in FIG. 17 may be set as parameters defining the floor reaction force's horizontal component allowable limit. However, when determining the floor reaction force's horizontal component allowable limit by using Equations 12, the values of (ka*$\mu$) in Equations 12 may be simply set as the parameters.

There is no problem to set the floor reaction force's horizontal component allowable limit by using other setting method, as long as the above condition (condition that the floor reaction force's horizontal component of the desired gait always remains within the frictional limit) is satisfied. Further, the floor reaction force's horizontal component allowable limit set in S108 is used for generating the normal gait for determining conditions at the end of the current time gait. Therefore, the floor reaction force's horizontal component allowable limit is not necessarily determined based on a strict friction limit. For example, the floor reaction force's horizontal component allowable limit during the one-leg supporting period may be set as a range exceeding the friction limit. The same can be said of the floating period.

Next, processing proceeds to S110, where ZMP trajectory parameters are set. The ZMP trajectory parameters define a ZMP trajectory of the normal gait in which the first and second turning gaits are combined. In this case, the desired ZMP trajectory is set to have high stability margin and not to change rapidly, as described earlier.

Figure 18:
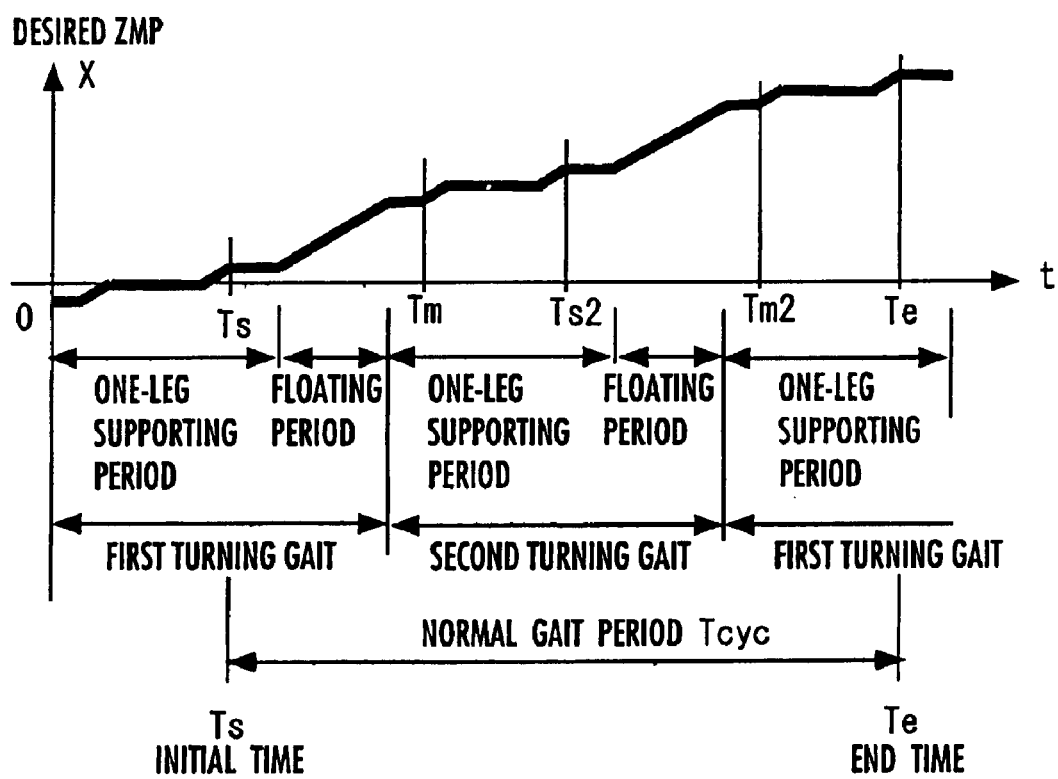
FIG. 18 is a diagram showing an example of setting a desired ZMP in the normal gait.

More specifically, in the running gait in FIG. 5, the supporting leg foot 22 lands with its heel, and a while later, almost entire bottom surface of the supporting leg foot 22 contacts the floor. Another while later, only the toe of the supporting leg foot 22 contacts the floor. Thereafter, the toe of the supporting leg foot 22 kicks the floor to jump into the air, and finally, the free leg foot 22 lands with its heel. In addition, the desired ZMP must be within the contact surface. Therefore, in this embodiment, in each of the first and second turning gaits of the normal gait, the position of the desired ZMP in the X-axis direction is set to remain the initial position, which is the position of the heel of the supporting leg foot 22, until almost entire bottom surface of the foot 22 contacts the floor, as shown in the upper diagram in FIG. 7. Next, the desired ZMP is set as follows. The desired ZMP moves to the center of the supporting leg foot 22 and moves to the toe before the foot 22 comes into a state where the toe contacts the floor. Thereafter, the ZMP stays at the toe of the supporting leg foot 22 until the foot 22 is lifted. In addition, after the above, the desired ZMP sequentially moves from the toe of the supporting leg foot 22 to a landing position of the heel of free leg foot 22, by the time the next free leg foot 22 lands, as described earlier. Therefore, the desired ZMP trajectory (trajectory in the X-axis direction) of the normal gait configured by the first and second turning gaits is as shown in FIG. 18. Time and positions of break points of the desired ZMP trajectory are set as the ZMP trajectory parameters. In this case, time of the break points is set in accordance with gait periods of the first and second turning gaits defined by the aforementioned required parameters. The positions of the break points are set in accordance with the positions/postures of the next time gait's supporting leg coordinate system and the next but one time gait's supporting leg coordinate system, or required values of the expected landing positions/postures of free leg foot on the first and second steps of the required parameters defining the above coordinate systems. The position of the ZMP trajectory in the Y-axis direction is set as in the case of the trajectory shown in the lower diagram in FIG. 7. More specifically, in the first turning gait, the trajectory of the desired ZMP at a position of the Y-axis direction is set to have the same pattern as that in the lower diagram in FIG. 7. In the second turning gait, the trajectory of the desired ZMP at a position of the Y-axis direction is set to be a trajectory which has the same form as that of the first turning gait and is continuous from the end of the trajectory of the first turning gait.

Finally, processing proceeds to S112, where initial time, end time and period of one step (one cycle) of the normal gait are redefined as described below.

The normal gait must be a gait in which state variables at the beginning and end of the gait are sequentially continuous. In this embodiment, differently from the foregoing definition of gait in a narrow sense, the beginning, end and period of one step of the normal gait are defined as shown in FIG. 16 for convenience, until the normal gait is determined, in order to determine this kind of gait easily. In other words, in the latter half of the one-leg supporting period of the first turning gait, time at which the floor reaction force's vertical component is reduced to some extent is set as initial time Ts of the normal gait. It is preferred that, as shown in FIG. 7, the initial time Ts be set to be a moment at which a floor contacting portion of the supporting leg foot 22 shifts from almost entire bottom surface thereof to the toe thereof, or time immediately before the moment (end time of the whole sole contacting period in FIG. 7 or time immediately before that). Further, a relation between the desired ZMP set in S110 and time Ts shown in FIG. 18 (or FIG. 7) is described. After the almost entire bottom surface of the supporting leg foot 22 contacts the floor in the first turning gait, the desired ZMP moves to the center of the supporting leg foot 22, and then to the toe by the time the toe contacts the floor. It is preferred that the moment that the desired ZMP moves to the toe be set as time Ts. This initial time Ts is set in accordance with, for example, the desired ZMP trajectory parameters set earlier. The reason why the initial time Ts is set in the above manner is described later.

Further, as shown in FIG. 16, the cycle Tcyc of the normal gait is the sum of gait periods of the first and second turning gaits. End time of the normal gait is represented by Te. Te is set to be time obtained by adding Tcyc to Ts.

From a point in time when the normal gait is determined (a point in time of exit from a later-described loop of S204 in FIG. 19), definitions of beginning, end and the like of the gait are changed back to the aforementioned definitions in a narrow sense. In the following description, initial time based on the definition of the gait in a narrow sense (time at which the supporting leg foot 22 begins to land) is represented by 0. The above mentioned initial time Ts, which is used until the normal gait is determined, is discriminated from the original initial time 0 by using Reference Symbol Ts. (The initial time Ts is sometimes abbreviated as "Ts").

After the processing shown from S010 to S022 in FIG. 12 are performed, processing proceeds to S024, where initial states of the normal gait are calculated. The initial states calculated here are initial body horizontal position/velocity (initial body position and initial body velocity in the horizontal direction), initial body vertical position/velocity (initial body position and initial body velocity in the vertical direction), an initial divergence component, an initial body posture angle and its angular velocity, of the normal gait. Calculation of the initial states is searchingly performed, following the flowchart in FIG. 19.

Figure 19:
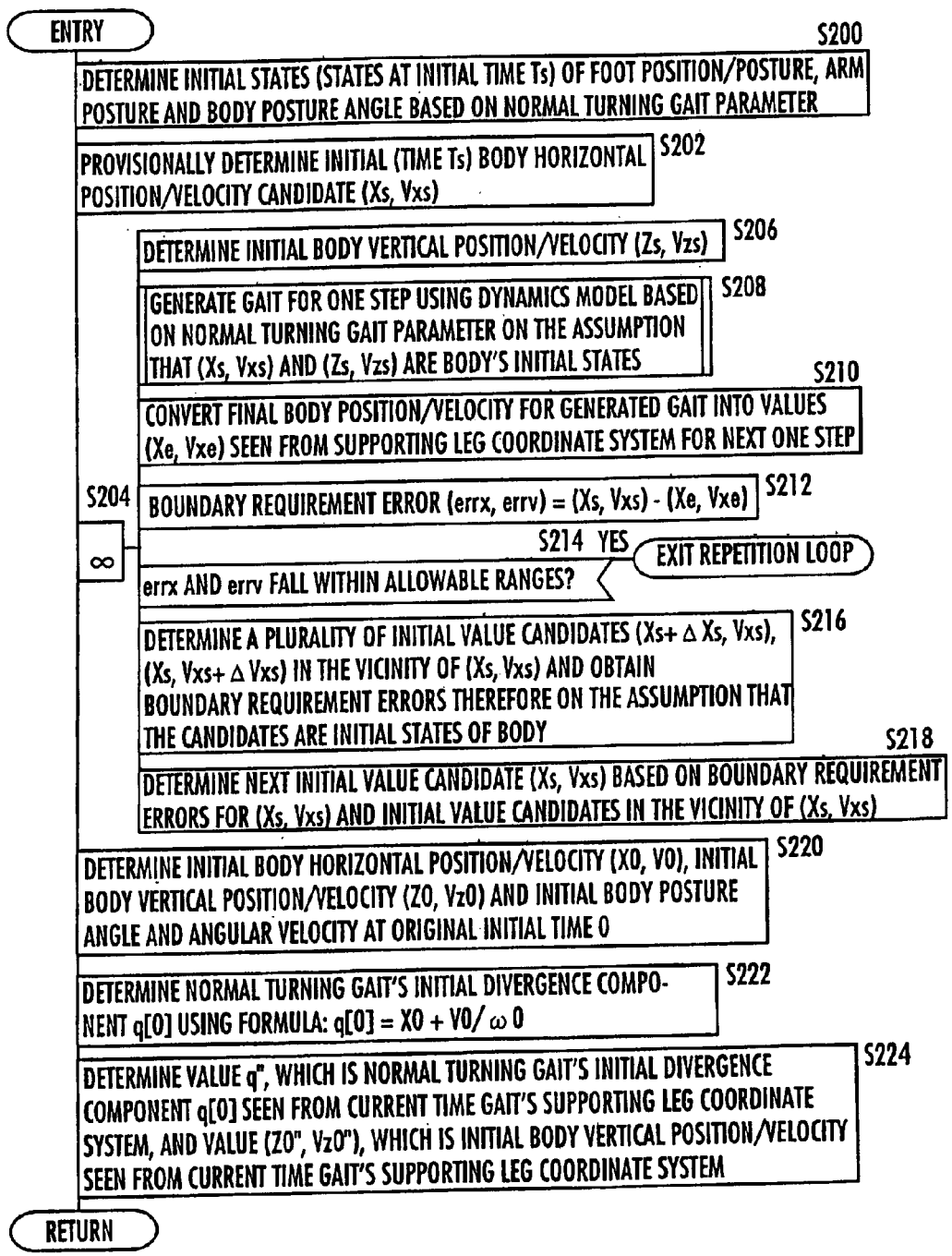
FIG. 19 is a flowchart showing subroutine processing of the flowchart in FIG. 12.

In the flowchart in FIG. 19, first of all, in S200, initial states (states at initial time Ts) of desired foot position/posture, desired arm postures, and desired body posture angle (posture angle and direction) are determined based on the gait parameters of the normal gait (parameters set in S022 in FIG. 12). The "states" herein mean position and posture, as well as their rates of change (time differentials).

In this case, the initial states of the desired foot position/posture on the supporting leg side are determined by generating foot position/posture trajectories (trajectories viewed from the next time gait's supporting leg coordinate system) from the supporting leg foot position/posture at first turning gait's beginning to the free leg foot position/posture at the second turning gait's end, of the foot trajectory parameters determined in S100 in FIG. 14 described earlier. The foot position/posture trajectories are generated by the use of the finite duration settling filter, until time Ts. The initial states of the desired foot position/posture on the free leg side are determined by generating foot position/posture trajectories from the supporting leg foot position/posture at current time gait's beginning, viewed from the next time gait's supporting leg coordinate system, to the free leg foot position/posture at the first turning gait's end. The position/posture trajectories are generated by the use of the finite duration settling filter until time Ts. Further, the initial states of the desired arm postures are determined by obtaining arm postures (total center of gravity or the like of both arms relative to the body 24) at time Ts, based on the arm posture trajectory parameters determined in S104 in FIG. 14. Furthermore, the reference body posture (posture angle) and its angular velocity at time Ts, defined by the reference body posture trajectory parameters determined in S102 of FIG. 14, are determined as the initial state of the desired body posture angle. In this embodiment, since the reference body posture angle is the vertical posture, the initial state of the desired body posture angle (posture angle and its angular velocity) is zero. Moreover, in this embodiment, the desired foot position/posture trajectories, floor reaction force's vertical component trajectory, and desired ZMP trajectory of the normal gait are independently determined by the foot trajectory parameters, floor reaction force's vertical component trajectory parameters, and ZMP trajectory parameters determined in the flowchart in FIG. 14, respectively. For example, the desired foot position/posture at each instance of the normal gait are determined in accordance with the foot trajectory parameters without depending on an instantaneous value of the floor reaction force's vertical component.

Next, in S202, candidates of initial body horizontal position/velocity (that is, candidate body horizontal position/velocity at initial time Ts) expressed by (Xs, Vxs) (Xs: horizontal position, Vxs: horizontal velocity) are provisionally determined. The provisionally determined candidates (Xs, Vxs) may be arbitrary. However, for example, it is sufficient that the body horizontal position/velocity in the initial states of the normal gait, obtained when generating the last time gait, are the provisional candidates (Xs, Vxs).

In order to simplify description, an example will be given regarding a case of searching the initial states of the normal gait in the X direction (front-and-back direction) on the sagittal plane. In practice, however, it is required to separately or simultaneously search the initial states of the normal gait (initial states satisfying the foregoing boundary requirement of the normal gait) in the X direction (front-and-back direction) and Y direction (right-and-left direction) for both position and velocity.

A searching decision method may be as follows. Affinite Jacobian (sensitivity matrix) is obtained and the next candidate is determined by a steepest-descent method. Alternatively, a simplex method can be used. In this embodiment, the steepest-descent method is used.

Next, after S204, in S206, initial body vertical position/velocity (at time Ts) (Zs, Vzs) (Zs: vertical position, Vzs: vertical velocity) are determined.

In this embodiment, the initial body vertical velocity Vzs is analytically determined in a manner below.

The following equation holds true for the robot 1, as a dynamic relation.

> Final total center-of-gravity vertical position−initial total center-of-gravity vertical position=second-order integral of (floor reaction force's vertical component/total mass of robot)+second-order integral of gravity acceleration+initial total center of gravity's vertical velocity*duration of one step  Equation 13

(where gravity acceleration is a negative value)

In the normal gait, the final total center-of-gravity vertical position and initial total center-of-gravity vertical position coincides with each other. Thus, the right side of Equation 13 above has to be zero. Therefore, the initial total center of gravity's vertical velocity can be obtained from this relation. Specifically, first of all, the floor reaction force's vertical component calculated by the floor reaction force's vertical component parameters set in S104 in FIG. 14 described earlier is divided by the total mass of the robot 1. The resulting value is then second-order integrated for a period of one step (from time Ts to time Te). Thus, a total center of gravity movement amount by the floor reaction force's vertical component (the first term on the right side of Expression 13) can be obtained. Further, a gravity acceleration is second-order integrated for a period of one step, thus obtaining a total center of gravity movement amount by the gravity (the second term on the right side of Equation 13). Thereafter, the sign of the sum of the total center of gravity movement amount by the floor reaction force and the total center of gravity movement amount by the gravity is changed, and the resulting value is divided by the duration of one step (duration of one cycle Tcyc of the normal gait), thus obtaining the initial total center of gravity's vertical velocity.

Next, in order to obtain the initial body vertical position Zs, the total center of gravity's vertical velocity at time 0 is obtained by the use of the following equation. At this time, a value obtained in the above manner based on Equation 13 is substituted for the total center of gravity's vertical velocity at time Ts in the following equation, and integration period is set to be from time 0 to time Ts.

> Total center of gravity's vertical velocity at time Ts−total center of gravity's vertical velocity at time 0=first-order integration of (floor reaction force's vertical component/total mass of robot)+first-order integration of gravity acceleration  Equation 14

(where gravity acceleration is a negative value)

Next, a body height (body vertical position) at time 0 (that is, at landing moment) is determined by the use of the body height decision method earlier proposed by the applicant in Japanese Patent Laid-Open Publication No. Heisei 10-86080. At this time, the body vertical position (height of the body), at which the knees of both legs 2 and 2 are not completely stretched at time 0, is determined based on the foot position/posture at time 0 (the supporting leg foot position/posture at the first turning gait's beginning (time 0) and the free leg foot position/posture at the first turning gait's beginning (time 0) determined in S100 of FIG. 14 stated earlier), and predetermined geometric conditions regarding the bending angle of the knee of each leg 2. Specifically, when the knee bending angle of the leg 2 on the supporting leg side is represented by θsup and the knee bending angle of the leg 2 on the free leg side is represented by θswg, the body vertical position is determined so that, for example, the sum of inverse numbers of the sines of the knee bending angles θsup and θswg become predetermined values (finite values). Each of the knee bending angles θsup and θswg is an angle of the axis of the crus portion with respect to the axis of the thigh portion of each leg 2. This angle increases from zero as the knee bends from a state where each leg 2 is completely stretched. This method of determining the vertical position of the body 24 is detailed in Japanese Patent Laid-Open Publication No. Heisei 10-86080 mentioned above. Thus description of the above is ended.

Figure 11:
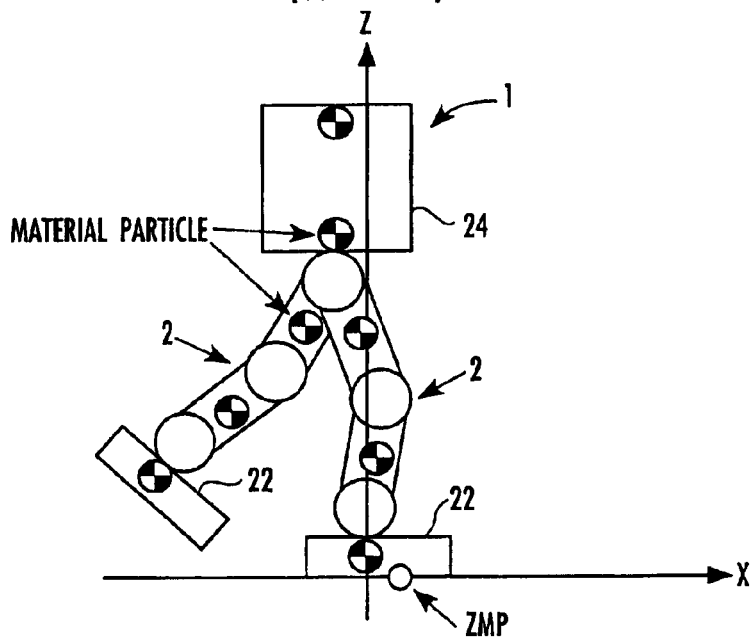

Next, based on the body vertical position and the foot position/posture at time 0 determined in the above manner, the total center-of-gravity vertical position at time 0 is obtained using a model of the robot 1. For example, the total center-of-gravity vertical position at time 0 is obtained by using a kinematics model of earlier-described Equation 04 which corresponds to the model in FIG. 10. Specifically, the vertical position of the body material particle 24m is obtained from the body vertical position and body posture angle (which is zero in this embodiment) at time 0. The vertical positions of the supporting leg material particle 2m and free leg material particle 2m are obtained from the supporting leg foot position/posture and free leg foot position/posture at time 0 (which are the supporting leg foot position/posture at the first turning gait's beginning and free leg foot position/posture at the first turning gait's beginning, set in S100 of FIG. 14 stated earlier), respectively. The vertical positions of the body material particle 24m, supporting leg material particle 2m and free leg material particle 2m are substituted for Zb, Zsup and Zswg of earlier-described Equation 04, respectively. Thus, the total center-of-gravity vertical position (ZGtotal in Equation 04) is obtained. Note that, the total center-of-gravity vertical position at time 0 may also be obtained using a more precise model of the robot 1 (for example, a model with multiple material particles as shown in FIG. 11), considering the body horizontal position and arm positions at time 0.

Next, in expression 13, the total center-of-gravity vertical position at time 0 obtained above is substituted for the initial total center-of-gravity vertical position in the left side of Equation 13, and the total center of gravity's vertical velocity at time 0 obtained earlier is substituted for the initial total center of gravity's vertical velocity on the right side of Equation 13. In addition, duration of one step in Equation 13 is set to be Ts so that the integration period is from time 0 to time Ts. Thus, the value of final total center-of-gravity vertical position on the left side of Equation 13 is calculated, and the calculated value is obtained as the initial total center-of-gravity vertical position (at time Ts). Further, the initial body vertical position Zs (at time Ts) is obtained by the use of a model of the robot 1 (for example, the kinematics model of Equation 04), from the initial total center-of-gravity vertical position (at time Ts) obtained as above, foot position/posture at time Ts (obtained in S200) and the like. Specifically, the vertical positions of the supporting leg material particle $2m$ and free leg material particle $2m$ of the model in FIG. 10 are obtained from the foot position/posture of each of the supporting leg and free leg at time Ts. These vertical positions and the initial total center-of-gravity vertical position (at time Ts) obtained earlier are applied to Equation 04, thus obtaining the vertical position of the body material particle $24m$ (Zb in Equation 04). From the vertical position of the body material particle $24m$ and the body posture at time Ts (which is zero in this embodiment), the initial body vertical position Zs (at time Ts) is obtained by reverse calculation. In this case, the initial body vertical position Zs may also be obtained by using a more precise model, considering the body horizontal position and arm postures.

Finally, the initial body vertical velocity is obtained using a model of the robot 1 (for example, the kinematics model of Equation 04), from the initial states of foot position/posture determined in foregoing S200, the initial total center of gravity's vertical velocity obtained in S206, and the like. Specifically, the initial total center of gravity's vertical velocity obtained based on foregoing Equation 13 and the vertical velocities of supporting leg material particle $2m$ and free leg material particle $2m$ defined by the initial state of foot position/posture on each of the supporting leg side and free leg side are applied to an equation obtained by differentiating both sides of Equation 04 with respect to time. Thus, the vertical velocity of the body material particle $24m$ is obtained. Thereafter, the body vertical velocity is obtained from the vertical velocity of body material particle $24m$ and the initial state of body posture angle (determined in S200 or S208 described later). Note that, the initial body vertical velocity satisfying the initial total center of gravity's vertical velocity obtained above may also be obtained by the use of a more precise model of the robot 1, considering not only the initial states of each foot position/posture and initial total center of gravity's vertical velocity, but also the initial states of arm postures (determined in S200), the provisionally determined initial state of body horizontal position (latest one that is provisionally determined in S202 or later described S21 or S218), and the initial body vertical position obtained above.

Supplementarily, the robot 1 has six degrees of freedom for each leg. Thus, even if the model of the robot 1 is complicated (rigorous) as the one shown in FIG. 11, all initial states of the robot are uniquely determined if initial states of the foot position/posture trajectories and the body position/posture trajectories (position/posture and their rates of change) are given. Therefore, if they are given, the initial total center of gravity's vertical velocity is uniquely determined as well. On the other hand, since there are six degrees of freedom for each leg, even if one of the velocity-related states (for example, the initial body vertical velocity) among the initial states of the foot position/posture trajectories and the body position/posture trajectories is undetermined, the undetermined initial state is uniquely determined if the initial total center of gravity's vertical velocity is given.

After the processing of S206, processing proceeds to S208, where the normal turning gait is provisionally generated. More specifically, based on the gait parameters of the normal gait determined in S022 in FIG. 12 mentioned earlier, desired ZMP, desired floor reaction force's vertical component, desired foot position/posture, reference body posture, desired arm postures and floor reaction force's horizontal component allowable limit, at each instance from the initial time Ts to end time Te, are sequentially obtained. Thereafter, the aforementioned body horizontal position/velocity (Xs and Vxs) and body vertical position/velocity (Zs, Vzs) are set as the initial states of the body 24 (at time Ts). The body position/posture are then sequentially determined by the use of the foregoing dynamic model (model in FIG. 10) so as to satisfy dynamic equilibrium conditions related to the desired ZMP and desired floor reaction force's vertical component obtained above, and conditions of the floor reaction force's horizontal component allowable limit. Thus, the gait from time Ts to end time Te is generated. At this time, the gait is generated so that the body posture coincides with the reference body posture as much as possible.

Note that, this gait generation for the normal gait is performed within the gait generating device 100 only. The normal gait is not outputted to the foregoing composite-compliance operation determinator 104 as desired values for driving the actual robot 1.

Hereinbelow, details are given regarding processing in S208, which is normal gait generation processing by consecutive calculation.

Figure 20:
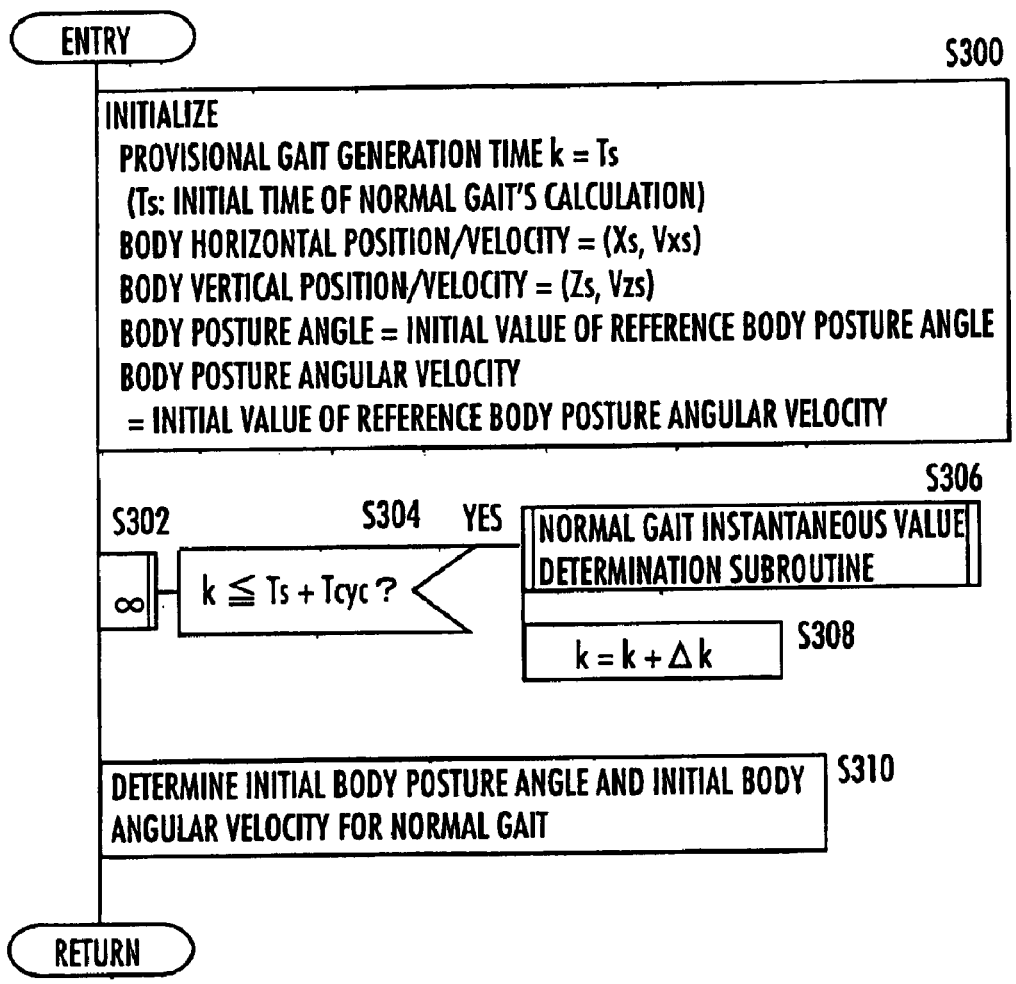
FIG. 20 is a flowchart showing subroutine processing of the flowchart in FIG. 19.

FIG. 20 is a subroutine flowchart showing this processing.

Description is as follows. In S300, various initialization is performed. Specifically, the initial time Ts is substituted for time for provisional gait generation k. Further, provisionally determined current (Xs, Vxs) (determined in S202 or later described S216 or S218 in FIG. 19) are substituted for the body horizontal position/velocity. The latest (Zs, Vzs) obtained in foregoing S206 are substituted for the body vertical position velocity. Moreover, the initial value of reference body posture angle (reference body posture angle at time Ts) is substituted for the desired body posture angle, and the initial value of reference body posture angular velocity (reference body posture angular velocity at time Ts) is substituted for the desired body posture angular velocity. Supplementarily, since the initial desired body posture angular velocity is ultimately changed as described later, it is possible to substitute a value different from the initial value of reference body posture angular velocity.

Next, in S304 after S302, it is determined whether or not time for provisional gait generation k is before end time of gait (whether or not k≦Ts+Tcyc). If the determination result is YES, processing proceeds to gait instantaneous value decision subroutine in S306, where gait instantaneous values are determined. Next, the processing of the gait generating device 100 proceeds to S308, where time for provisional gait generation k is increased by Δk, and processing then returns to S304.

Here, Δk is an interval of provisional gait generation, and usually, it is sufficient that Δk coincides with control cycle Δt. If dynamic accuracy of the provisional gait can be reduced, Δk may be set longer than Δt in order to reduce the amount of calculation.

When the determination result in S304 is NO, processing proceeds to S310. By the processing described above, the normal gait is generated from the beginning to the end thereof before processing proceeds to S310.

Hereinbelow, details of the gait instantaneous value decision subroutine in S306 are described with reference to FIG. 21.

Figure 21:
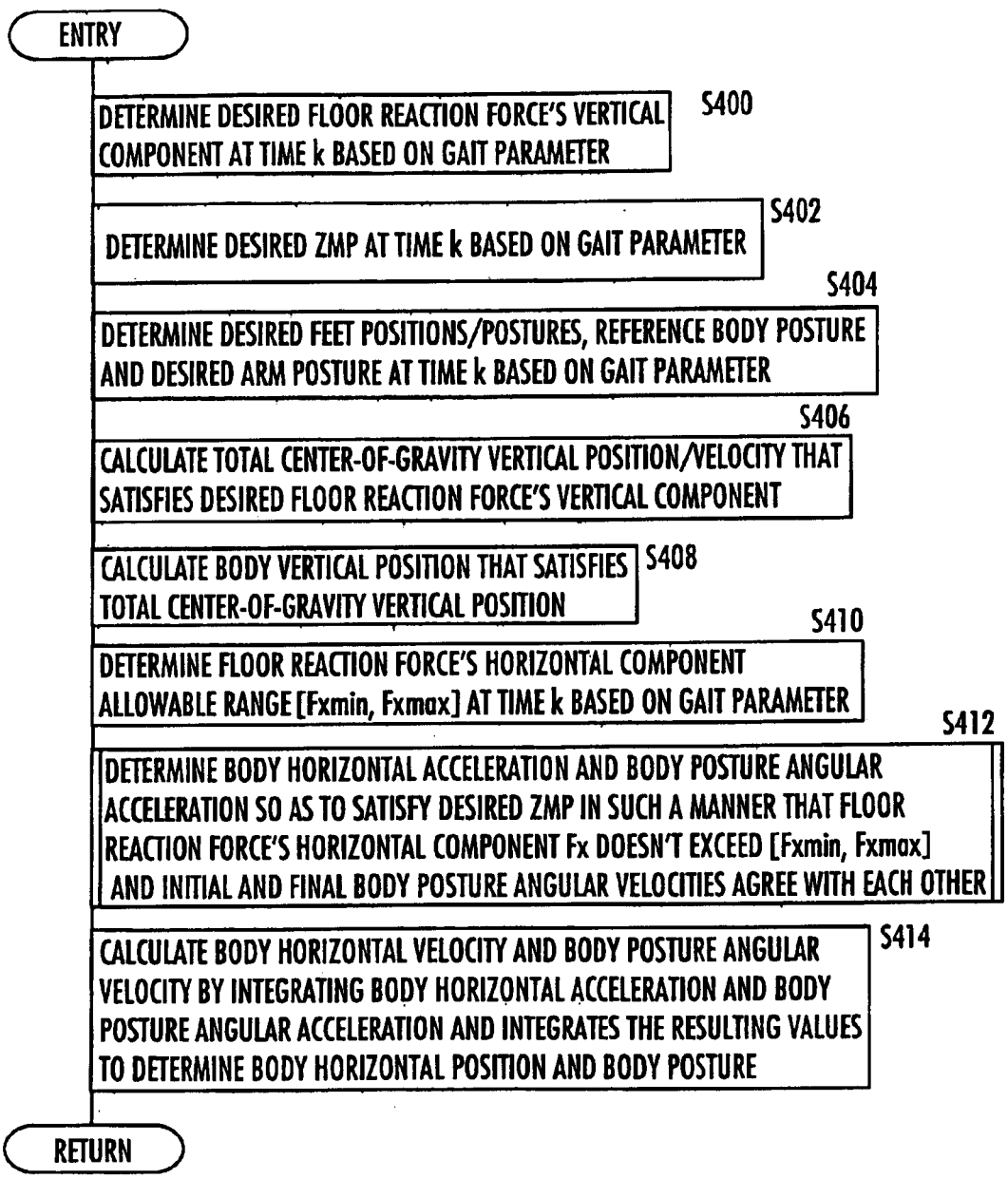
FIG. 21 is a flowchart showing subroutine processing of the flowchart in FIG. 20.

First of all, in S400 in FIG. 21, a value (present value) at time k of the desired floor reaction force's vertical component shown in FIG. 16 described earlier is obtained based on the normal gait parameters (floor reaction force's vertical component trajectory parameters). Moreover, in S402, a value (present value) at time k of the desired ZMP shown in FIG. 18 described earlier is obtained based on the normal gait parameters (ZMP trajectory parameters).

Next, processing proceeds to S404, where values (present values) of desired both foot positions/postures (desired foot postures/positions on both supporting leg side and free leg side), reference body posture and desired arm postures at time k are obtained based on the normal gait parameters (foot trajectory parameters, reference body posture trajectory parameters, and arm posture trajectory parameters). To be specific, as for the desired arm postures, total center of gravity of both arms is determined, but movements of the arms (arm swinging movements) for changing angular momentum about the vertical axis (or body trunk axis) are not yet determined. Note that, the present values (values at time k) of the desired foot position/posture are obtained as in the case where the foot position/posture was obtained at initial time Ts in S200 in FIG. 19 described earlier.

Next, processing proceed to S406, where values (present values) of total center-of-gravity vertical position/velocity at time k are calculated to satisfy the desired floor reaction force's vertical component (to cause the sum of an inertial force and gravity in the vertical direction of the robot 1 to balance with the desired floor reaction force's vertical component). Specifically, for example, the total center-of-gravity vertical position/velocity is calculated based on foregoing Equations 01 and 04 related to the dynamic model in FIG. 10 described earlier. In other words, according to Equations 01 and 04, obtained is a relational expression (equation of movement related to the total center of gravity of the robot 1 in the vertical direction) expressing that a value obtained by multiplying the sum of the total center of gravity's vertical acceleration and gravity acceleration by a movement of the robot 1, by the total mass of the robot 1, is equal to the floor reaction force's vertical component. Therefore, the total center of gravity's vertical acceleration is obtained from this relational expression and the desired floor reaction force's vertical component.

Note that this relational expression itself is generally established without depending on the model of the robot 1. By integrating the obtained total center of gravity's vertical acceleration, a total center of gravity's vertical velocity is calculated. Further, by integrating the total center of gravity's vertical velocity, a total center-of-gravity vertical position is calculated. More generally, these calculations are performed by dynamic relational expressions (equations obtained by discretizing Newton's equation of movement) expressed by the following Equations 15 and 16.

Total center of gravity's vertical velocity at time $k$=total center of gravity's vertical velocity at time $(k-\Delta k)$+((floor reaction force's vertical component/total mass of robot)+gravity acceleration)*$\Delta k$(where gravity acceleration is a negative value)   Equation 15

Total center-of-gravity vertical position at time $k$=total center-of-gravity vertical position at time $(k-\Delta k)$+total center of gravity's vertical velocity at time $k*\Delta k$   Equation 16

Next, processing proceeds to S408, where a body vertical position satisfying the total center-of-gravity vertical position is calculated. Specifically, for example, the body vertical position is calculated by the use of Equation 04 related to the model in FIG. 10 described above. In other words, vertical positions of the supporting leg material particle 2m and free leg material particle 2m of the model in FIG. 10 are obtained from the present values of the desired foot positions/postures on the supporting leg side and free leg side. Thereafter, the vertical positions of the supporting leg material particle 2m and free leg material particle 2m obtained above and the present value of the total center-of-gravity vertical position obtained in S407 are applied to Equation 04, thus obtaining a vertical position of the body material particle 24m. Further, the body vertical position is obtained from the vertical position of the body material particle 24m obtained above and the present value of the desired body posture angle (reference body posture angle set in S404 or a desired body posture angle at the last time (time k–Δk), determined in later-described S414).

Note that, the body vertical position may be obtained by the use of a more precise model (for example, a model with multiple material particles as shown in FIG. 11, having material particles corresponding to respective links of the robot 1). In this case, the body vertical position is obtained so that the present value of the total center-of-gravity vertical position obtained earlier coincides with a total center-of-gravity vertical position determined from the earlier-obtained present values (values at time k) of the desired both foot positions/postures, desired body posture at time (k–Δk) (or the present value of the reference body posture obtained earlier), the present values of desired arm postures (center of gravity of both arms), the body horizontal position at time (k–Δk), and the body vertical position desired to be obtained.

In this case, the body posture and body horizontal position at time k are not yet determined, and the values of them at time (k–Δk) are used instead. In order to improve accuracy, estimated values at time k may be obtained from a state of gait at time (k–Δk) by extrapolation.

Next, processing proceeds to S410, where values (present values) at time k of the floor reaction force's horizontal component allowable limit [Fxmin, Fxmax] shown in FIG. 17 are obtained based on the gait parameters (parameters defining the floor reaction force's horizontal component allowable limit of the normal gait) determined in S108 in FIG. 14 described earlier.

Next, processing proceeds to S412, where present values of body horizontal acceleration and body posture angular acceleration are determined to satisfy a dynamic equilibrium condition with respect to the desired ZMP (that a horizontal component of a moment generated about a desired ZMP by the resultant force of the inertial force and gravity of the robot 1 is zero). The body horizontal acceleration and body posture angular acceleration are determined so that the floor reaction force's horizontal component Fx does not exceed [Fxmin, Fxmax], and the body posture angular acceleration is the same at the beginning and end of the normal gait. Details of this are given hereinbelow.

At this point, instantaneous values (present values) of the foot position/posture and body vertical position are determined as described earlier. Therefore, when remaining body horizontal position and body posture angle are determined, a desired movement of the robot 1 can be uniquely determined, except for degree of freedom of movements of the arms, which changes angular momentum about the vertical axis. Therefore, once the body horizontal position and body posture angle are determined, all floor reaction forces are uniquely determined, except for a moment about the vertical axis of the floor reaction force. Note that, in this embodiment, the desired floor reaction force's vertical component and desired ZMP of the normal gait are respectively defined by the floor reaction force's vertical component trajectory parameters and desired ZMP trajectory parameters determined in S022 in FIG. 12 described earlier. Hence, the floor reaction force determined dependently on decision of the body horizontal position and body posture angle is the floor reaction force's horizontal component only. Further and supplementarily, since each leg has six degrees of freedom in the robot 1 as mentioned earlier, position/posture of each portion of the leg 2 are uniquely determined from the desired foot position/posture and desired body position/posture. Note that, freedom of movement of the arms, which changes angular momentum about the vertical axis, is used for canceling a spin force as described later.

Incidentally, if the body rotation mode is mainly used and the foregoing body translation mode is not used so much when generating a gait in order to satisfy the desired ZMP (to cause the horizontal component of the floor reaction force's moment about the desired ZMP to be zero), the body posture angle may change too much. Therefore, in order to prevent this, the body translation mode should be used as preferentially as possible. However, the body translation mode causes changes of the floor reaction force's horizontal component. Therefore, if the body translation mode is strongly applied and the floor reaction force's horizontal component allowable limit is narrow, the robot may slip. In such a case, there is no choice but to rely on the body rotation mode. During a period when the floor reaction force's horizontal component allowable limit becomes zero like the foregoing running gait, it is not feasible to generate a gait which generates the floor reaction force's horizontal component. Thus, there is no choice but to rely on the body rotation mode. In this embodiment, the body horizontal acceleration and body posture angular acceleration are determined considering the above, following the flowchart shown in FIG. 22.

First of all, in S500, time Tm is set, at which the floor reaction force's vertical component is increased to a predetermined magnitude in the second turning gait, after the initial time Ts and then the floating period of the first turning gait. Further, time Ts2 is set, at which the floor reaction force's vertical component is decreased to some extent in the latter half of the one-leg supporting period in the second turning gait. Furthermore, time Tm2 is set, at which the floor reaction force's vertical component is increased to a predetermined magnitude in the first turning gait, after the floating period of the second turning gait.

These times are shown in FIG. 16. It is preferred that time Tm be set as a moment at which almost entire bottom surface of the supporting leg foot 22 contacts the floor or a moment immediately after that moment. The same can be said of time Tm2 as well. It is also preferred that, as in the case of the foregoing initial time Ts, time Ts2 be set as a moment at which the floor contacting portion of the foot 22 shifts from almost entire bottom surface to the toe, or a moment immediately before that moment.

Moreover, description is given regarding relations between the desired ZMP in FIG. 18 set in S110 in FIG. 14 described earlier and times Tm, Ts2 and Tm2. It is preferred that time Tm be set as a moment at which the desired ZMP starts moving to the center of the supporting leg foot 22 in the second turning gait, after the desired ZMP remains at the initial position, the position of the heel of the supporting leg foot 22, until almost entire bottom surface of the foot 22 contacts the floor. It is preferred that time Ts2 then be set as a moment at which the desired ZMP stops moving at the toe of the supporting leg foot 22 by the time only the toe contacts the floor. It is preferred that time Tm2 be set as a moment at which the desired ZMP starts moving to the center of the supporting leg foot 22 in the next first turning gait, after the desired ZMP remains at the initial position, the position of the heel of the supporting leg foot 22, until almost entire bottom surface of the foot 22 contacts the floor.

The reason why they are set as above is described later.

Next, in S502, it is determined whether or not current time (value of a timer for normal gait generation) k is between times Ts and Tm or times Ts2 and Tm2. If the determination result is YES, processing proceeds to S504, and if the result is NO, processing proceeds to S518.

In S504, body horizontal acceleration αtmp is obtained from a state of last instantaneous gait of the robot 1 (state of gait at time k−1). This body horizontal acceleration αtmp is required to satisfy the desired ZMP at present time (time k) if the angular velocity of the body rotation mode is set to be zero and the robot 1 is caused to perform a movement in the body translation mode. This αtmp can be obtained by the use of, for example, foregoing Equation 03 related to the dynamic model in FIG. 10 described earlier. More specifically, for example, the vertical accelerations of the supporting leg material particle 2m and free leg material particle 2m are obtained by the use of time series values of the desired foot position/posture obtained by the current time k. At the same time, the vertical positions of the supporting leg material particle 2m and free leg material particle 2m are obtained by the use of the desired foot position/posture at the current time k (present time). Further, the vertical position of the body material particle 24m is obtained by the use of the floor reaction force's vertical position at the current time k (present time), and the vertical acceleration of the body material particle 24m at the current time k is obtained by the use of time series values of the desired body vertical position obtained by the current time k. An equation is obtained by substituting these values obtained above into Equation 03 and letting My and d2θby/dt2 in Equation 03 be zero. By solving this equation for d2Xb/dt2, the body material particle horizontal acceleration d2Xb/dt2 is obtained as the body horizontal acceleration αtmp. A more precise model may be used to searchingly obtain the body horizontal acceleration αtmp by which the horizontal component of the floor reaction force's moment about the desired ZMP becomes zero. Moreover, in this embodiment, the reference body posture is a vertical posture and the body posture angular acceleration by the reference body posture is thus zero. Therefore, the angular acceleration of the body rotation mode is set to be zero when the body horizontal acceleration Δtmp is obtained. When the reference body posture trajectory parameters are set to change the reference body posture, and the reference body posture angular acceleration at the current time k, defined by the above parameters, is thus not zero, it is sufficient that the angular acceleration of the body rotation mode is set to be the value of the reference body posture angular acceleration, which is not zero, and that the body horizontal acceleration αtmp is obtained by using the dynamic model. (For example, d2θby/dt2 in Equation 03 is set to be the reference body posture angular acceleration, which is not zero, and the body horizontal acceleration αtmp is obtained in a manner similar to the manner described earlier.)

Next, processing proceeds to S506, where a floor reaction force's horizontal component Fxtmp at time k in a case where the body horizontal acceleration is αtmp is obtained by using the dynamic model. In this embodiment, Fxtmp is obtained by the use of Equation 02 of the aforementioned dynamic model. In other words, Fxtmp is obtained by the following Equation 17, where d2Xsup/dt2 and d2Xswg/dt2 represent supporting leg foot material particle's horizontal acceleration and free leg foot material particle's horizontal acceleration at the time k, respectively.

$$Fxtmp = mb*\alpha tmp + msup*d2Xsup/dt2 + mswg*d2Xswg/dt2 \qquad \text{Equation 17}$$

Figure 23:
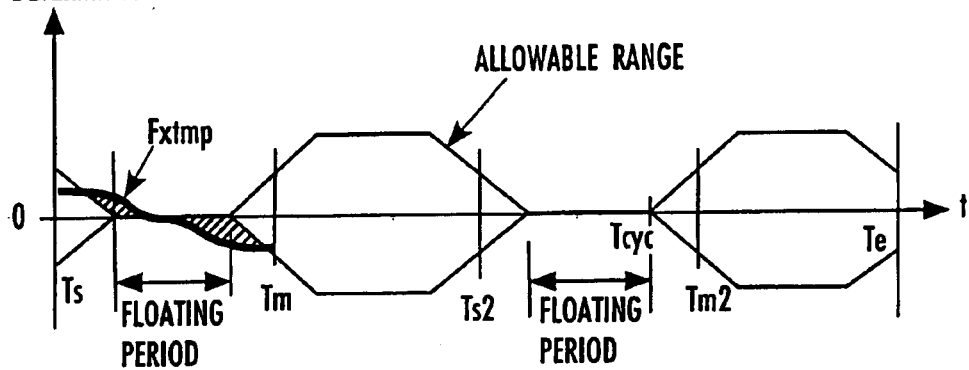
FIGS. 23 to 30 are diagrams for explaining processing of essential parts of the flowchart in FIG. 21.

An example of Fxtmp obtained as above is shown in FIG. 23. Portions where Fxtmp exceeds the floor reaction force's horizontal component allowable limit [Fxmin, Fxmax] are shaded in FIG. 23.

Next, processing proceeds to S508, and body horizontal acceleration α of the body translation mode, a floor reaction force's horizontal component Fx generated by α, and a body angular acceleration β of the body rotation mode are determined as follows (S508 to S516).
Specifically,
if Fxtmp>Fxmax is established, processing proceeds to S510, and Fx is determined by the following equation.

$$Fx = Fxmax \qquad \text{Equation 18}$$

If Fxtmp<Fxmin is established, processing proceeds to S512, and Fx is determined by the following equation.

$$Fx = Fxmin \qquad \text{Equation 19}$$

In the other case, that is, if Fxtmp exists within the floor reaction force's horizontal component allowable limit [Fxmin, Fxmax], processing proceeds to S514, and Fx is determined by the following equation.

$$Fx = Fxtmp \qquad \text{Equation 20}$$

In any of the above cases, processing proceeds to S516, where the body horizontal acceleration α and body posture angular acceleration β are determined by following equations.

$$\alpha = \alpha tmp + (Fx - Fxtmp)/\Delta Fp \qquad \text{Equation 21}$$

$$\beta = (\alpha tmp - \alpha)*\Delta Mp/\Delta Mr \qquad \text{Equation 22}$$

ΔFp, ΔMp and ΔMr are determined by Equations 06, 07, and 09, respectively.

Supplementarily, in order to improve accuracy of dynamic calculation, it is favorable that, after the body angular acceleration β is obtained in the above manner, the body horizontal acceleration α of the body translation mode be analytically or searchingly determined by the use of a more rigorous dynamic model so that a movement, obtained by combining the body translation mode and body rotation mode producing the body angular acceleration β obtained above, satisfies the desired ZMP. A searching decision method may be as follows: determining the next candidate by pseudo-Newton's method and the like after obtaining Affine-Jacobian (sensitivity matrix). A simplex method and the like can be used instead.

Moreover, in order to strictly prevent the floor reaction force's horizontal component Fx from exceeding the floor reaction force's horizontal component allowable limit [Fxmin, Fxmax], a group of the body horizontal acceleration α and body angular acceleration β may be searchingly obtained so that Fx becomes equal to Fxmax and the horizontal component of the floor reaction force's moment about the desired ZMP becomes zero in S510, and that Fx becomes equal to Fxmin and the horizontal component of the floor reaction force's moment about the desired ZMP becomes zero in S512.

Figure 24:
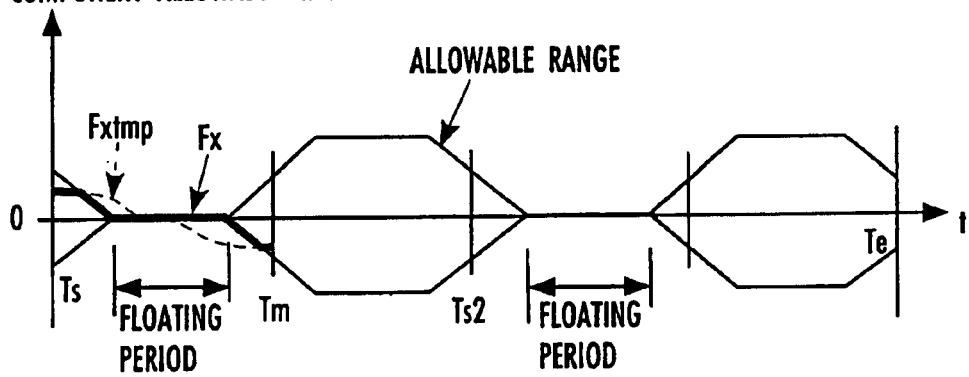
Figure 25:
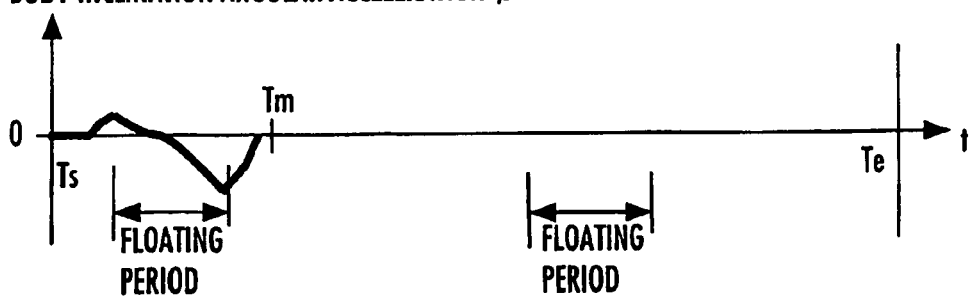

Fx obtained as above is shown in FIG. 24. Fx is obtained by limiting (saturating) the value of Fxtmp so that Fxtmp does not exceed the floor reaction force's horizontal component allowable limit [Fxmin, Fxmax]. More specifically, when Fxtmp according to the body horizontal acceleration αtmp generated only by the body translation mode is within the allowable range [Fxmin, Fxmax], Fxtmp becomes Fx as it is. When Fxtmp according to the body horizontal acceleration αtmp generated only by the body translation mode is beyond the upper limit or lower than the lower limit of the allowable range [Fxmin, Fxmax], Fx is forcefully limited to be Fxmax or Fxmin. In Particular, in the floating period of the running gait, Fxmax=Fxmin=0 is always applied, resulting in Fx=0.

The body posture angular acceleration β obtained as described earlier is shown in FIG. 25. In order to prevent Fx, generated by the body translation mode, from exceeding the allowable range [Fxmin, Fxmax], the acceleration of the body translation mode is limited. A floor reaction force's moment, which becomes insufficient due to this limitation of acceleration of the body translation mode (more specifically, a moment obtained by subtracting a moment component generated by the limited body horizontal movement and movements of both legs 2 and 2, from the inertial force's moment required for causing the horizontal component of the floor reaction force's moment about the desired ZMP to be zero), is compensated by the body rotation mode. In the floating period of the running gait, the body horizontal acceleration a generated by the body translation mode is always limited to zero. Thus, the above-mentioned insufficient floor reaction force's moment is compensated only by the body posture angular acceleration β generated by the body rotation mode.

The description provided above was about the processing when time k is between times Ts and Tm or between times Ts2 and Tm2.

When the determination result in S502 is NO, the following processing is performed. First of all, processing proceeds to S518. Set in S518 is a pattern of a ZMP-converted value of a floor reaction force's moment for generating the body posture angular acceleration for returning the body posture angular velocity to the initial value (hereinafter referred to as body posture restoring moment ZMP-converted value, and abbreviated as ZMPrec) (the value at time Ts if the current time k is before time Ts2, or the value at time Ts2 if otherwise) by time Ts2 if the current time k is before time Ts2, or by time Te if otherwise.

This is detailed below. Processing when the current time k is after the time Tm2 is similar to that when the current time k is before time Ts2. Thus, description is given only about the processing when the current time K is before time Ts2.

Now, consider that the body posture angular velocity is retuned to its initial value (value at time Ts) by generating the body posture angular acceleration using the body rotation mode, from the time Tm to time Ts2. A body posture angular acceleration pattern is therefore set as β(k).

In body rotation mode, when attempting to generate the body posture angular acceleration β(k), a floor reaction force's moment β(k)*ΔMr is generated. If a floor reaction force's vertical component at the moment is Fz(k), a ZMP(k) calculated from the movement (not the desired ZMP) consequently shifts by ΔZMP obtained by the following equation.

$$\Delta ZMP(k) = -\beta(k)*\Delta Mr/Fz(k) \qquad \text{Equation 23}$$

Thus, if the patterns of ΔMr and Fz (k) are determined (known), the body posture angular acceleration pattern satisfying Equation 23 is generated by setting the pattern of ΔZMP(k) as appropriate. Thus, the body posture angular velocity can be returned to the initial value (value at time Ts), that is, the body posture angular velocity in the initial state of the reference body posture trajectory (at time Ts).

The body posture restoring moment ZMP-converted value (ZMPrec) mentioned above means ΔZMP(k) appropriately set as above. Strictly speaking, ΔMr varies when setting the body posture restoring moment ZMP-converted value using the equation 23. However, ΔMr may be approximately set to as a constant value when setting the body posture restoring moment ZMP-converted value. This is because dynamic accuracy of the normal gait does not have to be so high since the normal gait is generated only provisionally, and the actual robot is not caused to follow the normal gait.

Figure 26:
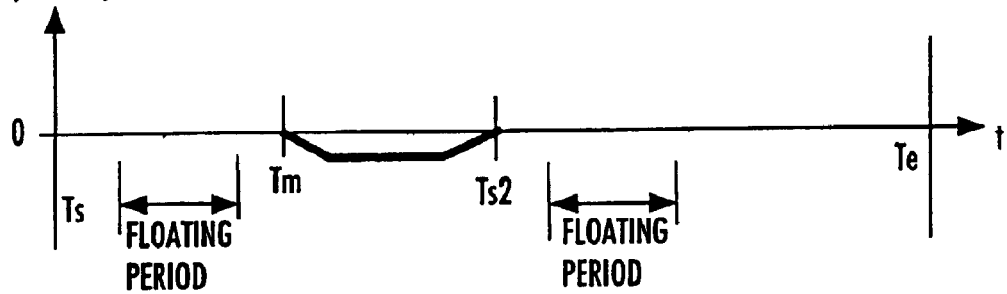

FIG. 26 shows an example of ZMPrec. In FIG. 26, the pattern of the ZMPrec is set to be a trapezoid pattern. The times at break points of the trapezoid portion correspond to the times at break points of the desired ZMP pattern (see FIG. 18) during the period between time Tm and time Ts2. This is because the desired ZMP pattern of the current time gait is easily corrected, as described later. By substituting ZMPrec for ΔZMP(k) in Equation 23, the following equation is obtained.

$$\beta(k) = -ZMPrec*Fz(k)/\Delta Mr \qquad \text{Equation 24}$$

Figure 27:
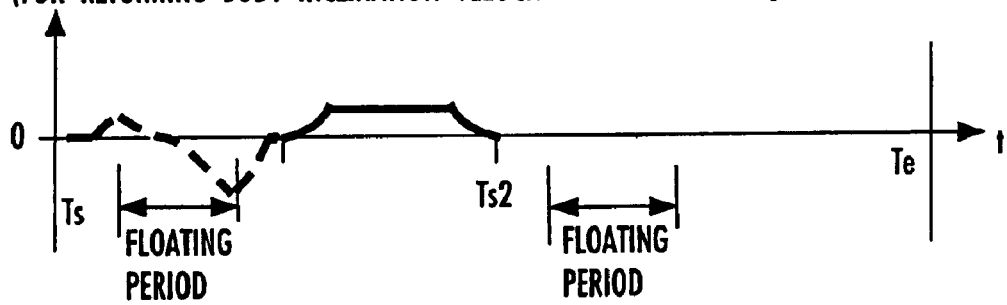

Accordingly, β(k) obtained by Equation 24 is as shown by a solid line in FIG. 27. Note that a dotted line in FIG. 27 shows the body posture angular acceleration from time Ts to time Tm (shown by a solid line in FIG. 25).

Incidentally, it is preferred that, in the normal gait, the body posture angular velocity at time Ts2 be equal to the body posture angular velocity at time Ts. If they are equal, fluctuation of the body posture angle becomes small.

Thus, in order to cause the body posture angular velocity at time Ts2 to be equal to the body posture angular velocity at time Ts, the body posture angular acceleration pattern is set so that an integral of the body posture angular acceleration β from time Ts to time Ts2 becomes zero. In other words, the body position angular acceleration pattern is set so that an integral of β(k) from time Tm to time Ts2 (integral of a portion shown by the solid line in FIG. 27) becomes a value obtained by multiplying an integral of the body posture angular acceleration from time Ts to time Tm (obtained in S504 to S516 in FIG. 22 as described earlier) by −1. (An integral of the body posture angular acceleration from time Ts to time Tm is an integral of the portion shown by the dotted line in FIG. 27, in other words, a difference between body posture angular accelerations at time Tm and time Ts.)

More specifically, in this embodiment, in the trapezoid pattern of ZMPrec in FIG. 26, times of break points (determined based on the desired ZMP trajectory of the normal gait as described earlier) of the trapezoid are set to be known, and the height of the trapezoid is set as an unknown. Thus, the height of the trapezoid of ZMPrec (parameters defining the ZMPrec pattern) that satisfies the aforementioned relation is obtained.

The height of the trapezoid of the ZMPrec in the first turning gait is called a first turning gait's body posture restoring moment's ZMP-converted value's trapezoid height acyc1. The height of the trapezoid of the ZMPrec in the second turning gait is called a second turning gait's body posture restoring moment's ZMP-converted value's trapezoid height acyc2. The ZMPrec in the second turning gait has a trapezoid pattern set during a period from time Tm2 to time Te.

Supplementarily, unless the gait parameters are changed while generating one step of current time gait, the ZMPrec pattern determined in S518 does not change (the same parameter values are calculated) during a period between time Tm and time Ts2 or between time Tm2 and time Te. Therefore, the processing of S518 may only be executed at time Tm and time Tm2.

Next, processing proceeds to S520, where an instantaneous value (present value) of the body posture restoring moment ZMP-converted value ZMPrec at time k is calculated based on the parameters (height of the trapezoid) determined as above.

Next, Processing proceeds to 522, where an instantaneous value (present value) of the aforementioned body posture angular acceleration pattern β at time k is calculated by the use of Equation 24 stated earlier.

Next, processing proceeds to S524, where body horizontal acceleration αtmp is obtained by the use of the dynamic model of the robot 1. This body horizontal acceleration αtmp is required to satisfy the desired ZMP at present time (time k) if the robot is caused to perform a movement not in the body rotation mode but in the body translation mode only from a state of last instantaneous desired gait of the robot (state of the desired gait at time k−1) This αtmp is calculated in a manner similar to S504.

Next, processing proceeds to S526, where the body horizontal acceleration α of the body translation mode is calculated by the use of the following equation.

$$\alpha = \alpha tmp - (\Delta Mr/\Delta Mp)*\beta \qquad \text{Equation 25}$$

Further, processing proceeds to S528, where the floor reaction force's horizontal component Fx at time k, in the case where the body horizontal acceleration is α obtained as above, is obtained by the following equation 26 similar to aforementioned Equation 17.

$$Fx = mb*\alpha + msup*d2Xsup/dt2 + mswg*d2Xswg/dt2 \qquad \text{Equation 26}$$

Supplementarily, in order to improve accuracy of dynamic calculation, it is favorable that the body horizontal acceleration α of the body translation mode be determined in a similar manner to that explained in the supplement description of S516, instead of executing calculation of the body horizontal acceleration α using Equation 25 in S526. Specifically, it is favorable that, after the body angular acceleration β is obtained in the foregoing manner, the body horizontal acceleration α of the body translation mode be analytically or searchingly determined by the use of a more rigorous dynamic model so that a movement, obtained by combining the body translation mode and body rotation mode producing the body angular acceleration β obtained above, satisfies the desired ZMP.

The description provided above was about the processing when time k is neither between times Ts and Tm nor between times Ts2 and Tm2.

Figure 28:
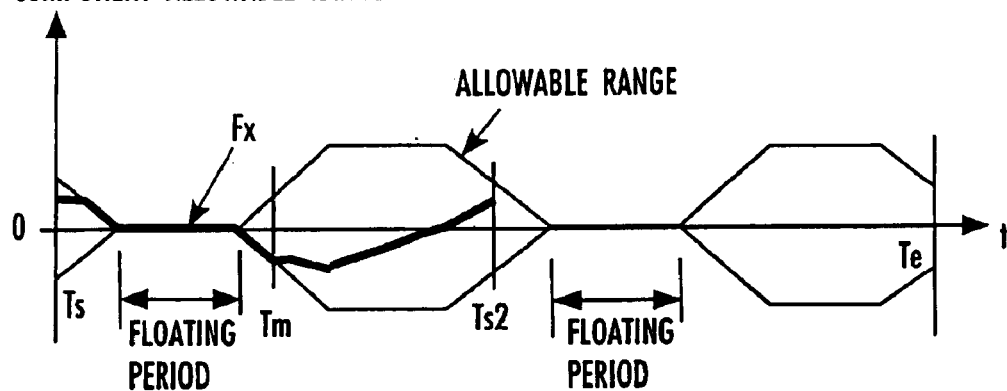
Figure 29:
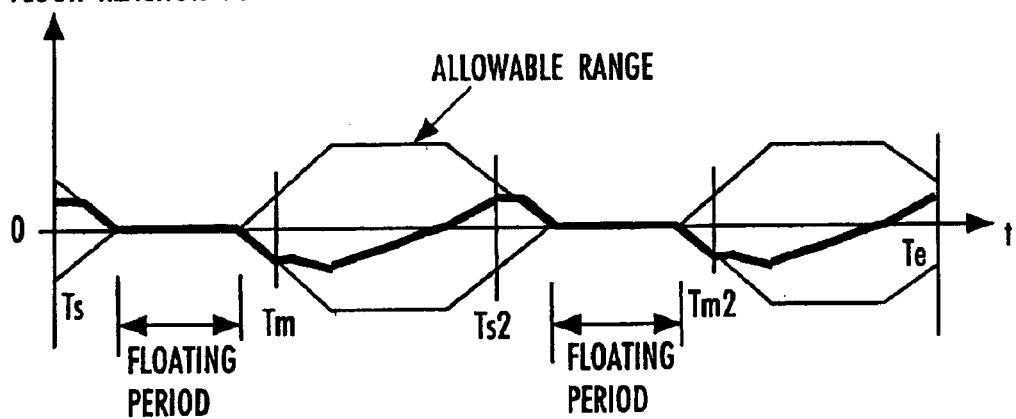
Figure 30:
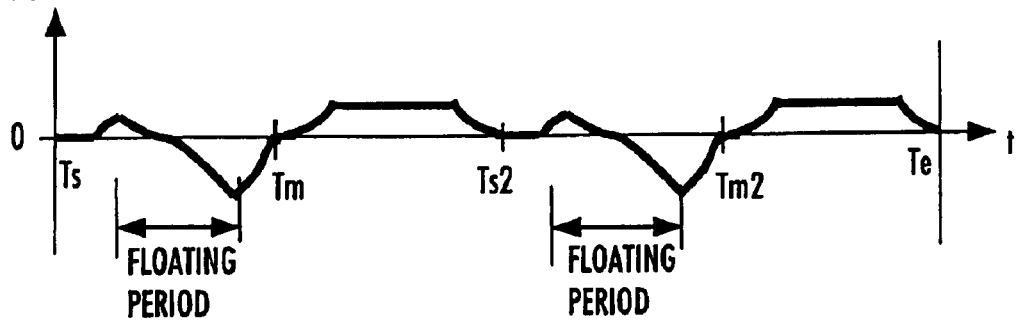
Figure 31:
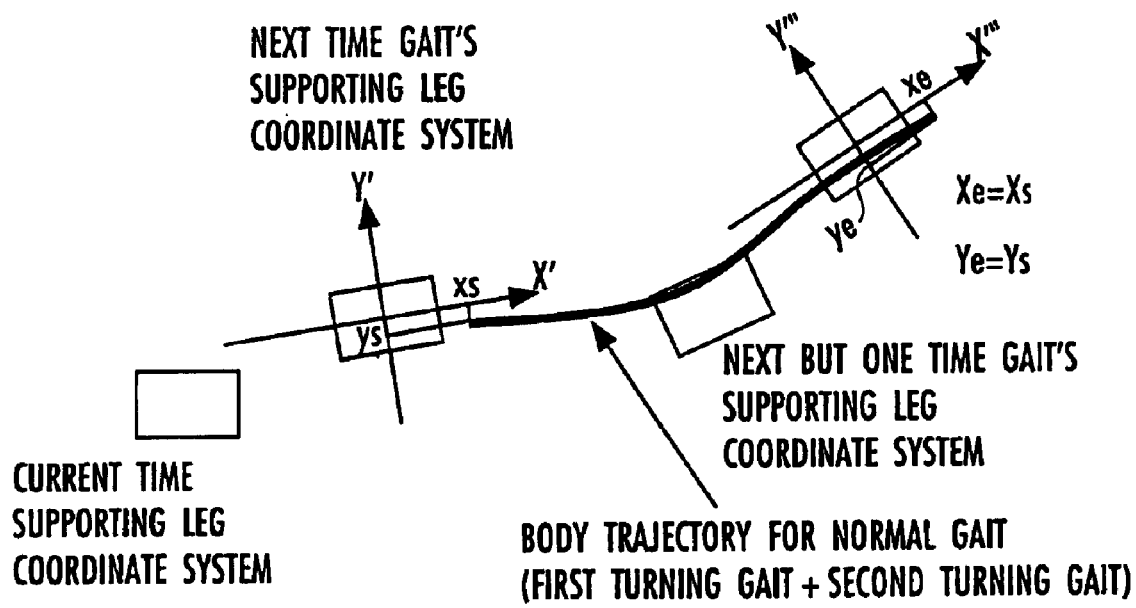
FIG. 31 is an explanatory view showing an example of a trajectory of the body position in the normal gait.

FIG. 28 shows the floor reaction force's horizontal component Fx when the processing described so far has completed to time Ts2. Further, FIGS. 29 and 30 show the floor reaction force's horizontal component Fx and the body posture angular acceleration β, respectively, when the processing described so far has completed to time Te. Note that the processing of S412 (subroutine for determining body horizontal acceleration and body posture angular acceleration) described so far determines the instantaneous values of the body horizontal acceleration and body posture angular acceleration at time k, but does not generate the time series of them to time Te at once.

Note that, in this embodiment, the reference body posture is the vertical posture and the body posture angular acceleration by the reference body posture is thus zero. Therefore, the angular acceleration β of the body rotation mode obtained as described earlier is set as the body posture angular acceleration determined by the processing of S412. However, when the reference body posture trajectory parameters are set to change the reference body posture, the sum of the angular acceleration β of the body rotation mode obtained as described earlier and the reference body posture angular acceleration should be set as the body posture angular acceleration determined by the processing of S412.

The reason why times Ts, Tm and Ts2 are set as stated earlier is to prevent the floor reaction force's horizontal component Fx from exceeding the allowable range [Fxmin, Fxmax], even if the body posture angular acceleration β is generated to return the body posture angular velocity to the initial angular velocity of the reference body posture trajectory, during a period from time Tm to time Ts2 and a period from time Tm2 to time Te. In other words, the floor reaction force's horizontal component allowable limit is sufficiently large during a period from time Tm to time Ts2 and a period from time Tm2 to time Te. Therefore, the floor reaction force's horizontal component Fx does not exceed the allowable range even if the body posture angular acceleration β is generated to return the body posture angular velocity to the initial angular velocity while satisfying the desired ZMP.

Moreover, in stead of causing the body posture angular velocity at time Ts to coincide with the body posture angular velocity at time Ts, the values of acyc1 and acyc2 may be set at equal values (acyc1=acyc2) which permit the body posture angular velocity at time Te to coincide with the body posture angular velocity at time Ts.

Next, processing proceeds to S414 in FIG. 21. In S414, the body horizontal acceleration obtained in S412 is sequentially integrated (cumulatively added from time Ts to current time k), thus obtaining a body horizontal velocity. Further, the body horizontal velocity is sequentially integrated (cumulatively added from time Ts to current time k), thus obtaining (the present value of) a body horizontal position. In addition, the body posture angular acceleration obtained in S412 is sequentially integrated (cumulatively added from time Ts to current time k), thus obtaining a body posture angular velocity. Further, the body posture angular velocity is sequentially integrated (cumulatively added from time Ts to current time k), thus obtaining (the present value of) a body posture angle.

After execution of the normal gait instantaneous value decision subroutine in S306 in FIG. 20, processing proceed to S308, where the value of time for gait generation k is increased by the gait generation interval Δk. Next, processing returns to S304, and processing of S306 and S308 is repeated as long as the conditions shown in S304 hold. Once the conditions shown in S304 are not applicable, that is, upon completion of the provisional normal gait generation to the end (time Te=Ts+Tcyc), processing proceeds to S310. In S310, based on the final body posture angle (at time Te) of the provisional gait and the like obtained in the foregoing, an initial body posture angle (at time Ts) and an initial body posture angular velocity (at time Ts) are corrected according to the following equations. These corrections are made to satisfy the boundary requirement of the normal gait related to the body posture angle and its angular velocity (the condition causing the body posture angles and angular velocities to coincide with each other at the beginning and end of the normal gait). Note that, in this description, the gait of the robot 1 is a gait for causing the robot 1 to move straight.

In this case, new values in the following equations represent the corrected values.

New initial body posture angular velocity=initial body posture angular velocity of provisional gait−(final body posture angle of provisional gait−initial body posture angle of provisional gait)/Tcyc    Equation 30

New initial body posture angle=initial reference body posture angle (at time Ts)    Equation 31

Hereinbelow, description is given regarding a reason why the initial body posture angular velocity is corrected by Equation 30 above. In the normal gait, it is required to determine the initial body posture angle and its angular velocity to prevent a state of movement of the robot 1 from being discontinuous (to satisfy the foregoing boundary requirement) at the boundary of the normal gait when the normal gait is repeated. In this case, by setting the body posture angular acceleration pattern corresponding to the foregoing body posture restoring moment ZMP-converted value ZMPrec, the final body posture angular velocity of the provisional normal gait obtained as above is generated to coincide with the initial value of the initial body posture angular velocity (initial value of reference body posture angular velocity). Thus, as long as the following equation, a remaining condition, is satisfied, the above-mentioned condition related to the body posture angle and its angular velocity is satisfied.

Final body posture angle=initial body posture angle    Equation 32 and, second-order differential of body posture angle=body posture angular acceleration    Equation 33

Thus, by second-order integration of both sides of Equation 33 from the beginning to the end of the normal gait, a relation of the following equation is obtained.

Final body posture angle=initial body posture angle+initial body posture angular velocity*Tcyc+second-order integral of body posture angular acceleration    Equation 34

Meanwhile, in generating the normal gait, the horizontal acceleration (adjustable horizontal velocity) of the body 24 is adjusted basically by the use of the body translation mode in order to satisfy the desired ZMP as described earlier. However, in a situation where horizontal acceleration of the body 24 for satisfying the desired ZMP cannot be generated sufficiently (a situation where a sufficient friction force cannot be generated), the angular acceleration of the body posture angle is adjusted by the use of the body rotation movement mode while preventing the total gravity acceleration from changing. Thus, insufficient body horizontal acceleration due to the body translation movement mode is compensated.

The adjustment operation of the body posture angular acceleration by using the above-mentioned body rotation movement mode is approximately equivalent to adjustment of an angular acceleration of the flywheel FH in the model of the robot 1 with the flywheel FH shown in FIG. 10. If the rotation velocity of the flywheel FH is close to zero, gyroscopic precession does not occur, and a force generated by the flywheel FH is determined only by the angular acceleration of the flywheel FH. Therefore, in the robot 1 with the flywheel FH in the body 24, even if the initial angle and angular velocity of the flywheel FH are somewhat changed, the force generated does not change very much as long as the flywheel FH is moved by angular accelerations in equal pattern. Accordingly, gyroscopic precession is ignored in the dynamic equations of the robot, Equations 01, 02 and 03. Therefore, when Equations 01, 02 and 03 are used or even when a more general and rigorous dynamic model is used in the robot 1 of this embodiment, even if the initial body posture angle and its angular velocity are somewhat changed, a resultant force of inertial force and gravity, thus generated, is almost invariant as long as the body posture angle is moved by angular accelerations in the same pattern while preventing the total center-of-gravity acceleration from changing (that is, as long as the body posture angle is moved by angular accelerations in the same pattern by the use of the body rotation movement mode). In other words, even if the initial body posture angle and its angular velocity are somewhat changed, the body posture angular acceleration of the gait generated in accordance with the aforementioned flowchart is invariant.

In short, the second-order integral of the body posture angular acceleration in Equation 34 no longer depends on the initial body posture angle and its angular velocity. In other words, the second-order integral of the body posture acceleration can be treated as a constant value regardless of the values of the initial body posture angle and its angular velocity.

When the value of the initial body posture angle is the initial body posture angle of the provisional gait and the value of the initial body angular velocity is the initial body angular velocity of the provisional gait, the final body posture angle becomes the final body posture angle of the provisional gait. Therefore, this relation is substituted into Equation 34, obtaining the following equation.

Final body posture angle of provisional gait=initial body posture angle of provisional gait+second-order integral of body posture angular acceleration+initial body posture angular velocity of provisional gait*$Tcyc$  Equation 35

Thus,

Second-order integral of body posture angular acceleration=(final body posture angle of provisional gait−initial body posture angle of provisional gait)−initial body posture angular velocity of provisional gait*$Tcyc$  Equation 36

Based on the above argument, the second-order integral of the body posture angular acceleration can be treated as a constant. (The second-order integral of the body posture angular acceleration does not depend on the initial body posture angle and its angular velocity). Thus, above Equation is substituted into Equation 34, thus obtaining the following equation.

Final body posture angle=initial body posture angle+(final body posture angle of provisional gait−initial body posture angle of provisional gait)−initial body posture angular velocity of provisional gait*$Tcyc$+initial body posture angular velocity*$Tcyc$  Equation 37

From Equations 37 and 32, foregoing Equation 30 is obtained.

The initial body posture angle is caused to coincide with the initial value of the reference body posture angle shown as in Equation 31. However, the initial body posture angle may also be set such that an average value of the body posture angles of the normal gait coincides with the initial value of the reference body posture angle. Alternatively, the initial body posture angle may be set such that an average value of maximum and minimum values of the body posture angle of the normal gait coincides with the initial value of the reference body posture angle.

In the foregoing, description was provided regarding an example in which a movement of the robot 1 is limited to a linear movement. In the case of determining a normal gait which includes a turning movement, the robot 1 has different traveling directions at the beginning and end of the gait. Therefore, the initial body posture angular velocity depends on the initial body posture angle. Therefore, the initial body posture angle and its angular velocity need to be determined under consideration of the above dependence. In this case, for example, it is sufficient that the initial body posture angle and initial body posture angular velocity are renewed to satisfy the following Equations 37a and 37b.

Final body posture angle−initial body posture angle=second-order integral of body posture angular acceleration determined to satisfy floor reaction force's horizontal component allowable limit+second-order integral of body posture angular acceleration generated by $ZMPrec$+initial body posture angular velocity*period of the normal gait  Equation 37a Final body posture angular velocity−initial body posture angular velocity=first-order integral of body posture angular acceleration determined to satisfy floor reaction force's horizontal component allowable limit+first-order integral of body posture angular acceleration generated by $ZMPrec$  Equation 37b The integral period of the first term on the right side of each of Equations 37a and 37b is a period obtained by combining a period from time Ts to time Tm, and a period from time Ts2 to time Tm2. The integral period of the second term on the right side of the same is a period obtained by combining a period from the time Tm to time Ts2 and a period from time Tm2 to time Te.

More specific description is provided. In the normal gait, initial body position angle and its angular velocity viewed from the first turning gait supporting leg coordinate system (next time gait's supporting leg coordinate system) should coincide with final body posture angle and its angular velocity viewed from the following first turning gait supporting leg coordinate system (next but two time gait's supporting leg coordinate system). Therefore, in this embodiment, the new initial body posture angle is determined by foregoing Equation 31. Thereafter, the new initial body posture angle is substituted for the initial body posture angle on the left side of Equation 37a. The coordinate of the new initial body posture angle is transformed into a value viewed from the next time gait's supporting leg coordinate system, by matrix (matrix of transformation of a rotating coordinate) corresponding to a total turning angle (turning angle about the vertical axis) of the robot 1 in the normal gait. The resulting value is substituted for final body posture angle on the left side of Equation 37a. Further, the body posture angular acceleration sequentially obtained in S516 in FIG. 22 described earlier is used for the body posture angular acceleration related to integration in the first term on the right side of each of Equations 37a and 37b.

Thereafter, the initial body posture angular velocities in Equations 37a and 37b and the heights of the trapezoids of the ZMPrec (trapezoid-shape pattern in FIG. 26) related to integration in the second term on the right side of Equations 37a and 37b are set as unknowns. (The times of break points of the trapezoid pattern of the ZMPrec are determined in advance, and the trapezoid height acyc1 of the ZMPrec in the first turning gait and the trapezoid height acyc2 of the ZMPrec in the second turning gait are equal values.) An initial body posture angular velocity, obtained by solving simultaneous equations 37a and 37b including the above unknowns, is determined as the new initial body posture angular velocity. In this case, the final body posture angular velocity in Equation 37b is a value obtained as follows. The coordinate of the unknown initial body posture angular velocity is transformed into a value viewed from the next supporting leg coordinate system, by the matrix which corresponds to the foregoing total turning angle of the normal gait.

When the movement of the robot 1 includes turning, the new initial body posture angle and its angular velocity may be determined in the above-described manner.

Note that, it is also possible to searchingly obtain an initial body posture angular velocity which satisfies the boundary requirement of the normal gait.

After the processing of S310 in FIG. 20 is completed, processing proceeds to S210 in FIG. 19. In S210, the final body horizontal position/velocity of the generated gait (provisional normal gait) are converted into values viewed from a supporting leg coordinate system which corresponds to the supporting leg at such moment (X'''-Y'''-Z''' coordinate system in FIG. 31). The resulting values are set as (Xe, Vxe) (Xe: final body horizontal position, Vxe: final body horizontal velocity).

Next, processing proceeds to S212, where differences between the initial body horizontal position/velocity (Xs, Vxs) and final body horizontal position/velocity (Xe, Vxe) are calculated as shown in the drawing. The differences (Xs−Xe, Vxs−Vxe) are referred to as body horizontal position/velocity boundary requirement errors (errx, errvx). In the normal gait, the foregoing boundary requirement needs to be satisfied. Thus, (Xs, Vxs) and (Xe, Vxe) have to coincide with each other. Hence, the body horizontal position/velocity boundary requirement errors (errx, errvx) have to be zero or nearly zero. In this embodiment, (Xs, Vxs), with which the body horizontal position/velocity boundary requirement errors (errx, errvx) are almost zero, are searchingly obtained.

Next, processing proceeds to S214, where it is determined whether or not the calculated body position/velocity boundary requirement errors (errx, errvx) are within their allowable ranges that are appropriately set in advance. Instead of setting the allowable ranges of the body horizontal position/velocity boundary requirement errors as above, it may be determined whether or not a difference between an initial divergence component (Xs+Vxs/ω0) and an final divergence component (Xe+Vxe/ω0), and a difference between an initial convergence component (Xs−Vxs/ω0) and an end convergence component (Xe−Vxe/ω0) are within corresponding allowable ranges, respectively. Note that ω0 is a predetermined certain value as mentioned earlier.

When the determination result in S214 is NO, processing proceeds to S216. In S216, a plurality of (in this embodiment, two) candidate initial values (Xs+ΔXs, Vxs) and (Xs, Vxs+ΔVxs) are determined near (Xs, Vxs). Here, ΔXs and ΔVxs mean predetermined amounts of minute changes relative to Xs and Vxs, respectively. The respective candidate initial values are employed as initial states of the body horizontal position/velocity, and the normal gait is generated using the gait parameters by processing similar to that of S208 described earlier. Further, the final body position/velocity of the generated normal gait is converted into values viewed from a supporting leg coordinate system which corresponds to the supporting leg at such moment (X'''-Y'''-Z''' coordinate system in FIG. 31). The values thus obtained are (Xe+ΔXe1, Vxe+ΔVxe1) and (Xe+ΔXe2, Vxe+ΔVxe2). Herein, (Xe+ΔXe1, Vxe+ΔVxe1) mean the final body position/velocity corresponding to (Xs+ΔXs, Vxs), and (Xe+ΔXe2, Vxe+ΔVxe2) mean the final body position/velocity corresponding to (Xs, Vxs+ΔVxs). Note that, in this processing for generating the normal gait (provisional gait) in such case, initial states (states at time Ts) of variables other than the body horizontal position/velocity may be set in a same manner as that in the case where the candidate initial values of the body horizontal position/velocity are set as (Xs, Vxs). Further, in S216, differences between the respective candidate initial values and corresponding final body position/velocity, that is, the body horizontal position/velocity boundary requirement errors corresponding to respective candidate initial values (Xs+ΔXs, Vxs) and (Xs, Vxs+ΔVxs), are obtained by the similar processing to that of S210 described earlier.

Next, processing proceeds to S218. In S218, based on the body horizontal position/velocity boundary requirement errors corresponding to (Xs, Vxs) and the candidate initial values (Xs+ΔXs, Vxs) and (Xs, Vxs+ΔVxs) near (Xs, Vxs), respectively, the next candidate initial values of (Xs, Vxs) are determined by a searching method (a method in which affine-Jacobian (sensitivity matrix) is obtained and the next candidate is determined by a steepest-descent method, or a simplex method). Specifically, based on the body horizontal position/velocity boundary requirement errors corresponding to (Xs, Vxs) and the candidate initial values (Xs+ΔXs, Vxs) and (Xs, Vxs+ΔVxs) near (Xs, Vxs), respectively, a sensitivity matrix is obtained which shows degrees of changes of the body horizontal position/velocity boundary requirement errors when minute changes are made in the body horizontal position and body horizontal velocity from the candidate initial values (Xs, Vxs), respectively. Based on this matrix, candidate initial values (Xs, Vxs) for reducing the body horizontal position/velocity boundary requirement errors are newly determined. After the new candidate initial values (Xs, Vxs) of the body horizontal position/velocity are determined as above, processing returns to S206.

The above-described processing (processing of S206–S218) is repeated as long as the determination result in S214 is NO. In this case, in S300 (see FIG. 20) of the processing for generating the normal gait (S208) which corresponds to the new candidate initial values (Xs, Vxs) of the body horizontal position/velocity, the initial value of the body posture angular velocity is not set as the initial value of the reference body posture angular velocity, but as a value which was determined in S310 (see FIG. 20) in the processing of S208, and which corresponds to the last candidate initial values (Xs, Vxs) of the body horizontal position/velocity. When the determination result in S214 is YES, processing exits a repeating loop (S204) and proceeds to S220. Note that, the provisional normal gait generated immediately before processing exits the repeating loop of S204, is obtained as the normal gait satisfying the boundary requirement.

In S220, obtained are initial body horizontal position/velocity (X0, V0) at the original initial time 0 (end time of the current time gait), initial body vertical position/velocity (Z0, Vz0) at the initial time 0, and initial body posture angle and its angular velocity at the initial time 0.

Specifically, in S408 and S414 of the normal gait instantaneous value decision subroutine shown in FIG. 21 described earlier, (X0, V0) and (Z0, Vz0) are determined as values obtained as follows. The body horizontal position/velocity and body vertical position/velocity, determined at time of a switching moment from the second turning gait to the second turning gait, that is, determined when time k=Tcyc (time Te−Ts), are converted into values viewed from a supporting leg coordinate system (X'''-Y'''-Z''' coordinate system in FIG. 31) which corresponds to the supporting leg of a step starting from time Tcyc (that is, the supporting leg of the first turning gait in the second time) Similarly, the initial body posture angle and angular velocity are determined as values obtained as follows. The body posture angle and angular velocity determined when time k=Tcyc (time Te−Ts) are converted into values viewed from a supporting leg coordinate system (X'''-Y'''-Z''' coordinate system in FIG. 31) which corresponds to the supporting leg of a step starting from the time Tcyc (that is, the supporting leg of the first turning gait in the second time).

Next, processing proceeds to S222, where a normal gait's initial divergence component q[0] is obtained by the following equation.

$$q[0]=X0+V0/\omega0 \qquad \text{Equation 40}$$

where ω0 is a predetermined certain value, as stated earlier in the explanation regarding divergence.

Processing proceeds to S224, where the normal gait initial divergence component q[0] is converted into a value viewed from the current time gait's supporting leg coordinate system, and the resulting value is obtained as q"[0]. In addition, the initial body vertical position/velocity (Z0, Vz0) are converted into values viewed from the current time gait's supporting leg coordinate system, and the resulting values are obtained as (Z0", Vz0").

Supplementarily, (Z0", Vz0") coincide with body vertical position/velocity at the second turning gait's end, viewed from the supporting leg coordinate system of the second turning gait (X"-Y"-Z" coordinate system in FIG. 15). Further, q"[0] coincides with a divergence component at the second turning gait's end, viewed from the supporting leg coordinate system of the second turning gait (X"-Y"-Z" coordinate system in FIG. 15). Therefore, (Z0", Vz0") and q"[0] may be calculated by using such properties.

This is the end of the processing of S024 in FIG. 12, that is, subroutine processing for obtaining initial state of the normal gait.

Next, processing proceeds to S026 in FIG. 12, where gait parameters of the current time gait is determined (a part of the parameters are provisionally determined). To be more specific, in S026, the following processing is performed, following the flowchart shown in FIG. 32.

First of all, in S600, foot trajectory parameters of the current time gait are set so that the foot position/posture trajectories of the current time gait continue to the foot position/posture trajectories of the normal gait.

Specifically, free leg foot position/posture at the current time gait's beginning (initial values of current time gait free leg foot position/posture) are set as current free leg position/posture (free leg position/posture at the last time gait's end) viewed from the current time gait's supporting leg coordinate system. Supporting leg foot position/posture at the current time gait's beginning (initial values of current time gait supporting leg foot position/posture) are set as current supporting leg foot position/posture (supporting leg foot position/posture at the last time gait's end) viewed from the current time gait's supporting leg coordinate system. Further, free leg foot position/posture at the current time gait's end is determined in accordance with the next time gait's supporting leg coordinate system (required values of free leg landing position/posture of the first step related to the current time gait) viewed from current time gait's supporting leg coordinate system. In other words, the free leg foot position/posture at the current time gait's end is determined as follows. When the free leg foot 22 is rotated while contacting a floor, from the free leg foot position/posture at the current time gait's end until almost entire bottom surface of the foot 22 contacts a floor so as not to slip, the representative point of the foot 22 coincides with the origin of the next time gait's supporting leg coordinate system viewed from the current time gait's supporting leg coordinate system.

At the end of the current time gait, the supporting leg foot 22 is lifted in the air. Supporting leg foot expected landing position/posture are set in order to determine trajectories after the supporting leg foot 22 is lifted. The supporting leg foot expected landing position/posture are set, corresponding to the next but one time gait's supporting leg coordinate system (required values of the free leg foot position/posture of the second step related to the current time gait) viewed from the current time gait's supporting leg coordinate system. More specifically, the supporting leg foot expected landing position/posture are set as follows. When the foot 22 is rotated, while contacting the floor, from the planned position/posture until almost entire bottom surface of the foot 22 contacts the floor so as not to slip, the representative point of the foot 22 coincides with the origin of the next but one time gait's supporting leg coordinate system, viewed from the current time gait's supporting leg coordinate system.

Supporting leg foot position/posture at the current gait's end is obtained by generating foot position/posture trajectories from the current supporting leg position/posture (supporting leg foot position/posture at the current time gait's beginning) to the planned foot landing position/posture corresponding to the next time gait's supporting leg coordinate system (required values of free leg foot expected landing position/posture of the second step in the foregoing required parameters). The foot position/posture trajectories are obtained using the foregoing finite duration settling filter until the end of the current time gait.

Next, processing proceeds to S602, where reference body posture trajectory parameters of the current time gait are determined as in the case of those for the first and second turning gaits of the normal gait. The parameters are set so that the reference body posture trajectory of the current time gait sequentially continues to the reference body posture trajectory of the foregoing normal gait (the reference body posture angle and its angular velocity at the end of the current time gait coincide with the reference body posture angle and its angular velocity at the beginning of the normal gait). Note that, in this embodiment, the reference body posture is the constantly vertical posture in any of the current time gait and normal gait.

Next, processing proceeds to S604, where arm posture trajectory parameters of the current time gait are determined as in the case of those for the first and second turning gaits of the normal gait. The parameters are set so that the arm posture trajectories of the current time gait sequentially continue to the arm posture trajectories of the foregoing normal gait. Note that, as in the case where the normal gait parameters are determined (S104 in FIG. 14), the arm posture trajectory parameters herein determined are movement parameters apart from those related to changes of angular momentum of both arms about the vertical axis (or body trunk axis), and are parameters defining trajectories of the center of gravity of both arms.

Next, processing proceeds to S606, where floor reaction force's vertical component trajectory parameters of the current time gait are set, as in the case of those for the first and second turning gaits of the normal gait, so that a floor reaction force's vertical component trajectory defined by these parameters becomes substantially continuous (value does not become discontinuous in a stepwise manner) as shown in FIG. 6.

The floor reaction force's vertical component trajectory parameters are determined so that both total center-of-gravity vertical position/velocity and floor reaction force's vertical component trajectory of the current time gait sequentially continue to those of the normal gait.

Specifically, first of all, initial total center-of-gravity vertical position/velocity of the normal gait, viewed from the current time gait's supporting leg coordinate system, are obtained by the use of, for example, Equation 04 described earlier (or a kinematics model of the robot 1), based on the values (Z0", Vz0") and the like. The values (Z0", Vz0") were obtained by converting the initial body vertical position/velocity of the normal gait, finally obtained in the processing of S024 (decision processing of the normal gait initial state) of FIG. 12 described earlier, into values viewed from the current time gait's supporting leg coordinate system, that is, (Z0", Vz0") obtained in S224 in FIG. 19, or the like. Specifically, the initial total center-of-gravity vertical position of the normal gait, viewed from the current time gait's supporting leg coordinate system, is obtained by substituting the following into Equation 04. Substituted are: the body material particle's vertical position of the model in FIG. 10, corresponding to the body vertical position Z0" of the normal gait obtained in S224; and leg material particle vertical positions on the supporting leg side and free leg side, corresponding to positions obtained by converting the positions of the respective legs at the beginning of the normal gait into values viewed from the current time gait's supporting leg coordinate system. Moreover, the initial total center of gravity's vertical velocity of the normal gait, viewed from the current time gait's supporting leg coordinate system, is obtained by substituting the following for an equation obtained by differentiating both sides of Equation 04. Substituted are: the body material particle vertical velocity of the model in FIG. 10, corresponding to the body vertical velocity Vz0" of the normal gait obtained in S224; and leg material particle vertical velocities on the supporting leg side and free leg side, corresponding to velocities obtained by converting the respective foot vertical velocities in the normal gait into values viewed from the current time gait's supporting leg coordinate system. Note that, the initial total center-of-gravity vertical position/velocity may be calculated by the use of a more precise model.

Thereafter, the initial total center-of-gravity vertical position/velocity of the normal gait obtained as above are substituted for the end total center of gravity's vertical position/velocity of forgoing Equations 13 and 41. At the same time, the total center-of-gravity vertical position and velocity of the last desired gait instantaneous values (more precisely, resulting values of conversion of the end state of the last desired gait into the present supporting leg coordinate system) are substituted for the initial total center-of-gravity vertical position and velocity in foregoing Equations 13 and 41. The floor reaction force's vertical component pattern (more specifically, parameter values) of the current time gait is thus determined to satisfy the relations in Equations 13 and 41. Integrals in Equations 13 and 41 are integrals during a period from the beginning to the end of the current time gait.

End total center of gravity's vertical velocity−initial total center of gravity's vertical velocity=first-order integral of (floor reaction force's vertical component/mass of robot)+first-order integral of gravity acceleration    Equation 41

The gravity acceleration is a negative value.

More specifically, first of all, among floor reaction force's vertical component parameters (times of breakpoints, and the like) for defining the floor reaction force's vertical component pattern shown in FIG. 6, at least two parameters are set as independent unknown variables and the values of the unknown variables are determined by solving simultaneous equations including Equations 13 and 41.

For example, the height (peak value of the floor reaction force's vertical component) and width (duration of the one-leg supporting period) of the trapezoid in FIG. 6 may be selected as the floor reaction force's vertical component parameters set as unknown variables. In this case, inclinations of both sides of the trapezoid in FIG. 6 are values determined in advance in accordance with the current time gait's period or the like. Alternatively, times of the break points of the floor reaction force's vertical component pattern, except for time of shift from the one-leg supporting period to the floating period, are values determined in advance in accordance with the current time gait's period or the like. Supplementarily if the number of unknowns is one, there is generally no solution which satisfies the simultaneous equations of Equations 13 and 41.

Next, processing proceed to S608, where floor reaction force's horizontal component allowable limit [Fxmin, Fxmax] (to be more specific, parameters defining a pattern of the floor reaction force's horizontal component allowable limit) is set as in the case of the first and second turning gaits of the normal gait. For example, the floor reaction force's horizontal component allowable limit is set to have the pattern shown in FIG. 33. In this embodiment, the floor reaction force's horizontal component allowable limit (to be more specific, a allowable range in each of the X-axis and Y-axis directions) is set based on foregoing Equation 12, in accordance with the floor reaction force's vertical component pattern determined earlier in S606. Note that, it is preferred that this floor reaction force's horizontal component allowable limit herein set certainly remain within the friction limit.

Next, processing proceeds to S610, where a ZMP trajectory of the current time gait (to be more specific, parameters defining the ZMP trajectory; times and positions of break points of the trajectory) is set as shown in FIG. 7 described earlier, so as to have high stability margin and not to change suddenly, as in the case of the first and second turning gaits of the normal gait. These parameters are set so that the ZMP trajectory of the current time gait sequentially continues to the ZMP trajectory of the foregoing normal gait. In other words, the ZMP trajectory parameters are determined so that the position of the ZMP at the end of the current time gait coincides with the position of the ZMP at the beginning of the normal gait. In this case, in the running gait, the way of setting times and positions of break points of the ZMP trajectory during the one-leg supporting period may be similar to the way of setting the ZMP trajectory parameters of the foregoing normal gait. In addition, the ZMP trajectory parameters can be set so that the desired ZMP trajectory during the floating period linearly and continuously changes from the position of ZMP at initial time of the floating period to the position of ZMP at the beginning of the normal gait.

Note that, the ZMP trajectory parameters of the current time gait determined in S610 are determined only provisionally and will be corrected as described later. Therefore, the ZMP trajectory of the current time gait set as above is hereinafter referred to as a provisional desired ZMP trajectory of the current time gait.

Finally, processing proceeds to S612, where a body posture angle recovery period [Ta, Tb] is set. Body posture angle recovery initial time Ta is equivalent to Tm in the second turning gait of the normal gait, and body posture angle recovery end time Tb is equivalent to Ts2 in the second turning gait of the normal gait. The ways of setting times Ta and Tb are similar to the ways of setting Tm and Ts2, respectively.

Returning to description of FIG. 12, after the processing shown in S026 (decision processing of the gait parameters of the current time gait) is performed as above, processing proceeds to S028, where the gait parameters (ZMP trajectory parameters) of the current time gait are corrected. In this processing, the ZMP trajectory parameters are corrected to allow the body position/posture trajectories to continue to or to be close to those of the normal gait.

Figure 34:
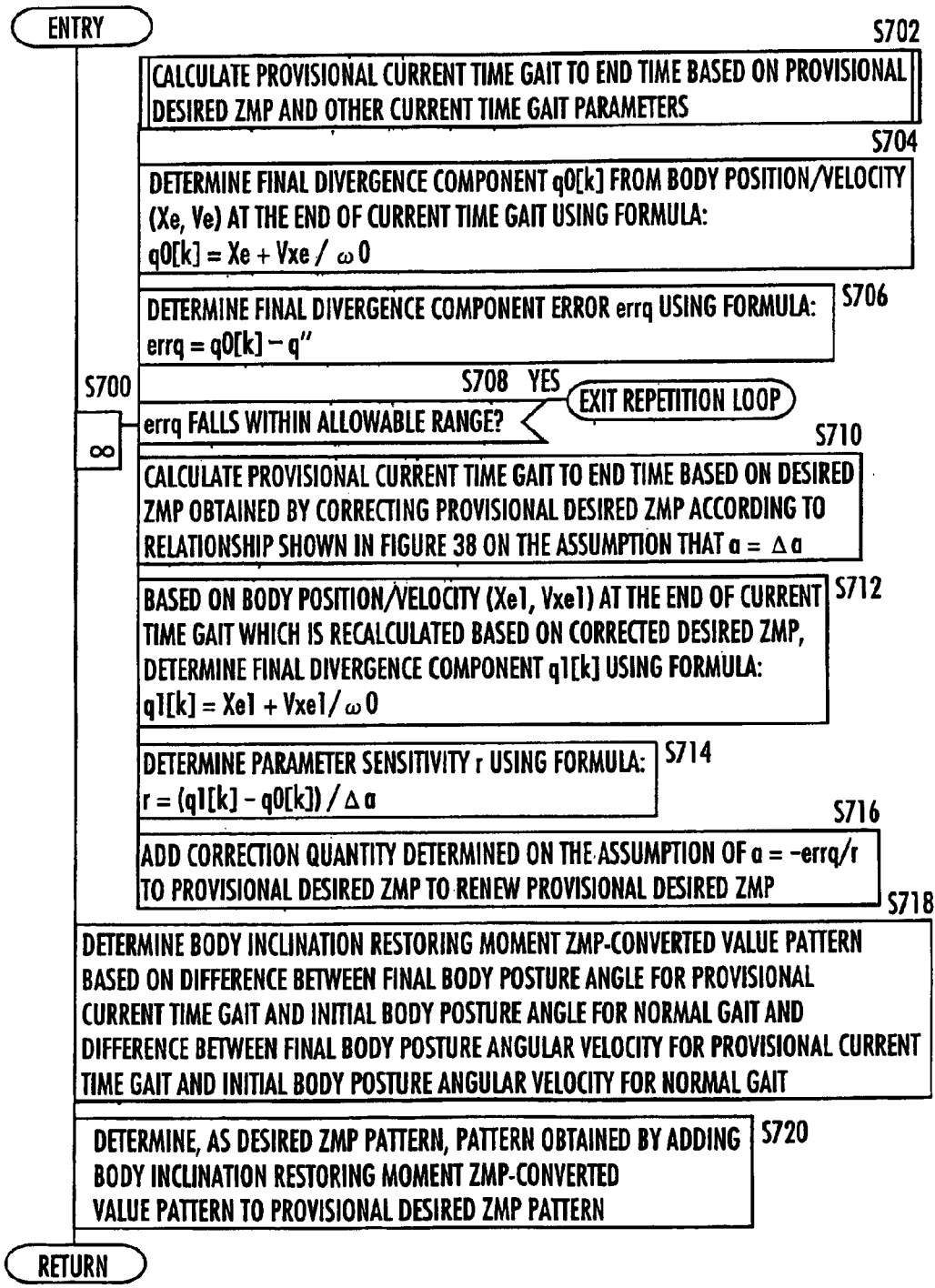
FIG. 34 is a flowchart showing subroutine processing of the flowchart in FIG. 12.

FIG. 34 is a subroutine flowchart showing above processing.

First of all, after S700, processing proceeds to S702, where a provisional current time gait to the end time of the current time gait is generated provisionally based on the provisional desired ZMP pattern and other current time gait parameters.

In S702, the processing below is performed following the flowchart shown in FIG. 35.

Description is given hereinbelow. Various initialization is performed in S800. To be specific, zero is substituted for time for provisional gait generation k. Further, the end state (to be more specific, end values of the gait state, such as the body horizontal position/velocity, body vertical position/velocity, body posture angle and its angular velocity, desired foot position/posture, desired arm postures and the like) of the last desired gait is converted into the present supporting leg coordinate system, and the resultant state is set as the current time gait initial state.

Next, in S804 after S802, it is determined whether or not time for provisional gait generation k is before current time gait end time Tcurr (whether or not k≦Tcurr). If the determination result is YES, processing proceeds to current time gait instantaneous value decision subroutine of S806, and an instantaneous value of time k in the current time gait is determined. Next, processing proceeds to S808, where time for provisional gait generation k is increased by Δk. Thereafter, processing returns to S804.

Figure 35:
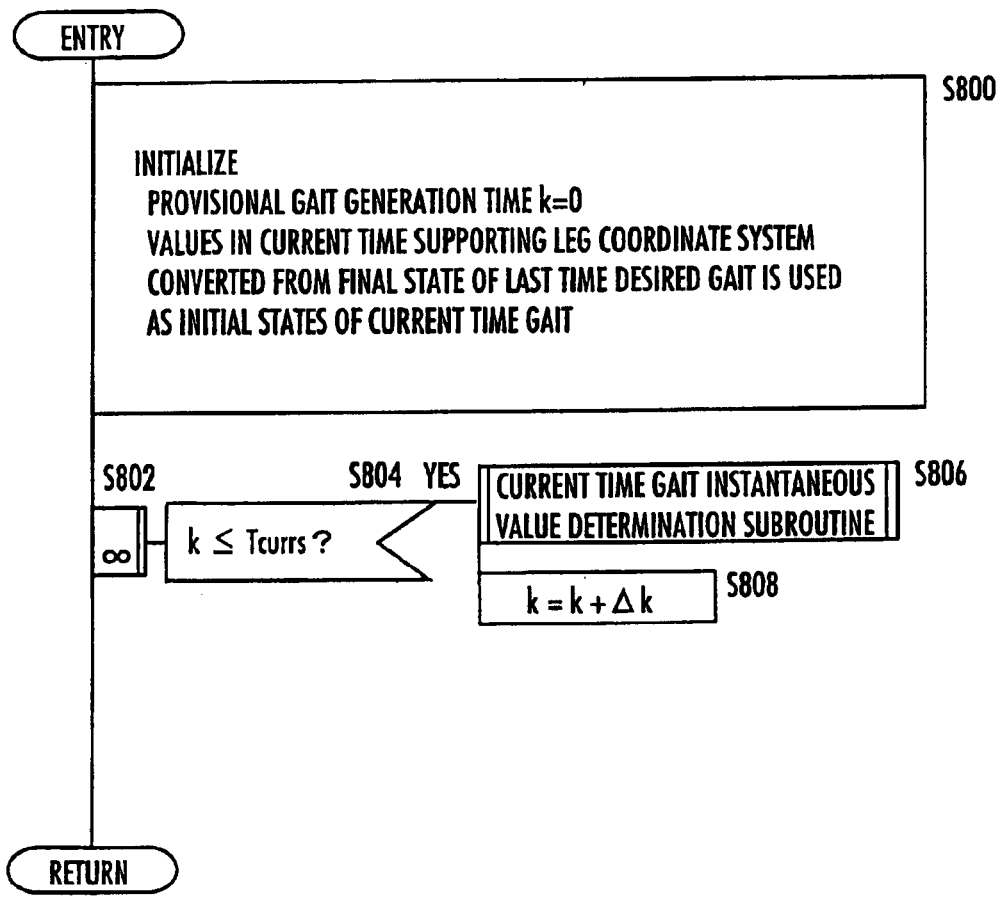
FIG. 35 is a flowchart showing subroutine processing of the flowchart in FIG. 34.

If the determination result of S804 is NO, the processing of the flowchart shown in FIG. 35 is completed.

By the above processing, the provisional current time gait is generated from the beginning to the end.

Figure 36:
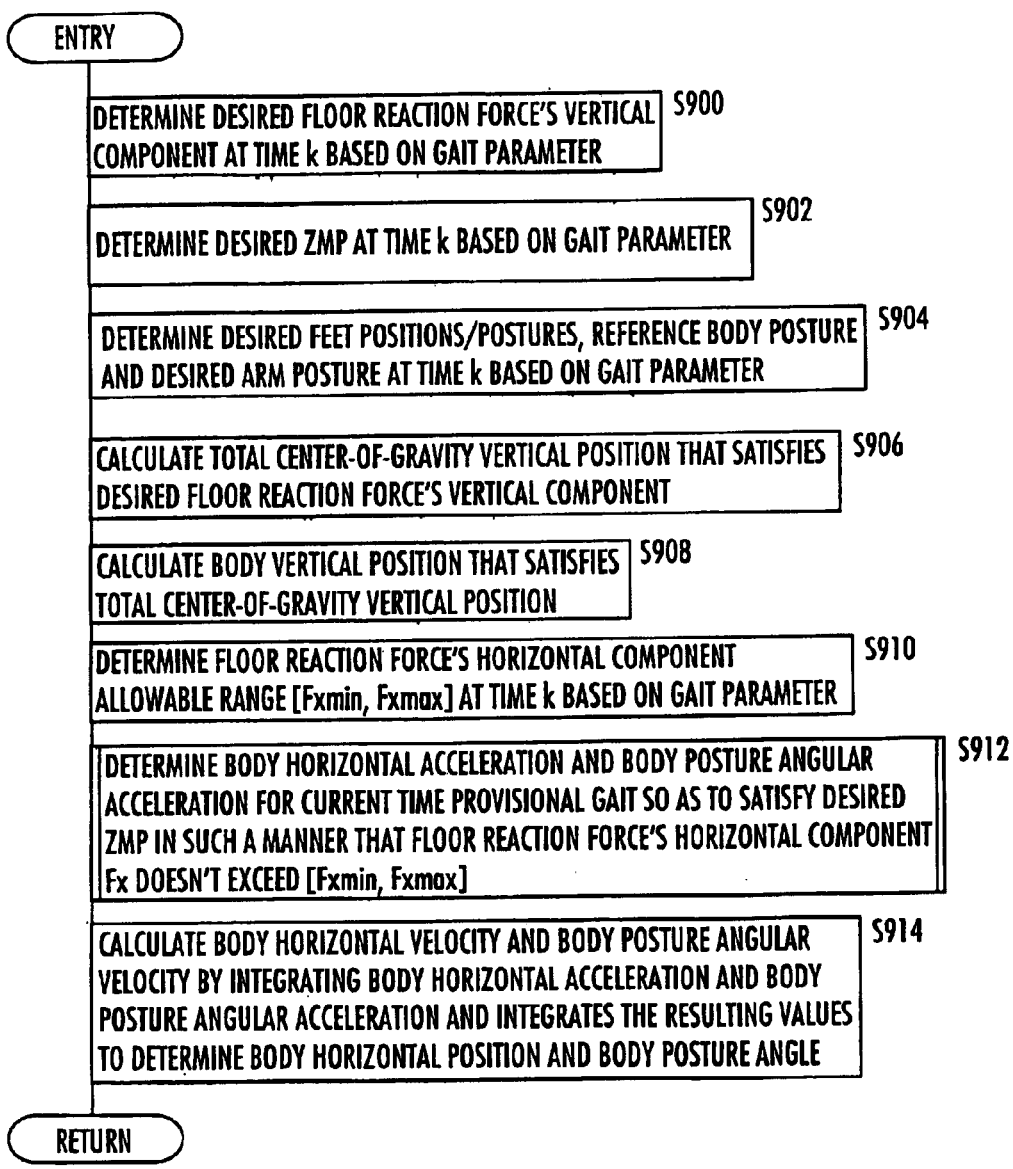
FIG. 36 is a flowchart showing subroutine processing of the flowchart in FIG. 35.

In the gait instantaneous value decision subroutine in S806, processing shown in FIG. 36 is performed. Description of the processing is given hereinbelow.

First of all, in S900, a value (present value) of the desired floor reaction force's vertical component shown in FIG. 6 at time k is obtained based on the floor reaction force's vertical component trajectory parameters of the current time gait parameters. Next, in S902, a value (present value) of the desired ZMP trajectory (provisional desired ZMP trajectory) shown in FIG. 7 at time k is obtained based on the ZMP trajectory parameters of the current time gait parameters.

Next, processing proceeds to S904, where values (present values) of the desired both foot positions/postures, reference body posture and desired arm postures at time k are respectively obtained based on the current time gait parameters (foot trajectory parameters, reference body posture trajectory parameters and arm posture trajectory parameters). As for the desired arm postures, total center of gravity of the arms is determined, but freedom of movement which changes angular momentum about the vertical axis (or body trunk axis) is not yet determined. Note that, as in the case of the normal gait, the desired foot position/posture trajectories and floor reaction force's vertical component trajectory of the current time gait are determined independently from each other, in accordance with the foot trajectory parameters and floor reaction force's vertical component trajectory parameters determined in the flowchart in FIG. 32, respectively.

Next, processing proceeds to S906, where a total center-of-gravity vertical position at time k is calculated to satisfy the present value of the desired floor reaction force's vertical component obtained in S900 (to cause the sum of an inertial force and gravity in the vertical direction of the robot 1 to balance with the desired floor reaction force's vertical component). Specifically, this calculation is performed by processing similar to that of S406 in FIG. 21 described earlier.

Next, processing proceeds to S908, where a present value of the body vertical position, which satisfies the total center-of-gravity vertical position obtained as above, is calculated. Specifically, this calculation is performed by processing similar to that of S408 in FIG. 21.

Figure 32:
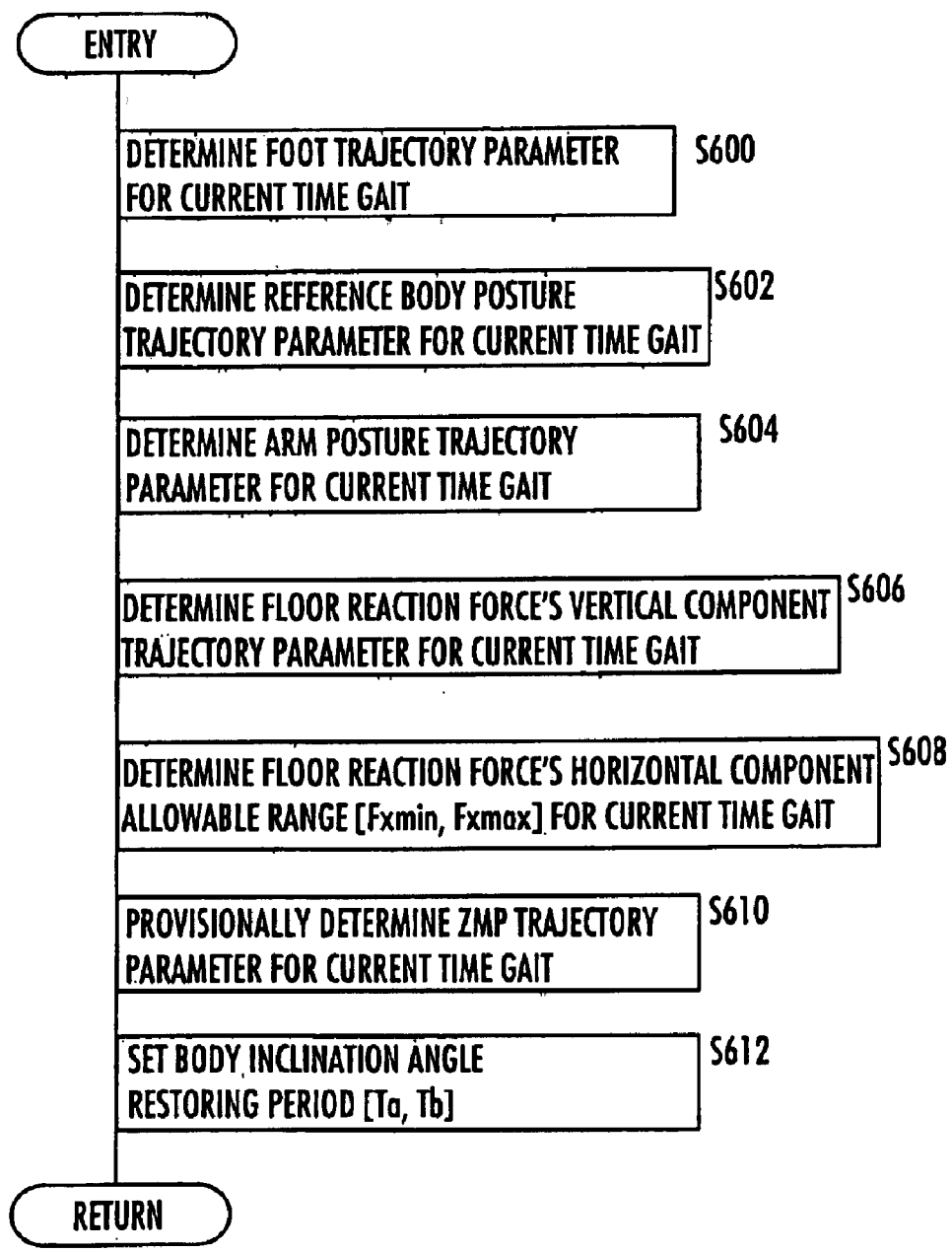
FIG. 32 is a flowchart showing subroutine processing of the flowchart in FIG. 12.
Figure 33:
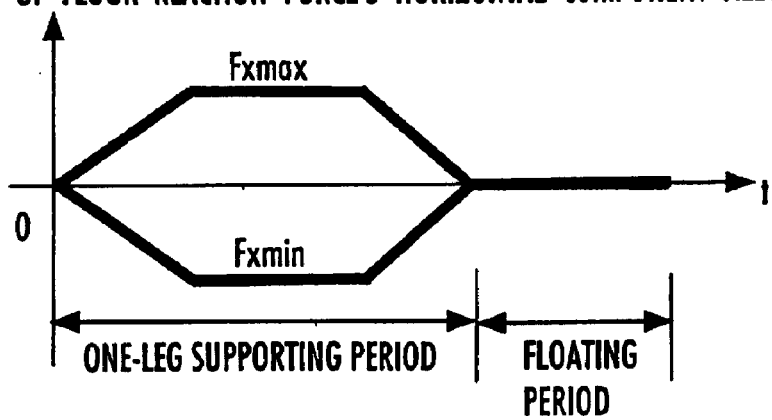
FIG. 33 is a diagram showing an example of setting a floor reaction force's horizontal component allowable limit of a current time gait.

Next, processing proceeds to S910, where values (present values) of the floor reaction force's horizontal component allowable limit [Fxmin, Fxmax] shown in FIG. 33 are obtained based on the parameters of floor reaction force's horizontal component allowable limit determined in S608 in FIG. 32 described earlier.

Figure 22:
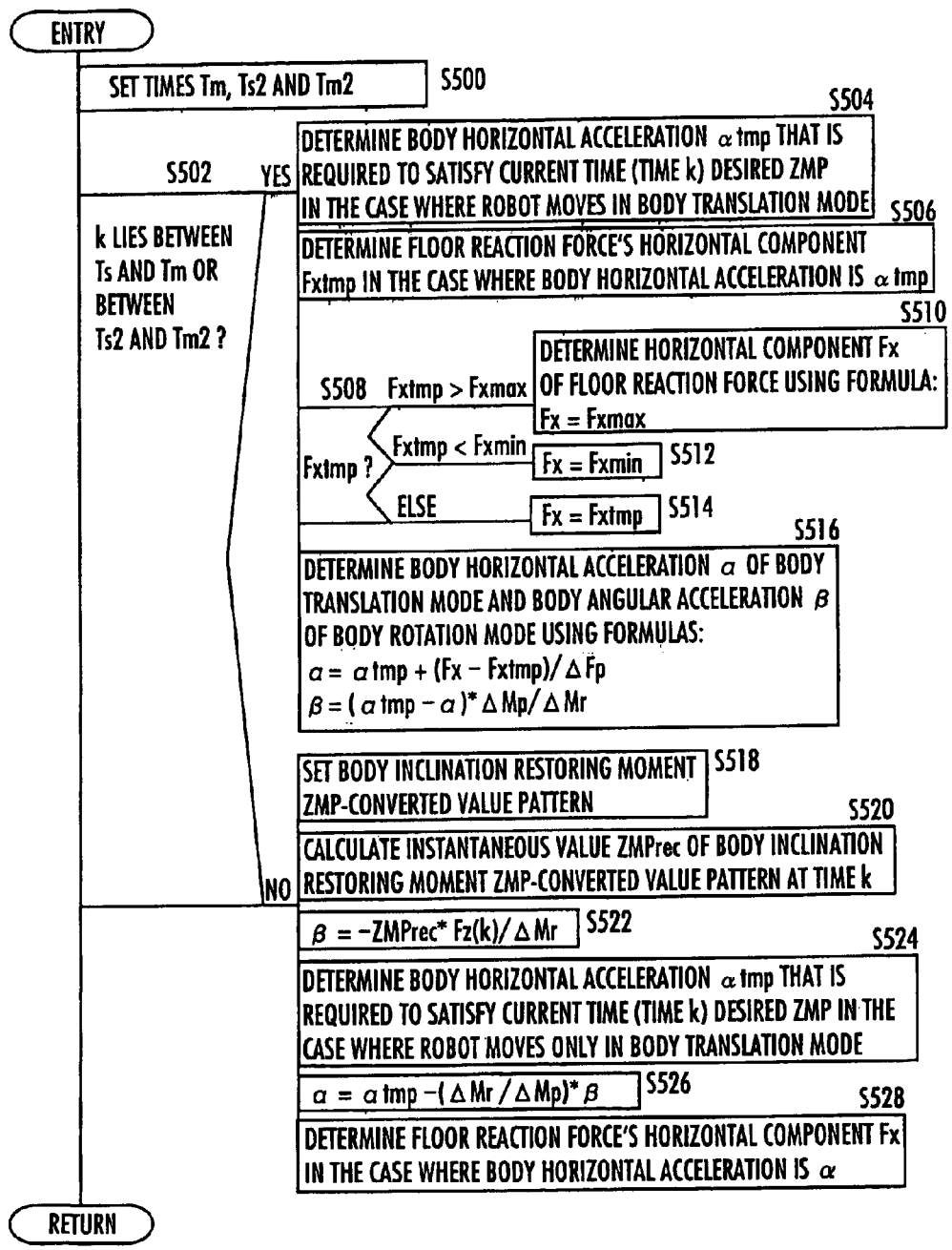
FIG. 22 is a flowchart showing subroutine processing of the flowchart in FIG. 21.

Next, processing proceeds to S912, where body horizontal acceleration and body posture angular acceleration of the provisional current time gait are determined to satisfy the desired ZMP (to cause the moment's horizontal component generated about the desired ZMP to be zero). Note that, these accelerations are determined so that the floor reaction force's horizontal component Fx does not exceed [Fxmin, Fxmax]. This processing is slightly different from the processing of the flowchart in FIG. 22 showing the details of S412 in FIG. 21.

Figure 37:
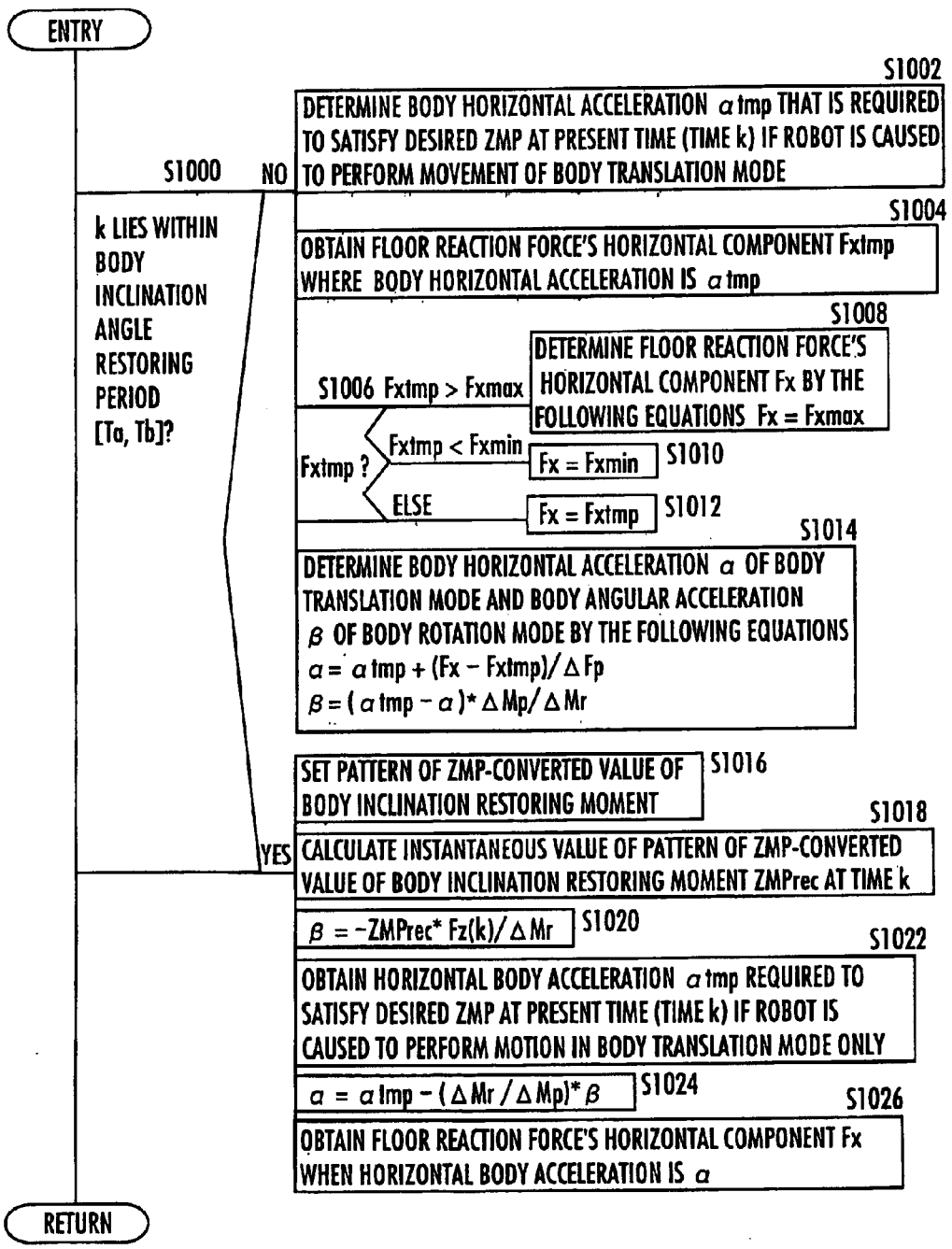
FIG. 37 is a flowchart showing subroutine processing of flowchart in FIG. 36.

To be specific, in S912, processing shown in the flowchart of FIG. 37 is performed. In the flowchart of FIG. 37, first of all, in S1000, it is determined whether or not time k is in the body posture angle recovery period [Ta, Tb] set in S612 in FIG. 32 described earlier.

If the determination result is NO (if the floor reaction force's horizontal component allowable limit is zero or narrow), processing from S1002 to S1014 is executed. The processing from S1002 to S1014 is the same as the processing from S504 to S516 in FIG. 22 described earlier. Thus, description thereof is omitted.

When the determination result in S1000 is YES, processing proceeds to S1016, where a pattern of body posture restoring moment ZMP-converted value ZMPrec is set. In this case, the ZMPrec is set to have a pattern with a constant value of zero (in other words, a pattern when the height of the trapezoid pattern shown in FIG. 26 is zero). This is different from S518 in foregoing FIG. 22 related to generation of the normal gait. Next, processing from S1018 to S1026 is performed. The processing from S1018 to S1026 is the same as the processing from S520 to S528 in foregoing FIG. 22. Thus, description thereof is omitted. Note that, in the processing from S1016 to S1026, the instantaneous value of the body posture restoring moment ZMP-converted value ZMPrec is always zero. Thus, body posture angular acceleration β of the body rotation mode obtained in S1020 is also zero. Therefore, only the processing of S1022, S1024 and S1026 may be performed with β=0. If the determination result in S1000 is YES, that is, during the body posture angle recovery period [Ta, Tb], β=0 as described above. Therefore, in the processing of S912, unlike the case of generating the normal gait, a movement trajectory of the body posture change in a recovery direction of the body posture angular velocity is not generated during the body posture angle recovery period [Ta, Tb] (period with sufficiently large floor reaction force's horizontal component allowable limit).

Note that, in this embodiment, the reference body posture is the vertical posture and the body posture angular acceleration by the reference body posture is thus zero. Therefore, the angular acceleration β of the body rotation mode obtained as described earlier is set as the body posture angular acceleration determined in the processing S912. However, when the reference body posture trajectory parameters are set to change the reference body posture, the body posture angular acceleration determined in the processing of S912 should be the sum of the angular acceleration β of the body rotation mode obtained as described earlier and the reference body posture angular acceleration.

After the processing of S912 in FIG. 36 is completed as above, processing next proceeds to S914, where the body horizontal acceleration obtained in S912 is sequentially integrated (cumulatively added from the current time gait's beginning (time k=0) to current time k), thus obtaining a body horizontal velocity. Further, the body horizontal velocity is sequentially integrated (cumulatively added from the current time gait's beginning (time k=0) to current time k), thus obtaining (the present value of) a body horizontal position. In addition, the body posture angular acceleration obtained in S912 is sequentially integrated (cumulatively added from the current time gait's beginning (time k=0) to current time k), thus obtaining a body posture angular velocity. Further, the body posture angular velocity is sequentially integrated (cumulatively added from the current time gait's beginning (time k=0) to current time k), thus obtaining the present value of a body posture angle. The processing of S914 is similar to the processing of S414 in FIG. 21.

The current time gait instantaneous value decision subroutine in S806 in FIG. 35 is executed as above, and processing next proceeds to S808, where the value of the gait generation time k is increased by a gait generation interval Δk. Next, processing returns to S804, and the processing of S806 and S808 is repeated as long as the conditions shown in S804 are applicable. Once the conditions shown in S804 are no longer applicable, that is, once generation of the provisional current time gait is completed to the end, processing proceeds to S704 in FIG. 34.

In S704, an final divergence component q0[k](k=Tcurr) is obtained using the equation in the drawing (foregoing Equation 10), from the body horizontal position velocity (Xe, Vxe) at the end of the current time gait obtained in S702 as above.

Next, processing proceeds S706, where an final divergence component error errq is obtained using the equation in the drawing. The final divergence component error errq is a difference between the current time gait final divergence component q0[k] and the normal gait initial divergence component q" (obtained in S224 in FIG. 19). Further, processing proceeds to S708, where it is determined whether or not the obtained final divergence component error errq is within the allowable range (a range near zero).

Figure 38:
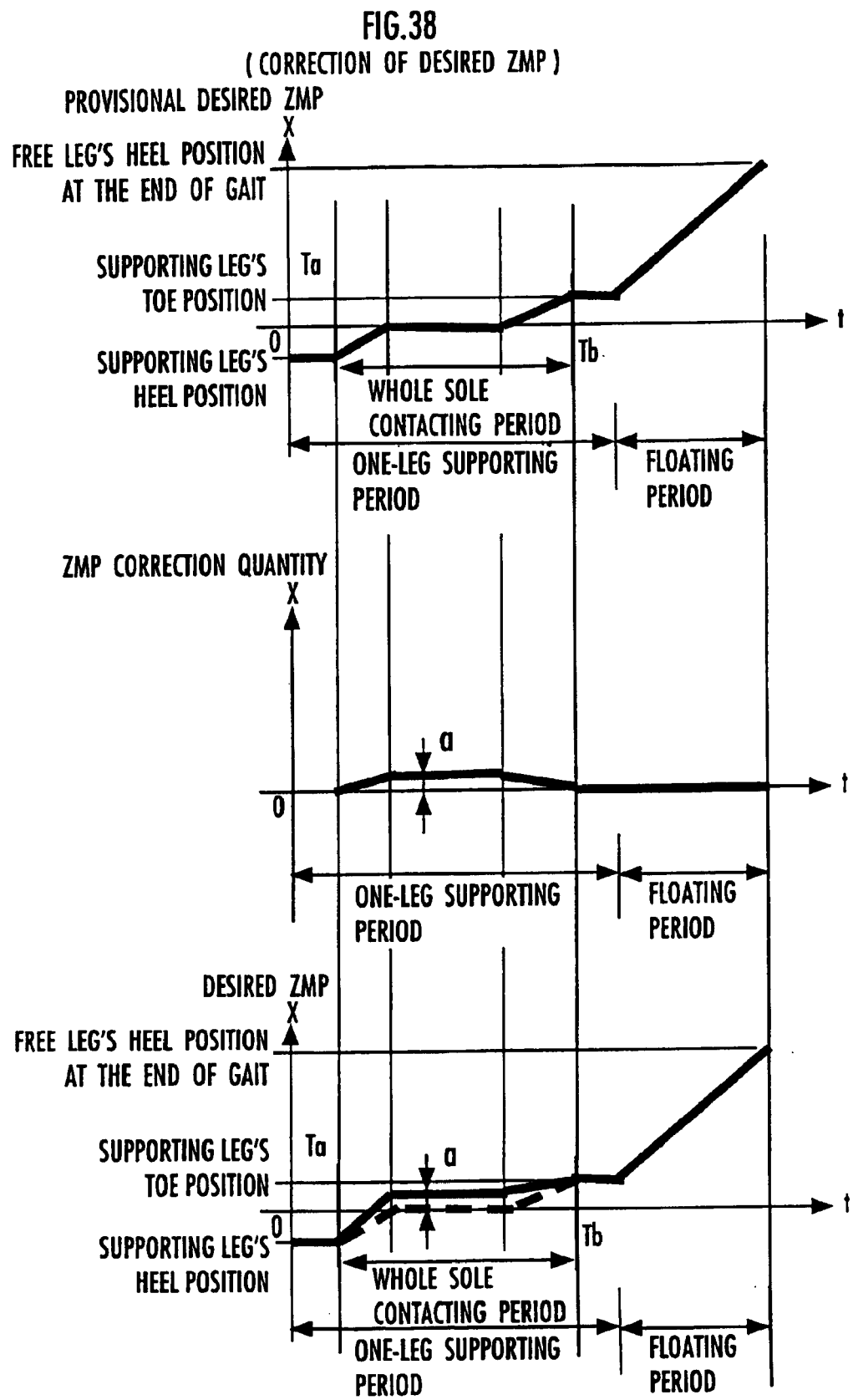
FIG. 38 is a diagram for explaining processing of an essential part of the flowchart in FIG. 37.

When the determination result in S708 is NO, processing proceeds to S710, where a=Δa is set (Δa is a predetermined minute amount), and the provisional current time gait until the end is calculated as in the case of foregoing S702, based on the desired ZMP obtained by adding a trapezoid-shaped correction to the current provisional desired ZMP pattern in accordance with the relation shown in FIG. 38. Here, referring to FIG. 38, a is the height of trapezoid pattern for correcting the provisional desired ZMP in order to permit the current time gait final divergence component to coincide with the normal gait initial divergence component as much as possible (to permit the body horizontal position/posture trajectories of the current time gait to be close to the body horizontal position/posture trajectories of the normal gait). In this case, in the present embodiment, the provisional desired ZMP is corrected during a period when almost entire bottom surface of the supporting leg foot 22 contacts the floor (entire foot bottom surface floor contacting period), that is, a period when the floor reaction force's horizontal component allowable limit is sufficiently large. Times of break points of the above-mentioned trapezoid pattern are set to coincide with the times of the break points of the provisional desired ZMP during the entire foot bottom surface floor contacting period. Note that, a=Δa is set in S710 in order to observe changes of the foregoing final divergence component error errg when the current provisional desired ZMP trajectory is corrected by the foregoing trapezoid pattern by a minute amount.

In S710, the provisional current time gait is generated to the end when a=Δa is set and the provisional desired ZMP trajectory is corrected. Thereafter, processing proceeds to S712. In S712, based on body horizontal position/velocity (Xe1, Vxe1) at the end of the provisional current time gait obtained in S710, an final divergence component q1[k] of the provisional current time gait is obtained using the equation in the drawing (foregoing Equation 10).

In this embodiment, in S710, Δa is a constant of a minute amount set as appropriate. However, Δa may be set to be decreased by a repeat operation described below as the final divergence component error errq becomes small. Nevertheless, even when the Δa is a constant, the final divergence component error errq can remain within the allowable range by several repeat operations.

Next, processing proceeds to S714, where parameter sensitivity r (a rate of change of the final divergence component error relative to Δa) is obtained from the equation in the drawing. Further, processing proceeds to S716, where a=−errq/r is set, that is, the height a of the trapezoid pattern is set as a value obtained by dividing the final divergence component error errq obtained in S706 by the parameter sensitivity r obtained in S714. In addition, a correction amount having the trapezoid pattern with the height a is added to the provisional desired ZMP pattern in accordance with the relation shown in FIG. 38, thus correcting the provisional desired ZMP pattern (thus determining new provisional desired ZMP pattern).

Next, processing returns to S702. Thereafter, the processing of S702 to S716 described above is repeated as long as the determination result in S708 is NO. When the determination result is YES, processing exits the repeating loop (S700) and proceeds to S718.

In S718, based on a difference between the final body posture angle of the provisional current time gait and the initial body posture angle of the normal gait, a difference between the final body posture angular velocity of the provisional current time gait and the initial body posture angular velocity of the normal gait, and the like, a pattern of a ZMP-converted value of the body posture restoring moment (ZMPrec) of the current time gait is determined so that the body posture angle of the current time gait becomes close to the body posture angle of the normal gait. The ZMPrec determined here is for correcting the provisional desired ZMP so that the coincidence of the current time gait final divergence component with the normal gait initial divergence component is maintained (the condition in S708 is maintained) even when the body posture angular acceleration is generated to allow the body posture angle trajectory of the current time gait to continue (to be close) to that of the normal gait during a period when the floor reaction force's horizontal component allowable limit is sufficiently large (period within the one-leg supporting period) in later-described processing for generating current time gait instantaneous values.

The ZMPrec has a trapezoid-shaped pattern, as in the case of the ZMPrec described in the foregoing normal gait generation processing. Specifically, the ZMPrec is determined as follows. In the trapezoid pattern of the ZMPrec shown in FIG. 26, the times of peaks (break points) of the trapezoid are set to be known (to be more specific, the times of break points of the trapezoid are caused to meet the times of break points of the desired ZMP), and the height of the trapezoid is set to be unknown. Thereafter, the height of the trapezoid (parameter) of the ZMPrec is obtained as described below. In S718, Tm and Ts2 in FIG. 26 are substituted by Ta and Tb, respectively.

When the number of the unknown parameter of the pattern of the body posture restoring moment ZMP-converted value is one as above, it is generally impossible that both body posture angle and body posture angular velocity at the end of the current time gait sequentially continue to those of the normal gait. Therefore, in this embodiment, the unknown parameter is determined so that a state of a generated gait gets gradually closer to a state of the normal gait through a plurality of steps.

Supplementarily, it may be possible to make the ZMPrec pattern in one gait complicated and to have two or more unknown parameters in order to cause both body posture angle and body posture angular velocity to sequentially continue to those of the normal gait. However, there is a possibility that the ZMPrec pattern excessively fluctuates in a zig-zag manner.

Hereinbelow, after description of a principle of calculation, a calculation procedure is described.

Obtained is a difference between the final body posture angle of the provisional current time gait and the initial body posture angle of the normal gait, and this difference is set as $\theta err$. The provisional current time gait is obtained in S702 as described above with the height of the trapezoid of the ZMPrec pattern set as zero. Further, a difference between the final body posture angular velocity of the provisional current time gait and the initial body posture angular velocity of the normal gait is obtained and set as $v\theta err$.

Here, it is assumed that the current time gait is generated while letting the height of the trapezoid of the ZMPrec pattern be a given value bcurr, and the first turning gait is subsequently generated by algorithm similar to that of the current time gait. The pattern of body posture restoring moment ZMP-converted value ZMPrec of the first turning gait is set as the sum of the ZMPrec pattern of the first turning gait obtained in S518 in FIG. 22 (trapezoid pattern in FIG. 26 whose height is acyc1 described earlier) and a given value b1.

A gait generated as above is referred to as a ZMPrec corrected gait, and body posture angle and its angular velocity at the end of the gait (end of the first turning gait) are set as $\theta 1$ and $v\theta 1$, respectively.

Body posture angle and its angular velocity at the first turning gait's end of the original normal gait are set as $\theta 1 org$ and $v\theta 1 org$, respectively. The original normal gait (normal gait in a case where the body posture angle and its angular velocity at the normal gait's beginning, ultimately determined by Equations 30 and 31 of S310, are set as initial values, and the ZMPrec pattern is set as the pattern obtained in S518 (trapezoid pattern in FIG. 26 whose height is acyc1)) is obtained upon completion of the processing of the subroutine in S024 for obtaining the initial state of the normal gait.

Here, $\Delta\theta 1$ and $\Delta v\theta 1$ are defined as follows.

$$\Delta\theta 1 = \theta 1 - \theta 1 org \qquad \text{Equation 50}$$

$$\Delta v\theta 1 = v\theta 1 - v\theta 1 org \qquad \text{Equation 51}$$

$\Delta\theta 1$ and $\Delta v\theta 1$ mean a difference between the body posture angles and a difference between angular velocities of the ZMPrec corrected gait and the original normal gait, respectively, at the point where both gaits are generated to the end of the first gait. If $\Delta\theta 1$ and $\Delta v\theta 1$ are zero, the second turning gait where the height of trapezoid of the ZMPrec pattern is set as acyc2, is generated subsequently to the ZMPrec corrected gait by algorithm similar to that of the current time gait. Thus, the second turning gait coincides with the original normal gait.

Therefore, the current time gait trapezoid height bcurr, and the first turning gait trapezoid height b1 are obtained so that $\Delta\theta 1$ and $\Delta v\theta 1$ become zero. The obtained bcurr can be finally determined as the trapezoid height of the current time gait.

Incidentally, the dynamic model related to the body posture angle of the robot 1 has a linear characteristics like the flywheel FH shown in FIG. 10. Therefore, $\Delta\theta 1$ and $\Delta v\theta 1$ have the following relations with the current time gait trapezoid height bcurr, the first turning gait trapezoid height b1, the difference $\theta err$ between the final body posture angle of the provisional current time gait and the initial body posture angular velocity of the normal gait, and the difference $v\theta err$ between the final body posture angle of the provisional current time gait and the initial body posture angular velocity of the normal gait.

$$\Delta\theta 1 = c11*bcurr + c12*b1 + \theta err + e1*v\theta err \qquad \text{Equation 52}$$

$$\Delta v\theta 1 = c21*bcurr + c22*b1 + e2*v\theta err \qquad \text{Equation 53}$$

where c11, c12, c21, c22, e1 and e2 are coefficients uniquely determined by parameters (particularly, parameters related to time) of the current time gait, a gait period of the first turning gait, and the pattern of the body posture restoring moment ZMP-converted value ZMPrec, and the like.

Based on the above principle, the difference $\theta err$ between body posture angles and the difference $v\theta err$ between angular velocities at the boundary of the provisional current time gait and the normal gait are first obtained as the calculation procedure.

Next, c11, c12, c21, c22, e1, and e2, the coefficients of Equations 52 and 53, are obtained based on the parameters (particularly, parameters related to time) of the current time gait, the gait period of the first turning gait and the pattern of the body posture restoring moment ZMP-converted value ZMPrec, and the like.

Next, the current time gait trapezoid height bcurr and the first turning gait trapezoid height b1 are determined so that the right sides of Equations 52 and 53 become zero. In other words, bcurr and b1 are obtained by solving a simultaneous equation in which the right sides of Equations 52 and 53 are zero.

Finally, the height of the trapezoid pattern of the body posture restoring moment ZMP-converted value (ZMPrec) of the current time gait is set as bcurr, the current time gait trapezoid height obtained above.

Next, processing proceeds to S720, where a desired ZMP pattern of the current time gait is determined. This desired ZMP pattern is a pattern obtained by adding the pattern of the body posture restoring moment ZMP-converted value obtained in S718 as above to the current provisional desired ZMP pattern (provisional desired ZMP pattern when processing exits the repeating loop in S700). Note that, this processing is similar to the processing in S710 to add the trapezoid pattern with the height $\Delta a$ to the provisional desired ZMP pattern.

Described below is the reason why the pattern of the body posture restoring moment ZMP-converted value is added to the provisional desired ZMP pattern.

As described earlier, the provisional current time gait generated in the loop of S700 is generated where the body posture restoring moment ZMP-converted value ZMPrec is zero (the height parameter of the trapezoid pattern of the ZMPrec is zero). In the provisional current time gait finally generated in the loop of S700 as above, the body posture velocity continues to or becomes close to that of the normal gait. However, the body posture angle shifts from the body posture angle of the normal gait or diverges in some cases.

The pattern of the body posture restoring moment ZMP-converted value obtained in S718 generates a body posture angular acceleration for reducing the shift of the body posture angle from that of the normal gait to zero.

However, if the body posture angular acceleration in accordance with the pattern of the body posture restoring moment ZMP-converted value obtained in S718 is generated without correcting the provisional desired ZMP pattern finally obtained in the loop of S700, a body horizontal position trajectory has to be shifted from the body horizontal position trajectory of the foregoing provisional current time gait in order to satisfy the dynamic equilibrium conditions (where the moment, except for the vertical component, acted on the desired ZMP by the resultant force of the inertial force and gravity of the robot becomes zero). Therefore, in this embodiment, the provisional desired ZMP pattern is corrected by the ZMPrec so that the body horizontal position trajectory does not need to be shifted from the body horizontal position finally obtained in the loop of S700.

If the body posture angular acceleration corresponding to the pattern of the body posture restoring moment ZMP-converted value obtained in S718 is generated on top of the movement of the aforementioned provisional current time gait, the ZMP (a point at which the moment, except for the vertical component, of the resultant force of the inertial force and gravity generated by movement becomes zero) shifts by the body posture restoring moment ZMP-converted value. Therefore, on the other hand, a pattern obtained by adding the pattern on the body posture restoring moment ZMP-converted value to the provisional desired ZMP pattern is set as the desired ZMP pattern. Thereafter, the current time gait which satisfies the desired ZMP pattern is generated while generating the body posture angular acceleration in the body rotation mode corresponding to the pattern of the body posture restoring moment ZMP-converted value obtained in S718. Thus, the current time gait becomes the body translation movement, which is the same as the foregoing provisional current time gait.

The foregoing is the reason why the desired ZMP pattern is set as the pattern obtained by adding the pattern of the body posture restoring moment ZMP-converted value to the provisional desired ZMP pattern.

Returning to FIG. 12, after the current time gait parameters are corrected as above in S028, processing proceeds to S029, where parameters are determined which define the allowable range of the floor reaction force's moment about the desired ZMP (to be more specific, a horizontal component of the floor reaction force's moment). Note that, the floor reaction force's moment is divided by the floor reaction force's vertical component, and the resulting value expresses a deviation of the ZMP (floor reaction force central point) from the desired ZMP. Hence, the parameters of the allowable range of ZMP which have been converted into the floor reaction force central point (floor reaction force central point allowable range) may be set by dividing the floor reaction force's moment allowable range by the floor reaction force's vertical component.

The floor reaction force's moment allowable range determined in S029 is a allowable range of an actual floor reaction force's moment about the desired ZMP, controlled by control processing (compliance control) of the foregoing composite-compliance operation determinator 104. The allowable range of floor reaction force's moment is described hereinbelow.

The compliance control by processing of the composite-compliance operation determinator 104 controls the position/posture of the foot 22 so that the floor reaction force's moment generated about the desired ZMP becomes the desired floor reaction force's moment for compliance control. When the compliance control is operated faithfully as desired, the actual floor reaction force central point shifts to a point where a value obtained by dividing the desired floor reaction force's moment by the vertical floor reaction force is added to or subtracted from the desired ZMP. The actual floor reaction force central point cannot exceed a range, expressed as a so-called support polygon, where the ZMP can exist (strictly speaking, a range where a point of action of the actual floor reaction force central point can exist). However, if the actual floor reaction force seems about to exceed the range (in other words, the actual floor reaction force central point is too close to the boundary of the range where the ZMP can exist), problems occur such as lowering foot 22's original sense of contact with the floor and raising foot 22's bottom surface.

The floor reaction force's moment allowable range is for limiting the desired floor reaction force's moment of the compliance control, in order to prevent such problems. To be precise, the floor reaction force's moment allowable range is set for a recovery condition 1 described in the second embodiment described later. However, in the case of satisfying forgoing Equation d27 like this embodiment, setting the floor reaction force's moment allowable range for the recovery condition 1 is equivalent to limiting the desired floor reaction force's moment for compliance control not to exceed the floor reaction force's moment allowable range.

Therefore, it is preferred that the floor reaction force's moment allowable range be set so that the floor reaction force central point allowable range obtained by dividing the floor reaction force's moment allowable range by the floor reaction force's vertical component, is included in the range where the ZMP can exist.

To be more specific, the floor reaction force central point allowable range (ZMP allowable range) should be determined to correspond to the support polygon, and generally has a complicated shape. Here, however, the allowable range is basically set as a rectangle region on the floor surface in order to simplify the calculation. In other words, the floor reaction force central point allowable ranges, thus, the floor reaction force's moment allowable ranges obtained by converting the floor reaction force central point into the floor reaction force's moment, are set independently for a component in the front-and-back direction (X-axis direction) and a component in the right-and-left direction (Y-axis direction).

Figure 39:
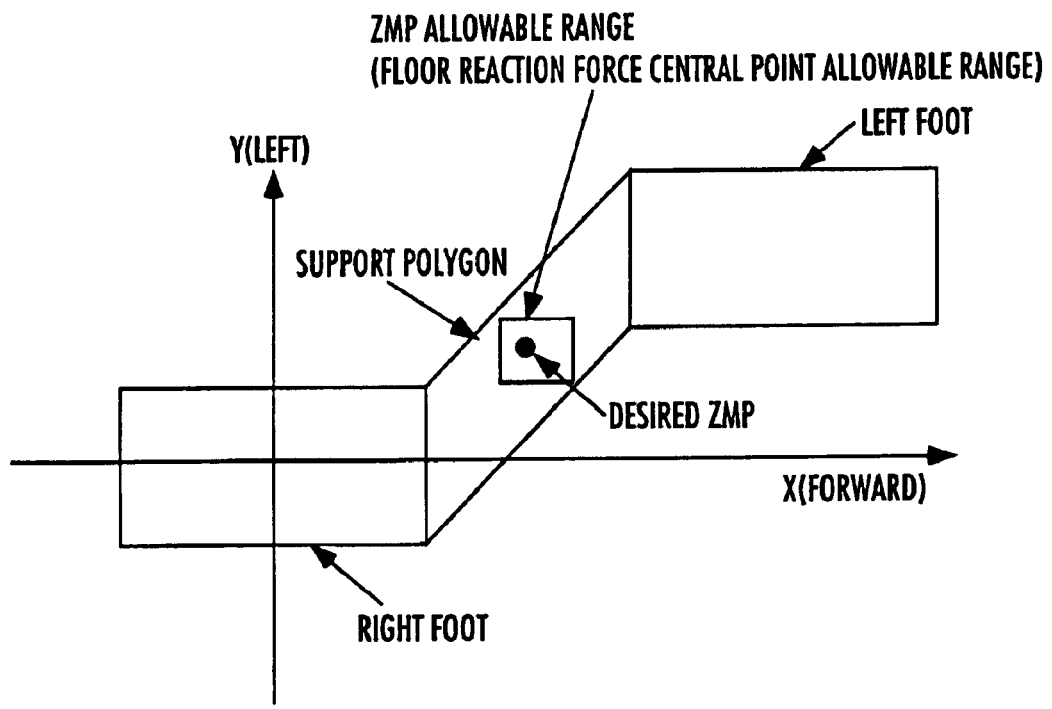
FIG. 39 is an explanatory view showing an example of setting a ZMP allowable range.

For example, when the support polygon and the desired ZMP are in a situation shown in FIG. 39, the ZMP allowable range is set to be included in the support polygon as shown in the drawing. At the same time, the ZMP allowable range is set to include the desired ZMP. Note that the support polygon in the example in FIG. 39 is the one during the two-leg supporting period in the walking gait (supplementary description will be specifically provided later regarding gait generation related to the walking gait). Rectangular portions on both sides of the support polygon represent positions of the feet 22 of the respective legs 2. The right foot 22 contacts a floor with its toe, and the left foot 22 contacts the floor with its heel.

During the one-leg supporting period in the walking gait or the running gait in foregoing FIG. 5, the support polygon is a contact surface (surface contacting the floor surface) of the supporting leg foot 22. In this case, the ZMP allowable range is set to include the desired ZMP and to be included in the support polygon or to almost coincide with the support polygon. During the floating period of the running gait in foregoing FIG. 5, the ZMP allowable range is set as, for example, a region with zero width in both X-axis and Y-axis directions about the desired ZMP set as the center, that is, a point of the desired ZMP itself (which means a region with zero area).

Returning back to FIG. 12, after the floor reaction force's moment allowable range is determined in S029 as described above, or when the determination result in S016 is NO, processing proceeds to S030, where current time gait instantaneous values are determined. In S030, the gait instantaneous values are determined so that the model manipulation floor reaction force's moment determined in accordance with foregoing Equation d26 is generated about the desired ZMP.

Figure 40:
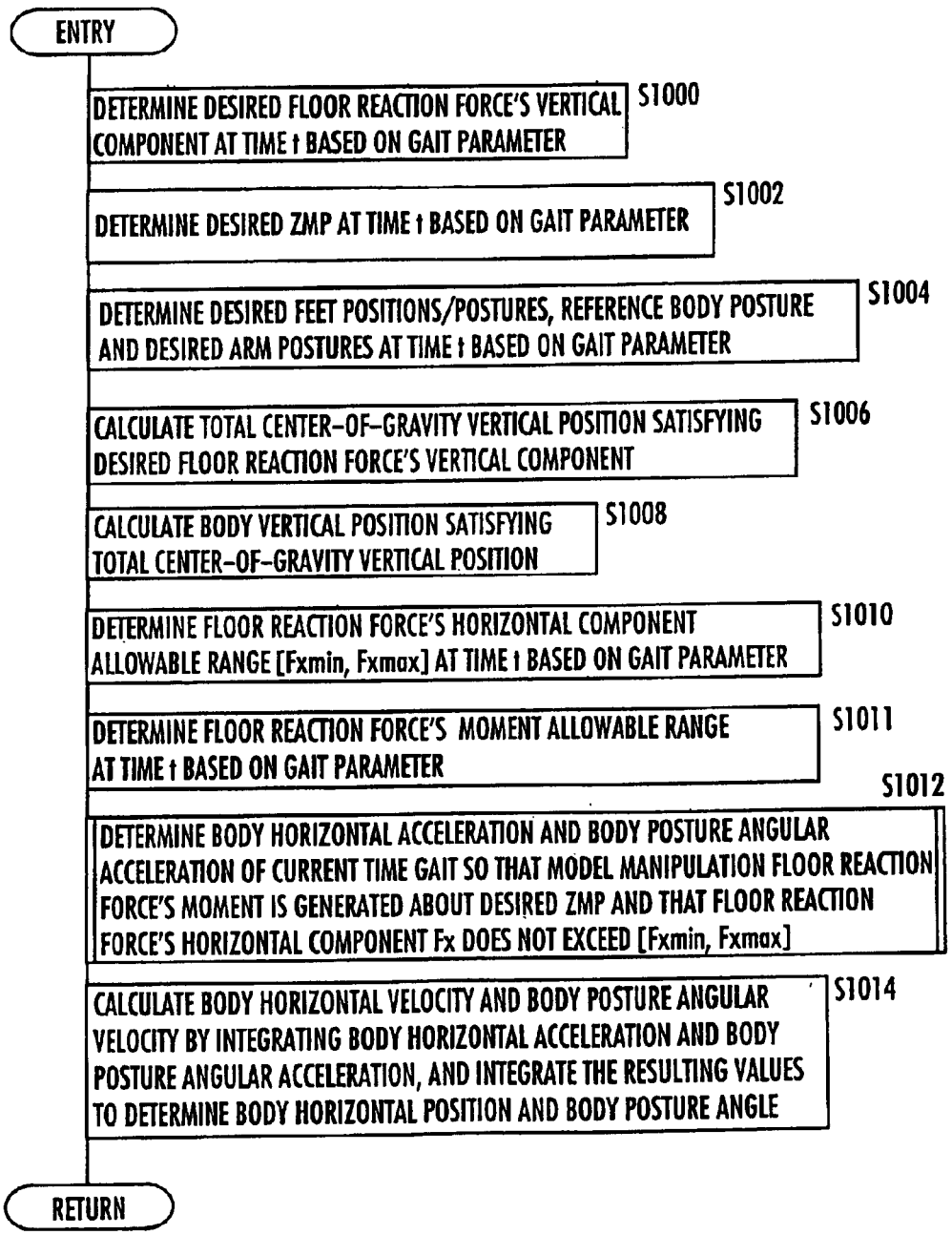
FIG. 40 is a flowchart showing a subroutine processing of the flowchart in FIG. 12.
Figure 41:
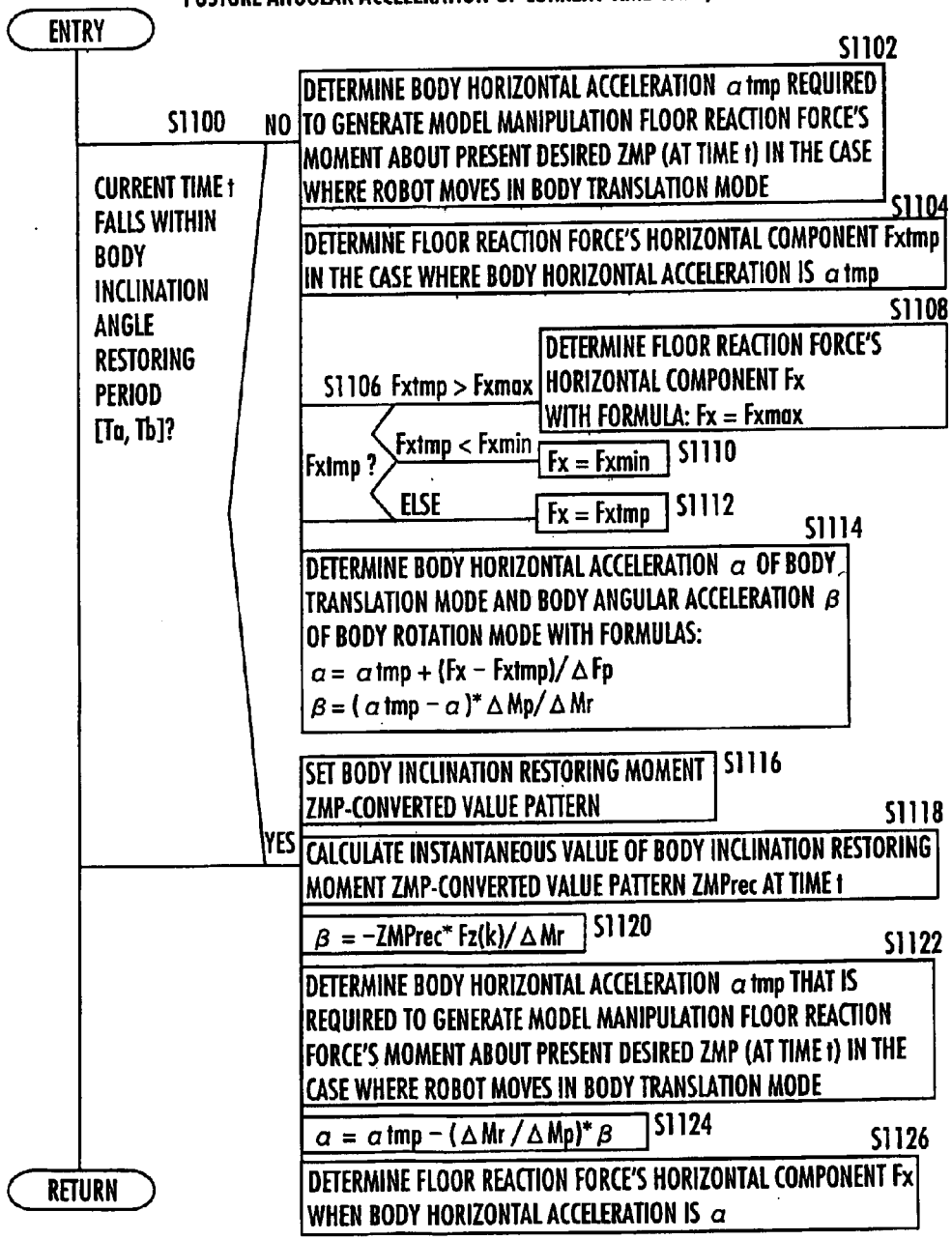
FIG. 41 is a flowchart showing a subroutine processing of the flowchart in FIG. 40.

Specifically, the gait instantaneous values are determined in accordance with the flowcharts in FIGS. 40 and 41. In other words, in S030, processing from S1000 to S1010 in FIG. 40 is first executed. The processing from S1000 to S1010 is exactly the same as the processing from S900 to S910 in foregoing FIG. 36.

Next, processing proceeds to S1011, where an instantaneous value (present value at current time t) of the floor reaction force's moment allowable range is obtained based on the parameters of the floor reaction force's moment allowable range determined in S029 in foregoing FIG. 12. The floor reaction force's moment allowable range obtained is transmitted to the foregoing compensated total floor reaction force's moment distributor 110 (see FIG. 3). Thereafter, a present value (value at current time t) of the model manipulation floor reaction force's moment calculated by foregoing Equation d26 in the distributor 110 is given to the gait generating device 100.

Next, the processing of the gait generating device 100 proceeds to S1012, where body horizontal acceleration and body posture angular acceleration of the current time gait are determined so that the model manipulation floor reaction force's moment given from the compensated total floor reaction force's moment distributor 110 is generated about the desired ZMP. Note that the body horizontal acceleration and body posture angular acceleration are determined to prevent the floor reaction force's horizontal component Fx from exceeding the floor reaction force's horizontal component allowable limit [Fxmin, Fxmax] determined in S608 in FIG. 32.

In other words, the body horizontal acceleration and body posture angular acceleration of the current time gait are determined so that the moment acted about the desired ZMP by the resultant force of the inertial force and gravity becomes a moment obtained by changing the sign of the model manipulation floor reaction force's moment. Note that the body horizontal acceleration and body posture angular acceleration are determined to prevent a force obtained by changing the sign of an inertial force's horizontal component from exceeding the floor reaction force's horizontal component allowable limit [Fxmin, Fxmax].

Specifically, in S1012, the body horizontal acceleration and body posture angular acceleration are determined following the flowchart shown in FIG. 41. Description thereof is as follows. First of all, in S1100, it is determined whether or not the current time t is within the body inclination angle recovery period [Ta, Tb] described with respect to the processing of S612 in foregoing FIG. 33. In other words, it is determined whether or not the current time t is within a period during which the floor reaction force's vertical component and floor reaction force's horizontal component can be generated with sufficiently large magnitudes.

If the determination result in S1100 is NO, processing proceeds to S1102. In S1102, obtained is a body horizontal acceleration αtmp required to generate the model manipulation floor reaction force's moment about the desired ZMP at present time t when movement of the body translation mode is performed. For example, αtmp is obtained by using foregoing Equation 03 related to the dynamic model in foregoing FIG. 10. To be more specific, accelerations of the supporting leg material particle 2m and free leg material particle 2m at current time k is obtained using time series values of the desired foot position/posture obtained up to the current time k. At the same time, positions of the supporting leg material particle 2m and free leg material particle 2m are obtained using the (present) desired foot position/posture at the current time k. Further, the desired total center-of-gravity vertical position at the current time k is obtained by using the (present) desired floor reaction force's vertical component at the current time k, and the vertical position of the body material particle 24m is obtained from the vertical positions of the supporting leg material particle 2m and free leg material particle 2m as well as the desired total center-of-gravity vertical position. At the same time, the vertical acceleration of the body material particle 24m at the current time k is obtained using time series values of the desired body vertical position obtained up to the current time k. These values obtained above are then substituted for foregoing Equation 03, the model manipulation floor reaction force's moment is set as My in Equation 03, and d2θby/dt2 of Equation 03 is set to be zero. The equation thus obtained is then solved for d2Xb/dt2, thus obtaining d2Xb/dt2 as the body horizontal acceleration αtmp. Note that, by the use of a more rigorous dynamic model, the body horizontal acceleration αtmp may also be searchingly obtained, which causes the horizontal component of the floor reaction force's moment about the desired ZMP to be the model manipulation floor reaction force's moment. Moreover, in this embodiment, the reference body posture is the vertical posture, and the body posture angular acceleration by the reference body posture is thus zero. Hence, the body horizontal acceleration αtmp is obtained while setting the angular acceleration of the body rotation mode to be zero. However, when the reference body posture trajectory parameters are set to change the reference body posture, and if the reference body posture angular acceleration at the current time k, defined by the parameters, is not zero, the angular acceleration of the body rotation mode is set to be the reference body posture angular acceleration which is not zero. The body horizontal acceleration αtmp is then obtained by the use of the dynamic model. (For example, d2θby/dt2 of Equation 03 is set to be the reference body posture angular acceleration and the body horizontal acceleration αtmp is obtained as in the case of the above.)

Next, processing proceeds from S1104 to S1114, where processing same as that from S1004 to S1014 in foregoing FIG. 37 is executed.

When the determination result in S1100 is YES, processing proceeds to S1116, where a pattern of a body posture restoring moment ZMP-converted value (ZMPrec) is set. In S1100, the ZMPrec pattern is set as a pattern of the ZMP-converted vale of body posture restoring moment (ZMPrec) set in S718 in FIG. 34, unlike the one in S1016 in FIG. 37.

Next, processing proceeds to S1118 and 1120, where processing same as that of S1018 and S1020 in FIG. 37 is executed. In this case, however, the ZMPrec pattern is not zero. Therefore, in general, the body posture angular acceleration β for body posture recovery obtained in S1120 is not zero.

Next, processing proceeds to S1122. In S1122, if movement of the body translation mode is performed, obtained is a body horizontal acceleration αtmp required to generate the model manipulation floor reaction force's moment about the desired ZMP at present time. This processing is the same as that of S1102.

Next, processing proceeds to S1124 and S1126, where processing same as that of S1024 and S1026 in FIG. 37 is executed. Thus, processing of S1012 in FIG. 40 is completed.

After performing the processing of S1012 as above, processing proceeds to S1014, where the processing same as that of S914 in FIG. 36 is executed, thus determining a body horizontal position and a body posture angle (specifically, present values of them at the current time t) of the current time gait. Thus, the processing of S030 in FIG. 12 is completed.

Next, processing proceeds to S032, where movements of arms for canceling a spin force (for causing the floor reaction force's moment vertical component generated about the desired ZMP by movement of the robot 1 other than the arms' movements to be nearly zero) are determined. Specifically, obtained is a floor reaction force's moment vertical component trajectory at the desired ZMP when the arms are not swung (precisely, a trajectory obtained by changing a sign of each instantaneous value of the vertical component trajectory of the moment acted on the desired ZMP by the resultant force of the gravity and inertial force of the robot 1, in the case where a gait is generated without swings of arms). In other words, an instantaneous value of the floor reaction force's moment vertical component about the (instantaneous value of) desired ZMP is obtained, and this instantaneous value balances with the instantaneous value of the movement of the gait (excluding arm swinging movements) generated by the processing in S030. Further, the instantaneous value of the floor reaction force's moment vertical component is divided by an equivalent inertia moment of arm swinging movement, thus obtaining angular accelerations of the arm swinging movements, required for canceling the spin force. Supplementarily, if the arms are swung too much, the instantaneous value of the floor reaction force's moment vertical component can be divided by a value larger than the equivalent inertia moment.

Next, each angular acceleration is second-order integrated, and then passed through a low-cut filter for preventing the integral from being too large. The angle thus obtained is set as an arm swinging movement angle. Note that, in the arm swinging movements, the right and left arms are swung to the front and back in the opposite directions to each other, in order not to change the center of gravity of both arms. It is also possible that the arm swinging movements for canceling the spin force are generated in the normal gait, and arm swinging movements in the current time gait are determined so as to continue to those of the normal gait.

Next, processing proceeds to S034, where the control cycle Δt is added to time t. Thereafter, processing returns to S014, and waits for timer interruption per control cycle.

Figure 42:
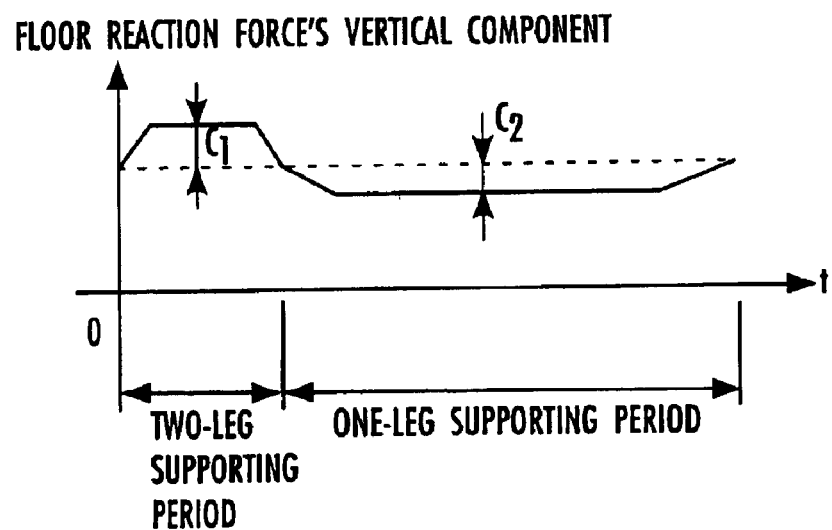
FIG. 42 is a diagram showing an example of setting a desired floor reaction force's vertical component in a walking gait.

The above-described generation processing of the desired gait has been described, taking the running gait in foregoing FIG. 5 as an example. However, even when the walking gait of the robot 1 is generated, a desired gait can be generated as in the case of the above. In this case, the floor reaction force's vertical component trajectory (trajectory for one step) may be set to have a broken line-shaped pattern as shown in FIG. 42, for example. To be more specific, in this example, the floor reaction force's vertical component trajectory for the walking gait during the two-leg supporting period is set to have a trapezoid shape which projects to the increasing side of the floor reaction force's vertical component (projects upward). During the one-leg supporting period, the floor reaction force's vertical component trajectory for the walking gait is set to have a trapezoid shape which projects to the decreasing side of the floor reaction force's vertical component (projects downward). In this case, it is preferred to determine heights C1, C2 and the like of these two trapezoid portions of the floor reaction force's vertical component trajectory in the following manner. By the use of the body height decision method (see Japanese Patent Laid-Open Publication No. Heisei 10-86080; more specifically, the method and the like shown in FIG. 6 of the publication) earlier proposed by the applicant of the application concerned, a body vertical position trajectory is obtained as a reference body vertical position trajectory. This body vertical position trajectory satisfies a predetermined geometrical condition (condition for preventing the respective legs 2 and 2 from being fully stretched) related to displacement of the joints (specifically, knee joints) of the legs 2 and 2 of the robot 1. Thereafter, the heights C1 and C2 of two trapezoid portions of the floor reaction force's vertical component trajectory are determined so that the characteristic amount (for example, a difference between maximum and minimum values) with respect to the form of the body vertical position trajectory matches the characteristic amount (for example, a difference between maximum and minimum values) of the aforementioned reference body vertical position trajectory. The body vertical position trajectory corresponds to the total center-of-gravity vertical position trajectory of the robot 1 obtained by second-order integration of the floor reaction force's vertical component trajectory from the beginning to the end of the gait. In this case, in the floor reaction force's vertical component trajectory for the walking gait, an average value of the floor reaction force's vertical components within one cycle is caused to almost coincide with the self weight of the robot 1, as in the case of setting the floor reaction force's vertical component trajectory for the running gait.

The desired gait generation processing in the gait generating device 100 is performed as described so far, and instantaneous values of desired body position/posture, desired foot position/posture, desired arm postures, desired ZMP and desired total floor reaction force are sequentially determined and outputted. In this case, as for the desired total floor reaction force, only a component(s) required for compliance control may be outputted. The desired ZMP is stated as an output though it is included in the desired total floor reaction force. This is because the desired ZMP is particularly important. Further, the model manipulation floor reaction force's moment is not outputted to the composite-compliance control device (portion surrounded by a dotted line in FIG. 4) as the desired floor reaction force. In other words, a desired floor reaction force which targets zero floor reaction force's moment about the desired ZMP is outputted from the gait generating device 100 to the compliance control.

Operation 1 of the above-described embodiment is as follows. A movement of a desired gait is generated so that the model manipulation floor reaction force's moment is generated about the desired ZMP. At the same time, though, the movement of a desired gait is controlled so that the model manipulation floor reaction force's moment is not added to the floor reaction force of the actual robot 1. Therefore, an imbalance between the movement of the desired gait and the floor reaction force occurs commensurate with absence of the model manipulation floor reaction force's moment. This is equivalent to that a floor reaction force's moment obtained by changing the sign of the model manipulation floor reaction force's moment is acted on the actual robot 1, with regard to an effect of converging the difference between the body posture angle of the actual robot 1 and the body posture angle of the desired gait to zero.

Specifically, the gait of the actual robot 1 can be converged to the corrected desired gait by determining the model manipulation floor reaction force's moment as appropriate. In other words, the position of the actual robot 1 can be stabilized.

Operation 2 is that the total recovering force is the sum of the moment obtained by changing the sign of the model manipulation floor reaction force's moment and the desired floor reaction force's moment for compliance control. In other words, the total recovering force is a difference between the desired floor reaction force's moment for compliance control and the model manipulation floor reaction force's moment.

Moreover, Operation 3 is as follows. The model manipulation floor reaction force's moment can be any value without consideration of the range where the ZMP can exist. Thus, a very high posture recovering force can be generated.

Note that Operations 1, 2 and 3 are similar to those of the technology in Japanese Patent Laid-Open Publication No. Heisei 5-337849 earlier proposed by the applicant of the application concerned.

Moreover, Operation 4 is as follows. The body translational acceleration of the body translation mode and the body posture angular acceleration of the body rotation mode are determined so that the floor reaction force's horizontal component does not exceed the floor reaction force's horizontal component allowable limit. Thus, the robot 1 can be prevented from slipping at time when a large floor reaction force's horizontal component cannot be generated, such as time immediately before lifting and immediately after landing of the leg 2 on the supporting leg side in the running gait. The robot 1 can also be prevented from slipping even when the robot 1 moves on a floor with a small coefficient of friction.

Further, Operation 5 is as follows. The floor reaction force's horizontal component allowable limit is set to be zero during a period when the translation vertical component of the floor reaction force is zero, that is, a period when both legs do not contact the floor. Therefore, the posture is recovered automatically by the algorithm of this embodiment described above, depending on the body rotation mode without depending on the body translation mode. Thus, the posture is recovered without depending on a frictional force between the floor and the bottom of the foot. Hence, a posture recovery effect acts even in the above period (floating period) in a different manner from the method of merely correcting the body translation mode. Note that, during this period, the floor reaction force's horizontal component is generated to be zero. Thus, the total center-of-gravity horizontal acceleration of the gait becomes zero.

Yet further, Operation 6 is that the model manipulation floor reaction force's moment is not outputted to the compliance control as a desired floor reaction force, as described earlier. In other words, even when a gait is generated so that the model manipulation floor reaction force's moment is generated about the desired ZMP, a desired floor reaction force which targets zero floor reaction force's moment about the desired ZMP is given from the gait generating device 100 to the compliance control. Therefore, a floor reaction force control by the compliance control can be appropriately performed without interruption. To be more specific, occurrence of problems, such as lowering foot 22's original sense of contact with the floor and raising foot 22's bottom surface, can be prevented or suppressed.

Note that, as described later, the desired floor reaction force's moment for compliance control about the desired ZMP is determined not to exceed the floor reaction force's moment allowable range.

Operation 7 is as follows. A gait generated so that the moment generated about the desired ZMP becomes zero, is called an original gait. A gait generated so that the moment generated about the desired ZMP becomes the model manipulation floor reaction force's moment as this embodiment described above, is called a corrected gait. The original gait and the corrected gait are usually different gaits. The original gait is set so as to approach gradually the normal gait. Therefore, the corrected gait is usually a gait which does not gradually approach the normal gait.

However, immediately after completion of current time gait (corrected gait) generation, the processing from S020 to S028 is executed again. Therefore, the end state of the corrected gait is set as a new initial state of a new current time gait, and new current time gait parameters are determined so that the new current time gait gradually approaches the newly set normal gait. Thus, it is possible to continuously generate gaits with ensured stability (for a long period of time).

Here, correspondence of the above-described first embodiment to the present invention is described. The first embodiment corresponds to the foregoing first to fifteenth aspects of the invention. In this case, in the first embodiment, the body posture angle of the robot 1 is equivalent to the state of the posture of the robot, the floor reaction force's horizontal component is equivalent to the variable to be limited, and the model manipulation floor reaction force's moment is equivalent to the correction manipulated variable of the desired floor reaction force. The compensated total floor reaction force's moment Mdmd is equivalent to the first required manipulated variable, and the floor reaction force's moment for compliance control is equivalent to the actual floor reaction force manipulated variable. Further, the model in FIG. 10 is used as the dynamic model, and the movement of the model includes the body translation mode and the body rotation mode. In addition, gait parameters are corrected as appropriate in accordance with the end state of the last time gait, by the processing of S028 in FIG. 12.

Note that, in this embodiment, when the value of the compensated total floor reaction force's moment Mdmd is within the floor reaction force's moment allowable range, the model manipulation floor reaction force's moment is zero. However, the model manipulation floor reaction force's moment at this time may be set in accordance with a state quantity of the dynamic model in FIG. 10 (for example, the center of gravity of the robot, the position of the body material particle 24$m$, and the like on the dynamic model).

Next, the second embodiment of the present invention is described with reference to FIGS. 43 to 46. In the description of this embodiment, constituents or functional parts same as those of the first embodiment are denoted by the same reference symbols as those of the first embodiment to omit description thereof.

The outline of this embodiment is that the original gait and the corrected gait are simultaneously generated. The corrected gait is corrected to stabilize the posture of the actual robot 1. At the same time, when there remains a margin even after the floor reaction force's moment required for posture recovery is generated by compliance control (when there is a margin of the floor reaction force's moment which can be generated about the desire ZMP), the corrected gait is determined using this margin to converge to the original gait as much as possible.

Figure 43:
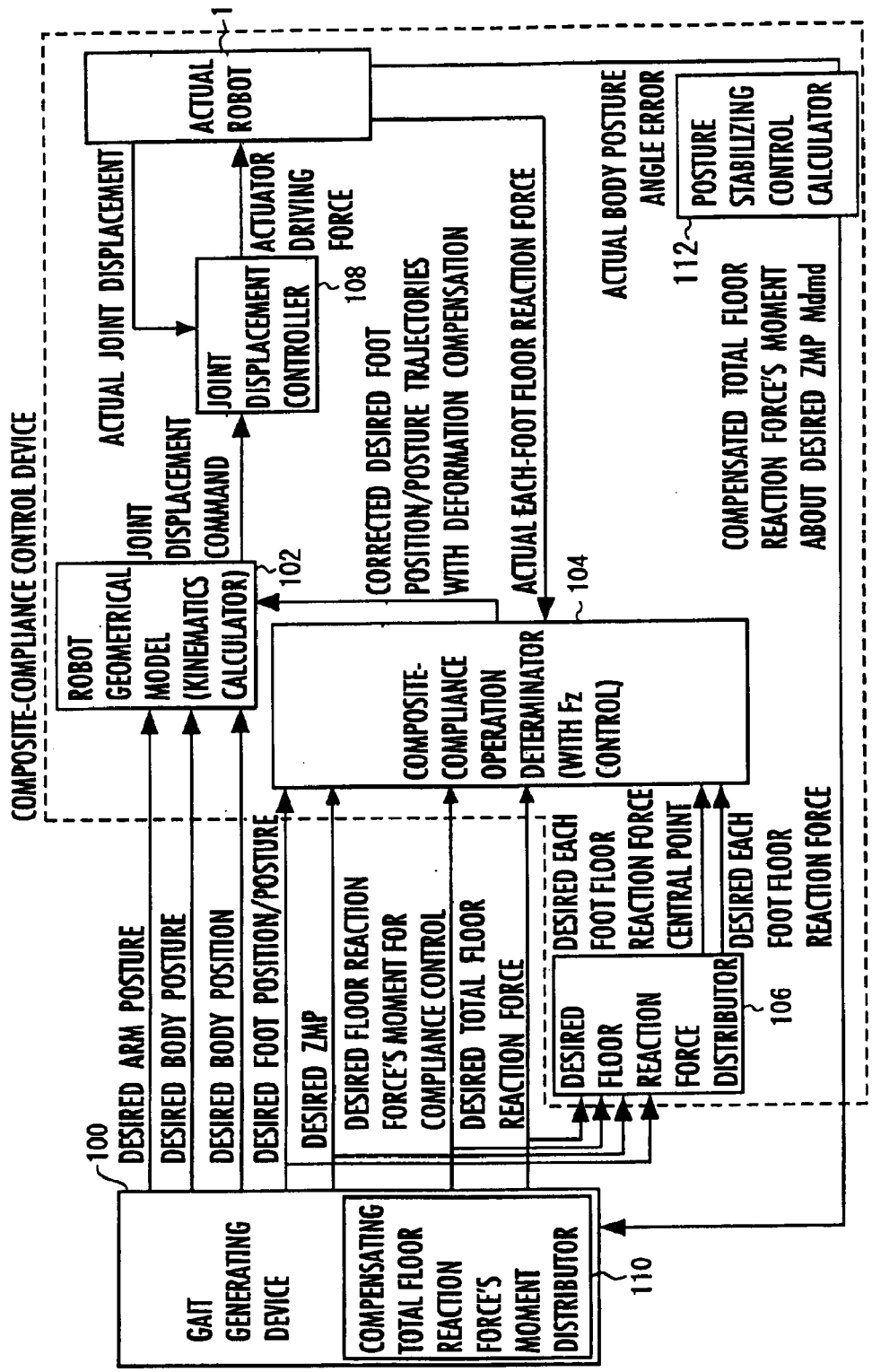
FIG. 43 is a block diagram showing a functional configuration of a control unit in the second embodiment.

A functional block diagram of the control unit 26 in this embodiment is shown in FIG. 43. In this embodiment, the compensated total floor reaction force's moment Mdmd obtained by the posture stability control calculator 112 is inputted to the gait generating device 100. The compensated total floor reaction force's moment distributor 110, which determines the model manipulation floor reaction force's moment and the desired floor reaction force's moment for compliance control based on the Mdmd, is incorporated in the gait generating device 100. The desired floor reaction force's moment for compliance control is outputted from the gait generating device 100 to the composite-compliance operation determinator 104. Thereafter, the compensated total floor reaction force's moment distributor 110 within the gait generating device 100 performs processing more complicated than that of the first embodiment, as described later. Functional configuration of the control unit 26 apart from the above is the same as that of the foregoing first embodiment.

Figure 44:
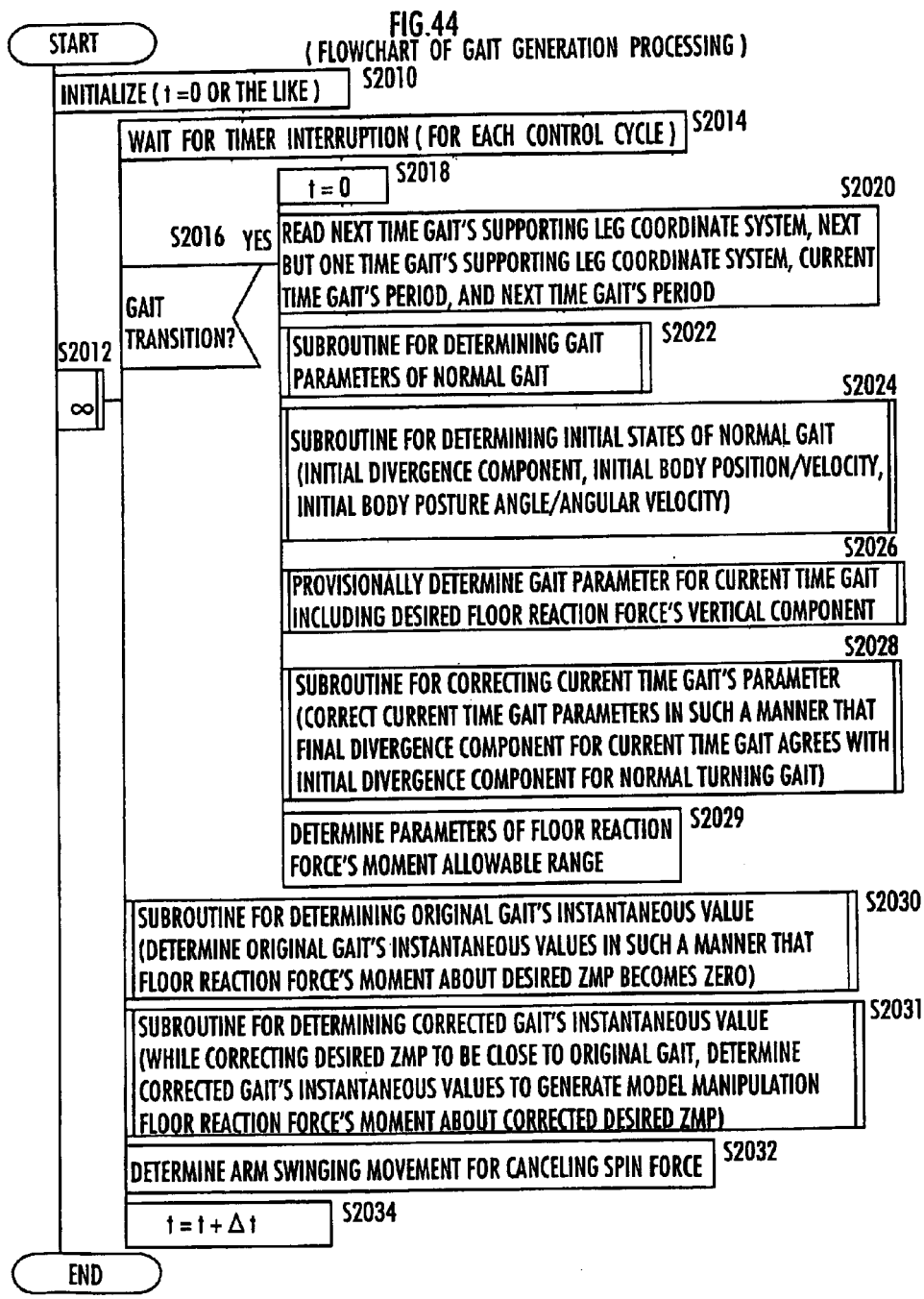
FIG. 44 is a flowchart showing main routine processing of a gait generating device in the second embodiment.

FIG. 44 shows the main flowchart of processing of the gait generating device 100 in this embodiment.

In FIG. 44, from S2010 to S2029, processing same as the processing from S010 to S029 of the main flowchart (FIG. 12) of the first embodiment is performed. As for the initialization in S800 of the flowchart in FIG. 35, a subroutine of S2028 (S2028 in this embodiment), the current time gait initial state is obtained by converting the end state of the last corrected gait (gait finally outputted from the gait generating device 100) into the present supporting leg coordinate system. The end state of the original gait determined in S2030 is not used in S800.

After the processing of S2029 is completed or when the determination result of S2016 is NO, processing proceeds to S2030, where instantaneous values (present values at time t) of the original gait are determined. The original gait is a gait generated so that the floor reaction force's moment about the desired ZMP becomes zero.

This original gait is generated by an algorithm in which the subroutine processing of S030 in FIG. 12 of the foregoing first embodiment is partially changed. Specifically, in S1102 and S1122 in FIG. 41, the subroutine processing within S030 (to be specific, the subroutine processing of S1012 in FIG. 40 which is the subroutine processing of S030), the model manipulation floor reaction force's moment is set to be zero (a horizontal component of the desired floor reaction force's moment about the desired ZMP is set to be zero), and then a body horizontal acceleration αtmp is obtained. Processing other than above may be the same as that of S030 in FIG. 12.

Next, processing proceeds to S2031, where instantaneous values of the corrected gait are determined. Note that, the corrected gait is a desired gait finally outputted from the gait generating device 100.

The processing of S2031 is performed by the subroutine processing of FIG. 45, and detailed description thereof is provided hereinbelow.

First of all, from S2100 to S2111, processing same as the processing from S1000 to S1011 in FIG. 40 described in the first embodiment is executed.

Next, processing proceeds to S2112, where a model manipulation floor reaction force's moment, a desired floor reaction force's moment for compliance control, a body horizontal acceleration and body posture angular acceleration are determined so as to satisfy the conditions of the floor reaction force's moment allowable range and floor reaction force's horizontal component allowable limit.

Figure 46:
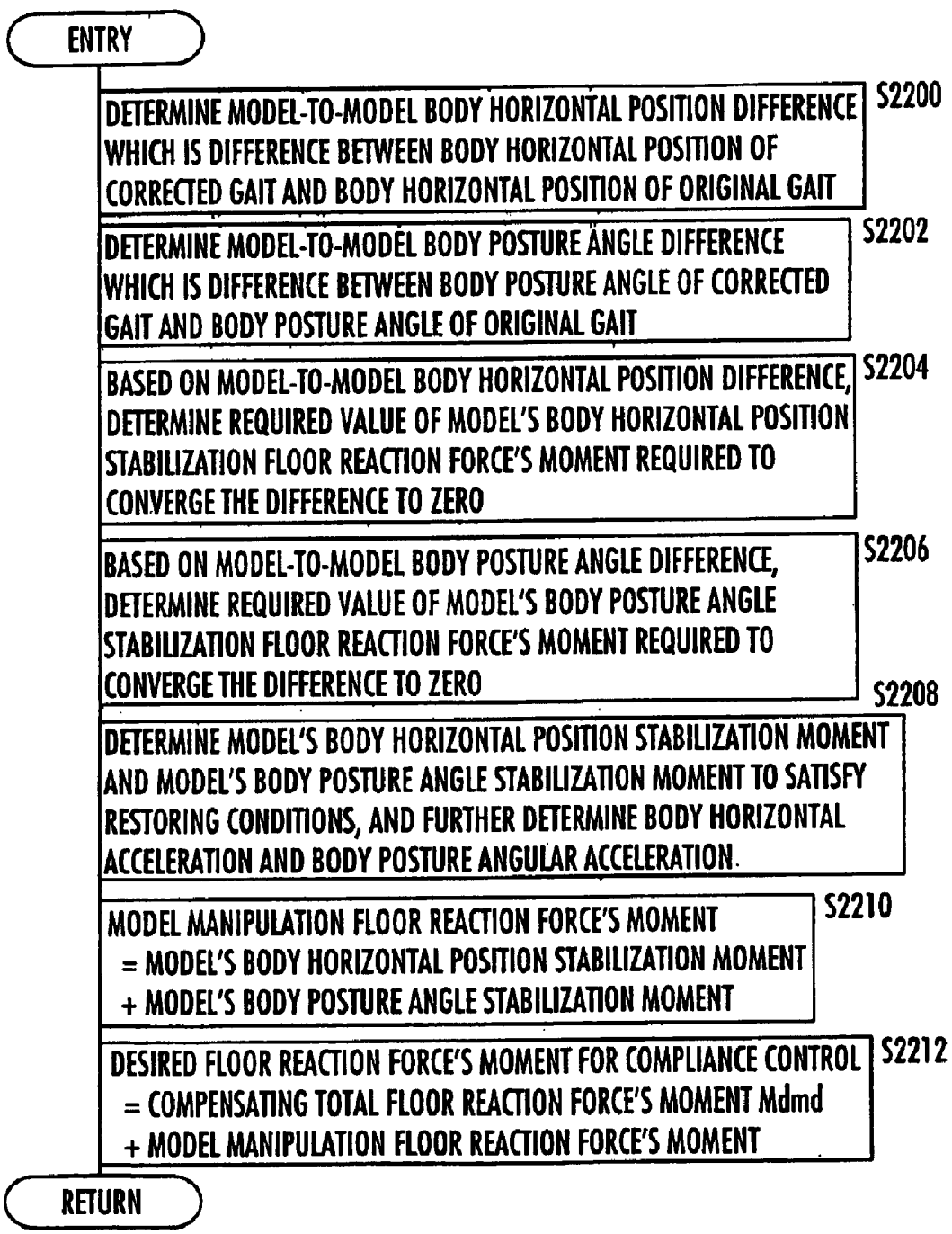
FIG. 46 is a flowchart showing subroutine processing of the flowchart in FIG. 45.

Details of S2112 are described below using the flowchart in FIG. 46 which shows the processing of S2112.

First of all, in S2200, a model-to-model body horizontal position difference is obtained. This is a difference between a body horizontal position of the corrected gait and a body horizontal position of the original gait. At this point, a present value (value at time t) of the body horizontal position of the corrected gait is not yet obtained. Therefore, in S2200, the model-to-model body horizontal position difference is calculated using the last value (value finally obtained in the control cycle of time t−Δt) of the body horizontal position of the corrected gait and the last value (value obtained in S2030 in the control cycle of time t−Δt) or the present value (value obtained in S2030 in control cycle of time t) of the body horizontal position of the original gait.

Next, processing proceeds to S2202, where a model-to-model body posture angle difference is obtained. This is a difference between a body posture angle of the corrected gait and a body posture angle of the original gait. In S2202, similarly to the calculation processing of the model-to-model body horizontal position difference in S2200, the last value of the body posture angle of the corrected gait and the last value or present value of the body posture angle of the original gait are used to obtain the model-to-model body posture angle difference.

Next, processing proceeds to S2204, where a required value of model's body horizontal position stabilization floor reaction force's moment Mpfdmd is determined based on the model-to-model body horizontal position difference. Mpfdmd is required to converge the model-to-model body horizontal position difference to zero. If a floor reaction force's moment for generating a body horizontal acceleration of the body translation mode of the corrected gait is merely caused to coincide with a floor reaction force's moment generating body horizontal acceleration of the body translation mode of the original gait, the model-to-model body horizontal position difference diverges. When a movement is performed by the aforementioned body translation mode so as to return the body horizontal position of the corrected gait to the body horizontal position of the original gait, a floor reaction force's moment is generated by the movement. From this floor reaction force's moment, a floor reaction force's moment generating a body horizontal acceleration of the body translation mode of the original gait is subtracted. The resulting moment is defined as the meaning of the required value of model's body horizontal position stabilization floor reaction force's moment Mpfdmd.

Specifically, the required value of model's body horizontal position stabilization floor reaction force's moment Mpfdmd is determined by, for example, a feedback control law of the following equation. In this example, a PD control law is used as the feedback control law, but other feedback control law, such as PID, may be used as well.

*Mpfdmd=Kmp*\*model-to-model body horizontal position difference+*Kmpv*\*time differential of model-to-model body horizontal position difference*     Equation d28 where Kmp and Kmpv are feedback gains (proportional gain, differential gain).

Next, processing proceeds to S2206, where a required value of model's body posture angle stabilization floor reaction force's moment Mrfdmd is determined based on the model-to-model body posture angle difference. Mrfdmd is required to cause the model-to-model body posture angle difference to converge to zero. If a floor reaction force's moment generating a body posture angular acceleration of the body rotation mode of the corrected gait is merely caused to coincide with a floor reaction force's moment generating a body position angular acceleration of the body rotation mode of the original gait, the model-to-model body posture angle difference does not converge to zero. When a movement is performed by the body rotation mode so as to return the body posture angle of the corrected gait to the body posture angle of the original gait, a floor reaction force's moment is generated by the movement. From this floor reaction force's moment, a floor reaction force's moment generating a body position angular acceleration of the body rotation mode of the original gait is subtracted. The resulting moment is defined as the required value of model's body posture angle stabilization floor reaction force's moment Mrfdmd.

Specifically, the required value of model's body posture angle stabilization floor reaction force's moment Mrfdmd is determined by, for example, a feedback control law of the following equation. In this example, a PD control law is used as the feedback control law, but other feedback control law, such as PID, may be used as well.

$$\text{Mrfdmd}=\text{Kmr}*\text{model-to-model body posture angle difference}+ \text{Kmrv}*\text{time differential of model-to-model body posture angle difference} \quad \text{Equation d29}$$

where Kmr and Kmrv are feedback gains (proportional gain, differential gain).

Incidentally, the floor reaction force's moment generating the body horizontal acceleration of the body translation movement mode of the original gait is subtracted from the floor reaction force generated due to the body translation movement mode of the finally determined corrected gait. The resultant moment is referred to as a model's body horizontal position stabilization floor reaction force's moment. In addition, the floor reaction force's moment generating body posture angular acceleration of the body rotation movement mode of the original gait is subtracted from the floor reaction force's moment generated due to the body rotation movement mode of the finally determined corrected gait. The resultant moment is referred to as a model's body posture angle stabilization floor reaction force's moment.

Meanwhile, linearity approximately holds between a perturbation movement and a perturbation floor reaction force. In other words, when different perturbation movements are added to a movement of the original gait, movements thus obtained generate floor reaction forces. These floor reaction forces are almost the same as floor reaction forces obtained by adding perturbation floor reaction forces generated by the above perturbation movements to a floor reaction force of the original gait. Hence, the following equation holds, approximately.

$$\text{Model manipulation floor reaction force's moment}=\text{model's body horizontal position stabilization floor reaction force's moment}+ \text{model's body posture angle stabilization floor reaction force's moment} \quad \text{Equation d30}$$

Therefore, if the model's body horizontal position stabilization floor reaction force's moment is determined to coincide with or to be as close as possible to the required value of model's body horizontal position stabilization floor reaction force's moment Mpfdmd, and if the model's body posture angle stabilization floor reaction force's moment is determined to coincide with or to be as close as possible to the required value of model's body posture angle stabilization floor reaction force's moment Mrfdmd, under consideration that Equation d30 approximately holds true, it is possible that an appropriate model manipulation floor reaction force's moment is generated to the corrected gait, and at the same time, the body horizontal acceleration and body posture angular acceleration of the corrected gait are converged to the body horizontal acceleration and body posture angular acceleration of the original gait, respectively, as much as possible.

Thus, after S2206, processing proceeds to S2208, and the model's body horizontal position stabilization floor reaction force's moment (floor reaction force's moment of body translation mode) and the model's body posture angle stabilization floor reaction force's moment (floor reaction force's moment of the body rotation mode) are determined so as to satisfy conditions below (conditions referred to as recovery conditions) as much as possible. Further, body horizontal acceleration and body posture angular acceleration of the corrected gait are determined to satisfy definitions of the foregoing model's body horizontal position stabilization floor reaction force's moment and model's body posture angle stabilization floor reaction force's moment. Note that the recovery conditions shown below have, in descending order, higher priorities. This means that, where some conditions are mutually contradictory and thus cannot be satisfied at the same time, each such condition has, in descending order, a priority to be satisfied (to hold true). However, recovery conditions 1 and 2 are always satisfied (always hold true).

(Recovery condition 1) The sum of the compensated total floor reaction force's moment Mdmd and the model manipulation floor reaction force's moment (equivalent to the desired floor reaction force's moment for compliance control when foregoing Equation d27 holds true) shall not exceed the floor reaction force's moment allowable range.

(Recovery condition 2) The floor reaction force's horizontal component of the corrected gait shall not exceed the floor reaction force's horizontal component allowable limit.

(Recovery condition 3) The model's body posture angle stabilization floor reaction force's moment shall coincide with or be as close as possible to the required value of model's body posture angle stabilization floor reaction force's moment Mrfdmd. This condition is for convergence of the body posture angle of the corrected gait to the body posture angle of the original gait (initially planned gait).

(Recovery condition 4) The model's body horizontal position stabilization floor reaction force's moment shall coincide with or be as close as possible to the required value of model's body horizontal position stabilization floor reaction force's moment Mpfdmd. This condition is for convergence of the body horizontal position of the corrected gait to the body horizontal position of the original gait (initially planned gait).

(Recovery condition 5) The model's body posture angle stabilization floor reaction force's moment and model's body horizontal position stabilization floor reaction force's moment are continuous, individually.

The processing of S2208 determines the body horizontal acceleration, body posture angular acceleration and the like which satisfy the above recovery conditions 1 to 5. For example, this processing is specifically executed as follows.

First of all, the required floor reaction force's moment for compliance control is caused to coincide with the sum of the compensated total floor reaction force's moment Mdmd, the foregoing required value of model's body horizontal position stabilization floor reaction force's moment Mpfdmd, and the required value of model's body posture angle stabilization floor reaction force's moment Mrfdmd. In this case, the provisional value of the desired floor reaction force's moment for compliance control (=Mdmd+Mpfdmd+Mrfdmd, denoted by Reference Symbol Min in the description of this embodiment) is obtained. Min means a basic required value of the desired floor reaction force's moment for compliance control.

Further, when a movement of a gait is generated under the assumption that Mpfdmd is generated by the body translation mode and Mrfdmd is generated by the body rotation mode, a floor reaction force's horizontal component is generated on the dynamic model of foregoing Equations 02 and 03. This floor reaction force's horizontal component is obtained as a provisional value Fin. Fin has a meaning of a required value of the floor reaction force's horizontal component by the required value of model's body horizontal position stabilization floor reaction force's moment Mpfdmd. This provisional value Fin of the floor reaction force's horizontal component can be obtained by, for example, a method similar to that of S1102 and S1104 in FIG. 41 described in the foregoing first embodiment. More specifically, My on the left side of Equation 03 is set as (Mpfdmd+Mrfdmd). (Precisely, My is set as a value obtained by adding a reference value of the floor reaction force's moment about the desired ZMP to Mpfdmd+Mrfdmd. However, the reference value is zero in this embodiment.) At the same time, $J*d2\theta by/dt2$ on the right side of Equation 03 is set as Mrfdmd. The equation thus obtained is solved for d2Xb/dt2. Thus, the horizontal acceleration of the body material particle 24m, and thus the body horizontal acceleration (equivalent to αtmp in S1102) is obtained. Thereafter, based on foregoing Equation 17, the provisional value Fin (equivalent to Fxtmp in Equation 17) of the floor reaction force's horizontal component is obtained using the body horizontal acceleration obtained above.

Figure 45:
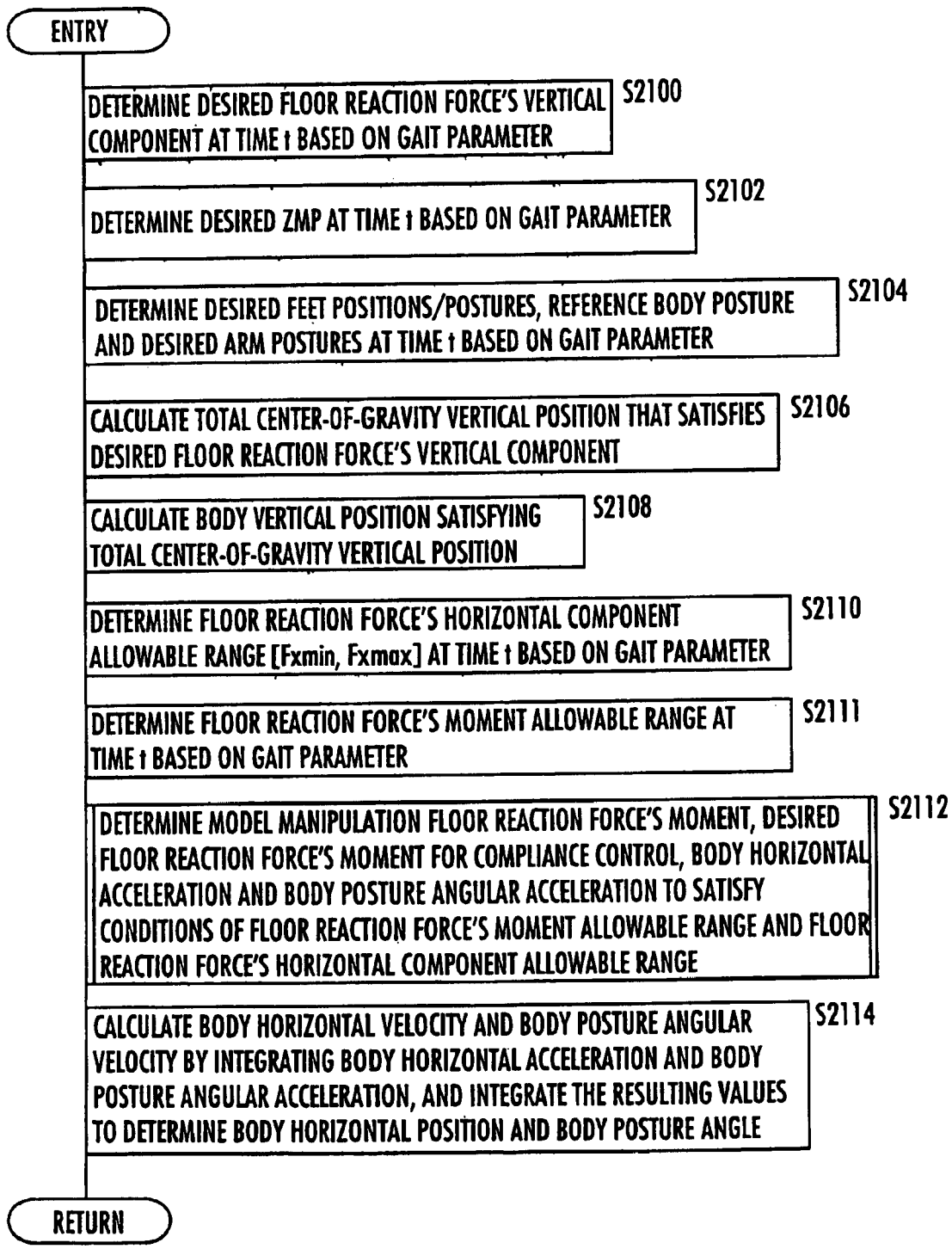
FIG. 45 is a flowchart showing subroutine processing of the flowchart in FIG. 44.

Next, a group of Min and Fin is compared with a group of the floor reaction force's moment allowable range (specifically, the present value of the allowable range obtained in S2111 in FIG. 45 in the control cycle at current time t) and the floor reaction force's horizontal component allowable limit (specifically, the present value of the allowable range obtained in S2110 in FIG. 45 in the control cycle at current time t). Thereafter, determined is a group of the desired floor reaction force's moment for compliance control and the floor reaction force's horizontal component, which satisfy the above limitations of allowable range, respectively (specifically, a group of the desired floor reaction force's moment for compliance control which remains within the floor reaction force's moment allowable range, and the floor reaction force's horizontal component which remains within the floor reaction force's horizontal component allowable limit). Strictly speaking, limited by the floor reaction force's moment allowable range is a value obtained by adding the desired floor reaction force's moment for compliance control to the reference value (reference instantaneous value) of the floor reaction force's moment about the desired ZMP. However, in this embodiment, the reference value is zero. Therefore, the desired floor reaction force's moment for compliance control is directly limited by the floor reaction force's moment allowable range.

Here, the group of the desired floor reaction force's moment for compliance control (hereinafter, referred to as controlled desired floor reaction force's moment for compliance control Mltd) and floor reaction force's horizontal component (hereinafter, referred to as controlled floor reaction force's horizontal component Fltd), which satisfy the above limitations of allowable range, is determined by a method same as a method to be detailed in the later-described third embodiment using FIGS. 52 to 55. Therefore, details of the method are described in the third embodiment. In the following description of this embodiment, the method is briefly explained with reference to FIGS. 52 to 55.

Figure 52:
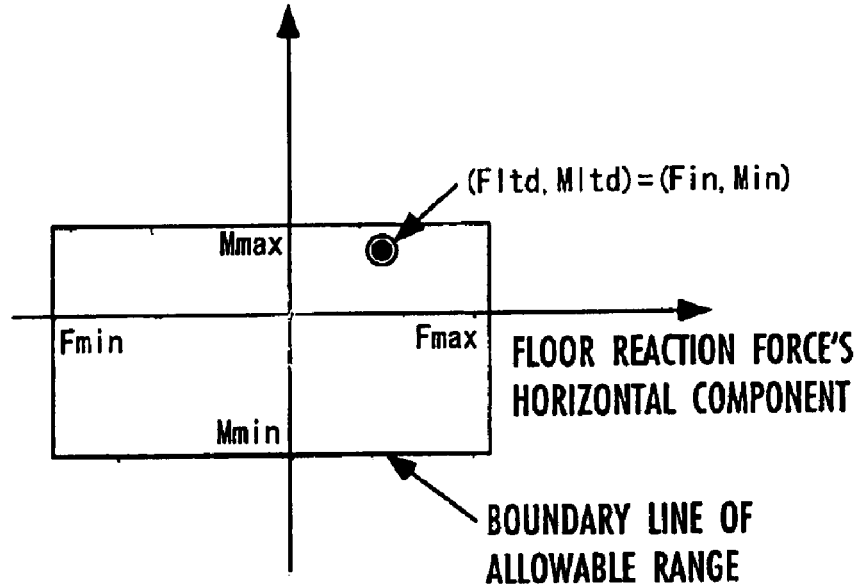
FIGS. 52 to 55 are explanatory views of limiting methods of a variable to be limited (a floor reaction force's horizontal component and a floor reaction force's moment).

As shown in FIGS. 52 to 55, when it is assumed that the floor reaction force's moment and floor reaction force's horizontal component are two axes of a coordinate plane, the group of the floor reaction force's moment allowable range and floor reaction force's horizontal component allowable limit is expressed as a rectangular region shown in the drawings (hereinafter, referred to as a allowable range region in this description). When the group of (Fin, Min) (white circle in the drawing) is within the above-mentioned allowable range region as shown in FIG. 52, Fin itself is determined as the floor reaction force's horizontal component Fltd which satisfies the limitation of the floor reaction force's horizontal component allowable limit, and Min itself is determined as the desired floor reaction force's moment for compliance control Mltd which satisfies the limitation of the floor reaction force's moment allowable range, like the group (Fltd, Mltd) expressed by a black circle in the drawing.

Figure 53:
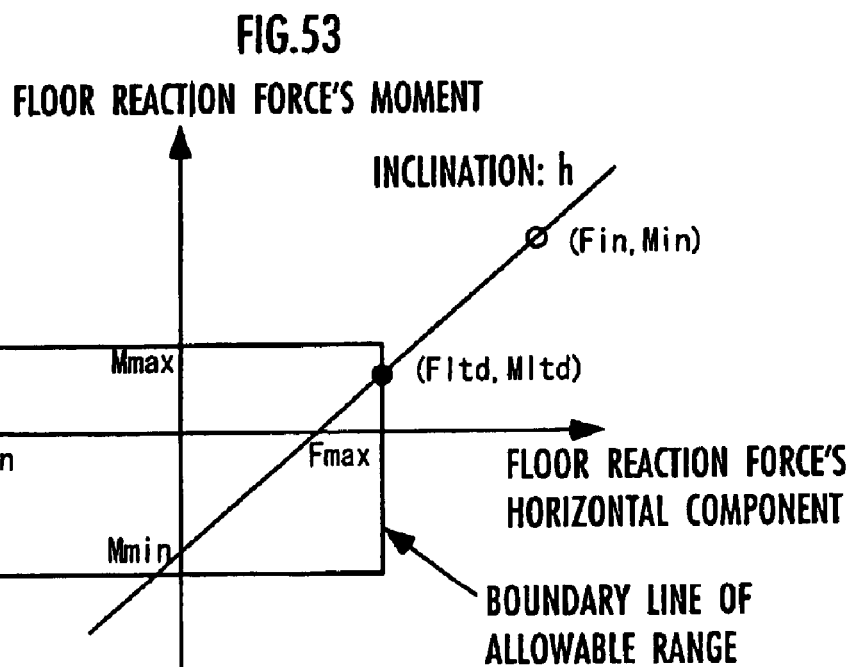
Figure 54:
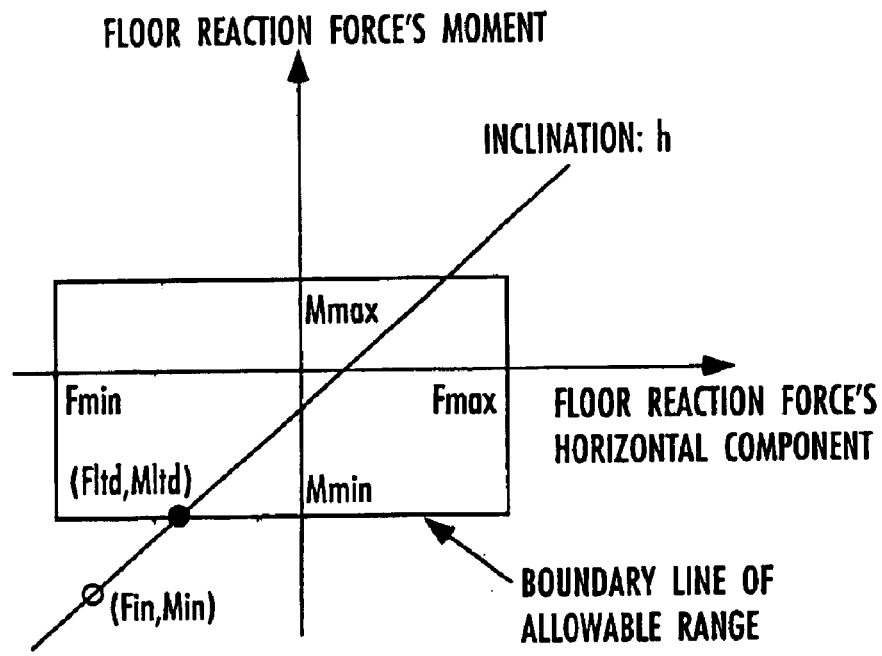
Figure 55:
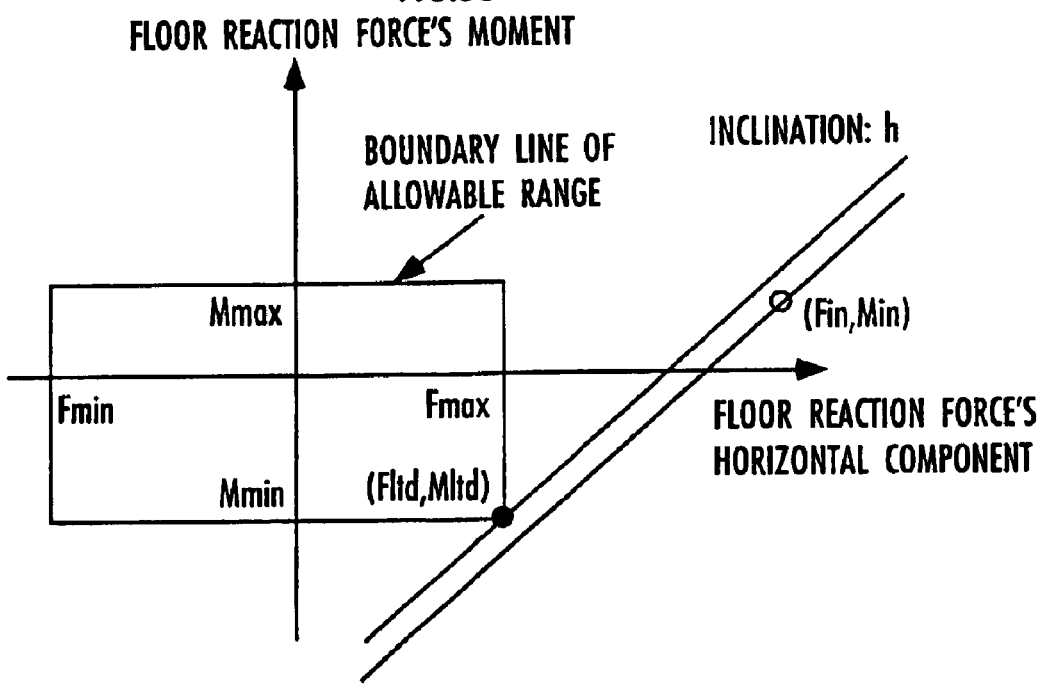

Further, when the group of (Fin, Min) (white circle in the drawing) deviates from the above-mentioned allowable range region as shown in FIGS. 53 to 55, it is prioritized that a model's body posture angle stabilization floor reaction force's moment, obtained by using later-described Equations e01 and e02 from the group of (Fltd, Mltd) finally determined to satisfy the above allowable range region, coincides with or become closest to the required value of model's body posture angle stabilization floor reaction force's moment Mrfdmd. Based on this, the group of (Mltd, Fltd) is determined so that the model body horizontal position stabilization moment becomes closest to the required value of model's body horizontal position stabilization moment Mpfdmd. This is for satisfying the foregoing recovery conditions 3 and 4.

For example, the group of (Fltd, Mltd) as above is determined as follows. A ratio of a floor reaction force's moment ΔMp and floor reaction force's horizontal component ΔFp (=ΔMp/ΔFp), both generated by the foregoing body translation mode, is referred to as a body translation mode floor reaction force ratio h. Assume a following line that has an inclination of the body translation mode floor reaction force ratio h and passes a point (Fin, Min) on the coordinate plane of each of FIGS. 53 to 55. Note that the body translation mode floor reaction force ratio h is a value defined by h=Zb−Zzmp (height of the body material particle 24m from the desired ZMP), based on foregoing Equations 06 and 07.

As shown in each of FIGS. 53 and 54, where are intersection points between the line having the aforementioned inclination h and the aforementioned allowable range region (rectangular regions in each drawing), (Fltd, Mltd) are determined as values of the floor reaction force's horizontal component and floor reaction force's moment which correspond to an intersection point (black circle in the drawings) closest to the point of (Fin, Min) among the above-mentioned intersection points. When the group of (Fltd, Mltd) is determined in this manner, it is prioritized that the model's body posture angle stabilization floor reaction force's moment obtained by the use of later-described Equations e01 and e02 coincides with the required value of model's body posture angle stabilization floor reaction force's moment Mrfdmd. Based on this, the model's body horizontal position stabilization floor reaction force's moment becomes closest to the required value of model's body horizontal position stabilization floor reaction force's moment Mpfdmd. Note that this principle will be detailed in the third embodiment described later.

Moreover, as shown in FIG. 55, when the line having the inclination h and passing the point (Fin, Min) (white circle in the drawing) does not intersect with the foregoing allowable range region, (Fltd, Mltd) are determined as values of the floor reaction force's horizontal component and floor reaction force's moment which correspond to an intersection point (black circle in the drawing) between the foregoing allowable range region and a line. This line is one of the lines having the same inclination h and intersecting with the foregoing allowable range region and is the closest line to the line having the inclination h and passing through the point (Fin, Min). When the group of (Fltd, Mltd) is determined as above, the model's body posture angle stabilization floor reaction force's moment obtained by later-described Equations e01 and e02 does not coincide with the required value of model's body posture angle stabilization floor reaction force's moment Mrfdmd, but it is prioritized to be closest to the Mrfdmd. Based on this, the model's body horizontal position stabilization floor reaction force's moment becomes closest to the required value of model's body horizontal position stabilization floor reaction force's moment Mpfdmd. Note that this principle will also be detailed in the third embodiment described later.

It is also possible to searchingly obtain the group of (Fltd, Mltd), which satisfies the foregoing recovery conditions 3 and 4, based on foregoing Equations 02 and 03.

After the group of (Fltd, Mltd) is obtained as described above, determined are the above-mentioned model's body horizontal position stabilization floor reaction force's moment, that is, the floor reaction force's moment to be generated by the body translation mode, and the above-mentioned model's body posture angle stabilization floor reaction force's moment, that is, the floor reaction force's moment to be generated by the body rotation mode.

In this case, the model's body horizontal position stabilization floor reaction force's moment is determined by, for example, the following equation.

Model's body horizontal position stabilization floor reaction force's moment=$Mpfdmd+Mltd$-Min+$h^*(Fltd-Fin)$  Equation e01

Moreover, the model's body posture angle stabilization floor reaction force's moment is determined by, for example, the following equation.

Model's body posture angle stabilization floor reaction force's moment=$Mrfdmd-h^*(Fltd-Fin)$  Equation e02

Next, a present value (value at time t) of the body horizontal acceleration and a present value (value at time t) of the body posture angular acceleration are determined. In this case, Fx on the left side of foregoing Equation 02 is set as Fltd, and the equation thus obtained is solved for $d2Xb/dt2$, obtaining a horizontal acceleration of the body material particle 24$m$. The body horizontal acceleration is determined from this horizontal acceleration of the body material particle 24$m$. The body posture angular acceleration is obtained by, for example, dividing the model's body posture angle stabilization floor reaction force's moment obtained as above by the foregoing body inertia moment J. Alternatively, the body posture angular acceleration can be obtained in the following manner, for example. My on the left side of Equation 03 is set as the sum of the model's body horizontal position stabilization floor reaction force's moment and the model's body posture angle stabilization floor reaction force's moment obtained as above. At the same time, $d2\theta Xb/dt2$ in the second term on the right side of Equation 03 is set as the (present value of) horizontal acceleration of the body material particle 24$m$ obtained as above. The equation thus obtained is solved for $d2\theta by/dt2$, thus obtaining the body posture angular acceleration. In this case, a present value of the body horizontal position, which corresponds to Xb (horizontal position of the body material particle 24$m$) in the first term on the right side of Equation 03, is not obtained yet. Yet, Xb, which corresponds to the last value (value obtained in the control cycle of time t−Δt) of the body horizontal position, can be used, for example. Alternatively, the body horizontal acceleration is second-order integrated up to the current time t by using the present value of the body horizontal acceleration obtained as above. Thus, the present value of the body horizontal position is obtained. The horizontal position of the body material particle 24$m$, corresponding to the above present value of the body horizontal position, may be used as Xb.

By the processing described above, the model's body horizontal position stabilization floor reaction force's moment and model's body posture angle stabilization floor reaction force's moment are determined to satisfy the foregoing recovery conditions 1 to 5. In addition, the body horizontal acceleration and body posture angular acceleration are determined.

After executing the processing of S2208 as above, processing proceeds to S2210, where the model manipulation floor reaction force's moment is determined by foregoing Equation d30. In other words, the sum of the model's body horizontal position stabilization floor reaction force's moment and model's body posture angle stabilization floor reaction force's moment, obtained in S2208, is determined as the model manipulation floor reaction force's moment. Note that the floor reaction force's moment about the desired ZMP may be calculated based on the present instantaneous value of the movement of the finally determined corrected gait, and the resulting value may be set as the model manipulation floor reaction force's moment.

Next, processing proceeds to S2212, where the desired floor reaction force's moment for compliance control is determined by foregoing Equation d27. In other words, the sum of the compensated total floor reaction force's moment Mdmd and the model manipulation floor reaction force's moment obtained in S2210 is determined as the desired floor reaction force's moment for compliance control.

Processing of S2112 in FIG. 45 is thus completed. Next, processing proceeds to S2114. The processing of S2114 is the same as the processing of S1014 in FIG. 40 in the foregoing first embodiment. The present value of the body horizontal position is determined by second-order integration of the body horizontal acceleration, and the present value of the body posture angle is determined by second-order integration of the body position angular acceleration.

Next, processing proceeds to S2032 and S2034 in FIG. 44, where processing same as that of S032 and S034 in FIG. 12 is executed, and gait generation processing is repeated.

Supplementarily, in determining gait instantaneous values by the dynamic model in this embodiment, a state of the dynamic model (or instantaneous values of the last time gait and the gait before the last time gait) is also required. Thus, two dynamic models for generating the corrected gait and the original gait are needed.

As described above, in this embodiment, the original gait and corrected gait are generated in parallel. The corrected gait is corrected to stabilize the posture of the actual robot 1. At the same time, if there remains a margin even after a floor reaction force's moment required for posture recovery is generated by the compliance control, the corrected gait is converged into the original gait using the margin, as much as possible. Therefore, in addition to the operational advantages of the foregoing first embodiment, it is possible to generate a gait close to the initially set original gait, that is, a gait close to a gait faithfully generated as initially required. Thus, where there is a movement path set in advance, it is possible to prevent a large deviation from the movement path. In addition, convergence of the body posture angle of the corrected gait to the body posture angle of the original gait (initially determined gait) is prioritized over convergence of the body horizontal position of the corrected gait to the body horizontal position of the original gait (initially determined gait) (a movement of body translation mode is adjusted as much as possible within a range where the floor reaction force's horizontal component allowable limit is satisfied). Thus, a large fluctuation of the body posture angle can be suppressed.

Here, correspondence of the second embodiment described above to the present invention is described. The second embodiment corresponds to the foregoing first to fourteenth aspects, and the sixteenth to twenty-third aspects of the present invention. In this case, in the second embodiment, the body posture angle of the robot 1 is equivalent to the state quantity of the posture of the robot, the floor reaction force's horizontal component is equivalent to the variable to be limited, the model manipulation floor reaction force's moment is equivalent to the correction manipulated variable of the desired floor reaction force, the compensated total floor reaction force's moment Mdmd is equivalent to the first required manipulated variable, the floor reaction force's moment for compliance control is equivalent to the actual floor reaction force manipulated variable, and the required value of model's body horizontal position stabilization floor reaction force's moment Mpfdmd and the required value of model's body posture angle stabilization floor reaction force's moment Mrfdmd are equivalent to the second required manipulated variable. Further, the model in FIG. 10 is used as the dynamic model, and the movement of the model includes the body translation mode and body rotation mode. Furthermore, the gait parameters are corrected as appropriate in accordance with the state of the corrected gait, in the processing of S2028 in FIG. 44.

Next, the third embodiment of the present invention is described with reference to FIGS. 47 to 55. In the description of this embodiment, constituents or functional parts same as those in the first or second embodiment are denoted by the same reference symbols as those of the first or second embodiment to omit description thereof.

In this embodiment, the functional configuration of the control unit 26 is the same as that of the foregoing second embodiment, in other words, the configuration shown in FIG. 43 described earlier. However, in this embodiment, the algorithm for gait generation executed by the gait generating device 100 is different from that of the foregoing second embodiment. The processing of each portion other than the gait generating device 100 is the same as that of the foregoing second embodiment.

Figure 47:
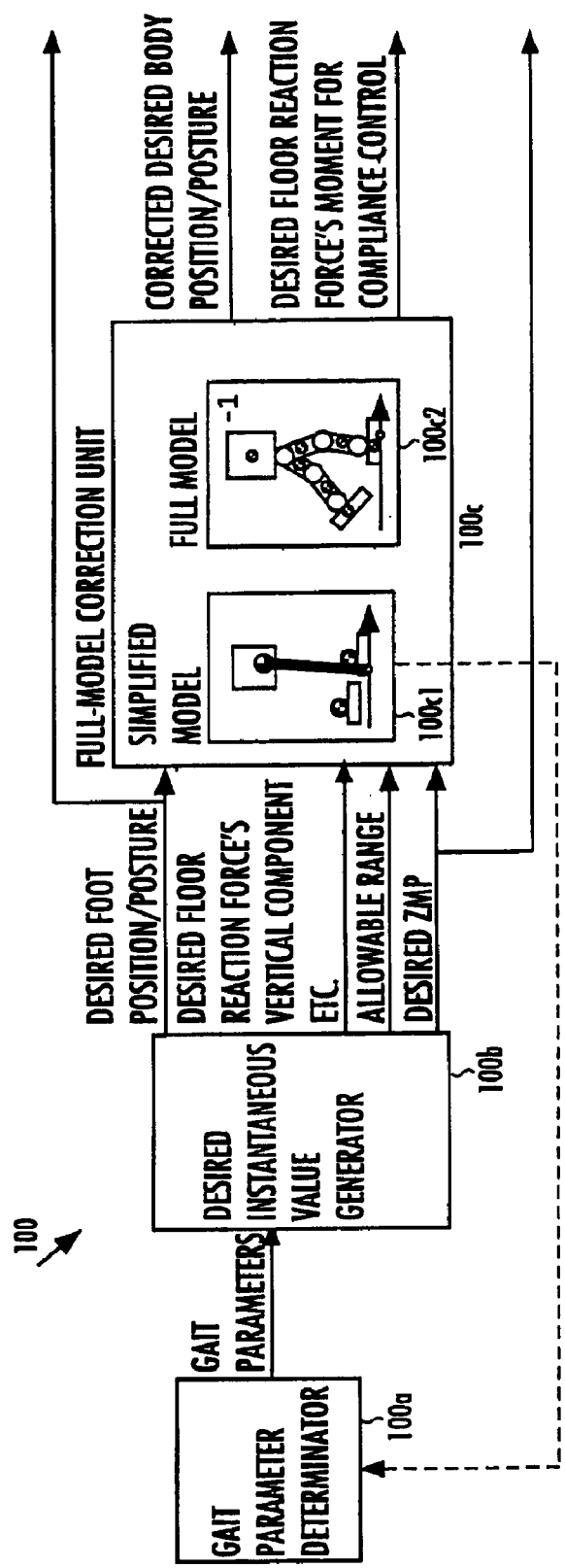
FIG. 47 is a block diagram functionally showing a configuration of an essential part of a gait generating device in the third embodiment.

FIG. 47 is a block diagram showing an outline of the processing by the gait generating device 100 in this embodiment. The outline of the processing by the gait generating device 100 is described below with reference to FIG. 47. The outline of the processing described below using FIG. 47 is the same in the fourth to sixth embodiments described later.

As shown in the drawing, the gait generating device 100 includes a gait parameter determinator 100a. The gait parameter determinator 100a determines values or a time series table of parameters of a desired gait (parameters defining the desired gait) This is equivalent to processing from S3018 to S3030 of the flowchart in FIG. 48 described later.

Though details are given later, the parameters determined by the gait parameter determinator 100a include parameters defining desired foot position/posture trajectories, desired arm posture trajectories, reference body posture trajectory, desired ZMP trajectory, desired floor reaction force's vertical component's trajectory, and the like, as well as parameters defining floor reaction force's horizontal component allowable limit and parameters defining ZMP allowable range. In this case, there are two kinds of floor reaction force's horizontal component allowable limits set in this embodiment, one for a simplified model's gait, set in processing of S3026 described later, and the other one for gait correction, set in S3030. Meanwhile, the ZMP allowable range is only one kind, solely for gait correction, set in the processing of S3030.

Here, the ZMP allowable range corresponds to the floor reaction force's moment allowable range in this embodiment, and is set as described in the foregoing first embodiment with reference to FIG. 39.

The gait parameters determined in the gait parameter determinator 100a are inputted to a desired instantaneous value generator 100b. Based on the gait parameters inputted, the desired instantaneous value generator 100b sequentially calculates (generates) the instantaneous values of desired foot position/posture, desired ZMP, desired floor reaction force's vertical component, desired arm postures, desired total center of gravity vertical position, desired body vertical position, floor reaction force's horizontal component allowable limit, ZMP allowable range and reference body posture angle, at current time t. (In FIG. 47, only a part of these desired instantaneous values is stated.) This processing by the desired instantaneous value generator 100b is equivalent to the processing from S1000 to S1010 in FIG. 40 executed within the processing of S3032 of the flowchart in FIG. 48 described later, as well as the processing of S3034 and S3036 in FIG. 48. Note that, in this embodiment, among the desired instantaneous values calculated by the desired instantaneous value generator 100b, a part of those instantaneous values (specifically, the instantaneous value of desired body vertical position) is a provisional value and will be corrected later. Further, the instantaneous values of the floor reaction force's horizontal component allowable limit calculated by the desired instantaneous value generator 100b includes an instantaneous value for the simplified model's gait, and an instantaneous value for gait correction.

The desired instantaneous values (part of which are provisional instantaneous values) calculated (generated) by the desired instantaneous value generator 100b are inputted to a full-model correction unit 100c. The compensated total floor reaction force's moment Mdmd, obtained in the posture stability control calculator 112 (see FIG. 43), is also inputted to the full-model correction unit 100c. The full-model correction unit 100c includes a simplified model 100c1 and a full model 100c2, as dynamic models. The full-model correction unit 100c determines provisional instantaneous values or the like of the desired body position/ posture from the inputted values, based on the simplified model 100c1. Further, the full-model correction unit 100c corrects the determined provisional instantaneous values or the like of the body position/posture, by the use of the full model 100c2.

Note that, a configuration is also feasible where the simplified model 100c1 is not included in the full-model correction unit 100c2. The full model 100c2 includes any one of an inverse full model (inverse dynamic full model) and a direct full model (direct dynamic full model), as described later.

Basically, the full-model correction unit 100c executes processing (B) to satisfy the following conditions A1 to A3. In other words, the full-model correction unit 100c corrects the body position/posture of the simplified model's gait determined by using the simplified model, and outputs the desired floor reaction force's moment for compliance control about the desired ZMP, (B), so that (A1) the dynamic equilibrium conditions are satisfied more accurately than a gait generated based on only the simplified model (hereinafter, referred to as a simplified model's gait) does; (A2) a true ZMP (ZMP which satisfies the original definition, corrected by generating a desired floor reaction force's moment for compliance control about the desired ZMP) exists within the ZMP allowable range (allowable range capable of sufficiently maintaining the stability margin); and (A3) the floor reaction force's horizontal component remains within the floor reaction force's horizontal component allowable limit for gait correction.

The above condition (A2) is equal to that the floor reaction force's moment generated about the desired ZMP remains within the floor reaction force's moment allowable range corresponding to the ZMP allowable range.

Here, the aforementioned simplified model 100c1 and full model 100c2 are described. The simplified model 100c1 is a dynamic model which prioritizes a reduction of calculation amount and easy analysis of behavior than dynamic accuracy. Thus, the simplified model may be a model in which partially neglected variables (for example, angular momentum about the total center of gravity is neglected) and a contradiction (i.e., lack of stringency) with regard to dynamics exist. In this embodiment, the dynamic model in FIG. 10 (dynamic model described by foregoing Equations 01 to 05) described in the foregoing first embodiment is used as the simplified model 100c1.

The full model 100c2 means a robot dynamic model different from the simplified model 100c1. It is preferred that the full model 100c2 be a robot dynamic model having higher approximation accuracy than that of the simplified model 100c1. This is explained by using illustrated examples. As described above, the dynamic model depicted in FIG. 10 is used as the simplified model 100c1 in this embodiment. Therefore, it is preferred that a robot dynamic model like, for example, the model with multiple material particles shown in FIG. 11 (a model having a material particle in each link), which has higher approximation accuracy than that of the dynamic model in FIG. 10, be used as the full model 100c2. In this case, an inertia moment may be set about each material particle in this full model 100c2.

However, the simplified model 100c1 and full model 100c2 need not be always different in approximation accuracy. The simplified model 100c1 and full model 100c2 may have the same dynamic equation, but have different floor reaction force's horizontal component allowable limits. In other words, a difference between the allowable range for the simplified model's gait and allowable range for gait correction may be the only difference between them. For example, it is sufficient that a floor reaction force's horizontal component allowable limit is set large (can even exceed the friction limit) when generating the gait using the simplified model 100c1, and is set narrow in order to prevent slip when correcting the gait using the full model 100c2.

Note that, in this description, a model used for calculating (outputting) body position/posture based on (by inputting) desired foot position/posture and desired floor reaction force (desired ZMP and desired floor reaction force's vertical component, in particular), is referred to as a "direct dynamic model." A model used for calculating (outputting) a floor reaction force (a desired ZMP or floor reaction force's moment about the desired ZMP and floor reaction force's horizontal component, in particular) based on (by inputting) the desired foot position/posture, desired body posture and desired body position, is referred to as an "inverse dynamic model." The inputs to the direct dynamic model include at least a desired floor reaction force, and the inputs to the inverse dynamic model include at least a desired movement.

The full model 100c2 included in the full-model correction unit 100c is provided with the inverse dynamic full model (often abbreviated as an "inverse full model") or the direct dynamic full model (often abbreviated as a "direct full model"). In general, an amount of calculation is apt to be larger in a direct dynamic model than in an inverse dynamic model.

The above then being the outline of the processing by the gait generating device 100.

Next, the processing by the gait generating device 100 in this embodiment is described in detail. The gait generating device 100 in this embodiment executes processing shown in a flowchart in FIG. 48 to generate a gait.

First of all, from S3010 to S3028, processing same as the processing from S010 to S028 in FIG. 12 described in the foregoing first embodiment is executed. The floor reaction force's horizontal component allowable limit of the current time gait, determined in S608 in FIG. 32 that is the subroutine of S3026, may be set without considering the frictional force limit so rigorously as in the foregoing first and second embodiments, and may be set as a range exceeding the frictional force limit. This is because later-described full model correction ultimately limits the floor reaction force's horizontal component by the floor reaction force's horizontal component allowable limit for gait correction.

Next, processing proceeds to S3030, where parameters are determined for respectively defining the floor reaction force's horizontal component allowable limit for gait correction and the ZMP allowable range (allowable range of floor reaction force central point). In this case, for example, similarly to the floor reaction force's horizontal component allowable limit for the aforementioned simplified model's gait, the floor reaction force's horizontal component allowable limit for gait correction is set to have a pattern like the one shown in foregoing FIG. 33 for each of X-axis direction (front-and-back direction) and Y-axis direction (right-and-left direction), based on the floor reaction force's vertical component trajectory and foregoing Equation 12. Further, for example, the value of ka*$\mu$ in foregoing Equation 12 is set as a parameter defining the floor reaction force's horizontal component allowable limit for gait correction. However, it is preferred that the floor reaction force's horizontal component allowable limit be surely set within a range of the friction limit by setting the value of the coefficient ka in Equation 12 to be somewhat smaller than that of the floor reaction force's horizontal component allowable limit for the simplified model's gait, or the like.

Moreover, the ZMP allowable range is set similarly to the description regarding setting of the floor reaction force's moment allowable range in S029 in FIG. 12 of the foregoing first embodiment. Of course, the ZMP allowable range may be converted into the equivalent floor reaction force's moment allowable range by multiplying the ZMP allowable range by the floor reaction force's vertical component.

Next, processing proceeds to S3032, where current time gait instantaneous values (values at current time t) are determined by the use of the foregoing simplified model (dynamic model in FIG. 10). The processing of S3032 is the same as the processing of S030 in FIG. 12 in the first embodiment, except for a part of the processing. To be more specific, in the processing of S3032, the current time gait instantaneous values are determined where the model manipulation floor reaction force's moment is set to be zero, in other words, so that the floor reaction force's moment generated about the desired ZMP becomes zero. In short, in the processing of S3032, the processing of S1102 and S1122 in FIG. 41, that is the subroutine processing within the processing of S3032, is executed where the model manipulation floor reaction force's moment is set to be zero. Apart from this, the processing of S3032 is the same as the processing of S030 of the first embodiment.

Next, processing proceeds to S3034, where movements of arms for canceling the spin force are determined. This processing is the same as the processing of S032 in FIG. 12 in the first embodiment.

The gait instantaneous values at current time t, generated by the processing up to S3034 described above, are hereinafter referred to as simplified model's gait instantaneous values. In this embodiment, the simplified model's gait instantaneous values are determined by the use of the simplified model (dynamic model in FIG. 10) to cause the floor reaction force's moment generated about the desired ZMP by the resultant force of the inertial force and gravity generated in the robot 1 by a movement thereof, to be zero (to satisfy the dynamic equilibrium conditions with respect to the desired ZMP).

In this case, among the simplified model's instantaneous values, the instantaneous values of the body horizontal position and body posture angle, as well as the instantaneous value of the body vertical position are provisional instantaneous values and will be corrected by full-model correction described later. Moreover, among the simplified model's instantaneous values in this embodiment, the instantaneous value of the desired floor reaction force's moment about the desired ZMP is normally zero. However, a desired floor reaction force's moment for compliance control will be generated as a desired value of the floor reaction force's moment to be generated about the desired ZMP by the full-model correction described later.

Next, processing proceed to S3036, where instantaneous values (values at current time t) of the floor reaction force's horizontal component allowable limit for gait correction and ZMP allowable range are obtained based on the parameters (set in S3030) defining the floor reaction force's horizontal component allowable limit for gait correction and ZMP allowable range.

Next, processing proceeds to S3038, where the corrected gait is generated (gait is corrected) by the use of the full model. Thus, final instantaneous values of the desired gait are determined. In other words, as described with reference to foregoing FIG. 47, the corrected desired body position/posture and the desired floor reaction force's moment for compliance control serving as the desired floor reaction force's moment about the desired ZMP, are calculated (determined), for example.

Next, processing proceed to S3040, where time t is increased by Δt. Thereafter, processing returns to S3014, and the processing from S3014 to S3040 is repeated.

The processing of S3038 described above is a characteristic part of this embodiment and is detailed hereinbelow. A method of gait correction by the device according to this embodiment is a full-model feed-forward correction type. In addition, the inverse dynamic full model (inverse full model) is used in this method. Further, in this method, the inputs of the simplified model's gait are not corrected and a perturbation model is used.

Figure 48:
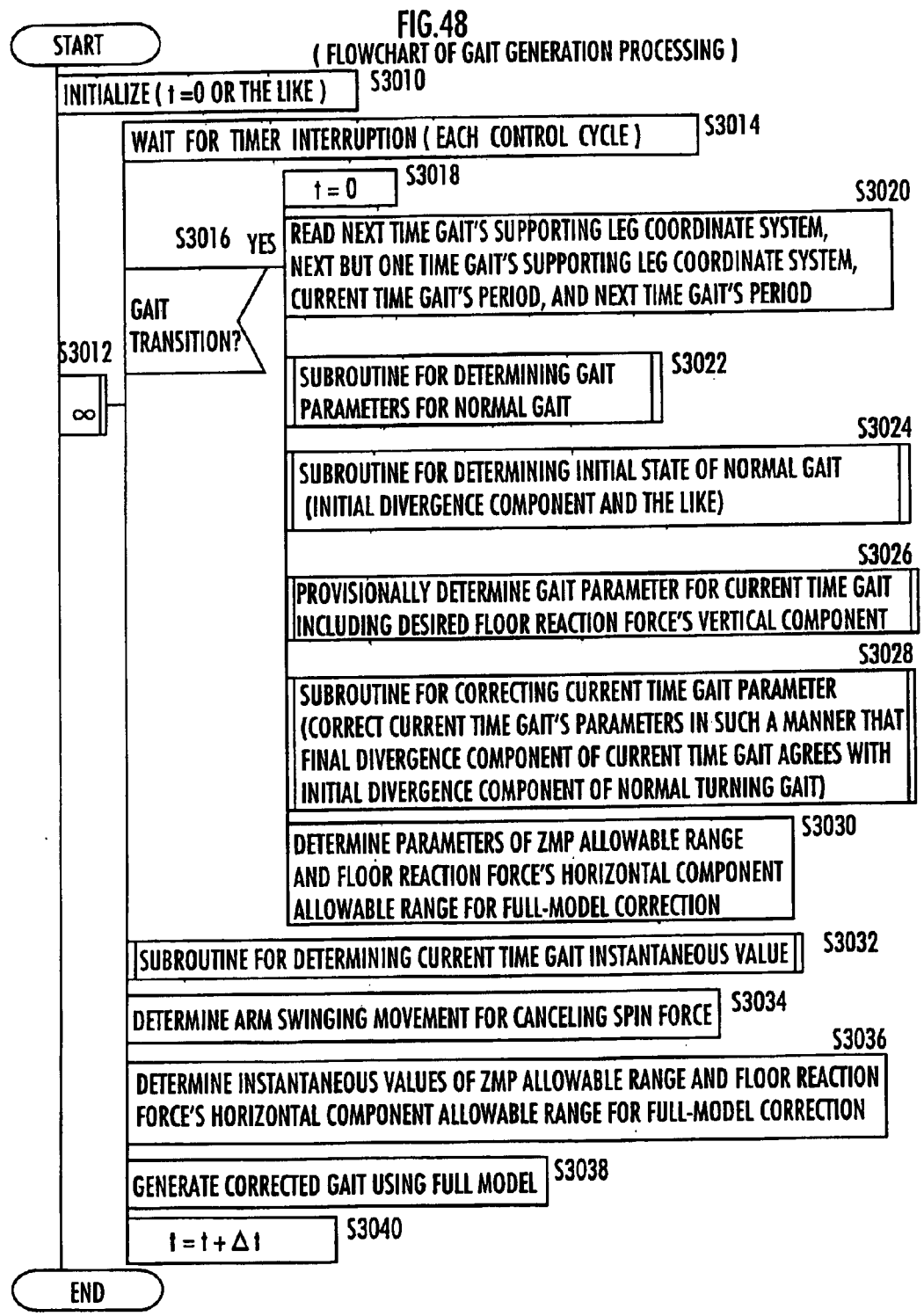
FIG. 48 is a flowchart showing main routine processing of the gait generating device in the third embodiment.
Figure 49:
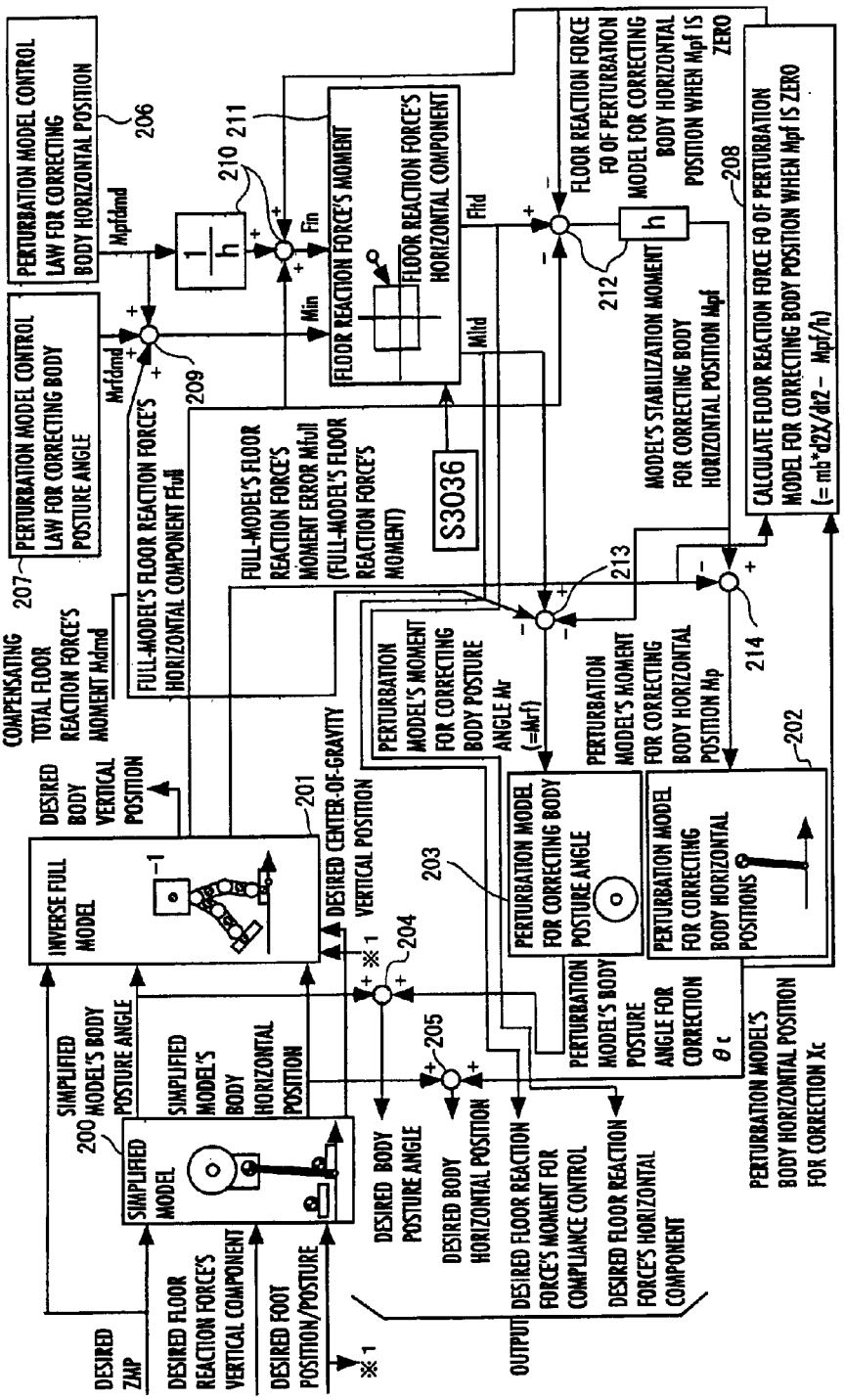
FIG. 49 is a block diagram functionally showing a gait generating method in the third embodiment.

FIG. 49 is a functional block diagram explaining the operation of the gait generating device 100 of this embodiment, more specifically, the gait correction method of S3038 of the flowchart in FIG. 48. A simplified model 200 in FIG. 49 represents not only a dynamic model but also the processing from S3010 to S3034 described earlier, that is, the calculation (determination) processing of the simplified model's gait instantaneous values. Therefore, in FIG. 49, the processing after the simplified model 200 corresponds to the processing of S3038.

Note that, the processing for determining the instantaneous values of the floor reaction force's horizontal component allowable limit for gait generation and ZMP allowable range is denoted by Reference Symbol S3036 of the flowchart in FIG. 48.

The actual processing is executed by using a single computer. Thus, after the block diagram is broken up, the actual processing is sequentially executed from the upstream side to the downstream side (gait output side) of the block diagram. However, a value (state quantity) calculated in the last control cycle (time t−Δt with respect to current time t) is used as a feedback amount which returns to the upstream side. Note that the value calculated by the last control cycle (time t−Δt) is abbreviated as a last value.

Whenever the processing of S3038 is executed, calculation for one control cycle in the block diagram is executed.

In S3038, first of all, inputted to the foregoing inverse dynamic full model (inverse full model) 201 are instantaneous values of valuables expressing movements (movement variables) of the desired body posture angle of the simplified model's gait obtained as above (hereinafter, referred to as a simplified model's body posture angle), desired body horizontal position of the same (hereinafter, referred to as a simplified model's body horizontal position), desired center of gravity of the same, desired foot position/posture of the same, desired arm postures of the same, and the like, as well as the instantaneous value of the desired ZMP. Calculation processing of the inverse full model 201 calculates a floor reaction force's horizontal component and a floor reaction force's moment about the desired ZMP which balance with the movements expressed by the movement variables inputted (in other words, a floor reaction force's horizontal component and a floor reaction force's moment about the desired ZMP which are generated from the full model by the movements). Note that the floor reaction force's moment about the desired ZMP in the simplified model's gait is zero. Thus, the floor reaction force's moment about the desired ZMP calculated by the inverse full model 201 has a meaning of an error of the simplified model's gait. Note that the floor reaction force's horizontal component and floor reaction force's moment obtained by the inverse full model 201 are referred to as "full-model's floor reaction force's horizontal component" and "full-model's floor reaction force's moment", respectively. Hereinafter, the full-model's floor reaction force's horizontal component and the full-model's floor reaction force's moment are often abbreviated as Ffull and Mfull, respectively.

Further, the above-mentioned inverse full model 201 calculates a body vertical position satisfying the desired center of gravity. Furthermore, though not illustrated, the inverse full model 201 calculates the center of gravity horizontal position.

Supplementarily, the desired total center of gravity vertical position is inputted to the full model. In addition, the desired floor reaction force's vertical component is obtained from the second-order differential of the desired total center of gravity vertical position. Thus, it is not particularly required to input the desired floor reaction force's vertical component to the full model. Although it will cause redundancy, the desired floor reaction force's vertical component may be inputted to the full model to reduce calculation.

Here, a perturbation model used for the gait correction is described.

The perturbation model is configured by a perturbation model for correcting body horizontal position 202 and a perturbation model for correcting body posture angle 203. Note that the perturbation model may be one model like the one in FIG. 10 instead of being broken up into two models.

The perturbation model for correcting body horizontal position 202 expresses a relation between a perturbation of the floor reaction force and a perturbation of the body horizontal position in the foregoing body translation mode.

The perturbation model for correcting body horizontal position 202 receives an input of a correction amount of the desired floor reaction force's moment and calculates a correction amount of the desired body horizontal position which dynamically balances with the input. This input (correction amount of the desired floor reaction force's moment) is called a perturbation model's moment for correcting body horizontal position Mp. The output of the perturbation model for correcting body horizontal position 202 (correction amount of the desired body horizontal position) is called a perturbation model's body horizontal position for correction Xc. Further, the floor reaction force's horizontal component generated by the perturbation model for correcting body horizontal position 202 is called a perturbation model's floor reaction force's horizontal component for correcting body horizontal position Fp.

Figure 50:
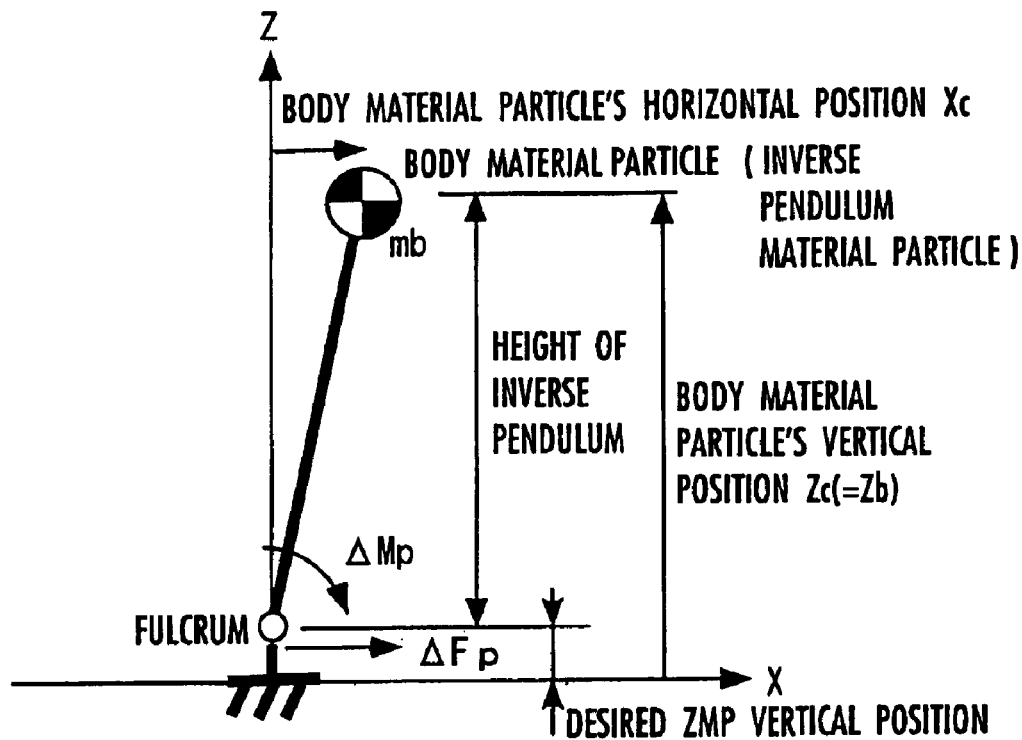
FIGS. 50 and 51 are explanatory views of perturbation models.

As shown in FIG. 50, the perturbation model for correcting body horizontal position 202 is expressed by an inverted pendulum configured by a fulcrum, a inverted pendulum material particle (body material particle), and an elastic support bar connecting the fulcrum and the inverted pendulum material particle. The position of the fulcrum is set so that the horizontal position of the fulcrum coincides with the horizontal position of the origin of the current time gait's supporting leg coordinate system described earlier, and the vertical position of the fulcrum coincides with the vertical position of the desired ZMP. The mass mb of the inverse pendulum material particle is equal to the mass of the body material particle of the foregoing simplified model shown in FIG. 10 (model having three material particles+flywheel). The vertical position Zc of the inverse pendulum is equal to the vertical position Zb of the body material particle of the simplified model shown in FIG. 10 which corresponds to the simplified gait.

The perturbation model for correcting body horizontal position 202 expresses a relation between a perturbation of floor reaction force's moment ΔMy and a perturbation of body material particle's horizontal position ΔXb in Equations 01, 02 and 03, dynamic equations of the foregoing simplified model (model with three material particles).

Hence, functions other than My, Xb and Zb are regarded as constants, and the relation between the perturbation of floor reaction force's moment ΔMy and the perturbation of body material particle's horizontal position ΔXb is obtained from Equation 03. Thus, the following equation is obtained.

$$\Delta My = -mb^* \Delta Xb^* (g + d2Zb/dt2) + mb^* (Zb - Zzmp)^* d2\Delta Xb/dt2$$
<div align="right">Equation a12</div>

Similarly, functions other than Fx and Xb are regarded as constants, and the relation between the perturbation of floor reaction force's horizontal component ΔFx and the perturbation of body material particle's horizontal position ΔXb is obtained from Equation a9. Thus, the following equation is obtained.

$$\Delta Fx = mb^* d2\Delta Xb/dt2$$
<div align="right">Equation a13</div>

The foregoing body translation mode floor reaction force ratio h, which is a ratio between ΔMp and ΔFp generated by the body horizontal acceleration, is a ratio between a term generated by the body horizontal acceleration (that is, the second term) on the right side of Equation a12, and Equation a13. Thus, the following equation is obtained.

$$h = (Zb - Zzmp)$$
<div align="right">Equation a14</div>

In other words, the body translation mode floor reaction force ratio h is equivalent to the height of the body material particle (inverse pendulum material particle) from the fulcrum of the simplified model.

Thus, the following equation is obtained from Equations a12 and a14.

$$\Delta My = -mb^* \Delta Xb^* (g + d2Zb/dt2) + mb^* h^* d2\Delta Xb/dt2$$
<div align="right">Equation a15</div>

Meanwhile, a floor reaction force's vertical component which balances with the translational force's vertical component of the resultant force of the gravity and inertial force acting on the body material particle (inverse pendulum material particle), is called a body's floor reaction force's vertical component Fbz. In other words, the body's floor reaction force's vertical component Fbz is defined by the following equation.

$$Fbz = mb^* (g + d2Zb/dt2)$$
<div align="right">Equation a16</div>

Based on Equation a8, the body's floor reaction force's vertical component Fbz is expressed by the following equation.

$$Fbz = Fz - msup^* (g + d2Zsup/dt2) - mswg^* (g + d2Zswg/dt2)$$
<div align="right">Equation a17</div>

In other words, the body's floor reaction force's vertical component is equal to the sum of the floor reaction force's vertical component Fz and the translational force's vertical component of the resultant force of the gravity and inertial force acting on the material particles of both legs of the foregoing simplified model shown in FIG. 10 (model with three material particles and flywheel).

By substituting Equation a15 in Equation a16, the following equation is obtained.

$$\Delta My = -Fbz^* \Delta Xb + mb^* h^* d2\Delta Xb/dt2$$
<div align="right">Equation a18</div>

The following equation is obtained by bringing ΔMy in Equation a18 into correspondence with the perturbation model's moment for correcting body horizontal position Mp, and bringing ΔXb into correspondence with the perturbation model's body horizontal position for correction Xc (by substituting the perturbation model's moment for correcting body horizontal position Mp for ΔMy in Equation a18, and substituting the perturbation model's body horizontal position for correction Xc for ΔXb).

$$Mp = Fbz*Xc + mb*h*d2Xc/dt2 \qquad \text{Equation a19}$$

Thus, the perturbation model for correcting body horizontal position 202 is expressed by Equation a19, by using the body translation mode floor reaction force ratio h obtained in Equation a14 and body's floor reaction force's vertical component Fbz obtained in Equation a17.

Further, the following equation is obtained by bringing ΔFx of Equation a13 into correspondence with the perturbation model's floor reaction force's horizontal component for correcting body horizontal position Fp.

$$Fp = mb*d2Xc/dt2 \qquad \text{Equation a20}$$

In other words, the perturbation model for correcting body horizontal position 202 is described by Equations a14, a17, a19, and a20.

Supplementarily, it is herein considered that the perturbation of the body material particle's position and the perturbation of body position (position of body's representative point) coincide with each other. Strictly speaking, however, they do not always coincide with each other. Therefore, a model expressing a geometric relation between the body material particle's horizontal position and body position is further required in order to obtain the relation among Mp, Fp and Xc.

Meanwhile, the perturbation model for correcting body posture angle 203 expresses a relation between a perturbation of floor reaction force and a perturbation of body posture angle in the foregoing body rotation mode.

The perturbation model for correcting body posture angle 203 receives an input of an correction amount of the floor reaction force's moment, and calculates a correction amount of the desired body posture angle which dynamically balances with the input. This input (correction amount of the floor reaction force's moment) is called a perturbation model's moment for correcting body posture angle Mr. Further, the output of the perturbation model for correcting body posture angle 203 (correction amount of the desired body posture angle) is called a perturbation model's body posture angle for correction θc. In addition, a floor reaction force's horizontal component generated by the perturbation model for correcting body posture angle is called a floor reaction force's horizontal component of perturbation model for correcting body horizontal position Fr. As mentioned earlier, Fr is zero. Thus, the following equation always holds true.

$$Fr = 0 \qquad \text{Equation a21}$$

Figure 51:
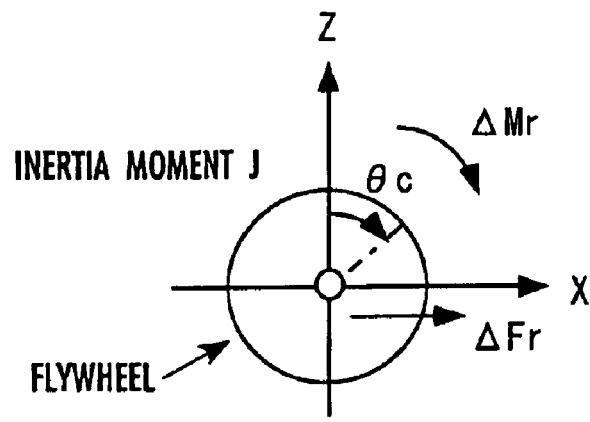

The perturbation model for correcting body posture angle 203 is expressed by a flywheel FH as shown in FIG. 51. Inertia of the flywheel is equal to that of the flywheel FH of the foregoing simplified model shown in FIG. 10 (model with three material particles+flywheel). A rotation angle of the flywheel of the perturbation model for correcting body posture angle 203 corresponds to the perturbation model's body posture angle for correction θc, and the floor reaction force's moment generated by the flywheel corresponds to the perturbation model's moment for correcting body posture angle Mr.

The perturbation model for correcting body posture angle 203 expresses a relation between a perturbation of the floor reaction force's moment ΔMy and a perturbation of the body posture angle Δθby in foregoing Equation 03, a dynamic equation of the foregoing simplified model (model with three material particles+flywheel).

Thus, functions other than My and θby are regarded as constants, and the relation between the perturbation of the floor reaction force's moment ΔMy and the perturbation of the body posture angle Δθby is obtained from Equation 03. Thus, the following equation is obtained.

$$\Delta My = J*d2\Delta\theta by/dt2 \qquad \text{Equation a22}$$

The following equation is obtained by bringing ΔMy of Equation a22 into correspondence with the perturbation model's moment for correcting body posture angle Mr, and bringing Δθ by into correspondence with the perturbation model's body posture angle for correction θc.

$$Mr = J*d2\Delta\theta c/dt2 \qquad \text{Equation a23}$$

In other words, the perturbation model for correcting body posture angle 203 is expressed by Equation a23. Further, the perturbation model's floor reaction force's horizontal component for correcting body horizontal position Fr is expressed by Equation a21 as described earlier (Fr=0).

As described later, in S3038, a corrected gait (to be more specific, desired instantaneous values obtained by partially correcting the instantaneous values of the simplified model's gait) is ultimately generated (outputted). The desired body posture angle of the corrected gait (hereinafter, referred to as corrected desired body posture angle) is obtained by adding the aforementioned perturbation model's body posture angle for correction θc (value obtained in the control cycle at current time t) to the instantaneous value of the simplified model's body posture angle obtained earlier (instantaneous value of the desired body posture angle at current time t of the current time gait, obtained in S3032) at a calculator 204. The desired body horizontal position of the corrected gait (hereinafter, referred to as corrected desired body horizontal position) is obtained by adding the perturbation model's body horizontal position for correction Xc (value obtained in the control cycle at current time t) to the instantaneous value of simplified model's body horizontal position obtained earlier (instantaneous value of the desired body horizontal position at current time t of the current time gait, obtained in S032) at a calculator 205.

The desired floor reaction force of the corrected gait is also corrected. Specifically, the floor reaction force's moment's horizontal component about the desired ZMP is no longer zero, and the desired floor reaction force's moment for compliance control is outputted as the desired value. Further, the desired floor reaction force's horizontal component is corrected into the corrected desired floor reaction force's horizontal component and outputted.

As described earlier, a movement of the corrected gait is a movement obtained by adding (combining) perturbation model's movements (specifically, movements of the perturbation model for correcting body position/posture and the perturbation model for correcting body posture angle) to a movement of the simplified model's gait.

Generally, a floor reaction force, generated from a movement obtained by adding a perturbation movement to a reference movement, approximates to the sum of a floor reaction force generated by the reference movement (floor reaction force balancing with the gravity and inertial force generated by the movement) and a perturbation of a floor reaction force generated by the perturbation movement.

Thus, a floor reaction force generated by a movement of the corrected gait (precisely, a value of floor reaction force generated by the movement of the corrected gait, calculated by the use of the inverse full model 201) is obtained by adding the input moment of the perturbation model for correcting body position/posture 202 (foregoing perturbation model's moment for correcting body horizontal position Mp) and the input moment of the perturbation model for correcting body posture angle 203 (foregoing perturbation model's moment for correcting body posture angle Mr), to the floor reaction force of the inverse full model 201 (the value of floor reaction force generated by a movement of the simplified model's gait, calculated by the use of the inverse full model 201).

To satisfy the dynamic equilibrium conditions by the corrected gait with good accuracy is equal to that the floor reaction force generated by the movement of the corrected gait (precisely, the floor reaction force generated on the inverse full model 201 by the movement of the corrected gait) almost coincides with the corrected desired floor reaction force. Thus, in order to satisfy the conditions, the following two equations should be satisfied.

Full-model's floor reaction force's moment $Mfull+$ perturbation model's moment for correcting body horizontal position $Mp+$ perturbation model's moment for correcting body posture angle $Mr=$ corrected desired floor reaction force's moment  Equation a5

Full-model's floor reaction force's horizontal component $Ffull+$ perturbation model's floor reaction force's horizontal component for correcting body horizontal position $Fp+$ perturbation model's floor reaction force's horizontal component for correcting body posture angle $Fr=$ corrected desired floor reaction force's horizontal component  Equation a6

Further, the true ZMP of the corrected gait is changed to a point shifted from the desired ZMP (ideal desired ZMP) of the simplified model's gait by a value obtained by dividing the corrected desired floor reaction force's moment by the desired floor reaction force's vertical component.

True ZMP of corrected gait=desired ZMP+corrected desired floor reaction force's moment/desired floor reaction force's vertical component  Equation a7

Note that, when calculating an X-direction (front-and-back direction) component of the true ZMP of the corrected gait, a component about Y axis (right-and-left direction axis) of the corrected desired floor reaction force's moment is used. Further, when calculating a Y-direction component of the true ZMP of the corrected gait, a component about the X axis (front-and-back axis) of the corrected desired floor reaction force's moment is used. However, when calculating the Y-direction component of the true ZMP of the corrected gait, "+" on the right side of Equation a7 should be "−".

The true ZMP of the corrected gait obtained by Equation a7 should be within the ZMP allowable range. This is called ZMP constraint.

Moreover, the corrected desired floor reaction force's horizontal component should be within the floor reaction force's horizontal component allowable limit for gait correction. This is called a floor reaction force's horizontal component constraint.

As described above, the corrected gait should satisfy Equations a5, a6, the ZMP constraint (condition on a range where the true ZMP of the corrected gait obtained by Equation a7 exists) and the floor reaction force's horizontal component constraint.

However, to simply satisfy these equations and conditions results in divergence of the foregoing perturbation model's body position for correction and the perturbation model's body posture angle for correction.

Therefore, based on state quantities of the foregoing perturbation model for correcting body horizontal position 202 and perturbation model for correcting body posture angle 203 (to be more specific, body horizontal position/velocity of the perturbation model for correction, body posture angle and its angular velocity of perturbation model for correction, and the like), stabilization control of the perturbation models for correction 202 and 203 is performed to converge (stabilize) these state quantities to predetermined states.

First of all, the stabilization control of the perturbation model for correcting body horizontal position 202 is detailed.

In Patent Application No. 2001-133621 earlier proposed by the present applicant, there is the control law in which the perturbation model of inverse-pendulum type is used to cause the center of gravity horizontal position XGf calculated by using the full model based on instantaneous posture of the corrected gait to converge to the center of gravity horizontal position XGs calculated by using the simplified model based on instantaneous posture of the simplified model's gait. A feedback amount (feedback manipulated amount) determined by the control law is additionally inputted to the perturbation model for correcting body horizontal position.

Specifically, the control law of Equation a9 is given so that the center of gravity horizontal position XGf converges to a desired settling position given in Equation a8. Here, mtotal is the foregoing gloss weight of the robot, mb is the foregoing mass of body material particle (mass of inverse pendulum), XGf is the center of gravity horizontal position calculated by the use of the full model based on the instantaneous position of the simplified model's gait, that is, the center of gravity horizontal position calculated by the foregoing inverse full model. Further, Kp and Kv are gains of feedback control.

Desired settling position=−$mtotal/mb*(XGf-XGs)$  Equation a8

ZMP-converted value of feedback amount for controlling perturbation model for correcting body horizontal position= $Kp*$(perturbation model's body horizontal position for correction−desired settling position)+$Kv*$perturbation model's body horizontal velocity for correction+perturbation model's body horizontal position for correction  Equation a9

Supplementarily, when calculation is actually executed on a computer, values of the variables on the right side of the above equations are last values thereof. The same can be said of control laws described below.

The perturbation model for correcting body horizontal position used in the full-model correction method proposed at this time by the present applicant has strong nonlinearity. However, this perturbation model is similar to the perturbation model for correcting body horizontal position used in Patent Application No. 2001-133621 earlier proposed by the applicant of the present application concerned, in that the model is the inverse-pendulum type as described before.

Thus, in the full-model correction method proposed at this time, the desired settling position is determined similarly to above, and only a control law for convergence to the desired stabilized position is changed.

A control law for causing the perturbation model for correcting body horizontal position 202 to converge (to be stabilized) to the desired settling position is called a perturbation model control law for correcting body horizontal position 206. A feedback amount (manipulated amount) determined by this control law is called a required value of perturbation model's stabilization moment for correcting body horizontal position Mpfdmd. The term "required value" is added because a value determined by the above control law is limited and corrected so that the true ZMP is within the foregoing ZMP allowable range and the floor reaction force's horizontal component is within the floor reaction force's horizontal component allowable limit as described later. This limited and corrected moment is called a perturbation model's stabilization moment for correcting body horizontal position Mpf.

For the perturbation model control law for correcting body horizontal position 206, the following equation can be used in stead of Equation a9.

Required value of perturbation model's stabilization moment for correcting body horizontal position $Mpfdmd$=

$Kpp$*(perturbation model's body horizontal position for correction $Xc$−desired settling position)+

$Kpv$*perturbation model's body horizontal velocity for correction $dXc/dt$− perturbation model's body horizontal position for correction $Xc$*body's floor reaction force's vertical component $Fbz$ Equation a10 where Kpp and Kpv are gains of feedback control.

As stated in the description regarding the perturbation model for correcting body horizontal position 202, the body's floor reaction force's vertical component Fbz is acting on the body material particle (inverse pendulum material particle) in the vertical direction. Therefore, as the body material particle's position shifts from the origin (position of the fulcrum), a moment acts on the body material particle, causing the body material particle's position to shift even further. The third term on the right side of Equation a10 is a moment for canceling this moment.

When obtaining a component about the X axis (front-and-back axis) of the required value of perturbation model's stabilization moment for correcting body horizontal position Mpfdmd, Y-axis direction (right-and-left direction) components of the perturbation model's body horizontal position/velocity for correction and desired settling position are used.

When obtaining a component about the Y axis (right-and-left axis) of the required value of perturbation model's stabilization moment for correcting body horizontal position Mpfdmd, X-axis direction (front-and-back direction) components of the perturbation model's body horizontal position/velocity for correction and desired settling position are used, and "−" in the third term on the right side is changed to "+".

Note that the desired settling position may be zero (horizontal position of the inverse pendulum fulcrum). Further, the perturbation model control law for correcting body horizontal position 206 may be any one of various methods described in Patent Application No. 2001-133621 earlier proposed by the present applicant. Alternatively, apart from the above, the perturbation model control law for correcting body horizontal position 206 may be determined based on at least any one of state quantites of the perturbation model for correcting body horizontal position 202 (more specifically, body horizontal position/velocity of perturbation model for correction, or the like) so that the state quantity converges (is stabilized) to the predetermined state.

Next, stabilization control of the perturbation model for correcting body posture angle 203 is detailed.

A feedback amount (manipulated amount) is determined by a feedback control law, such as PI control, in accordance with the state of the perturbation model for correcting body posture angle 203 so that the corrected desired body posture angle, that is, the posture angle obtained by adding perturbation model's body posture angle for correction to the desired body posture angle by the simplified model, is settled to or follow the reference body posture angle outputted by the desired instantaneous value generator 100$b$ (obtained in S1004 in FIG. 40) or the desired body posture angle by the simplified model (obtained in S1014 in FIG. 40). The feedback amount is additionally inputted to the perturbation model for correcting body posture angle 203.

The above control law is called a perturbation model control law for correcting body posture angle 207. The feedback amount (manipulated amount) is called a required value of perturbation model's stabilization moment for correcting body posture angle Mrfdmd. The term "required value" is added for a reason similar to that for the required value of perturbation model's stabilization moment for correcting body horizontal position Mpfdmd. A limited and corrected moment is called a perturbation model's stabilization moment for correcting body posture angle Mrf.

The perturbation model control law for correcting body posture angle 207, which determines the required value of perturbation model's stabilization moment for correcting body posture angle Mrfdmd, can be specifically expressed as the following equation.

Required value of perturbation model's stabilization moment for correcting body posture angle $Mrfdmd$ =$Krp$*(perturbation model's body posture angle for correction $\theta c$ −(reference body posture angle−required body posture angle by simplified model))

+$Krv$*perturbation model's body posture angular velocity for correction $d\theta c/dt$ Equation a11 where Krp and Krv are gains of feedback control.

Note that, in Equation a11, zero may be used instead of (reference body posture angle—required body posture angle by simplified model).

Again, the processing of S3038 is described using the functional block diagram in FIG. 49. As described above, the required value of perturbation model's stabilization moment for correcting body horizontal position Mpfdmd is obtained by the aforementioned perturbation model control law for correcting body horizontal position 206 (Equation a10). In addition, the required value of perturbation model's stabilization moment for correcting body posture angle Mrfdmd is obtained by the aforementioned perturbation model control law for correcting body posture angle 207 (Equation a11).

Next, obtained by a F0 calculator 208 is an estimated (calculated) value F0 of floor reaction force of the perturbation model for correcting body position under the assumption that the perturbation model's stabilization moment for correcting body horizontal position Mpf is zero. As described later, the perturbation model's stabilization moment for correcting body horizontal position Mpf is added to the full-model's floor reaction force's moment Mfull, and the resultant moment is inputted to the perturbation model for correcting body horizontal position 202. Accordingly, F0 is a floor reaction force generated by the perturbation model for correcting body horizontal position 202, when only the full-model's floor reaction force's moment, whose sign is changed, is inputted to the perturbation model for correcting body horizontal position 202.

Specifically, F0 is obtained by the following equation.

$F0 = mb*d2Xc/dt2 - 1/h*Mpf$ Equation a12

The first term on the right side represents a floor reaction force's horizontal component of the perturbation model for correcting body horizontal position 202 at the last time (time t−Δt).

The second term on the right side represents a floor reaction force's horizontal component directly generated to the perturbation model for correcting body horizontal position 202 by the last perturbation model's stabilization moment for correcting body horizontal position Mpf (that is, a floor reaction force's horizontal component of a feedthrough term).

In other words, a value obtained by dividing the last perturbation model's stabilization moment for correcting body horizontal position Mpf by the body translation mode floor reaction force ratio h is subtracted from a value obtained by multiplying the last body material particle's horizontal acceleration of the perturbation model for correcting body horizontal position 202 by the mass of body material particle mb. Thus, the estimated value of floor reaction force F0 of the perturbation model for correcting body horizontal position, under assumption that Mpf is zero, is obtained.

Next, a floor reaction force's moment Min generated about the desired ZMP is obtained by a Min calculator 209 under the following assumptions: the perturbation model's stabilization moment for correcting body horizontal position Mpf is caused to coincide with the required value of perturbation model's stabilization moment for correcting body horizontal position Mpfdmd; the perturbation model's stabilization moment for correcting body posture angle Mrf is caused to coincide with the required value of perturbation model's stabilization moment for correcting body posture angle Mrfdmd; and the desired floor reaction force's moment for compliance control, serving as the desired floor reaction force's moment about the desired ZMP, is caused to coincide with the total sum of the compensated total floor reaction force's moment Mdmd, Mpf, and Mrf. At this time, the foregoing constraints (floor reaction force's horizontal component constraint and ZMP constraint) are ignored. This floor reaction force's moment is called an unlimited corrected desired floor reaction force's moment Min. The unlimited corrected desired floor reaction force's moment Min is obtained by the following equation.

$$Min = Mpfdmd + Mrfdmd + Mdmd \qquad \text{Equation a13}$$

In other words, the unlimited corrected desired floor reaction force's moment Min is obtained by adding the required value of perturbation model's stabilization moment for correcting body horizontal position Mpfdmd, the required value of perturbation model's stabilization moment for correcting body posture angle Mrfdmd, and the compensated total floor reaction force's moment Mdmd.

Next, a floor reaction force's horizontal component Fin is obtained by a Fin calculator 210. The floor reaction force's horizontal component Fin is generated under the following assumption: the perturbation model's stabilization moment for correcting body horizontal position Mpf is caused to coincide with the required value of perturbation model's stabilization moment for correcting body horizontal position Mpfdmd; the perturbation model's stabilization moment for correcting body posture angle Mrf is caused to coincide with the required value of perturbation model's stabilization moment for correcting body posture angle Mrfdmd; and the desired floor reaction force's moment for compliance control is caused to coincide with the total sum of the compensated total floor reaction force's moment Mdmd, Mpf, and Mrf. At this time, the foregoing constraints (floor reaction force's horizontal component constraint and ZMP constraint) are ignored. This floor reaction force's horizontal component is called an unlimited corrected desired floor reaction force's horizontal component Fin.

The corrected desired floor reaction force's horizontal component is obtained by foregoing Equation a6. As described earlier, however, the floor reaction force's horizontal component is not generated in the perturbation model for correcting body posture angle 203 by behavior of the perturbation model for correcting body posture angle 203. In other words, Fr is zero. Hence, a floor reaction force's horizontal component, which increases as the perturbation model's stabilization moment for correcting body horizontal position Mpf is changed from zero to the required value of perturbation model's stabilization moment for correcting body horizontal position Mpfdmd, is added to the corrected desired floor reaction force's horizontal component under assumption that the perturbation model's stabilization moment for correcting body horizontal position Mpf is zero. The resulting value is the unlimited corrected desired floor reaction force's horizontal component Fin.

Incidentally, the floor reaction force's horizontal component, which increases as the perturbation model's stabilization moment for correcting body horizontal position Mpf is changed from zero to the required value of perturbation model's stabilization moment for correcting body horizontal position Mpfdmd, has a value obtained by dividing the required value of perturbation model's stabilization moment for correcting body horizontal position Mpfdmd by the body translation mode floor reaction force ratio h.

Therefore, as shown in Equation a15, the unlimited corrected desired floor reaction force's horizontal component Fin is obtained as follows. The full-model's floor reaction force's horizontal component Ffull is added to the value obtained by dividing the required value of perturbation model's stabilization moment for correcting body horizontal position Mpfdmd by the body translation mode floor reaction force ratio h. Further, the calculated value of the floor reaction force F0 of the perturbation model for correcting body position, under assumption that the perturbation model's stabilization moment for correcting body horizontal position Mpf is zero, is also added to the above value.

$$Fin = 1/h \cdot Mpfdmd + Ffull + F0 \qquad \text{Equation a15}$$

Next, limiting means (limitation processing unit) 211 detailed later determines a limited corrected desired floor reaction force's moment Mltd (about the desired ZMP) and a limited corrected desired floor reaction force's horizontal component Fltd from the unlimited corrected desired floor reaction force's moment Min and the unlimited corrected desired floor reaction force's horizontal component Fin, respectively. The moment Mltd and the component Fltd are values obtained by imposing limitations to the moment Min and the component Fin. In this embodiment, the desired floor reaction force's moment for compliance control coincides with the limited corrected desired floor reaction force's moment Mltd, and the floor reaction force's horizontal component of the corrected gait coincides with the limited corrected desired floor reaction force's horizontal component Fltd.

The limited corrected desired floor reaction force's moment Mltd and limited corrected desired floor reaction force's horizontal component Fltd are determined so that the true ZMP of the corrected gait (including the desired floor reaction force's moment for compliance control) is within the foregoing ZMP allowable range, and the floor reaction force's horizontal component of the corrected gait is within the floor reaction force's horizontal component allowable limit. In other words, Mltd and Fltd are determined to satisfy the ZMP constraint and floor reaction force's horizontal component constraint.

Further, the perturbation model's stabilization moment for correcting body horizontal position Mp is determined to be the same as or the closest value to the required value of perturbation model's stabilization moment for correcting body horizontal position Mpfdmd as much as possible. Similarly, the perturbation model's stabilization moment for correcting body posture angle Mr is determined to be the same as or the closest value to the required value of perturbation model's stabilization moment for correcting body posture angle Mrfdmd as much as possible. Accordingly, the foregoing perturbation model's body position for correction Xc and perturbation model's body posture angle for correction θc are stabilized and prevented from diverging.

Next, the perturbation model's stabilization moment for correcting body horizontal position Mpf and the perturbation model's stabilization moment for correcting body posture angle Mrf are obtained by Mpf calculator 212 and Mrf calculator 213, respectively, by the following equations.

$$Mpf=(Fltd-Ffull-F0)*h \qquad \text{Equation a20}$$

$$Mrf=Mltd-Mpf-Mdmd \qquad \text{Equation a21}$$

In other words, at the Mpf calculator 212, the full-model's floor reaction force's horizontal component Ffull is subtracted from the limited corrected desired floor reaction force's horizontal component Fltd, and the calculated value of the floor reaction force F0 of perturbation model for correcting body position 202 is further subtracted from Fltd, assuming that Mp is zero. The resulting value is then multiplied by the body translation mode floor reaction force ratio h. Thus, the perturbation model's stabilization moment for correcting body horizontal position Mpf is obtained. Further, at the Mrf calculator 213, the perturbation model's stabilization moment for correcting body posture angle Mrf is obtained by subtracting the above-mentioned perturbation model's stabilization moment for correcting body horizontal position Mpf and compensated total floor reaction force's moment Mdmd from the limited corrected desired floor reaction force's moment Mltd about the desired ZMP.

Next, the perturbation model's floor reaction force's moment for correcting body horizontal position Mp and perturbation model's floor reaction force's moment for correcting body posture angle Mr are obtained by the following equations.

$$Mp=Mpf-Mfull \qquad \text{Equation a22}$$

$$Mr=Mrf \qquad \text{Equation a23}$$

Specifically, at an Mp calculator 214, the perturbation model's floor reaction force's moment for correcting body horizontal position Mp is obtained by subtracting the full-model's floor reaction force's moment Mfull from the perturbation model's stabilization moment for correcting body horizontal position Mpf. Further, the perturbation model's floor reaction force's moment for correcting body posture angle Mr has the same value as the perturbation model's stabilization moment for correcting body posture angle Mrf.

Next, the perturbation model's floor reaction force's moment for correcting body horizontal position Mp is inputted to the perturbation model for correcting body position 202, and the perturbation model's body position for correction Xc, which balances with the inputted floor reaction force's moment, is calculated.

Moreover, the perturbation model's floor reaction force's moment for correcting body posture angle Mr is inputted to the perturbation model for correcting body posture angle 203, and the perturbation model's body posture angle for correction θc, which balances with the inputted floor reaction force's moment, is calculated.

Next, corrected desired body horizontal position and corrected desired body posture angle are determined at calculators 205 and 204, in accordance with the following Equations a24 and a25, respectively. These are outputted as final desired instantaneous values of the body horizontal position/posture, respectively.

Corrected desired body horizontal position=simplified model's body horizontal position+perturbation model's body position for correction Xc  Equation a24

Corrected desired body posture angle=simplified model's body posture angle+perturbation model's body posture angle for correction θc  Equation a25

In other words, the corrected desired body horizontal position is obtained by adding the perturbation model's body position for correction Xc to the simplified model's body horizontal position, and outputted as the final desired body horizontal position. Further, the corrected desired body posture angle is obtained by adding the perturbation model's body posture angle for correction θc to the simplified model's body posture angle, and outputted as the final desired body posture angle.

In addition, the limited corrected desired floor reaction force's moment Mltd is outputted as the desired floor reaction force's moment for compliance control about the desired ZMP. At the same time, the unlimited corrected desired floor reaction force's horizontal component Fltd is outputted as the corrected desired floor reaction force's horizontal component.

In other words, the corrected desired floor reaction force's horizontal component and the corrected desired floor reaction force's moment about the desired ZMP are determined as final desired instantaneous values of the floor reaction force's horizontal component and floor reaction force's moment (moment about the desired ZMP), respectively, in accordance with the following Equations a26 and a27, and outputted.

Desired floor reaction force's moment for compliance control= limited corrected desired floor reaction force's moment Mltd  Equation a26

Corrected desired floor reaction force's horizontal component= limited corrected desired floor reaction force's horizontal component Fltd  Equation a27

The gait correction of S3038 is performed as described so far.

Supplementarily, in this embodiment, the correction is the feed-forward type and the perturbation dynamic model is not a precise model. Thus, strictly speaking, even where a gait is corrected to satisfy Equations a5 and a6 as described earlier, the dynamic equilibrium conditions are not necessarily satisfied but approximately satisfied.

Further, in this embodiment, the state quantities of the body movement of the perturbation model for correcting body horizontal position 202 and the perturbation model for correcting body posture angle 203, such as the horizontal position of the body material particle (inverse pendulum material particle) of the perturbation model for correcting body horizontal position 202 and the rotation angle of the flywheel of the perturbation model for correcting body posture angle 203, are added as state quantites of the simplified model 200 at the end of a gait for one step (current time gait's end), for example. In other words, the state quantities of the simplified model 200 at the end of the current time gait are corrected by addition of the states of the body movement of the perturbation model for correcting body horizontal position 202 and the perturbation model for correcting body posture angle 203. Furthermore, the state quantities of the respective perturbation models 202 and 203 are initialized. (For example, the horizontal position of the body material particle (inverse pendulum material particle) of the perturbation model for correcting body horizontal position 202 and the rotation angle of the flywheel of the perturbation model for correcting body posture angle 203, are reset to zero.) Thereafter, the state quantities of the simplified model 200 corrected as above are set as initial values for the next time gait, and the next time gait is generated. At the same time, the perturbation model's body horizontal position for correction Xc and the perturbation model's body posture angle for correction θc are calculated by the perturbation models 202 and 203, respectively. Thus, stabilization of behavior of the respective perturbation models 202 and 203 is further improved. Note that the correction of state quantities of the simplified model 200 as above may also be performed as appropriate while a gait is generated. In addition, the correction of state quantities of the simplified model 200 as above is performed in the later-described fourth and fifth embodiments in the similar manner.

Next, the aforesaid limiting means, that is, the processing of the limitation processing unit 211 is detailed.

In the limiting means (limitation processing unit 211), the following processing is performed to provide the aforementioned functions.

First of all, an instantaneous value of the ZMP allowable range determined by the desired instantaneous value generator 100b, that is, an instantaneous value of the ZMP allowable range determined in S3036 in foregoing FIG. 48, is converted into an instantaneous value of the floor reaction force's moment allowable range about the desired ZMP.

Specifically, the floor reaction force's moment allowable range is obtained using the relation of the following equation.

Floor reaction force's moment allowable range=(*ZMP* allowable range−desired *ZMP*)*floor reaction force's vertical component vector     Equation a32 where all variables in Equation a32 are vectors, and the floor reaction force's vertical component vector is a translation floor reaction force vector in which components other than the vertical component are zero. Further, "*" means an outer product.

It is known that a movement of a gait which only satisfies the dynamic equilibrium conditions (particularly the condition that causes the horizontal component of a moment which is acted about the desired ZMP by the resultant force of the gravity and inertial force, to be zero) without consideration of the ZMP constraint and the floor reaction force's horizontal component constraint, can approximately satisfy the dynamic equilibrium conditions even where the movement is generated by combining separated movements on a sagittal plane and on a lateral plane, each generated to satisfy the dynamic equilibrium conditions. Further, by setting the ZMP allowable range and the floor reaction force's horizontal component allowable limit for gait correction as above, the ZMP constraint and the floor reaction force's horizontal component constraint can also be separated into constraints on the sagittal plane and the lateral plane, respectively. Therefore, a movement of a gait under consideration of all of the ZMP constraint, the floor reaction force's horizontal component constraint, and dynamic equilibrium conditions can also be generated by combining movements on the sagittal plane and the lateral plane, which are separately generated.

Thus, to aid understanding, description is given below regarding the operation of the limiting means only for the movement on the sagittal plane. The same description is applied to the movement on the lateral plane.

Since description is simplified as mentioned above, the following equation can express that the desired floor reaction force's moment for compliance control defined by the corrected gait is within the floor reaction force's moment allowable range (which means that the true ZMP by a movement of the corrected gait is within the foregoing ZMP allowable range). Mmax is the upper limit of the floor reaction force's moment allowable range and Mmin is the lower limit of the same.

*Mmax*≧desired floor reaction force's moment for compliance control≧*Mmin*     Equation a33

Further, the following equation expresses that the floor reaction force's horizontal component of the corrected gait is within the floor reaction force's horizontal component allowable limit for gait correction. Fmax is the upper limit of the floor reaction force's horizontal component allowable limit and Fmin is the lower limit of the same.

*Fmax*≧floor reaction force's horizontal component for gait correction≧*Fmin*     Equation a34

Furthermore, in this embodiment, the desired floor reaction force's moment for compliance control coincides with or almost coincides with the limited corrected desired floor reaction force's moment Mltd, and the floor reaction force's horizontal component for gait correction coincides with or almost coincides with the limited corrected desired floor reaction force's horizontal component Fltd.

Hence, Equations a33 and a34 are approximately converted into the following Equations a35 and a36.

*Mmax*≧*Mltd*≧*Mmin*     Equation a35

*Fmax*≧*Fltd*≧*Fmin*     Equation a36

In the coordinate system shown in FIG. 52, the horizontal axis is a component in the X-axis direction (front-and-back axis direction) of the floor reaction force's horizontal component and the vertical axis is a component about the Y axis (right-and-left axis) of the floor reaction force's moment. In this coordinate system, assuming that a group of the limited corrected desired floor reaction force's horizontal component Fltd and the limited corrected desired floor reaction force's moment Mltd (Fltd, Mltd) is a point on the coordinate system, a set of the points (allowable range) satisfying Equations a35 and a36 is on the border or inside of the rectangle in FIG. 52.

Like the white circle in FIG. 52 (in this drawing, the white circle and the later-described black circle lie on top of another), when the unlimited corrected desired floor reaction force's moment Min is within the floor reaction force's moment allowable range and the unlimited corrected desired floor reaction force's horizontal component Fin is within the floor reaction force's horizontal component allowable limit, in other words, when the point (Fin, Min) is within the rectangular range surrounded by the floor reaction force's moment allowable range and the floor reaction force's horizontal component allowable limit, Mltd is set as the unlimited corrected desired floor reaction force's moment Min and Fltd is set as the unlimited corrected desired floor reaction force's horizontal component Fin, as shown by the black circle in the drawing. As a matter of course, Equations a35 and a36 hold true only by setting them as above. In other words, the desired floor reaction force's moment for compliance control is within the floor reaction force's moment allowable range, and the floor reaction force's horizontal component for gait correction is within the floor reaction force's horizontal component allowable limit. In addition, the unlimited corrected desired floor reaction force's moment Min and unlimited corrected desired floor reaction force's horizontal component Fin are outputted as they are as Mltd and Fltd, respectively, without being limited (corrected). Thus, the foregoing perturbation model's body position for correction and the foregoing perturbation model's body posture angle for correction are appropriately stabilized, thus preventing divergence.

Like the white circle of FIGS. 53 to 55, when the unlimited corrected desired floor reaction force's moment Min is not within the floor reaction force's moment allowable range or the unlimited corrected desired floor reaction force's horizontal component Fin is not within the floor reaction force's horizontal component allowable limit, that is, when the point (Fin, Min) is not within the rectangular range surrounded by the floor reaction force's moment allowable range and the floor reaction force's horizontal component allowable limit, Mltd and Fltd are determined as follows.

First of all, before describing a determination method of Mltd and Fltd, a policy in determining Mltd and Fltd is described.

If Mltd and Fltd are simply set as the unlimited corrected desired floor reaction force's moment Min and the unlimited corrected desired floor reaction force's horizontal component Fin, respectively, the desired floor reaction force's moment for compliance control does not remain within the floor reaction force's moment allowable range, or the floor reaction force's horizontal component for gait correction does not remain within the floor reaction force's horizontal component allowable limit. At this time, the perturbation model's stabilization moment for correcting body horizontal position Mpf and the perturbation model's stabilization moment for correcting body posture angle Mrf are obtained by substituting Min and Fin for Mltd and Fltd, respectively, in foregoing Equations a20 and a21. Mpf and Mrf obtained in this manner need to be changed in order to allow the desired floor reaction force's moment for compliance control to exist within the floor reaction force's moment allowable range and to allow the floor reaction force's horizontal component for gait correction to exist within the floor reaction force's horizontal component allowable limit. In this embodiment, it is prioritized at this time that Mrf coincides with the required value of perturbation model's stabilization moment for correcting body posture angle Mrfdmd as much as possible, that is, correction of Mrf from Mrfdmd is minimized.

The reason of above is as follows.

A floor reaction force's moment which can be corrected by the perturbation model for correcting body posture angle 203 is relatively small. If a large moment is corrected by this model, the body posture angle is largely changed. Therefore, it is preferable that correction of the simplified model's gait using the inverse full model 201 is performed possibly by adding the movement of the perturbation model for correcting body horizontal position 202 to the simplified model's gait if possible. Then, when the movement of the perturbation model for correcting body horizontal position 202 is not sufficient for the correction, it is preferable that a movement of the perturbation model for correcting body posture angle 203 is added to the simplified model's gait to correct the simplified model's gait. Thus, it is preferable that recovery of the perturbation model for correcting body posture angle 203 (recovery to the reference body posture angle) is prioritized over recovery of the perturbation model for correcting body horizontal position 202 (recovery of the body horizontal position to the stable position). In other words, it is preferred to prioritize that Mrf, the manipulated amount for recovering the perturbation model for correcting body posture angle 203, is set to coincide with the required value of perturbation model's stabilization moment for correcting body posture angle Mrfdmd as much as possible.

Between Mpf and Mrf obtained by substituting Min and Fin for Mltd and Fltd, respectively, in Equations a20 and a21, only Mpf should be changed, while Mrf is not changed, in order to cause Mrf to coincide with the required value of perturbation model's stabilization moment for correcting body posture angle Mrfdmd.

Here, a change amount of Fltd is set as $\Delta F$ and a change amount of Mltd is set as $\Delta M$. In other words, the Fltd and Mltd are changed as expressed by the following equations.

$$Fltd = Fin + \Delta F \qquad \text{Equation a37}$$

$$Mltd = Min + \Delta M \qquad \text{Equation a38}$$

Incidentally, the relation of the following equation is obtained from foregoing Equations a20 and a21.

$$Mrf = Mltd - Mdmd - (Fltd - Ffull - F0)*h \qquad \text{Equation a39}$$

As evident from above Equations a37 to a39, Mrf is not changed as long as the following equation holds true. In short, as long as the following equation holds true, Mrf is the same as Mrf where Fltd=Fin and Mltd=Min.

$$\Delta M = \Delta F * h \qquad \text{Equation a40}$$

Based on the above, $\Delta M$ and $\Delta F$ must satisfy above Equation a40.

On top of this, it is preferred that Mpf is as close to the required value of perturbation model's stabilization moment for correcting body horizontal position Mpfdmd as possible. Therefore, the change amount $\Delta F$ (or $\Delta M$) is determined to have a smallest possible absolute value. Further, Fltd and Mltd are determined using Equations a37 and a38. Hence, at least the foregoing perturbation model's body posture angle for correction $\theta c$ is appropriately stabilized, thus preventing divergence. In addition, the foregoing perturbation model's body horizontal position for correction Xc is stabilized as much as possible, thus preventing divergence.

A group of Fltd and Mltd determined as above is shown as the black circle (Fltd, Mltd) in FIGS. 53 and 54. Among intersection points between a line passing through the white circle (Fin, Min) and having the body translation mode floor reaction force ratio h as its inclination, and the border of the allowable range expressed by Equations a35 and a36, the black circle is a point closest to the white circle (Fin, Min).

Supplementarily, the above line means a set of the points (Fltd, Mltd) which satisfy Equations a37, a38 and a40. Further, when only the perturbation model's stabilization moment for correcting body horizontal position Mpf is changed from the state of the white circle, the ratio between the change amount $\Delta M$ of Mltd and the change amount $\Delta F$ of Fltd becomes the body translation mode floor reaction force ratio h. It is thus understood that the above line means a set of groups (Fltd, Mltd) where only the perturbation model's stabilization moment for correcting body horizontal position Mpf is changed from the state where (Fltd, Mltd) coincides with (Fin, Min).

However, if there is no Fltd and Mltd satisfying Equations a35, a36, a37, a38 and a40 as shown in FIG. 55, Fltd and Mltd are determined as follows. In this case, Mr has to be changed but consideration is given to minimize the change amount of Mr.

Therefore, Equation 41 is used instead of Equation a40.

$$\Delta M = \Delta F * h + \Delta Mp2 \qquad \text{Equation a41}$$

Fltd and Mltd are determined to satisfy Equations a35, a36, a37, a38 and a41. The closer $\Delta Mp2$ is to zero, the smaller the change amount of Mr becomes. Thus, $\Delta Mp2$ is determined to have a smallest possible absolute value. On top of satisfying these conditions, it is also preferred that Mp is as close to the required value of perturbation model's stabilization moment for correcting body horizontal position Mpfdmd as possible. Hence, $\Delta F$ is determined to have a smallest possible absolute value. Accordingly, at least the forgoing perturbation model's body posture angle for correction $\theta c$ is stabilized as much as possible, thus preventing divergence. On top of that, the foregoing perturbation model's body horizontal position for correction Xc is stabilized as much as possible, thus preventing divergence.

The group of Fltd and Mltd determined as above is represented by the black circle (Fltd, Mltd) in FIG. 55. The black circle is a point among apexes of the rectangular border of the allowable range (among intersection points of four lines showing upper and lower limits of the allowable range) expressed by Equations a35 and a36. (More generally, the black circle is a point among points on the border line of the allowable range). This point is the closest point to the line passing thorough the white circle (Fin, Min) and having the body translation mode floor reaction force ratio h as its inclination.

The limited corrected desired floor reaction force's moment Mltd and limited corrected desired floor reaction force's horizontal component Fltd about the desired ZMP are determined as described so far.

Supplementary description is given. When the floor reaction force's vertical component is zero (during the floating period of the running gait), the upper limit values Mmax and Fmax, and lower limit values Mmin and Fmin of Equations a35 and a36 are zero. Thus, the limited corrected desired floor reaction force's moment Mltd about the desired ZMP and limited corrected desired floor reaction force's horizontal component Fltd are also zero.

The above has been the details of the processing of S3038.

Here, each variable in this embodiment corresponds to each variable explained in the second embodiment as follows.

(a) The required value of perturbation model's stabilization moment for correcting body posture angle Mrfdmd, which is the output of the perturbation model control law for correcting body posture angle 207, corresponds to the required value of the model's body posture angle stabilization floor reaction force's moment.

(b) The required value of perturbation model's stabilization moment for correcting body horizontal position Mpfdmd, which is the output of the perturbation model control law for correcting body horizontal position 206, corresponds to the required value of model's body horizontal position stabilization floor reaction force's moment.

(c) The perturbation model's stabilization moment for correcting body posture angle Mrf corresponds to the model's body posture angle stabilization floor reaction force's moment.

(d) The model's stabilization moment for correcting body horizontal position Mpf corresponds to the model's body horizontal position stabilization floor reaction force's moment.

Hereinbelow, considering the above correspondence, it is proved that the corrected gait generated in this embodiment satisfies foregoing Equation d27 and recovery conditions.

As evident from FIG. 49, a movement of the corrected gait is a movement obtained by adding body movements of the perturbation model for correcting body horizontal position 202 and perturbation model for correcting body posture angle 203 to a movement of the simplified model's gait. From a viewpoint of dynamics of the full model 201, a floor reaction force generated about the desired ZMP by a movement of the simplified model's gait is the full-model's floor reaction force's moment Mfull, a floor reaction force generated by the body movement of the perturbation model for correcting body horizontal position 202 is the perturbation model's moment for correcting body horizontal position Mp, and a floor reaction force generated by the body movement of the perturbation model for correcting body posture angle 203 is the perturbation model's moment for correcting body posture angle Mr.

Therefore, the floor reaction force's moment generated by a movement of the corrected gait, that is, model manipulation floor reaction force's moment is expressed by the following equation.

Model manipulation floor reaction force's moment=full-model's floor reaction force's moment+perturbation model's moment for correcting body horizontal position Mp+perturbation model's moment for correcting body posture angle Mr
Equation d31

Moreover, as evident from FIG. 49, the following equation holds true.

Perturbation model's moment for correcting body horizontal position Mp=model's stabilization moment for correcting body horizontal position Mpf-full-model's floor reaction force's moment
Equation d32

Further, the perturbation model's moment for correcting body posture angle Mr coincides with the perturbation model's stabilization moment for correcting body posture angle Mrf. Specifically, the following equation is applied.

Perturbation model's moment for correcting body posture angle Mr=perturbation model's stabilization moment for correcting body posture angle Mrf
Equation d33

Accordingly, the following equation holds true from Equations d31, d32 and d33.

Model manipulation floor reaction force's moment=model's stabilization moment for correcting body horizontal position Mpf+model's stabilization moment for correcting body posture angle Mrf
Equation d34

Equation d34 corresponds to Equation d30 of the second embodiment.

Supplementarily, in FIG. 49, in a case where the model's stabilization moment for correcting body horizontal position Mpf and perturbation model's stabilization moment for correcting body posture angle Mrf are both zero, a generated gait has zero moment about the desired ZMP. Therefore, the gait generated in the above case is equivalent to the original gait.

Yet further, as evident from FIG. 49, the following equation holds true.

Perturbation model's stabilization moment for correcting body posture angle Mrf=limited floor reaction force's moment Mltd−model's stabilization moment for correcting body horizontal position Mpf−compensated total floor reaction force's moment Mdmd
Equation a35

Thus, the following equation holds true from Equations d34 and d35.

Limited floor reaction force's moment $Mltd$=model manipulation floor reaction force's moment+compensated total floor reaction force's moment $Mdmd$             Equation d36

Incidentally, the limited corrected desired floor reaction force's moment Mltd is determined by the foregoing limiting means (limitation processing unit 211) not to exceed the floor reaction force's moment allowable range. Therefore, the right side of Equation d36 does not exceed the floor reaction force's moment allowable range either. Thus, the foregoing recovery condition 1 is satisfied.

Moreover, in this embodiment, the limited floor reaction force's moment Mltd is set as the desired floor reaction force's moment for compliance control. Thus, foregoing Equation d27 holds true by foregoing Equation d36.

Meanwhile, as described earlier, the limited corrected desired floor reaction force's horizontal component Fltd is determined by the limiting means (limitation processing unit 211) not to exceed the floor reaction force's horizontal component allowable limit.

Further, according to calculation processing until the perturbation model's moment for correcting body horizontal position Mp is determined from the limited corrected desired floor reaction force's horizontal component Fltd, the floor reaction force's horizontal component of the corrected gait almost coincides with the limited corrected desired floor reaction force's horizontal component Fltd.

Thus, the floor reaction force's horizontal component for corrected gait does not exceed the floor reaction force's horizontal component allowable limit. Thus, the foregoing recovery condition 2 is satisfied.

Moreover, in the processing of the limiting means (limitation processing unit 211), on top of satisfying the recovery conditions 1 and 2, a moment obtained by subtracting the model's stabilization moment for correcting body horizontal position Mpf and compensated total floor reaction force's moment Mdmd from the limited floor reaction force's moment Mltd, is determined to coincide with or to be a value close to the required value of the perturbation model's stabilization moment for correcting body posture angle Mrfdmd as much as possible.

Therefore, on top of satisfying the recovery conditions 1 and 2, the perturbation model's stabilization moment for correcting body posture angle Mrf is determined to coincide with or to be a value close to the required value of perturbation model's stabilization moment for correcting body posture angle Mrfdmd as much as possible. Thus, the foregoing recovery condition 3 is satisfied.

Moreover, according to calculation processing until the perturbation model's stabilization moment for correcting body horizontal position Mpf is determined from the required value of the perturbation model's stabilization moment for correcting body horizontal position Mpfdmd, the perturbation model's stabilization moment for correcting body horizontal position Mp is determined by the limited means (limitation processing unit 211) to coincide with or to be a value close to the required value of the perturbation model's stabilization moment for correcting body horizontal position Mpfdmd as much as possible, on top of satisfying the recovery conditions 1, 2 and 3. Thus, the foregoing recovery condition 4 is satisfied.

Further, when inputs to the limiting means (limitation processing unit 211) are continuous, outputs thereof are also continuous. Thus, the foregoing recovery condition 5 is satisfied.

As described above, all recovery conditions described earlier are satisfied in this embodiment. Thus, the same operational advantages as those of the second embodiment can be achieved.

In addition to the operational advantages of the second embodiment, the calculation amount can be reduced when determining body horizontal position and body posture angle to satisfy the foregoing recovery conditions.

Here, correspondence of the above-mentioned third embodiment to the present invention is described. The third embodiment corresponds to the foregoing first to fourteenth aspects and the sixteenth to twenty-third aspects of this invention. In this case, in the third embodiment, the body posture angle of the robot 1 is equivalent to the state quantity of the posture of the robot, the floor reaction force's horizontal component is equivalent to the variable to be limited, the perturbation model's moment for correcting body posture angle Mr and perturbation model's moment for correcting body horizontal position Mp are equivalent to the correction manipulated variable of the desired floor reaction force, the compensated total floor reaction force's moment Mdmd is equivalent to the first required manipulated variable, the floor reaction force's moment for compliance control is equivalent to the actual floor reaction force manipulated variable, and the required value of perturbation model's stabilization moment for correcting body position Mpfdmd and required value of perturbation model's stabilization moment for correcting body posture angle Mrfdmd are equivalent to the second required manipulated variable. In addition, the simplified model 200 (model in FIG. 10), the inverse full model 201, the perturbation model for correcting body posture 203 and perturbation model for correcting body horizontal position 202 are used as the dynamic model. Movements of the simplified model 200, the perturbation model for correcting body posture 203 and the perturbation model for correcting body horizontal position 202 include the body translation mode and body rotation mode. Further, gait parameters are corrected as appropriate, depending on the state quantities of the corrected gait in the processing in S3028 in FIG. 48.

Next, the fourth embodiment of this invention is described hereinbelow. A correction method of the device in the fourth embodiment is different from that of the third embodiment described above only in processing of the gait generating device 100 (processing of S3038 in FIG. 48). This correction method is a full-model feedback correction type. In addition, in this method, the inverse dynamic full model (inverse full model) is used and inputs to the simplified model's gait are not corrected. Further, perturbation models are used in this method.

Figure 56:
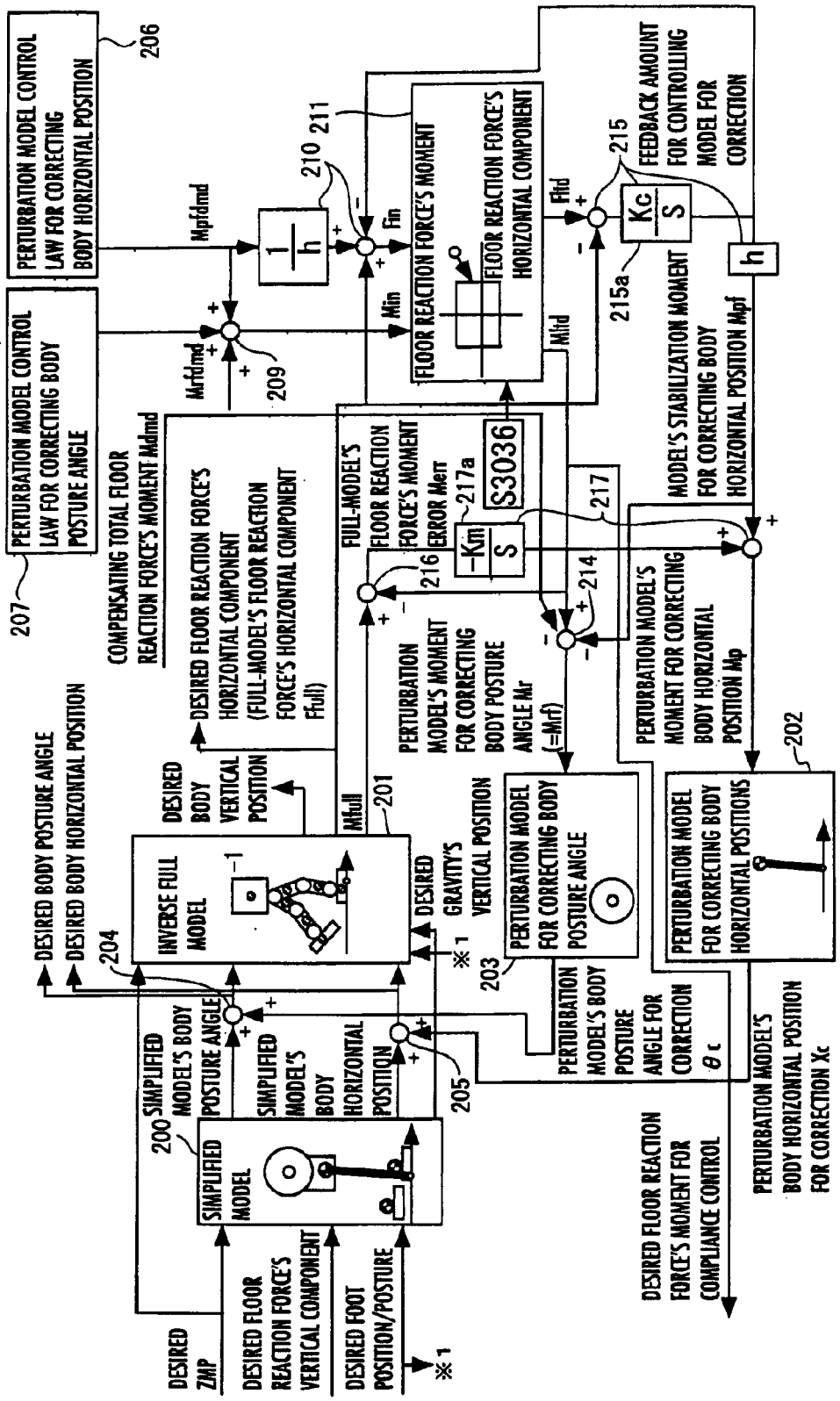
FIG. 56 is a block diagram functionally showing a gait generation method in the fourth embodiment.

FIG. 56 is a functional block diagram explaining the operation of the device according to the fourth embodiment, specifically, the correction method of the gait in S3038 of the flowchart in FIG. 48. Similarly to the third embodiment, the simplified model 200 in FIG. 56 represents not only the processing of the dynamic model, but also the processing from S3010 to S3034 in FIG. 48, that is, calculation (determination) processing of instantaneous values of the simplified model's gait. Therefore, in FIG. 56, processing after the simplified model 200 corresponds to the processing of S3038. Note that the functional parts in FIG. 56 which are the same as those in FIG. 49 of the third embodiment are denoted by the same reference symbols as those in FIG. 49 to omit the description thereof.

The configurations other than the processing of S3038 are the same as those of the third embodiment, and thus description thereof is omitted. The processing of S3038 is detailed below using FIG. 56.

In S3038, first of all, a perturbation model's body horizontal position for correction Xc calculated as described below in the last control cycle (time t−Δt) is added to an instantaneous value of a desired body horizontal position of a simplified model's gait obtained in S3032 in FIG. 48 as described earlier (provisional instantaneous value obtained in the control cycle at current time t), by a calculator 205. Thus, a final desired body horizontal position (corrected desired body horizontal position) is obtained. In addition, a later-described perturbation model's body posture angle for correction θc calculated in the last control cycle (time t−Δt) is added to an instantaneous value of a desired body posture angle of the simplified model's gait obtained in S3032 in FIG. 48 (provisional instantaneous value obtained in the control cycle at current time t). Thus, a final desired body posture angle (corrected desired body posture angle) is obtained. The corrected desired body horizontal position and corrected desired body posture angle are outputted as final desired instantaneous values of body horizontal position and body posture angle, respectively.

In other words, the corrected desired body horizontal position and corrected desired body posture angle are obtained by Equations a24 and a25 described earlier.

Next, inputted to the foregoing inverse dynamic full model 201 are instantaneous values of movement variables of the desired body horizontal position (corrected desired body horizontal position), desired body posture angle (corrected desired body posture angle) obtained by correcting the simplified model's gait as above, desired center-of-gravity position, desired foot position/posture, desired arm positions and the like of the simplified model's gait, obtained as described earlier, and an instantaneous value of the desired ZMP. Thereafter, a floor reaction force's horizontal component and floor reaction force's moment about the desired ZMP, which balance with a movement expressed by the inputted movement variables (that is, which are generated by the inverse full model 201 due to the movement), are calculated. Therefore, in this embodiment, the perturbation model's body horizontal position for correction Xc and perturbation model's body posture angle for correction θc, as well as the body horizontal position and body posture angle of the simplified model are additionally inputted to the inverse full model 201. Hereinbelow, similarly to the third embodiment, the floor reaction force's horizontal component and floor reaction force's moment calculated by the inverse full model 201 are called full-model's floor reaction force's horizontal component Ffull and full-model's floor reaction force's moment Mfull, respectively.

Between the full-model's floor reaction force's horizontal component Ffull and full-model's floor reaction force's moment Mfull, the full-model's floor reaction force's horizontal component Ffull is outputted as a corrected desired floor reaction force's horizontal component (final desired instantaneous value of floor reaction force's horizontal component at current time t).

In other words, the corrected desired floor reaction force's horizontal component is determined by the following equation and outputted.

Corrected desired floor reaction force's horizontal component= full-model's floor reaction force's horizontal component $Ffull$ Equation a48

As evident from the above processing, in this embodiment, the full-model's gait is obtained by adding behaviors of the perturbation model for correcting body horizontal position 202 and perturbation model for correcting body posture angle 203 to the simplified model's gait. Hence, the following equation holds true. The simplified model's floor reaction force's horizontal component is a translational force's horizontal component of a floor reaction force obtained by calculating the floor reaction force generated by the movement of the simplified model's gait, using the inverse full model 201.

Full-model's floor reaction force's horizontal component $Ffull$

=simplified model's floor reaction force's horizontal component+ perturbation model's floor reaction force's horizontal component for correcting body horizontal position $Fp$ +perturbation model's floor reaction force's horizontal component for correcting body posture angle $Fr$ Equation a51

Next, a required value of perturbation model's stabilization moment for correcting body horizontal position Mpfdmd is determined by the perturbation model control law for correcting body horizontal position 206. The perturbation model control law for correcting body horizontal position 206 in this embodiment is set as proposed in Patent Application No. 2001-133621 by the applicant of the present application concerned. For example, the control law 206 is determined as the following equation.

Required value of perturbation model's stabilization moment for correcting body horizontal position $Mpfdmd=Kpg^*$center-of-gravity difference+$Kvg^*$perturbation model's body horizontal velocity for correction $dXc/dt$ Equation a52 where center-of-gravity difference is obtained in the following equation.

Center-of-gravity difference=full-model's horizontal center-of-gravity position−simplified model's horizontal center-of-gravity position Equation a53

Kpg and Kvg in Equation a52 are gains of feedback control. The full-model's horizontal center-of-gravity position, simplified model's horizontal center-of-gravity position, and perturbation model's body horizontal velocity for correction dXc/dt are the horizontal center-of-gravity position of the instantaneous value of full-model's gait, the horizontal center-of-gravity position of the instantaneous value of simplified model's gait (horizontal center-of-gravity position XGs calculated using the simplified model, based on instantaneous posture of the simplified model's gait) and perturbation model's body horizontal velocity for correction dXc/dt, respectively, all calculated at the last time (time t−Δt) as described later.

In other words, a feedback amount (manipulated amount) for controlling the perturbation model is calculated based on the center-of-gravity difference, obtained by subtracting the simplified model's horizontal center-of-gravity position from the full-model's horizontal center-of-gravity position, and the perturbation model's body velocity, one of states of the perturbation model. A time average of the center-of-gravity differences can be controlled to be almost zero by the perturbation model control law.

Next, a required value of perturbation model's stabilization moment for correcting body posture Mrfdmd is determined by the perturbation model control law for correcting body posture angle 207. A control law similar to that of the first embodiment can be used. Thus, for example, Equation a11 is used as the control law 207.

Next, an unlimited corrected desired floor reaction force's moment Min is obtained (estimated) by a Min calculator 209. Similarly to the third embodiment, the unlimited corrected desired floor reaction force's moment Min is a floor reaction force's moment which is generated about the desired ZMP when the perturbation model's stabilization moment for correcting body horizontal position Mpf is caused to coincide with the required value of perturbation model's stabilization moment for correcting body horizontal position Mpfdmd, the perturbation model's stabilization moment for correcting body posture angle Mrf is caused to coincide with the required value of perturbation model's stabilization moment for correcting body posture angle Mrfdmd, and the desired floor reaction force's moment for compliance control, serving as the desired floor reaction force's moment about the desired ZMP, is caused to coincide with the total sum of the compensated total floor reaction force's moment Mdmd, Mpf, and Mrf. At this time, the foregoing constraints (ZMP constraints and floor reaction force's horizontal component constraint) are ignored.

The unlimited corrected desired floor reaction force's moment Min is obtained by calculation of foregoing Equation a13, similarly to the third embodiment. In other words, the unlimited corrected desired floor reaction force's moment Min is obtained by adding the required value of perturbation model's stabilization moment for correcting body horizontal position Mpfdmd, required value of perturbation model's stabilization moment for correcting body posture angle Mrfdmd, and the compensated total floor reaction force's moment Mdmd.

Further, an unlimited corrected desired floor reaction force's horizontal component Fin is obtained (estimated) by a Fin calculator 210. Similarly to the third embodiment, the unlimited corrected desired floor reaction force's horizontal component Fin is a floor reaction force's horizontal component (equivalent to Ffull) which is generated by the inverse full model 201 when the perturbation model's stabilization moment for correcting body horizontal position Mpf is caused to coincide with the required value of perturbation model's stabilization moment for correcting body horizontal position Mpfdmd, the perturbation model's stabilization moment for correcting body posture angle Mrf is caused to coincide with the required value of perturbation model's stabilization moment for correcting body posture angle Mrfdmd, and the desired floor reaction force's moment for compliance control is caused to coincide with the total sum of the compensated total floor reaction force's moment Mdmd, Mpf, and Mrf. At this time, the foregoing constraints (ZMP constraint and floor reaction force's horizontal component constraint) are ignored.

Unlike the third embodiment, the unlimited corrected desired floor reaction force's horizontal component Fin is obtained by the following equation.

Unlimited corrected desired floor reaction force's horizontal component *Fin*

=full-model's floor reaction force's horizontal component *Ffull*

+1/*h*

*(required value of perturbation model's stabilization moment for correcting body horizontal position *Mpfdmd*–perturbation model's stabilization moment for correcting body horizontal position *Mpf*)               Equation a54

The value of the perturbation model's stabilization moment for correcting body horizontal position Mpf is the last value thereof (value at time t−Δt). Specifically, a difference between the required value of perturbation model's stabilization moment for correcting body horizontal position Mpfdmd and perturbation model's stabilization moment for correcting body horizontal position Mpf is obtained, and an input to the perturbation model for correcting body horizontal position is increased by the above difference. Because of the increase, the full-model's floor reaction force's horizontal component Ffull is increased. The increased amount of the full-model's floor reaction force's horizontal component Ffull is estimated by dividing the above difference by the body translation mode floor reaction force ratio h. In addition, the full-model's floor reaction force's horizontal component Ffull is added to the above increased amount, thus estimating the unlimited corrected desired floor reaction force's horizontal component Fin.

Next, limited corrected desired floor reaction force's moment Mltd (about the desired ZMP) and limited corrected desired floor reaction force's horizontal component Fltd are determined by limiting means (limitation processing unit 211) similar to that of the third embodiment, from the unlimited corrected desired floor reaction force's moment Min and unlimited corrected desired floor reaction force's horizontal component Fin. Mltd and Fltd are values obtained by limiting Min and Fin, respectively, to satisfy the foregoing constraints (ZMP constraint and floor reaction force horizontal component constraint). This processing method is the same as that of the third embodiment.

In this embodiment, the desired floor reaction force's moment for compliance control also coincides with the limited corrected desired floor reaction force's moment Mltd, and the corrected desired floor reaction force's horizontal component almost coincides with the limited corrected desired floor reaction force's horizontal component Fltd. Thus, by determining the limited corrected desired floor reaction force's moment Mltd and limited corrected desired floor reaction force's horizontal component Fltd as described above, the desired floor reaction force's moment for compliance control and corrected desired floor reaction force's horizontal component almost satisfy the ZMP constraint and floor reaction force's horizontal component constraint, respectively.

Next, the perturbation model's stabilization moment for correcting body horizontal position Mpf is obtained by an Mpf calculator 215. To be more specific, a value obtained by subtracting the full-model's floor reaction force's horizontal component Ffull from the limited corrected desired floor reaction force's horizontal component Fltd, is multiplied by a gain Kc. The resulting value is integrated at the integrator 215*a*, and the integral thus obtained is further multiplied by the body translation mode floor reaction force ratio h. Thus, the perturbation model's stabilization moment for correcting body horizontal position Mpf is obtained. In other words, the perturbation model's stabilization moment for correcting body horizontal position Mpf is obtained by the following equation.

*Mpf=h*∫*Kc*(*Fltd−Ffull*)*dt*               Equation a55

Next, the perturbation model's stabilization moment for correcting body posture angle Mrf is obtained by a Mrf calculator 214, by subtracting the perturbation model's stabilization moment for correcting body horizontal position Mpf and compensated total floor reaction force's moment Mdmd from the limited corrected desired floor reaction force's moment Mltd. In other words, the perturbation model's stabilization moment for correcting body posture angle Mrf is obtained by foregoing Equation a21.

Further, the perturbation model's floor reaction force's moment for correcting body posture angle Mr is determined by foregoing Equation a23. In other words, the perturbation model's stabilization moment for correcting body posture angle Mrf, which is the output of the Mrf calculator 214, is determined as it is as the perturbation model's floor reaction force's moment for correcting body posture angle Mr.

Next, a full-model's floor reaction force's moment error Merr defined by the following equation is calculated by a Merr calculator 216.

Full-model's floor reaction force's moment error $Merr$=full-model's floor reaction force's moment $Mfull$–limited corrected desired floor reaction force's moment $Mltd$   Equation a56

Next, the perturbation model's floor reaction force's moment for correcting body horizontal position Mp is obtained by a Mp calculator 217, in accordance with the following equation.

$Mp=Mpf-\int Km^*Merr\, dt$   Equation a57

Specifically, a value obtained by multiplying the full-model's floor reaction force's moment error Merr by the integral gain Km is integrated at an integrator 217a, and the sign of the resulting integral is changed. Further, the output of the integrator 217a is added to the perturbation model's stabilization moment for correcting body horizontal position Mpf, thus obtaining the perturbation model's floor reaction force's moment for correcting body horizontal position Mp.

Next, the perturbation model's floor reaction force's moment for correcting body horizontal position Mp is inputted to the perturbation model for correcting body horizontal position 202. Thus, the perturbation model's body position for correction Xc which balances with the inputted floor reaction force's moment is calculated.

The perturbation model's floor reaction force's moment for correcting body posture angle Mr is inputted to the perturbation model for correcting body posture angle 203. Thus, the perturbation model's body posture angle for correction θc which balances with the inputted floor reaction force's moment is calculated.

The perturbation model's body position for correction Xc, the perturbation model's body posture angle for correction θc, and the perturbation model's stabilization moment for correcting body horizontal position Mpf are used as the last values at the next control cycle (at time t+Δt), as described earlier.

The rest of the configurations and processing are the same as those of the third embodiment. According to the fourth embodiment, operational advantages similar to those of the third embodiment can be achieved.

Here, correspondence of the above-described fourth embodiment to the present invention is described. The fourth embodiment corresponds to the foregoing first to tenth, and twelfth to seventeenth aspects of this invention. In this case, in the fourth embodiment, the body posture angle of the robot 1 is equivalent to the state quantity of the posture of the robot, the floor reaction force's horizontal component is equivalent to the variable to be limited, the perturbation model's moment for correcting body posture angle Mr and perturbation model's moment for correcting body horizontal position Mp are equivalent to the correction manipulated variable, the compensated total floor reaction force's moment Mdmd is equivalent to the first required manipulated variable, the floor reaction force's moment for compliance control is equivalent to the actual floor reaction force manipulated variable, the required value of perturbation model's stabilization moment for correcting body horizontal position Mpfdmd and required value of perturbation model's stabilization moment for correcting body posture angle Mrfdmd are equivalent to the second required manipulated variable. Further, the simplified model 200 (model in FIG. 10), the inverse full model 201, the perturbation model for correcting body posture 203, and the perturbation model for correcting body horizontal position 202 are used as dynamic models. The movements of the simplified model 200, perturbation model for correcting body posture 203 and perturbation model for correcting body horizontal position 202 include the body translation mode and body rotation mode. In addition, gait parameters are corrected as appropriate by the processing of S3028 in FIG. 48.

Next, the fifth embodiment of the present invention is described with reference to FIGS. 57 and 58. The fifth embodiment is a method of generating a gait while correcting the gait using a direct dynamic model (more precisely, pseudo direct dynamic model), instead of using the inverse dynamic full model (inverse full model) used in the aforementioned third and fourth embodiments.

Figure 57:
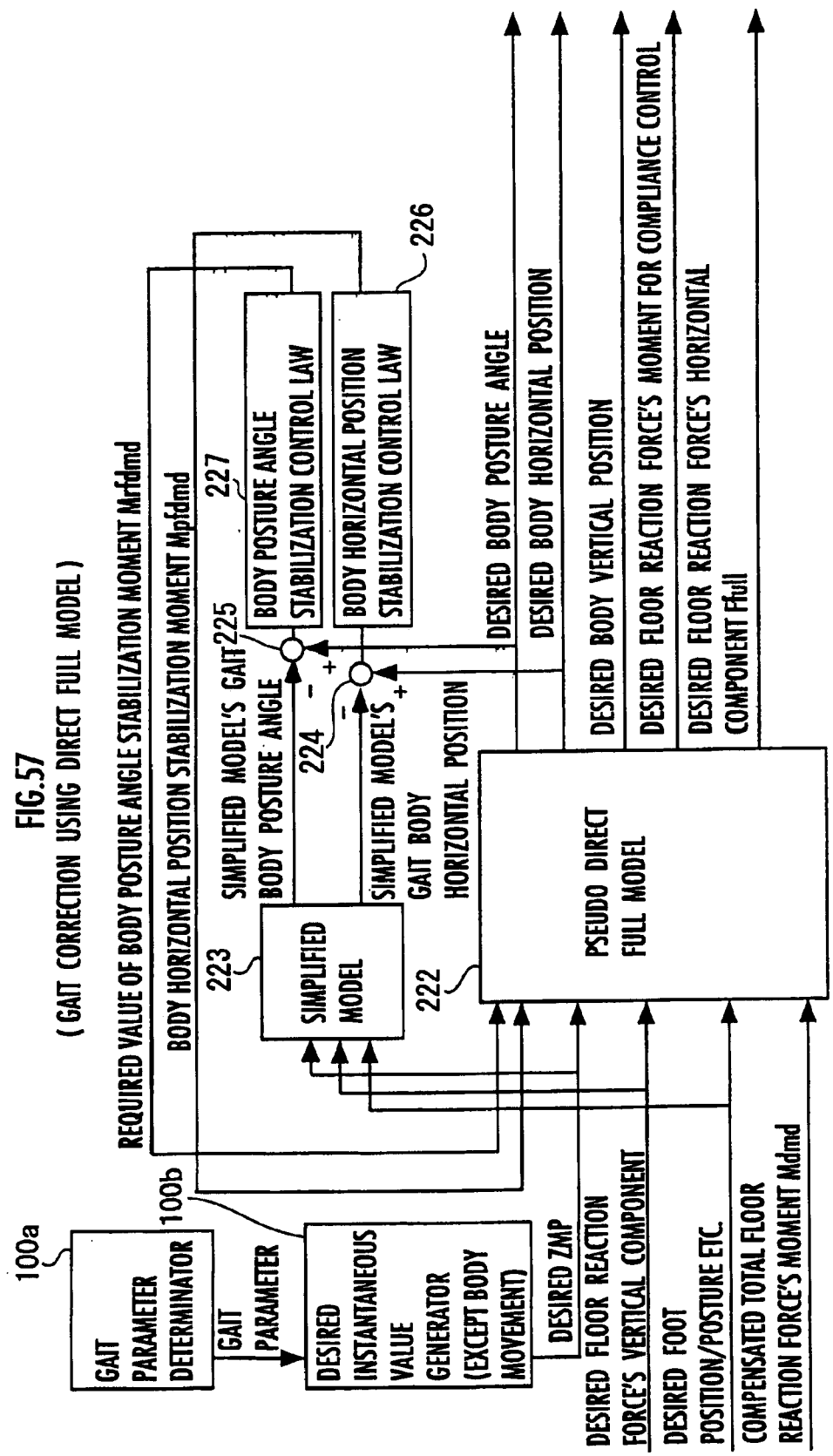
FIGS. 57 and 58 are block diagrams functionally showing a gait generation method in the fifth embodiment.

FIG. 57 is a functional block diagram explaining the operation of the device of the fifth embodiment. As shown in FIG. 57, the pseudo direct full model (pseudo direct dynamic full model) 222 is provided in this embodiment.

Inputs of this pseudo direct full model 222 are the required value of body horizontal position stabilization moment Mpfdmd, required value of body posture angle stabilization moment Mrfdmd, desired ZMP, desired floor reaction force's vertical component, and compensated total floor reaction force's moment Mdmd, as well as movement states of portions apart from the body 24, such as desired foot position/posture and desired arm postures. The pseudo direct full model 222 outputs desired body vertical position, desired body horizontal position, desired body posture angle, desired floor reaction force's moment for compliance control as a desired floor reaction force about the desired ZMP, and desired floor reaction force's horizontal component. The inputs of the pseudo direct full model 222 are generated by the desired instantaneous value generator 100b based on the gait parameters determined in the gait parameter determinator 10a, as described with reference to foregoing FIG. 47.

Figure 58:
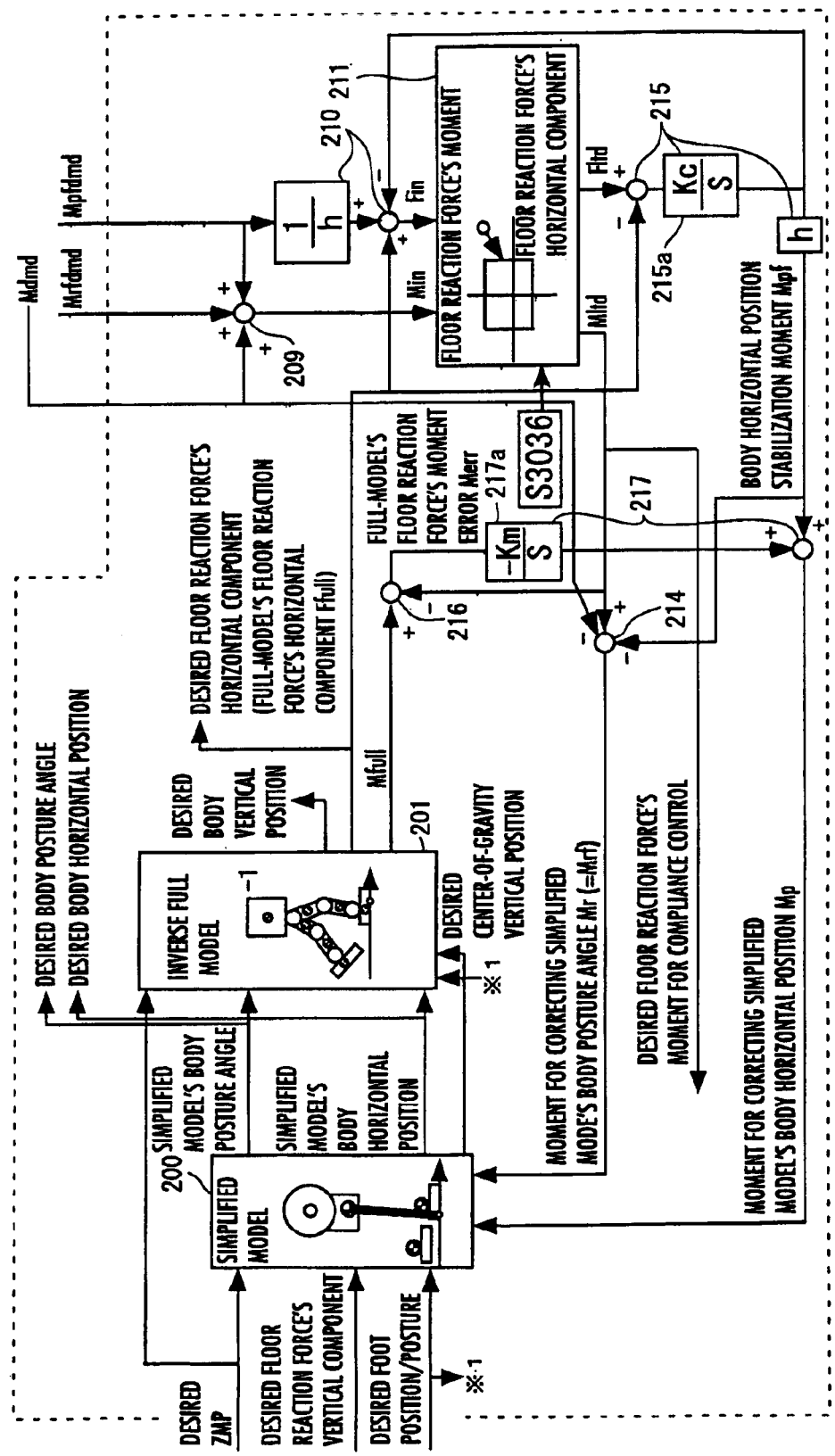

The above-described pseudo direct full model 222 is specifically shown by the functional block diagram in FIG. 58. Note that the functional parts in this functional block diagram, which are the same as those in FIG. 56 of the foregoing fourth embodiment, are denoted by the same reference symbols as those in FIG. 56.

Here, the simplified model 200 in FIG. 58 represents not only the dynamic model, but also the processing from S3010 to S3034 of foregoing FIG. 48, that is, the calculation (determination) processing of instantaneous values of the simplified model's gait. Further, in the calculation (determination) processing of instantaneous values of current time gait (instantaneous values of simplified model's gait) in S3032, the model manipulation floor reaction force's moment about the desired ZMP is set to be zero and instantaneous values of the gait are generated, as described in the foregoing third embodiment. Further, a perturbation movement in the body rotation mode is added to the instantaneous values of the gait. This perturbation movement generates (the last value of) perturbation model's moment for correcting body posture angle Mr which corresponds to the perturbation model's moment for correcting body posture angle Mr described in the third embodiment. In addition, a perturbation movement in the body translation mode is added to the instantaneous values of the gait. This perturbation movement generates (the last value of) a moment for correcting simplified model's body horizontal position Mp which corresponds to the perturbation model's moment for correcting body horizontal position Mp described in the third embodiment. Thus, the instantaneous values of the gait outputted by the simplified model 200 are corrected.

To be more specific, in the processing of S3032 in FIG. 48 in this embodiment, the instantaneous value of the body horizontal position at current time t is obtained in the following manner in S1014 in FIG. 40, subroutine processing of S3032 in FIG. 48. A body horizontal acceleration (d2Xb/dt2) is obtained based on an equation expressing that the second term on the right side of forgoing Equation 03 is equal to (the last value of) Mp, that is, an equation Mp=mb*(Zb−Zzmp)*(d2Xb/dt2). This body horizontal acceleration is added as a perturbation to the body horizontal acceleration obtained in the simplified model 200. The resultant body horizontal acceleration is then second-order integrated from the beginning of the current time gait up to current time t, thus obtaining the instantaneous value of body horizontal position at current time t. Further, in S1014 in FIG. 40, a body posture angular acceleration (d2θby/dt2) is obtained based on an equation which expresses that the seventh term on the right side of foregoing Equation 03 is equal to (the last value of) Mr, that is an equation Mr=J*d2θby/dt2. The body posture angular acceleration is added as a perturbation to the body posture angular acceleration obtained by the simplified model 200. The resultant body posture angular acceleration is second-order integrated from the beginning of the current time gait up to current time t, thus obtaining an instantaneous value of body posture angle at current time t.

In FIG. 58, portions after the simplified model 200 are those which execute processing which corresponds to the processing of S3038. The processing of S3038 is detailed below using FIG. 58.

In S3038, first of all, in S3032, a simplified model's body horizontal position, corrected based on the moment for correcting simplified model's body horizontal position Mp (specifically, the last value in control cycle at time (t−Δt)), is outputted as a desired body horizontal position (final desired instantaneous value of body horizontal position at time t), as described earlier. In addition, a simplified model's body posture angle, corrected based on the perturbation model's moment for correcting body posture angle Mr (specifically, the last value in control cycle at time (t−Δt)), is outputted as a desired body posture angle (final desired instantaneous value at body posture angle at time t).

In other words, final desired body horizontal position and desired body posture angle are determined by Equations a100 and a101.

Desired body horizontal position=simplified model's body horizontal position     Equation a100

Desired body posture angle=simplified model's body posture angle     Equation a101

Next, inputted to the foregoing inverse dynamic full model (inverse full model) 201 are the desired body horizontal position (that is, simplified model's body horizontal position), desired body posture angle (that is, simplified model's body posture angle), the instantaneous values of movement variables of the desired total center of gravity, desired foot position/posture, desired arm postures and the like of the simplified model's gait obtained as described earlier, as well as an instantaneous value of the desire ZMP. Thereafter, a floor reaction force's horizontal component and floor reaction force's moment about the desired ZMP, which balance with a movement expressed by the inputted movement variables (that is, which are generated by the inverse full model 201 due to the movement), is calculated. Hereinbelow, similarly to the fourth embodiment, these calculated floor reaction force's horizontal component and floor reaction force's moment are referred to as full-model's floor reaction force's horizontal component Ffull and full-model's floor reaction force's moment Mfull, respectively.

Similarly to the fourth embodiment, the full-model's floor reaction force's horizontal component Ffull is outputted as a desired floor reaction force's horizontal component (final desired instantaneous value of floor reaction force's horizontal component at time t).

In this embodiment, the perturbation model for correcting body posture angle and perturbation model for correcting body horizontal position are not provided. Thus, processing corresponding to perturbation model control law for correcting body horizontal position and perturbation model control law for correcting body posture angle is different from that in the fourth embodiment.

Apart from above, processing which is the same as the processing in the fourth embodiment for determining the perturbation model's moment for correcting body posture angle Mr and perturbation model's moment for correcting body horizontal position Mp is executed after the above-described processing, until the moment for correcting simplified model's body posture angle Mr and moment for correcting simplified model's body horizontal position Mp are determined. In other words, processing of Min calculator 209, Fin calculator 210, limitation processing unit 211 (limiting means), Mpf calculator 215, Merr calculator 216, Mrf calculator 217 (=Mr calculator), and Mp calculator 214 is the same as that of the fourth embodiment. Note that Mr and Mp correspond to the perturbation model's moment for correcting body posture angle Mr and perturbation model's moment for correcting body horizontal position Mp in the fourth embodiment, respectively. However, Mr and Mp are not inputted to the perturbation models like in the fourth embodiment, but inputted to the simplified model 200. Therefore, in this embodiment, Mr and Mp are referred to as the moment for correcting simplified model's body posture angle and the moment for correcting simplified model's body horizontal position, respectively.

The perturbation model's moment for correcting body posture angle Mr and the moment for correcting simplified model's body horizontal position Mp obtained as above are used as last values when determining (generating) the instantaneous values of the simplified model's gait in the next control cycle (time t+Δt) as described earlier.

The rest of the configurations and processing are the same as those in the fourth embodiment.

Hereinbelow, determination processing of the required value of body posture angle stabilization moment Mrfdmd and the required value of body horizontal position stabilization moment Mpfdmd is described with reference to FIG. 57.

As shown in FIG. 57, in this embodiment, a simplified model 223 is provided in addition to the simplified model 200 provided in the pseudo direct full model 222 as described earlier. In this embodiment, the function of the simplified model 223 is the same as that of the above-described simplified model 200. The simplified model 223 represents not only the dynamic model but also the processing from S3010 to S3034 in foregoing FIG. 48, that is, the calculation (determination) processing of instantaneous values of the simplified model's gait. Note that the simplified model 223 is only required to be able to determine instantaneous values of body posture angle and body horizontal position, and does not necessarily perform the entire processing from S3010 to S3034 in FIG. 43.

Hereinbelow, determination processing of Mpfdmd and Mrfdmd in this embodiment is detailed using FIG. 57.

Differences in body horizontal position and body posture angle between a gait generated by using the simplified model 223 and a gait calculated by using the foregoing pseudo direct dynamic full model 222 as described earlier, are obtained by calculators 224 and 225, respectively. Thereafter, in accordance with the differences, a required value of body horizontal position stabilization moment Mpfdmd and required value of body posture angle stabilization moment Mrfdmd are determined by feedback control laws, such as PID, so that the differences converge to zero. In other words, Mpfdmd is obtained by a body horizontal position stabilization control law 226 made up of the feed back control law, in accordance with the difference between the body horizontal position by the simplified model 223 and the body horizontal position by the pseudo direct full model 222. Further, Mrfdmd is obtained by a body posture angle stabilization control law 227 made up of the feedback control law, in accordance with the difference between the body posture angle by the simplified model 223 and the body posture angle by the pseudo direct full model 222. The Mpfdmd and Mrfdmd thus determined are then fed back and inputted to the aforementioned pseudo direct dynamic full model.

Note that, in this embodiment, the gait generating device 100 outputs the desired ZMP, desired floor reaction force's vertical component, desired foot position/posture, desired arm postures and the like, which are a part of inputs to the foregoing pseudo direct dynamic full model 222. The gait generating device 100 also outputs the desired body vertical position, desired body horizontal position, desired body posture angle, desired floor reaction force's horizontal component and desired floor reaction force's moment for compliance control, which are outputs from the foregoing pseudo direct dynamic full model 222. These are outputted as final desired instantaneous values of the current time gait.

According to the fifth embodiment described above, operational advantages similar to those of the foregoing fourth embodiment can be achieved.

Here, correspondence of the above-described fifth embodiment to the present invention is described. The fifth embodiment corresponds to the foregoing first to fourteenth aspects and the sixteenth to twenty-third aspects of this invention. In this case, in the fifth embodiment, the body posture angle of the robot 1 is equivalent to the state quantity of the posture of the robot, the floor reaction force's horizontal component is equivalent to the variable to be limited, the moment for correcting simplified model's body posture angle Mr and moment for correcting simplified model's body horizontal position Mp are equivalent to the correction manipulated variable of the desired floor reaction force, the compensated total floor reaction force's moment Mdmd is equivalent to the first required manipulated variable, the floor reaction force's moment for compliance control is equivalent to the actual floor reaction force manipulated variable, and the required value of body horizontal position stabilization moment Mpfdmd and required value of body posture angle stabilization moment Mrfdmd are equivalent to the second required manipulated variable. In addition, the pseudo direct full model 222 including the simplified model 200 and inverse full model 201, and the simplified model 223 are used as the dynamic model. The simplified models 200 and 223 include the body translation mode and body rotation mode. Further, gait parameters are corrected by the processing of S3028 in FIG. 48, as appropriate.

Note that, in the foregoing fifth embodiment, the required value of body posture angle stabilization moment Mrfdmd and body horizontal position stabilization moment Mpfdmd are inputted only to the pseudo direct full model 222. However, Mrfdm and Mpfdmd may be inputted to the simplified model 223, or distributed and supplied to the simplified model 223 and pseudo direct full model 222.

Figure 59:
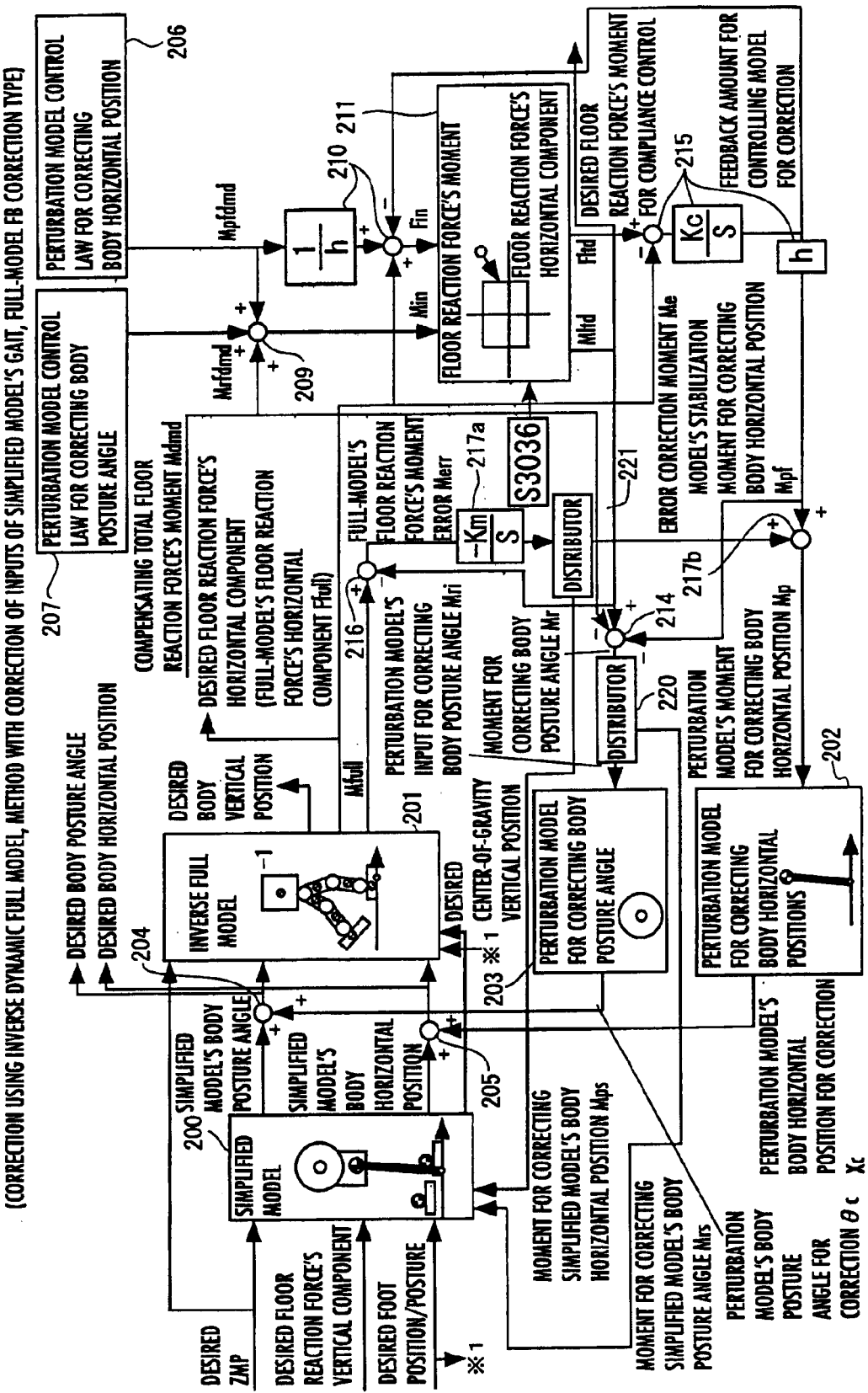
FIG. 59 is a block diagram functionally showing a gait generation method in the sixth embodiment.

Next, the sixth embodiment of the present invention is described with reference to FIG. 59. FIG. 59 is a functional block diagram for explaining the operation of the device in the sixth embodiment of this invention, specifically, the correction method of a gait in S3038 of the flowchart in FIG. 48. Note that, in FIG. 59, the same functional parts as those of the third or fourth embodiment are denoted by the same reference symbols as those in FIG. 49 or FIG. 56.

In the sixth embodiment, the perturbation model for correcting body horizontal position 202 and perturbation model for correcting body posture angle 203 are provided. In addition, two distributors 220 and 221 are provided.

The distributors 220 and 221 are defined. Each distributor is a transmission block with one input and two outputs, and determines one output in accordance with the input (for example, determines one output by performing signal processing with frequency characteristics, dead band characteristics, saturation characteristics or the like on the input), and then determine the other output so that the sum of two outputs coincides or almost coincides with the input.

An input to the distributor 220 is a moment for correcting body posture angle Mr (output of a Mr calculator 214), obtained by subtracting the perturbation model's stabilization moment for correcting body horizontal position Mpf and the compensated total floor reaction force's moment Mdmd from the limited corrected desired floor reaction force's moment Mltd. The moment for correcting body posture angle Mr is then distributed into a perturbation model's input for correcting body posture angle Mri to be inputted to the perturbation model for correcting body posture angle 203 and the moment for correcting simplified model's body posture angle Mrs to be inputted to the simplified model 200. At this time, the perturbation model's input for correcting body posture angle Mri and the moment for correcting simplified model's body posture angle Mrs are determined (outputted) so that the sum of the perturbation model's input for correcting body posture angle Mri and the moment for correcting simplified model's body posture angle Mrs coincides with the moment for correcting body posture angle Mr.

To be more specific, the perturbation model's input for correcting body posture angle Mri is determined in accordance with the moment for correcting body posture angle Mr. For example, the moment for correcting body posture angle Mr is put through signal processing having dead band characteristics, saturation characteristics, or frequency characteristics, thus determining the perturbation model's input for correcting body posture angle Mri. In addition, the perturbation model's input for correcting body posture angle Mri is subtracted from the moment for correcting body posture angle Mr, and the resulting value is determined as the moment for correcting simplified model's body posture angle Mrs. More specifically, in this embodiment, the distributor 220 outputs a low frequency component (direct current component) obtained by passing the input (moment for correcting body posture angle Mr=Mltd−Mpf−Mdmd) through a low pass filter, as the moment for correcting simplified model's body posture angle Mrs. At the same time, a component obtained by subtracting Mrs from the input (moment for correcting body posture angle Mr) is outputted as the perturbation model's input for correcting body posture angle Mri. In this case, the moment for correcting simplified model's body posture angle Mrs, which is the low frequency component (direct current component), is provided with dead band characteristics. Thus, where the output of the above-mentioned low pass filter is within a predetermined range having a predetermined value as the center thereof, Mrs is maintained to be the predetermined value (for example, zero).

The perturbation model's input for correcting body posture angle Mri, the output of the distributor 220, is inputted to the aforementioned perturbation model for correcting body posture angle 203, and the perturbation model's body posture angle for correction θc is determined by the perturbation model for correcting body posture angle 203.

The moment for correcting simplified model's body posture angle Mrs, the other output of the distributor 220, is inputted to the simplified model 200. This is equivalent to inputting the moment for correcting simplified model's body posture angle Mr to the simplified model 200 in FIG. 58 in the foregoing fifth embodiment.

A value obtained by multiplying the full-model's floor reaction force's moment error Merr by a gain Km is integrated by the integrator 217a, and the sign of the resulting value is changed. The value thus obtained is the input to the distributor 221.

As in the case of the distributor 220, the input to the distributor 221 is distributed into the moment for correcting simplified model's body horizontal position Mps to be inputted to the simplified model 200, and the error correction moment Me to be inputted to the perturbation model for correcting body horizontal position 202. To be more specific, the error correction moment Me is determined in accordance with the output of the integrator 217a. For example, the output of the integrator 217a (input to the distributor 220) is put through signal processing having dead band characteristics, saturation characteristics, or frequency characteristics, thus determining the error correction moment Me. In addition, the error correction moment Me is subtracted from the output of the integrator 217a, and the resulting value is determined as the moment for correcting simplified model's body posture angle Mrs. More specifically, in this embodiment, the distributor 221 outputs a low frequency component (direct current component) obtained by passing the input (output of the integrator 217a) through a low pass filter, as the moment for correcting simplified model's body horizontal position Mps. At the same time, a component obtained by subtracting Mps from the input (output of the integrator 217a) is outputted as the error correction moment Me. In this case, the moment for correcting simplified model's body horizontal position Mps, which is the low frequency component (direct current component), is provided with dead band characteristics. Thus, where the output of the abovementioned low pass filter is within a predetermined range having a predetermined value as the center thereof, Mps is maintained to be the predetermined value (for example, zero).

In the Mp calculator 217b, the model's stabilization moment for correcting body horizontal position Mpf is added to the error correction moment Me, the output of the distributor 221. Thus, the perturbation model's moment for correcting body horizontal position Mp is obtained. Thereafter, the perturbation model's moment for correcting body horizontal position Mp is inputted to the perturbation model for correcting body horizontal position 202. Thus, the perturbation model's body horizontal position for correction Xc is determined by the perturbation model for correcting body horizontal position 202.

The moment for correcting simplified model's body horizontal position Mps, the other output of the distributor 221, is inputted to the simplified model 200. This is equivalent to inputting the moment for correcting simplified model's body horizontal position Mp to the simplified model 200 in FIG. 58 in the foregoing fifth embodiment.

As in the case of the fifth embodiment, in the calculation (determination) processing of instantaneous values of the simplified model's gait, the simplified model 200 generates instantaneous values of the gait so that a floor reaction force's moment is not generated about the desire ZMP (the model manipulation floor reaction force's moment is zero). On top of this, a perturbation movement of the body rotation mode, which generates (the last value of) the moment for correcting simplified model's body posture angle Mrs, is added to the instantaneous values. At the same time, a perturbation movement of the body translation mode, which generates (the last value of) the moment for correcting simplified model's body horizontal position Mps, is added to the instantaneous values. Thus, the instantaneous values of the gait are corrected.

In this embodiment, in S800 in FIG. 35, a part of the processing of S3028 in FIG. 48, the state of the simplified model at the end of the last time gait are used as the end state of the last time gait. Therefore, if Mrs and Mps outputted from the distributors 220 and 221 to the simplified model are values other than zero, the simplified model is shifted from the original behavior. Hence, gait parameters are corrected in S3028 as appropriate, depending on the shift. Further, if ranges of the aforesaid dead band are set to be large, the absolute values of Mrs and Mps become small. Thus, absolute values of correction amounts of the gait parameters also become small.

The other configuration and processing are the same as those of the fourth embodiment. To be more specific, the processing of the calculators 204 and 205, Merr calculator 216, perturbation model control law for correcting body posture angle 207, perturbation model control law for correcting body horizontal position 206, Min calculator 209, Fin calculator 210, limit processing unit 211, and Mpf calculator 215 is the same as that of the foregoing fourth embodiment.

Note that, in this embodiment, there is no need to perform processing for correcting the states of the simplified model 200 by way of the states of the respective perturbation models 202 and 203 at the end of the current time gait or the like, as described in the foregoing third embodiment. This is because, the moment for correcting simplified model's body posture angle Mrs and moment for correcting simplified model's body horizontal position Mps are additionally inputted from the distributors 220 and 221.

In this embodiment, operational advantages similar to those of the foregoing fourth or fifth embodiment can be achieved.

Note that, in this embodiment, one of the two outputs from each of the distributors 220 and 221 may be set to be zero so that the other output is caused to coincide with the input.

In this case, if, for example, the moment for correcting simplified model's body posture angle Mrs, the output of the distributor 220, and the moment for correcting simplified model's body horizontal position Mps, the output of the distributor 221, are set to be zero, the operational advantages as those of the fourth embodiment can be achieved. (The configuration becomes practically the same as that of the fourth embodiment.)

Further, the moment for correcting simplified model's body posture angle Mrs, the output of the distributor 220, and the error correction moment Me, the output of the distributor 221, may be set to be zero. In this case, the perturbation model for correcting body posture angle can be omitted.

Yet further, the perturbation model's input for correcting body posture angle Mri, the output of the distributor 220, and the moment for correcting simplified model's body horizontal position Mps, the output of the distributor 221, may be set to be zero.

Yet further, it is also possible that the value obtained by adding the model's stabilization moment for correcting body horizontal position Mpf to the error correction moment Me is inputted to an unillustrated third distributor, the one of the outputs of the distributor is inputted to the perturbation model for correcting body horizontal position and the other output is added to the moment for correcting simplified model's body horizontal position Mps. In this case, the moment for correcting simplified model's body horizontal position Mps, the output of the distributor 221, may be zero. In other words, it may be possible that the distributor 221 is omitted and a value obtained by multiplying the full-model's floor reaction force's moment error Merr by the gain Km is integrated and the sign of the resulting value is changed. The value thus obtained is added to the model's stabilization moment for correcting body horizontal position Mpf, and the resulting value may be inputted to the third distributor.

Here, correspondence of the above-described sixth embodiment to the present invention is described. The sixth embodiment corresponds to the foregoing first to fourteenth aspects and the sixteenth to twenty-third aspects of the present invention. In this case, in the sixth embodiment, the body posture angle of the robot 1 is equivalent to the state quantity of the posture of the robot, the floor reaction force's horizontal component is equivalent to the variable to be limited, the moment for correcting simplified model's body posture angle Mrs, moment for correcting simplified model's body horizontal position Mps, perturbation model's input for correcting body posture angle Mri, and perturbation model's moment for correcting body horizontal position Mp are equivalent to the correction manipulated variable of the desired floor reaction force, the compensated total floor reaction force's moment Mdmd is equivalent to the first required manipulated variable, the floor reaction force's moment for compliance control is equivalent to the actual floor reaction force manipulated variable, the required value of perturbation model's stabilization moment for correcting body horizontal position Mpfdmd and required value of the perturbation model's stabilization moment for correcting body posture angle Mrfdmd are equivalent to the second required manipulated variable. Further, the simplified model 200 (model in FIG. 10), inverse full model 201, perturbation model for correcting body posture 203, the perturbation model for correcting body horizontal position 202 are used as the dynamic model. Movements of the simplified model 200, perturbation model for correcting body posture 203 and perturbation model for correcting body horizontal position 202 include the body translation mode and body rotation mode. In addition, gait parameters are corrected as appropriate by the processing of S3028 in FIG. 48.

In the first to sixth embodiments described so far, the compensated total floor reaction force's moment Mdmd may be determined based on other states related to the posture of the robot 1, such as total horizontal center-of-gravity position and velocity, in stead of the body posture angle and angular velocity.

In the aforementioned third to sixth embodiments, the gait generating devices of the first and second examples of Japanese Patent Laid-Open Publication No. Heisei 5-337849, earlier proposed by the applicant of the present application concerned, may be used for gait generation by the simplified model 200 (simplified model gait generation). A correction amount by the full model can be reduced, thus preventing the corrected gait from largely shifting from the simplified model's gait.

In the foregoing first embodiment, if the compensated total floor reaction force's moment Mdmd exceeds the floor reaction force's moment allowable range (in the second embodiment and the embodiments that follow, if the sum of the compensated total floor reaction force's moment Mdmd and model manipulation floor reaction force's moment exceeds the floor reaction force's moment allowable range), the desired floor reaction force's moment for compliance control becomes the upper or lower limit value of the floor reaction force's moment allowable range. However, even where the compensated total floor reaction force's moment Mdmd (in the second embodiment and the embodiments that follow, the sum of the compensated total floor reaction force's moment Mdmd and model manipulation floor reaction force's moment) exceeds the floor reaction force's moment allowable range, the desired floor reaction force's moment for compliance control may be set to increase or decrease corresponding to an increase or decrease of the compensated total floor reaction force's moment Mdmd (in the second embodiment and the embodiments that follow, the sum of the compensated total floor reaction force's moment Mdmd and model manipulation floor reaction force's moment). This is because, when the desired floor reaction force's moment for compliance control becomes close to the floor reaction force's moment allowable range, the actual floor reaction force's moment controlled by the compliance control tends to be slightly smaller than the desired value. Therefore, even where the desired floor reaction force's moment for compliance control slightly exceeds the allowable range, it is often the case where problems, such as lowering foot 22's original sense of contact with the floor and raising foot 22's bottom surface, do not occur immediately.

For reasons similar to above, the floor reaction force's moment allowable range may be set, exceeding a allowable range which is obtained by converting the range where ZMP can exist (strictly, the range where the point of action of the actual floor reaction force can exist) represented by the so-called support polygon, into a moment.

Excessive dependence on the floor reaction force's moment generated by the compliance control results in the problems, such as lowering foot 22's original sense of contact with the floor and raising foot 22's bottom surface, as described earlier. Therefore, it can be said that the floor reaction force's moment allowable range is such a allowable range of the actual floor reaction force's moment that posture control expects from compliance control.

The floor reaction force's moment allowable range may be determined based on not only gait parameters but also detected actual floor reaction force. Alternatively, the floor reaction force's moment allowable range may be determined based on detected values of a floor contacting region of the foot 22, such as detected values of edge positions of stairs.

The processing of the main flowchart may be changed so that correction of current time gait parameters (correction of the desired ZMP) in S028 in FIG. 12 in the foregoing first embodiment is performed for each control cycle.

When the corrected gait (desired gait) largely deviates (diverges) from the original gait, the corrected gait ends up with having too large deviation (too large divergence) when gait parameters of the next time gait are corrected. Hence, merely correcting gait parameters of the next time gait leaves it difficult to continuously generate stable desired gaits over a long period of time. This problem can be solved to a great extent by correcting current time gait parameters (by correcting the desired ZMP) for each control cycle.

Furthermore, foot landing position and landing time of the current time gait may be changed for each control cycle, depending on the extent of the deviation of the corrected gait from the original gait.

Specifically, the processing flow is changed to execute the processing from S020 to S029 for each control cycle. Thereafter, it is sufficient that at least any one of the next time gait's supporting leg coordinate system (the next time gait's supporting leg coordinate system corresponds to the next foot landing position/posture), next but one time gait's supporting leg coordinate system (next but one time gait's supporting leg coordinate system corresponds to the foot landing position/posture after the next), current time gait's period (current time gait's period corresponds to the next foot landing time), and next time gait's period (next time gait's period corresponds to the cycle of the normal gait) is changed as appropriate so that correction of the current time gait parameters (correction of the desired ZMP, in particular) in S028 becomes small (that is, stability margin of the current time gait is maintained high).

Yet further, gait parameters other than above may be changed.

The deviation of the corrected gait from the original gait can be estimated by the use of the dynamic model from the moment for correcting simplified model's body posture angle Mr, the moment for correcting simplified model's body horizontal position Mp and the like. Thus, deviation in behavior of the model is estimated in accordance with Mr and Mp, and gait parameters may be corrected based on the estimated deviation in behavior. Alternatively, a relation between Mr, Mp and appropriate values of correction amounts of gait parameters is obtained in advance and mapped. Thereafter, based on the map, correction amounts of gait parameters may be set in accordance with Mr and Mp.

Further, processing flow may be changed in the other embodiments (the second to sixth embodiments) in the manner similar to above.

The recovery conditions may additionally include kinematics conditions and dynamics conditions, such as whether a joint angle exceeds its allowable range, whether there is no interference of leg or the like, whether joint angular velocity and torque are excessive, and the like, other than the foregoing conditions.

Accordingly, when processing of the main flowchart is changed so that current time gait parameters (the desired ZMP or landing position and time) are corrected for each control cycle as described earlier, it is also possible to add the following as one of the recovery conditions: values of gait parameters, which are changed as appropriate to maintain high stability margin of current time gait, shall become appropriate values (shall satisfy a certain constraint).

The landing position and landing time determined (read) at switching moment of gait are determined by commands from a host control device (commands from a gait plan determinator, an operator, or the like, hereinafter referred to as "original requirements"). Hence, the landing position and landing time of the corrected gait should return to the landing position and landing time determined (read) at the switching moment of gait, as much as possible. Therefore, the following may be added to the recovery conditions: the landing position and landing time determined (read) at a switching moment of gait should be stored and the landing position and landing time of the corrected gait should coincide with or be as close to the stored landing position and landing time as possible. However, this does not have to be added since there is an effect operated due to the foregoing recovery conditions 3 and 4, that the landing position and landing time of the corrected gait gradually return to the landing position and landing time determined (read) at the switching moment of gait, as much as possible.

Moreover, the following may be added to the recovery conditions: the original requirements should be changed in accordance with changes of situations, and the gait parameters changed as appropriate to maintain high stability margin of the gait as described above should coincide with or be as close to gait parameters which satisfy the changed requirements as possible. In this case, the foregoing recovery conditions 3 and 4 should be removed.

As for a determination method of model's body horizontal position stabilization floor reaction force's moment and model's body posture angle stabilization floor reaction force's moment, which satisfy the aforementioned various recovery conditions, linear programming (simplex method or the like) or a search method for obtaining optimum values under constraints can be used. Alternatively, fuzzy inference may be used.

Moreover, when changing a landing position, there may be a situation where obstacles in the walking environment should be taken into consideration. In order to be able to deal with such situation, the corrected gait should be determined with additional processing related to the field of artificial intelligence, such as environment recognition and determination of actions.

The block diagrams before and after the limiting means (limitation processing unit 211) in the foregoing third to sixth embodiments may be equivalently or approximately transformed as described by the applicant of the present application concerned in PCT application (name: control system) filed as of Dec. 26, 2002, for example.

Figure 60:
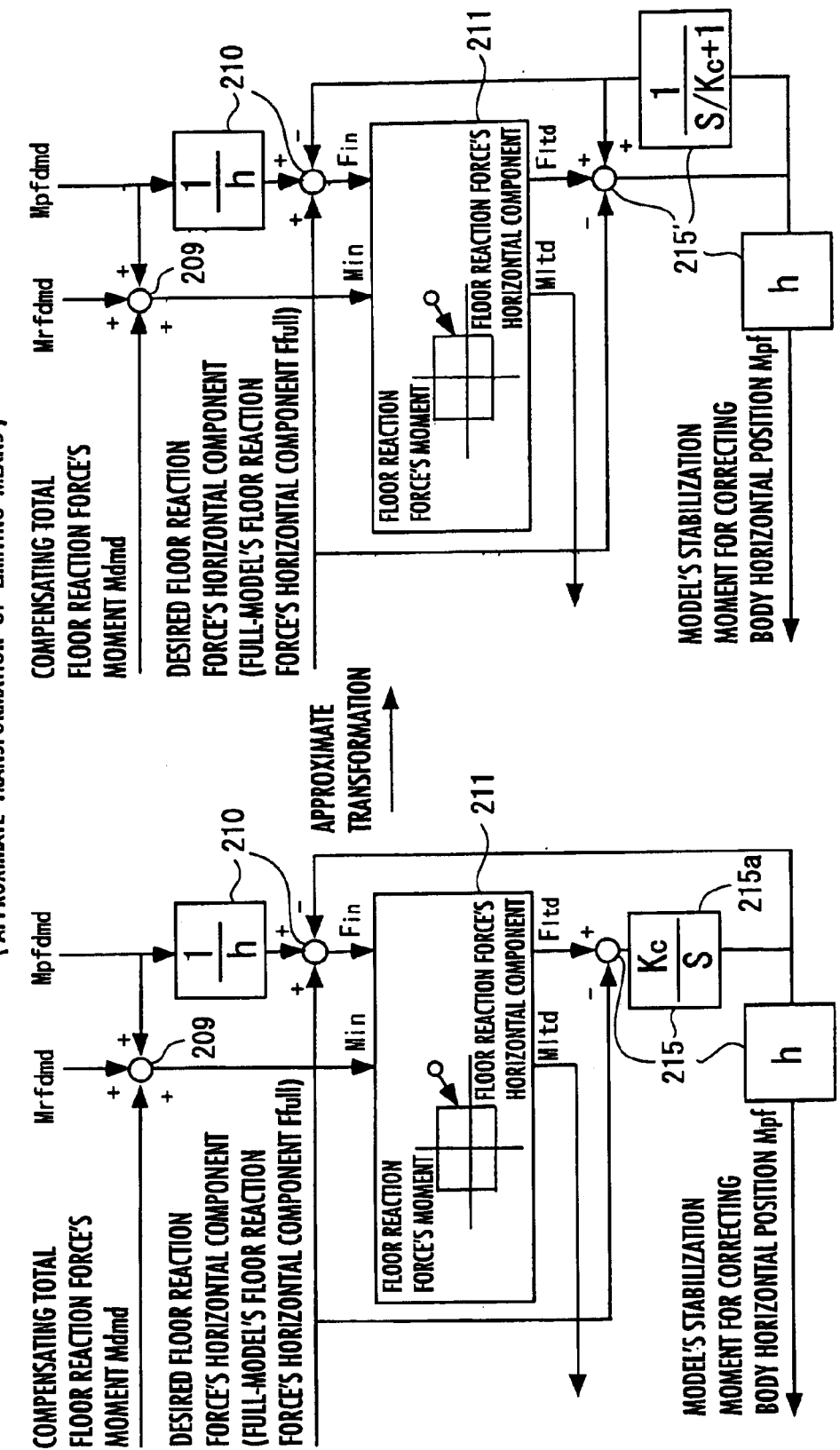
FIG. 60 is a block diagram showing a modified form of the essential parts in the fourth to sixth embodiments.
Figure 61:
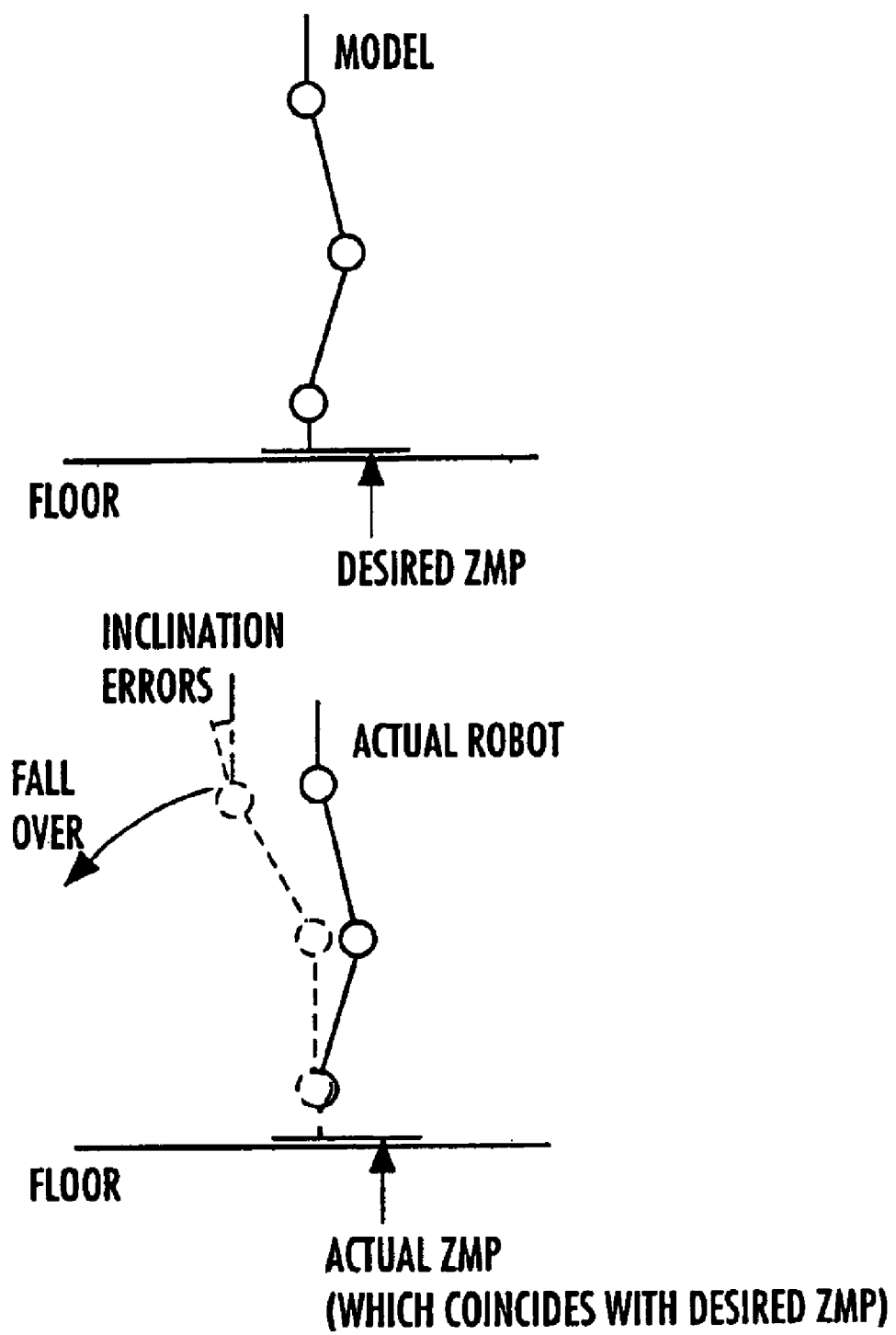
FIGS. 61 and 62 are explanatory views for explaining conventional technologies.
Figure 62:
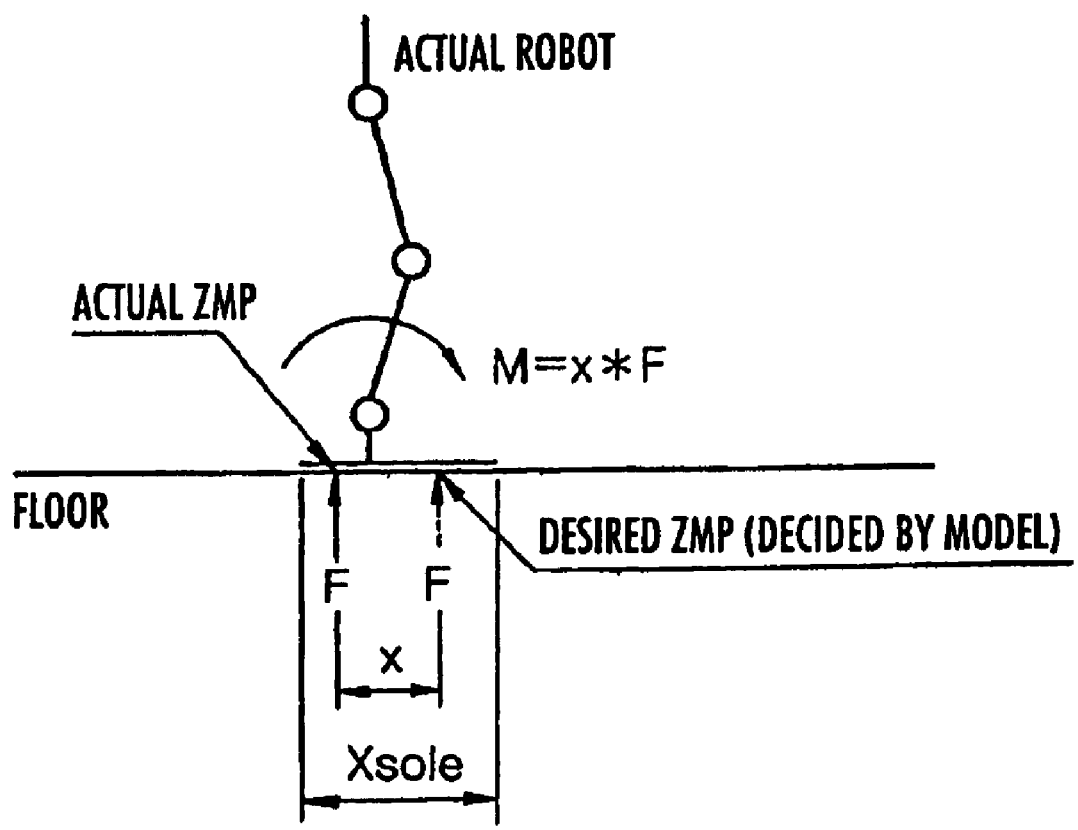

In this case, a value obtained by dividing the model's stabilization moment for correcting body horizontal position Mpf by h is passed though a low pass filter and the value thus obtained is subtracted from the corrected desired floor reaction force's horizontal component (full-model's floor reaction force's horizontal component Ffull). The resulting value corresponding to the estimated value of bias destm in the above-mentioned PCT application. Therefore, the above-mentioned block diagrams may be approximately transformed as shown in FIG. 60, by, for example, replacing integration of the gain Kc in the foregoing fourth to sixth embodiments by positive feedback system in which first-order lag of time constant 1/Kc is used as a feedback element. In this example, the Mpf calculator 215 in the fourth to sixth embodiments is approximately transformed as shown in the drawing.

In the foregoing first embodiment, in addition to the configuration described in Japanese Patent Laid-Open Publication No. Heisei 5-337849 proposed by the applicant of the present application concerned, determined are behaviors of two movement modes having different generation ratios of floor reaction force's horizontal component to floor reaction force's moment about the desired ZMP. For example, determined are body translation acceleration of the body translation movement mode and body posture angular acceleration of the body rotation mode. They are determined so that a translational force's horizontal component of a floor reaction force does not exceed allowable range of floor reaction force's horizontal component. Thus, the gait of the actual robot 1 can be converged to a corrected desired gait (gait finally outputted by the gait generating device 100). In other words, the posture of the actual robot 1 can be stabilized.

Further, a difference between desired floor reaction force's moment for compliance control and model manipulation floor reaction force's moment becomes the total recovering force.

Moreover, the model manipulation floor reaction force's moment can be any value without consideration of the range where ZMP can exist. Thus, a very high posture recovering force can be generated.

Yet further, the translational force's horizontal component of a floor reaction force does not exceed the allowable range of floor reaction force's horizontal component. Thus, robot 1 can be prevented from slipping.

Furthermore, during a period when a floor reaction force's vertical component is zero, that is, a period when both legs 2 and 2 do not contact the floor, posture is recovered depending on the body rotation movement mode, without depending on the body translation mode. Thus, posture is effectively recovered without depending on a frictional force between the floor and foot 22.

Further, the actual floor reaction force's moment is prevented from being excessively large. Thus, occurrence of problems, such as lowering foot 22's original sense of contact with the floor and raising foot 22's bottom surface, can be prevented or suppressed.

Moreover, current time gait parameters are determined or changed so that a new current time gait, in which the end state of the corrected gait for one step is used as a new initial state, becomes gradually close to a normal gait. Thus, gait with ensured stability can be generated continuously (for a long period of time).

In the foregoing second embodiment, the original gait and corrected gait are simultaneously generated as described earlier. The corrected gait is corrected for stabilizing the posture of the actual robot 1. When there remains a margin even after the floor reaction force's moment required for posture recovery is generated by compliance control, the corrected gait converges to the original gait using the margin as much as possible. Therefore, in addition to the operational advantages of the foregoing first embodiment, it is possible to generate a gait close to the initially-set original gait, that is, a gait close to the gait conforming to the initial requirements. Thus, when there is a movement path set in advance, it is possible to prevent a large deviation from the movement path. In addition, convergence of the body posture angle of the corrected gait to the body posture angle of the original gait (initially determined gait) is prioritized over convergence of the body horizontal position of the corrected gait to the body horizontal position of the original gait (initially determined gait). Thus, large fluctuations of the body posture angle can be suppressed.

In the foregoing first to sixth embodiments, the floor reaction force's horizontal component allowable limit is set. However, since the floor reaction force's horizontal component and robot's total center of gravity horizontal acceleration are in proportion to each other, there is no problem to use the robot's total center of gravity horizontal acceleration and its allowable range in stead of the floor reaction force's horizontal component and its allowable range in each embodiment described earlier. It is also no problem to explicitly set parameters related to a horizontal acceleration trajectory of a portion with a behavior close to the robot's total center of gravity horizontal acceleration trajectory. For example, where the masses of the legs 2 and 2 are sufficiently smaller than the mass of the body 24, the body horizontal acceleration trajectory and total center of gravity horizontal acceleration trajectory of the robot 1 are almost the same or in proportional to each other. Thus, the body horizontal acceleration and its allowable range can be used instead of the floor reaction force's horizontal component and its allowable range.

Moreover, for gait generation while the robot 1 is moved on a slope (while the robot 1 is moved on a inclined floor surface), an allowable range of a floor surface parallel component (component parallel to the floor surface) of the translation floor reaction force, that is, a allowable range of a friction force, or a allowable range of a floor surface parallel component of the total center-of-gravity acceleration (this component, excluding a gravity component, is proportional to a frictional force) may be set in stead of setting the floor reaction force's horizontal component allowable limit and allowable range of total center-of-gravity acceleration horizontal component. For example, description is given regarding a case of setting the allowable range of the floor surface parallel component (frictional force) of the translation floor reaction force. (This description is the same of a case of setting the allowable range of the floor surface parallel component of the total center-of-gravity acceleration). Where an inclination angle relative to the parallel floor surface is set as $\theta f$ (this inclination angle is set to be a positive value when the slope descends forward in the traveling direction of the robot 1), a relation expressed by the following Equation c72 about the frictional force holds true. Therefore, in the case of generating a gait to have algorithm similar to those of the foregoing embodiments, the frictional force allowable range can be converted into floor reaction force's horizontal component allowable limit by the use of the relation of Equation c72 to set the floor reaction force's horizontal component allowable limit. Note that, in this case, a desired floor reaction force's vertical component can be used as a floor reaction force's vertical component in Equation c72.

Frictional force=floor reaction force's horizontal component*$\cos(\theta f)$–floor reaction force's vertical component*$\sin(\theta f)$  Equation c72

In the foregoing embodiments, two movement modes, the body rotation mode and body translation mode, are used in order to allow the floor reaction force's horizontal component and floor reaction force's moment about the desired ZMP to be appropriate values. However, movement modes other than above may be used. In this case, one of the movement modes does not have to be a movement mode which does not generate a floor reaction force's horizontal component. This is because, as long as two movement modes with different generation ratios of floor reaction force's horizontal component to floor reaction force's moment about the desired ZMP, are used, any combination of modes can generate arbitrary floor reaction force's horizontal component and floor reaction force's moment about the desired ZMP like the above example.

Further, a movement mode other than those related to body posture may be used. However, it is necessary to choose a movement mode which is capable of generating a largest possible floor reaction force's horizontal component or floor reaction force's moment about the desired ZMP by smallest possible displacement.

For example, a movement mode for swinging right and left arms around in the same rotation direction, or a movement mode which causes a perturbation of a position of foot which does not contact a floor (which is in the air), may be used. However, when causing a perturbation of a free leg trajectory, the perturbation amount should be returned to substantially zero by the moment immediately before landing so that the landing position does not change.

Furthermore, three or more movement modes may be used.

Among the selected modes, at least two modes should have mutually different generation ratios of floor reaction force's horizontal component to floor reaction force's moment about the desired ZMP. Otherwise, in general, there will be no solutions of simultaneous equations.

Moreover, whenever possible, it is preferred to combine the following movement modes: a movement mode which can make a sufficiently large change of a floor reaction force's moment about the desired ZMP without changing a floor reaction force's horizontal component so much; and a movement mode which can make a sufficiently large change of a floor reaction force's horizontal component without changing a floor reaction force's moment about the desired ZMP so much.

In other words, it is preferred to combine a movement mode which can make a sufficiently large change of an angular momentum without changing total center of gravity so much, and a movement mode which can make a sufficiently large change of total center of gravity without changing an angular momentum so much. This is because displacement of a movement mode becomes small.

Other than the foregoing dynamic models used in the embodiments, the following models may be used as the aforementioned simplified model.

(1) A nonlinear model in which material particles are set in a plurality of links as shown in FIG. 12 (model with multiple material particles).
(2) A model with three material particles shown in Patent Application No. 2000-352011 proposed by the applicant of the present application concerned.
(3) A model with one material particle in which only the body has a mass.
(4) A model which ignores an inertial force's moment generated by a change of angular momentum about the total center of gravity.
(5) A separate type model having separate partial models including: a partial model representing a relation between the resultant force of gravity and inertial force (or floor reaction force) and body translation movement; and a partial model representing a relation between the above resultant force and body rotation movement. For example, the material particles shown in FIG. 10 are the partial model representing the relation between the above-mentioned resultant force and body translation movement, and the flywheel shown in FIG. 10 is the partial model representing the relation between the above-mentioned resultant force and body rotation movement.

However, the above models of (2), (3) and (4) cannot be used in the embodiment in which the moment for correcting simplified model's body posture angle is added to the simplified model.

Note that, it is basically preferred that a dynamic model having higher approximation accuracy than that of the simplified model is used as the full model. However, a dynamic model having approximate accuracy equal to that of the simplified model may be used.

Further, in each embodiment described earlier, equivalent modification, such as changing the order of calculation processing, can be made in block diagrams, flowcharts, algorithms and the like. A low pass filter may also be inserted where appropriate.

Each foregoing embodiment has been described with regard to a biped mobile robot. However, the present invention can be applied to any robot with one foot as well as any multi-legged robot having three or more feet.

INDUSTRIAL APPLICABILITY

As described so far, the present invention is useful as it can perform movement control of a robot, which enables a legged mobile robot such as a biped mobile robot to move smoothly with stable posture without causing slip or the like.

What is claimed is:

1. A control device for a legged mobile robot that moves by moving legs extending from a body, for successively determining an instantaneous value of a desired movement of the legged mobile robot by the use of a dynamic model representing at least a relation between a movement and a floor reaction force of the robot, and performing movement control of the robot to allow the movement of the robot to follow the determined instantaneous value of the desired movement, the control device comprising:

allowable range setting means for setting a allowable range of a variable to be limited, which is at least a horizontal component of a translation floor reaction force or a floor surface parallel component of a translation floor reaction force, acting on the robot, or a total center-of-gravity acceleration or a floor surface parallel component of the total center-of-gravity acceleration of the robot; and desired instantaneous value determining means for determining a new instantaneous value of the desired movement based on at least an error between a desired state quantity of a posture of the robot, which corresponds to the determined instantaneous value of the desired movement, and an actual state quantity of the posture of the robot such that the variable to be limited which is defined based on the dynamic model in accordance with the new instantaneous value, remains within the allowable range.

2. The control device for a legged mobile robot according to claim 1, wherein a movement of the dynamic model includes at least a plurality of movement modes of the robot, the movement modes having mutually different generation ratios of a floor reaction force's moment to the translation floor reaction force, and the desired instantaneous value determining means determines the new instantaneous value of the desired movement by adjusting a plurality of the movement modes of the movement of the dynamic model in accordance with at least the allowable range.

3. The control device for a legged mobile robot according to claim 2, wherein the movement modes include a posture changing movement for changing a posture of a predetermined portion of the robot while maintaining center-of-gravity of the robot almost invariable, and a translation movement of the body of the robot.

4. The control device for a legged mobile robot according to claim 1, comprising means for correcting gait parameters for determining a pattern(s) of a desired floor reaction force and/or the desired movement of the robot after current time, in accordance with at least a state quantity of the dynamic model.

5. The control device for a legged mobile robot according to claim 1, comprising means for successively determining a reference instantaneous value of a desired floor reaction force of the robot, wherein the desired Instantaneous value determining means determines a correction manipulated variable of the desired floor reaction force in accordance with at least the error and the allowable range of the variable to be limited, and also determines the new instantaneous value of the desired movement to permit a resultant force of an inertial force and gravity, generated on the dynamic model by the new instantaneous value of the desired movement, to balance with a floor reaction force obtained by correcting the reference instantaneous value by the correction manipulated variable.

6. The control device for a legged mobile robot according to claim 5, wherein a movement of the dynamic model includes at least a plurality of movement modes of the robot, the movement modes having mutually different generation ratios of a floor reaction force's moment to the translation floor reaction force, and the desired instantaneous value determining means determines the new instantaneous value of the desired movement by adjusting a plurality of the movement modes of the movement of the dynamic model in accordance with at least the allowable range.

7. The control device for a legged mobile robot according to claim 6, wherein the movement modes include a posture changing movement for changing a posture of a predetermined portion of the robot while maintaining center-of-gravity of the robot almost invariable, and a translation movement of the body of the robot.

8. The control device for a legged mobile robot according to claim 7, wherein the desired instantaneous value determining means determines a new desired instantaneous value of the desired movement by preferentially adjusting the translation movement of the body, rather than the posture changing movement, in order to permit the resultant force to balance with the floor reaction force obtained by correcting the reference instantaneous value by the correction manipulated variable of the desired floor reaction force.

9. The control device for a legged mobile robot according to claim 5, comprising means for determining the correction manipulated variable of the desired floor reaction force in accordance with at least the error, the allowable range of the variable to be limited, and a state quantity of the dynamic model.

10. The control device for a legged mobile robot according to claim 5, comprising means for correcting gait parameters for determining a pattern(s) of the desired floor reaction force and/or the desired movement of the robot after current time, in accordance with the correction manipulated variable of the desired floor reaction force used for determining an instantaneous value of the desired movement, and/or a change of a state quantity of the dynamic model by the correction manipulated variable.

11. The control device for a legged mobile robot according to claim 5, comprising: first means for determining a first required manipulated variable of a floor reaction force in accordance with the error so that the error becomes close to zero; second means for determining an actual floor reaction force manipulated variable and the correction manipulated variable of the desired floor reaction force, which define a desired value of an actual floor reaction force of the robot, based on at least the first required manipulated variable; and third means for performing movement control of the robot in accordance with the actual floor reaction force manipulated variable and the instantaneous value of the desired movement.

12. The control device for a legged mobile robot according to claim 11, wherein any one of the first required manipulated variable, the actual floor reaction force manipulated variable, and the correction manipulated variable of the desired floor reaction force is a manipulated variable related to a floor reaction force's moment about a point of action of a floor reaction force, a position of the point of action of the floor reaction force, or a ZMP.

13. The control device for a legged mobile robot according to claim 11, wherein the second means determines the actual floor reaction force manipulated variable and the correction manipulated variable of the desired floor reaction force so that a difference between the actual floor reaction force manipulated variable and the correction manipulated variable of the desired floor reaction force monotonously changes as the first required manipulated variable increases.

14. The control device for a legged mobile robot according to claim 11, wherein the second means determines the actual floor reaction force manipulated variable so that a value obtained by adding the actual floor reaction force manipulated variable to the reference instantaneous value remains within a predetermined actual floor reaction force allowable range.

15. The control device for a legged mobile robot according to claim 14, wherein, when a value obtained by adding the first required manipulated variable to the reference instantaneous value is a value within the predetermined actual floor reaction force allowable range, the second means determines the first required manipulated variable as the actual floor reaction force manipulated variable, and determines the correction manipulated variable of the desired floor reaction force to be almost zero or a value defined in accordance with the state quantity of the dynamic model, and, when the value obtained by adding the first required manipulated variable to the reference instantaneous value deviates from the predetermined actual floor reaction force allowable range, the second means determines a value obtained by subtracting the reference instantaneous value from a limit value of the actual floor reaction force allowable range, as the actual floor reaction force manipulated variable, and determines the correction manipulated variable of the desired floor reaction force in accordance with at least a difference between the actual floor reaction force manipulated variable and the first required manipulated variable.

16. The control device for a legged mobile robot according to claim 14, wherein the second means comprises: means for obtaining provisionally determined values of the actual floor reaction force manipulated variable and the correction manipulated variable of the desired floor reaction force so that a difference between the actual floor reaction force manipulated variable and the correction manipulated variable of the desired floor reaction force becomes at least a value corresponding to the first required manipulated variable; means for obtaining an estimated value of the variable to be limited corresponding to the new instantaneous value of the desired movement when the new instantaneous value of the desired movement is assumed to be determined by the use of the obtained provisionally determined value of the correction manipulated variable of the desired floor reaction force; means for comparing a value obtained by adding the provisionally determined value of the actual floor reaction force manipulated variable to the reference instantaneous value and the estimated value of the variable to be limited, to the predetermined actual floor reaction force allowable range and the allowable range of the variable to be limited, respectively, and determining a group of the actual floor reaction force manipulated variable and the variable to be limited which satisfy limits by the actual floor reaction force allowable range and the allowable range of the variable to be limited, respectively, based on a result of the comparison; and means for determining the correction manipulated variable of the desired floor reaction force based on the variable to be limited and a value obtained by subtracting the first required manipulated variable from the determined actual floor reaction force manipulated variable.

17. The control device for a legged mobile robot according to claim 16, wherein a movement of the dynamic model includes at least a plurality of movement modes having mutually different generation ratios of a floor reaction forces moment to a translation floor reaction force, and the correction manipulated variable of the desired floor reaction force is configured by a plurality of manipulated variables, each corresponds to each of the movement modes.

18. The control device for a legged mobile robot according to claim 11, comprising fourth means for determining a second required manipulated variable of the floor reaction force to permit a state quantity of the dynamic model to be close to a predetermined state quantity in accordance with the state quantity of the dynamic model, wherein the second means determines the actual floor reaction force manipulated variable and the correction manipulated variable of the desired floor reaction force based on at least the first required manipulated variable, the second required manipulated variable, and the allowable range.

19. The control device for a legged mobile robot according to claim 18, wherein any one of the first and second required manipulated variables, the actual floor reaction force manipulated variable and the correction manipulated variable of the desired floor reaction force is a manipulated variable related to a floor reaction force's moment about a point of action of a floor reaction force, a position of the point of action of the floor reaction force, or a ZMP.

20. The control device for a legged mobile robot according to claim 18, wherein the second means determines the actual floor reaction force manipulated variable and the correction manipulated variable of the desired floor reaction force so that a difference between the actual floor reaction force manipulated variable and the correction manipulated variable of the desired floor reaction force monotonously changes as the first required manipulated variable increases.

21. The control device for a legged mobile robot according to claim 18, wherein the second means determines the actual floor reaction force manipulated variable so that a value obtained by adding the actual floor reaction force manipulated variable to the reference instantaneous value remains within a predetermined actual floor reaction force allowable range.

22. The control device for a legged mobile robot according to claim 21, wherein the second means comprises: means for obtaining provisionally determined values of the actual floor reaction force manipulated variable and the correction manipulated variable of the desired floor reaction force so that a difference between the actual floor reaction force manipulated variable and the correction manipulated variable of the desired floor reaction force becomes at least a value corresponding to the first required manipulated variable and that the correction manipulated variable of the desired floor reaction force becomes a value corresponding to the second required manipulated variable; means for obtaining an estimated value of the variable to be limited corresponding to the new Instantaneous value of the desired movement when the new instantaneous value of the desired movement is assumed to be determined by the use of the obtained provisionally determined value of the correction manipulated variable of the desired floor reaction force; means for comparing a value obtained by adding the obtained provisionally determined value of the actual floor reaction force manipulated variable to the reference instantaneous value and the estimated value of the variable to be limited, to the predetermined actual floor reaction force allowable range and the allowable range of the variable to be limited, respectively, and determining a group of the actual floor reaction force manipulated variable and the variable to be limited which satisfy limits by the actual floor reaction force allowable range and the allowable range of the variable to be limited, respectively, based on a result of the comparison; and means for determining the correction manipulated variable of the desired, floor reaction force based on the variable to be limited and a value obtained by subtracting the first required manipulated variable from the determined actual floor reaction force manipulated variable.

23. The control device for a legged mobile robot according to claim 22, wherein a movement of the dynamic model includes at least a plurality of movement modes having mutually different generation ratios of a floor reaction force's moment to a translation floor reaction force, and the correction manipulated variable of the desired floor reaction force is configured by a plurality of manipulated variables, each corresponds to each of the movement modes.

24. The control device for a legged mobile robot according to claim 12, wherein the second means determines the actual floor reaction force manipulated variable and the correction manipulated variable of the desired floor reaction force so that a difference between the actual floor reaction force manipulated variable and the correction manipulated variable of the desired floor reaction force monotonously changes as the first required manipulated variable increases.

25. The control device for a legged mobile robot according to claim 19, wherein the second means determines the actual floor reaction force manipulated variable and the correction manipulated variable of the desired floor reaction force so that a difference between the actual floor reaction force manipulated variable and the correction manipulated variable of the desired floor reaction force monotonously changes as the first required manipulated variable increases.

* * * * *